United States Patent [19]

Atwood et al.

[11] Patent Number: 5,475,610
[45] Date of Patent: Dec. 12, 1995

[54] THERMAL CYCLER FOR AUTOMATIC PERFORMANCE OF THE POLYMERASE CHAIN REACTION WITH CLOSE TEMPERATURE CONTROL

[75] Inventors: John G. Atwood, West Redding; Albert C. Mossa, Trumbull; Lisa M. Goven, Bridgeport; Fenton Williams, Brookfield; Timothy M. Woudenberg, Bethel, all of Conn.; Marcel Margoulies, Scarsdale, N.Y.; Robert P. Ragusa, Newton, Conn.; Richard Leath, Berkley; Clive Miles, San Rafael, both of Calif.

[73] Assignee: The Perkin-Elmer Corporation, Norwalk, Conn.

[21] Appl. No.: 871,264

[22] Filed: Apr. 20, 1992

Related U.S. Application Data

[63] Continuation-in-part of Ser. No. 620,606, Nov. 29, 1990, abandoned, and Ser. No. 670,545, Mar. 14, 1991, abandoned.

[51] Int. Cl.$^6$ .................................................. G06G 7/58
[52] U.S. Cl. .................... 364/500; 364/496; 364/497; 364/498; 364/499; 165/12
[58] Field of Search .............................. 364/166, 183, 364/496–500, 557; 236/46; 435/52, 290; 422/88; 361/380; 65/1, 12

[56] References Cited

U.S. PATENT DOCUMENTS

| | | | |
|---|---|---|---|
| Re. 34,133 | 11/1992 | Thorne | 422/99 |
| 3,311,303 | 3/1967 | Noyes . | |
| 3,392,914 | 7/1968 | Nienstadt . | |

(List continued on next page.)

FOREIGN PATENT DOCUMENTS

| | | |
|---|---|---|
| 0134622 | 5/1983 | European Pat. Off. . |
| 171140 | 5/1984 | European Pat. Off. . |
| 0128778 | 12/1984 | European Pat. Off. . |
| 0223618 | 7/1985 | European Pat. Off. . |

(List continued on next page.)

OTHER PUBLICATIONS

Techne TP–16 Instruction Manual (16 pages), 1990.
Techne TP–16 Advertisement (2 pages), Dec. 1984.
Techne TP–16 Operating Instruction Manual, May 1984.
Coy Laboratory Products Inc., Model 50/60, Tempcycler Manual, dated Jul. 11, 1991.
Histomat advertisement, R. Jung GmbH, Oct., 1980.
Lake Shore Cryotronics, Inc., Review of Scientific Instruments, Jul. 1980.
Barber–Colman Co. UP55 Setpoint Programmer, 1980.
Techne Brochure, on PHC–2 1982.

(List continued on next page.)

*Primary Examiner*—Emanuel T. Voeltz
*Assistant Examiner*—Kamini Shah
*Attorney, Agent, or Firm*—Davis Hoxie Faithfull & Hapgood

[57] ABSTRACT

An instrument for performing highly accurate PCR employing a sample block in microtiter tray format. The sample block has local balance and local symmetry. A three zone film heater controlled by a computer and ramp cooling solenoid valves also controlled by the computer for gating coolant flow through the block controls the block temperature. Constant bias cooling is used for small changes. Sample temperature is calculated instead of measured. A platen deforms plastic caps to apply a minimum acceptable threshold force for seating the tubes and thermally isolates them. A cover isolates the block. The control software includes diagnostics. An install program tests and characterizes the instrument. A new user interface is used. Disposable, multipiece plastic microtiter trays to give individual freedom to sample tubes are taught.

167 Claims, 39 Drawing Sheets

Microfiche Appendix Included
(10 Microfiche, 890 Pages)

U.S. PATENT DOCUMENTS

| | | | |
|---|---|---|---|
| 3,483,997 | 12/1969 | Ritter | 211/76 |
| 3,847,200 | 11/1974 | Kopp et al. | 159/16 R |
| 3,856,471 | 12/1974 | Winitz . | |
| 3,912,913 | 10/1975 | Bunting . | |
| 3,983,363 | 9/1976 | Alter . | |
| 4,008,048 | 2/1977 | Hellemans et al. . | |
| 4,206,872 | 6/1980 | Levine . | |
| 4,312,835 | 1/1982 | Zoltan et al. . | |
| 4,335,620 | 6/1982 | Adams . | |
| 4,362,699 | 12/1982 | Verlander . | |
| 4,401,594 | 8/1983 | Umezawa et al. | 260/112.5 |
| 4,404,845 | 9/1983 | Schrenker . | |
| 4,474,015 | 10/1984 | Christmas et al. . | |
| 4,478,094 | 10/1984 | Saloma et al. . | |
| 4,483,823 | 10/1984 | Umetsu . | |
| 4,504,733 | 3/1985 | Walsh . | |
| 4,517,160 | 5/1985 | Galle et al. . | |
| 4,518,700 | 5/1985 | Stephens . | |
| 4,534,941 | 8/1985 | Stephens et al. . | |
| 4,544,436 | 11/1985 | Chlosta et al. . | |
| 4,554,839 | 11/1985 | Hewlett et al. . | |
| 4,598,049 | 7/1986 | Zelinka . | |
| 4,651,813 | 3/1987 | Witt et al. | 165/30 |
| 4,679,615 | 7/1987 | Livne | 165/1 |
| 4,683,194 | 7/1987 | Saiki et al. . | |
| 4,683,195 | 7/1987 | Mullis et al. . | |
| 4,683,202 | 7/1987 | Mullis . | |
| 4,685,081 | 8/1987 | Richman . | |
| 4,708,886 | 11/1987 | Nelson . | |
| 4,711,851 | 12/1987 | McNamara et al. . | |
| 4,800,159 | 1/1989 | Mullis et al. | 435/172.3 |
| 4,858,155 | 8/1989 | Okawa et al. . | |
| 4,865,986 | 9/1989 | Coy et al. | 436/290 |
| 4,889,818 | 12/1989 | Gelfand et al. | 435/194 |
| 4,933,146 | 6/1990 | Meyer et al. . | |
| 4,950,608 | 8/1990 | Kishimoto | 435/290 |
| 4,965,188 | 10/1990 | Mullis et al. . | |
| 4,981,801 | 1/1991 | Suzuki et al. . | |
| 5,008,182 | 4/1991 | Sninsky et al. | 435/5 |
| 5,038,852 | 8/1991 | Johnson et al. | 165/12 |
| 5,056,427 | 10/1991 | Sakabe | 100/211 |
| 5,075,216 | 12/1991 | Innis et al. | 435/6 |
| 5,167,929 | 12/1992 | Korf et al. | 422/102 |

FOREIGN PATENT DOCUMENTS

| | | |
|---|---|---|
| 0164054 | 12/1985 | European Pat. Off. . |
| 0200362 | 12/1986 | European Pat. Off. . |
| 0236069 | 9/1987 | European Pat. Off. . |
| 0238313 | 9/1987 | European Pat. Off. . |
| 0325763 | 2/1989 | European Pat. Off. . |
| 0311440 | 4/1989 | European Pat. Off. . |
| 0318255 | 5/1989 | European Pat. Off. . |
| 0388159 | 9/1990 | European Pat. Off. . |
| 2413708 | 12/1977 | France . |
| 2359422 | 2/1978 | France . |
| 2490632 | 3/1982 | France . |
| 2490362 | 3/1982 | France . |
| 2650593 | 5/1977 | Germany . |
| 2603683 | 8/1977 | Germany . |
| 88 08 738.7 | 10/1988 | Germany . |
| 57-098013 | 6/1982 | Japan . |
| 60-24188 | 4/1985 | Japan . |
| 62-12986 | 6/1989 | Japan . |
| 664094 | 2/1988 | Switzerland . |
| 2161815 | 1/1986 | United Kingdom . |
| 8807297 | 3/1988 | WIPO . |
| 8909437 | 10/1989 | WIPO . |
| 89/12502 | 12/1989 | WIPO . |
| 90/08298 | 7/1990 | WIPO . |
| 910636 | 5/1991 | WIPO . |

OTHER PUBLICATIONS

P. S. Martin, et al., J. Parent Sci. Tech. date unknown.

Peltier heat pumps from Materials Electronics Corp. date unknown.

Techne Ad for Dri Block PHC–1, date unknown.

Techne TP–16 Temperature Programmer Advertisement date unknown.

Biores b.v. Bioexcellence TAQ–Polymerase and Ampliclone Kit date unknown.

Techne PHC–1 Ad date unknown.

Techne PHC–2 Temperature Cycler Ad date unknown.

Techne Flow Coolers FC–200 and FC200 and Dip Cooler RU–200 date unknown.

Techne Tempunit ro Tempette Immersion Circulators Ad date unknown.

Dialog Search for Techne Patents date unknown.

Forma Scientific Advertisement, Analytic Chemistry, Aug. 8, 1982, Brookfield Test Chamber.

Cole–Parmer Instr. Co. 1985–1986 Catalog.

IEEE Transactions on Biomedical Engineering, vol. BME–29, No. 8, Aug. 1982, pp. 555–568 V. J. Anselmo et al. "Programmable Temperature Control System for Biological Materials".

Amino Acid Analysis System Rev. Sci. Instrum. 51(7), Jul. 1980.

"Studies on Polynucleotides–The Linkage of Deoxyribopolynucleotide Templates to Cellulose and Its Use in Their Replication" by Panet and Khorara, The Journal of Biological Chemistry, vol. 249, No. 16, Issue of Aug. 25, pp. 5213–5221 (1974).

"Advances in Laboratory Automation Robotics 1984" by Zynark Corp.

"Studies on Polynucleotides–Repair Replication of Short Synthetic DNA's As Catalyzed by DNA Polymerase" by Kleppe et al. J. Mol. Biol. (1971) 56, pp. 341–461.

Studies on Polynucleotides–Total Synthesis of the Structural Gene For An Alanic Transfer Ribonucleic Acid from Yeast, by Khorana et al. J. Mol. Biol. (1972) 72, PP. 209–217.

Studies on Polynucleotides–Hybridization of Polydeoxynucleotides with Tryosine Transfer RNA Sequences to the r Strand ø80 psu DNA, by Miller et al., J. Mol. Biol, (1972) 72, pp. 593–522.

"Automation of Microliter Plate Chromogenic Substrate LAL Endotoxin Assay Method by use of a Modified Pro/Pette Express System", Martin et al. J. Parent Sci Tech, vol. 40, No. 2, pp. 61–66, Mar.–Apr. 1986.

Saiki et al., "Enzymatic Amplification of B–Globin Genomic Sequences and Restriction Site Analysis for Diagnosis of Sickle Cell Anemia", Science vol. 320 pp. 1350–1354, Dec. 1985.

Tecam Dry Heat Baths, Catalog 7051081 date unknown.

Techne (OB–1) Block Digestor) Catalog 7051091 date unknown.

Techne (Dri–Block 08–3), Catalog 7051101 date unknown.

Brookfield Test Chamber, advertisement, Date unknown.

Gene Machines Open Markets, S. Russell, San Francisco Chromical Jan. 11, 1988.

PTC–100 Programmable Thermal Controller, MJ Research, Inc. date unknown.

Techne PHC–1 Dri–Block Operating Instructions date unknown.

Thermoelectric Coolers Tackle Jobs Heat Jobs Heat Sinks Can't–J. McDermott, EDN May 20, 1980.

Laboratory Methods "A Programmable System to Perform the Polymerase Chain Reaction", Weier, et al. date unknown.
Nucleic Acids Research, vol. 16, No. 7, 1988; Rollo et al.
Nucleic Acids Research, vol. 16, No. 12, 1988; Foulkes, et al.
Frigichip–Miniature Ceramic Modules, Series FC, Melcor date unknown.
Model 2010 and 2011 Controllers Pµ, P, LFE Corporation date unknown.
PC Application Ideas, Instruments & Control, Oct. 1980, Jack Hickey.
Bicoent Model Name: ROB 3, ROB 4, Advertisement date unkown.
Biodesign Systems, Model Name: Thermo 4, Advertisement date unkown.
Bio Med, Model Name: PCR Processor; Thermocycler 10; Thermocycler 60, Advertisements and description of PCR–Processor by Oers.
BioMetra, Model Name: Trio notes of Aug. 7, 1989.
Biotherm Corp., Developer Biotherm, Model Name: BioOven, advertisement Jun. 1989.
B. Braun, Model Name: Thermocycler, Advertisement date unknown.
Chromatec, Inc., Model Name: TAC 3000a, notes to Jon Raymond from Fenton Williams of Perkin Elmer re New Cycler Competitor and Letter of Nov. 29, 1989 from Richard Messerschmidt of Chromotec, Inc. to Jona Laboratories.
Coy Labs., Model Name: TempCycler, Distributor: Mepco Scientific, Rotech Scientific Inst., advertisement, J. Fenton William May 12, 1989 "Competitive Analysis: Coy Laboratories Model 50 Tempcyler", Perkin Elmer memo to BIO Competitor Hotline Distribution from B. Delisle of Aug. 3, 1989 re Coy TempCycler.
Dale Designs, Developer; Dale Designs, Model Name: Genesmaid, Distributor; Dale Designs description of "Genesmaid: cycling water bath".
Dalton, Model Name: Programmable Cnzyme Reactor, questionnaire date unknown.
Eppendorf, Inc., Model Name: MicroCycler, advertisement Jan. 1, 1989.

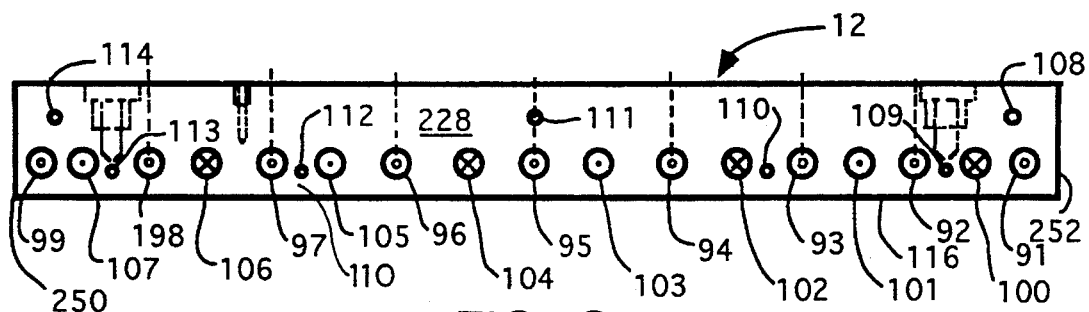
FIG. 3
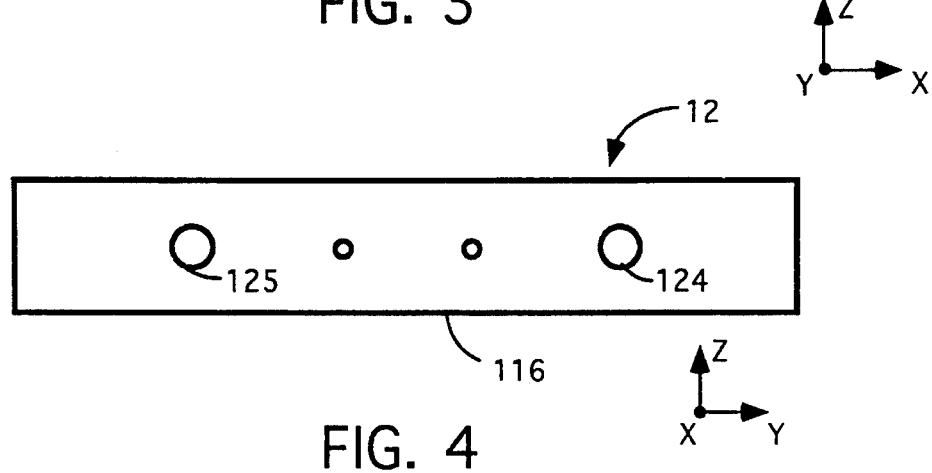
FIG. 4
FIG. 5
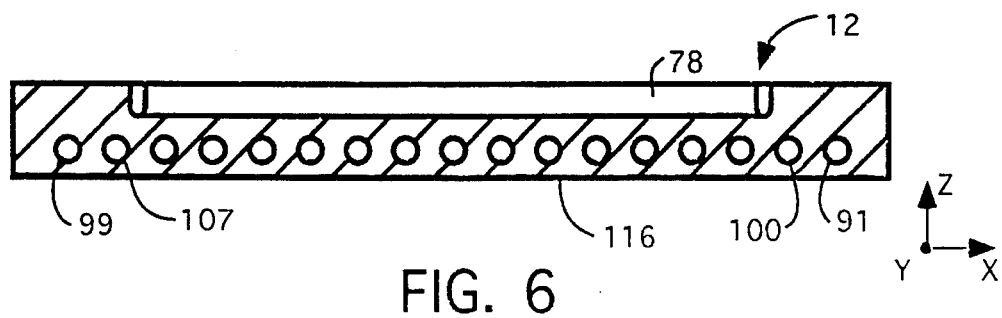
FIG. 6

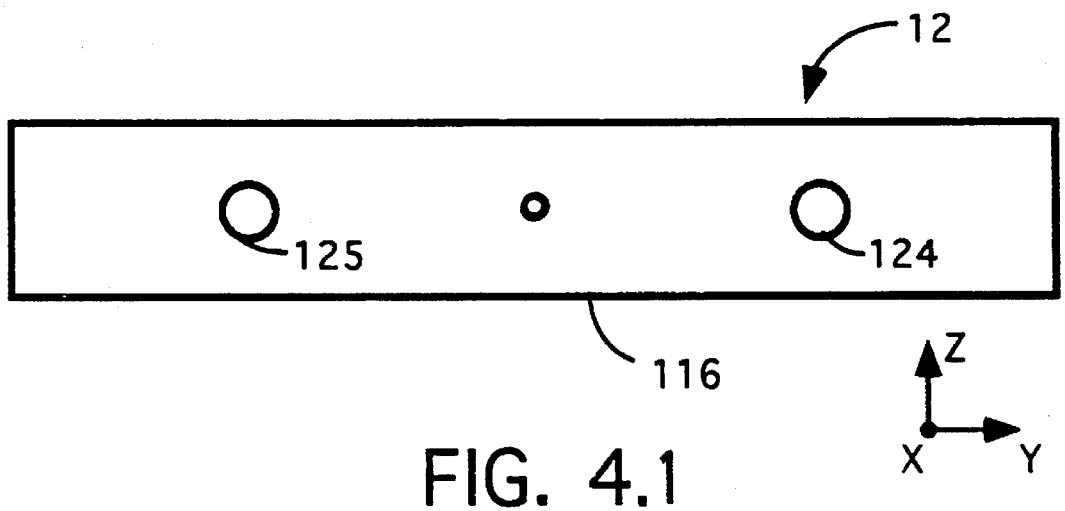
FIG. 4.1

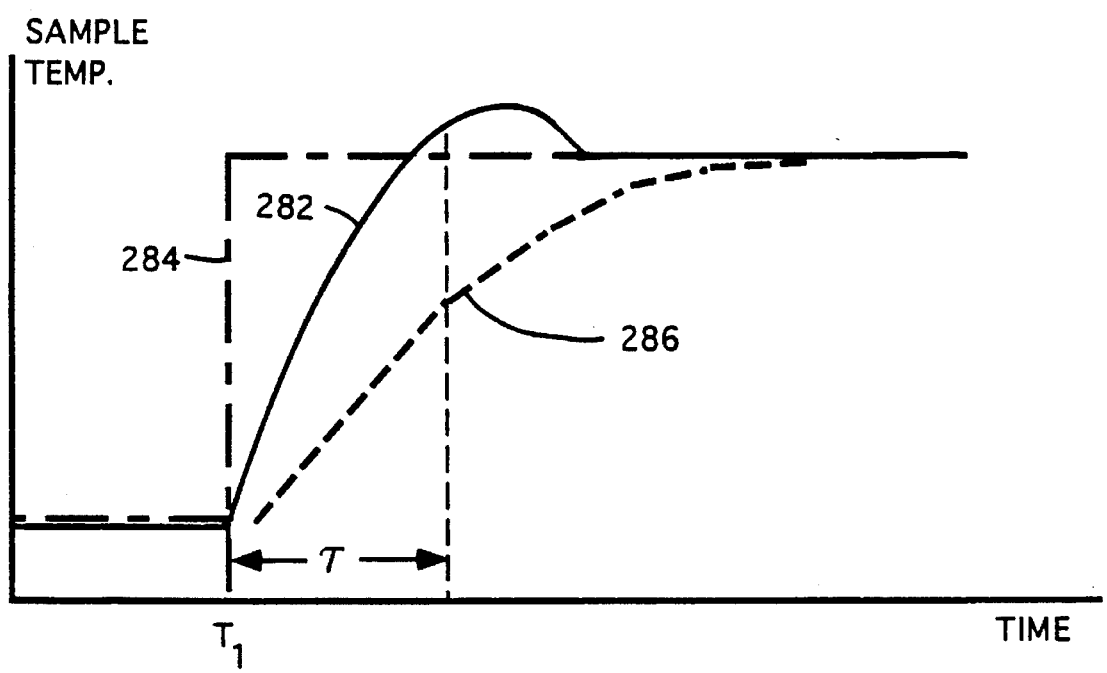
FIG. 14.1

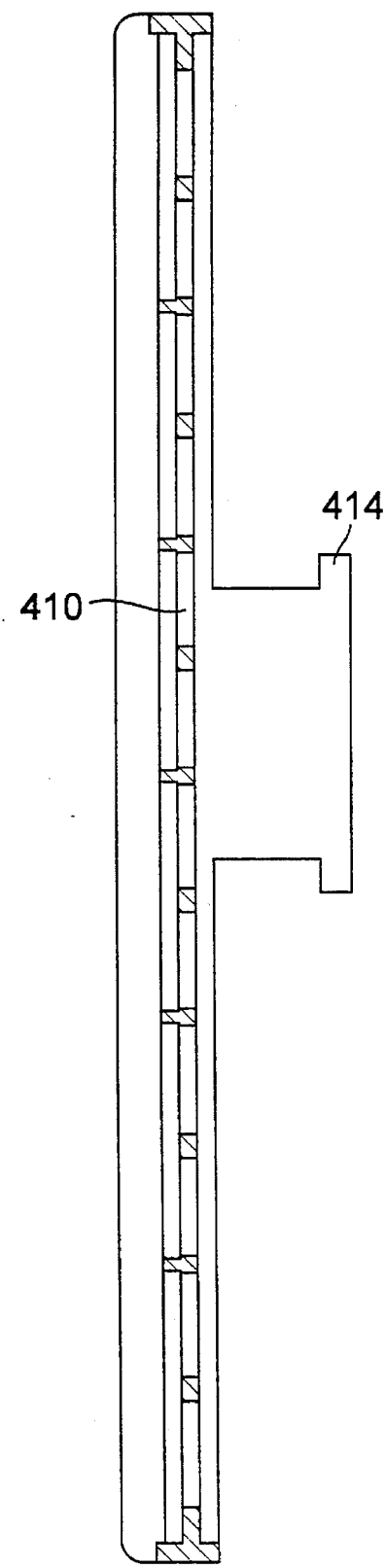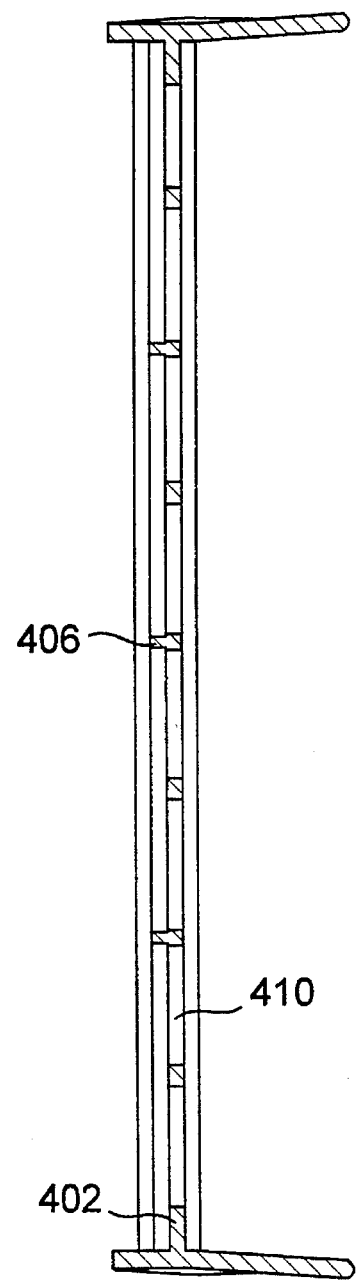
FIG. 36
FIG. 37

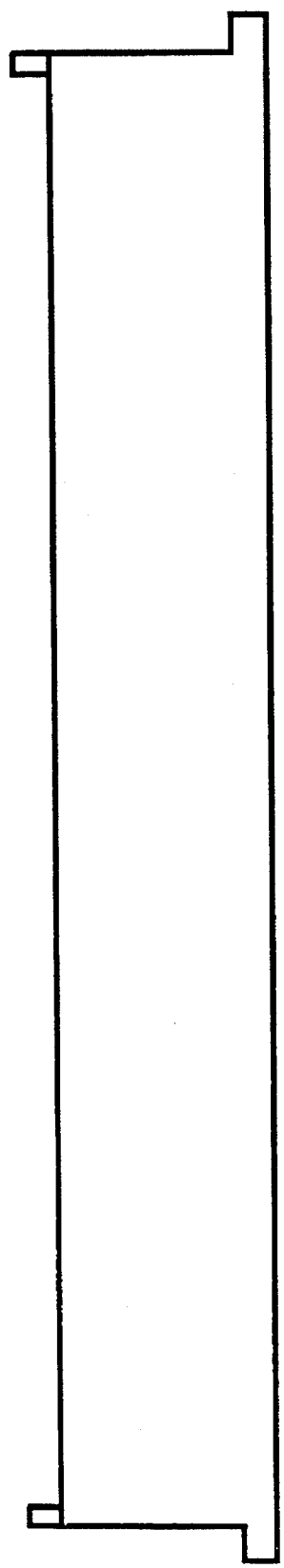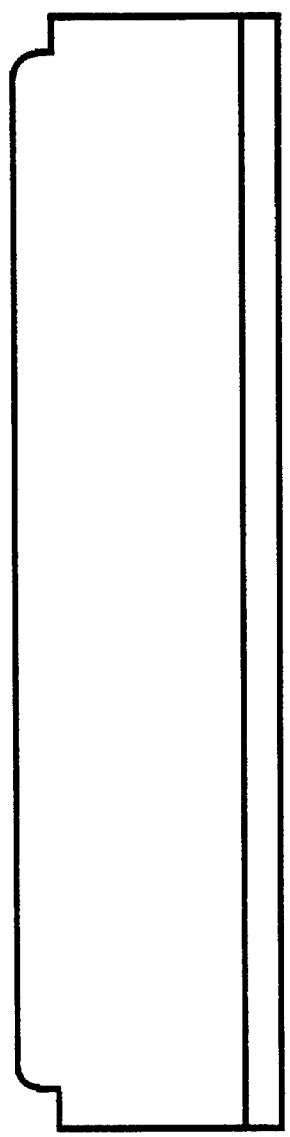
FIG. 41
FIG. 40

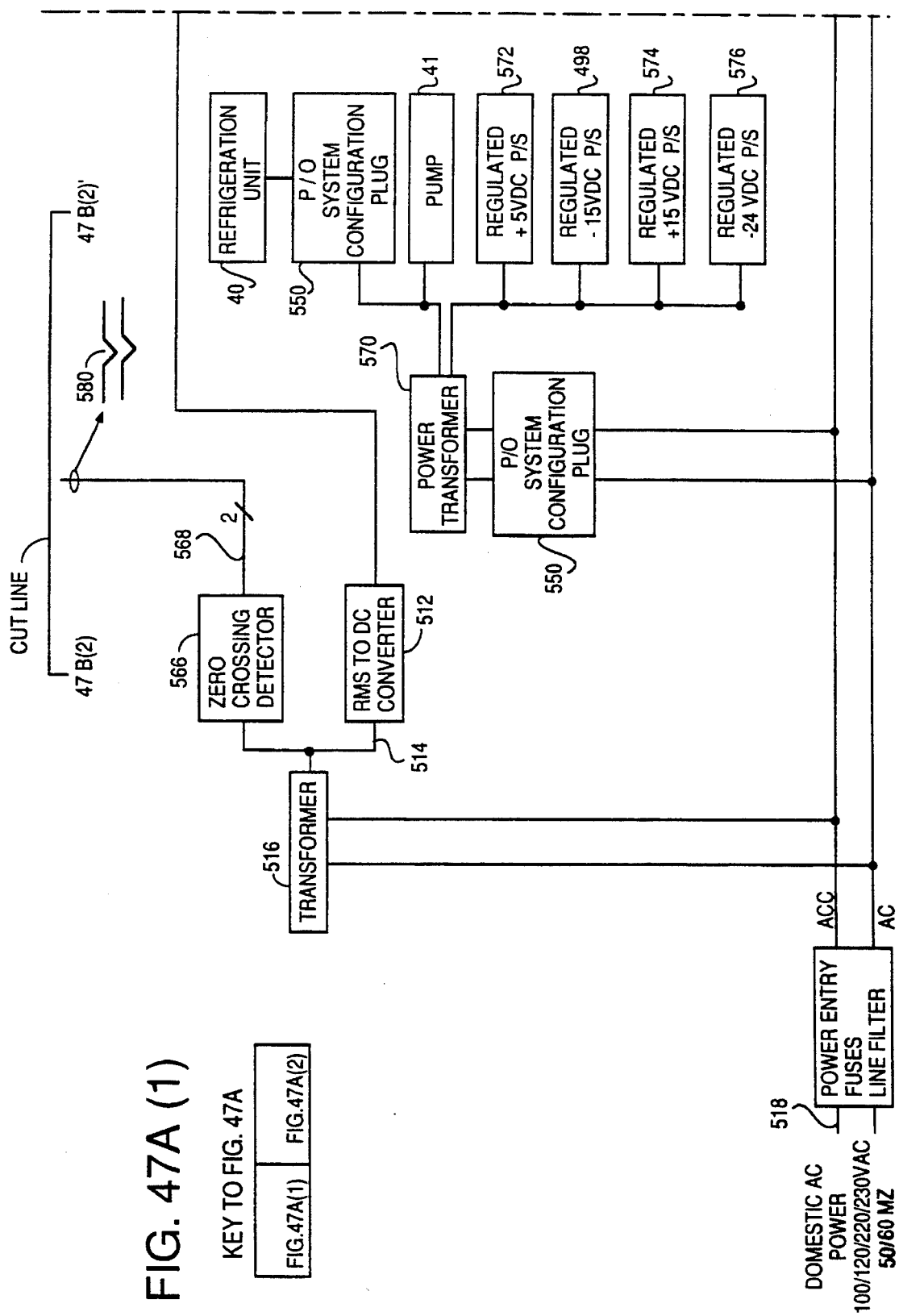

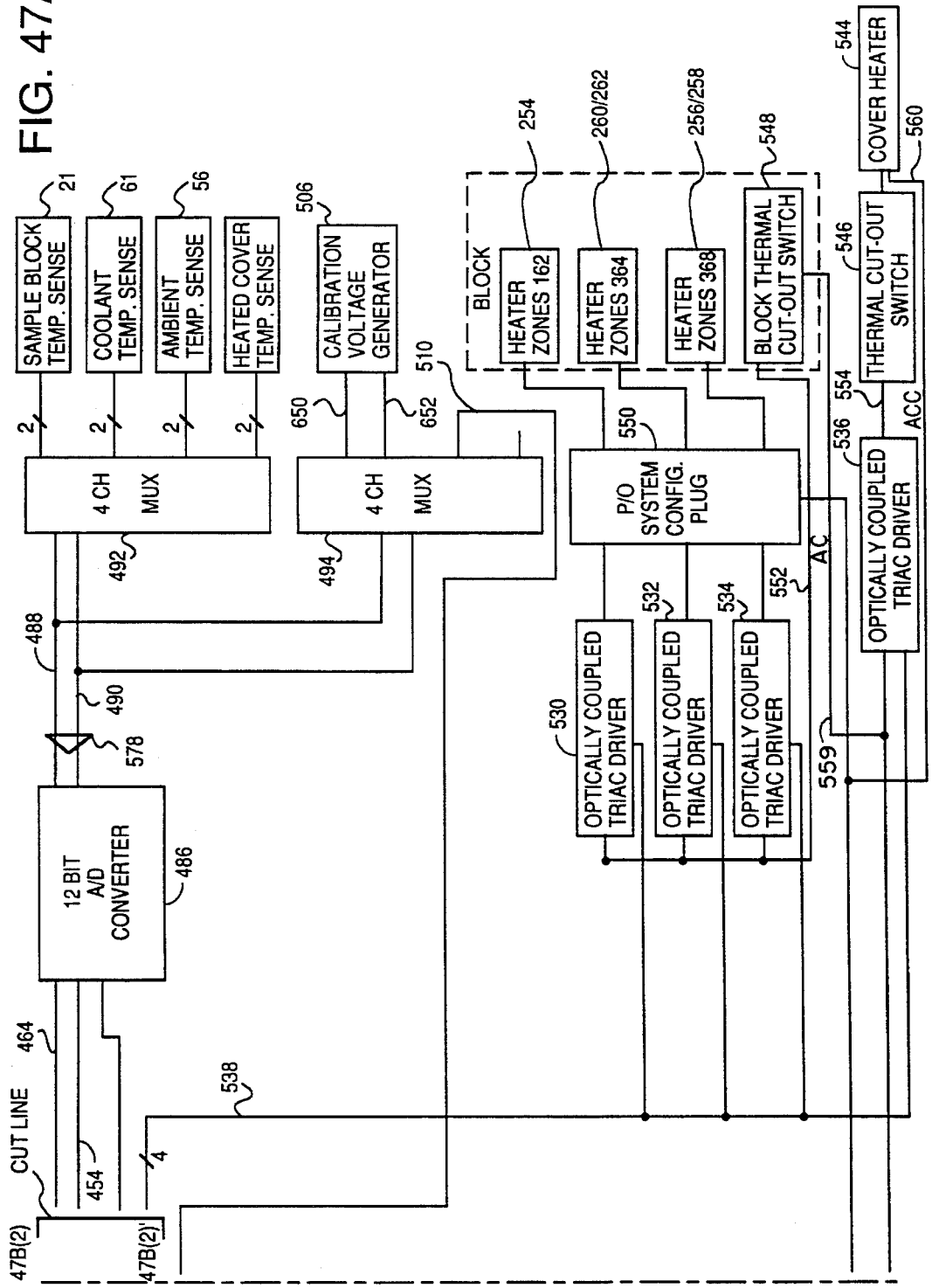
FIG. 47A (2)

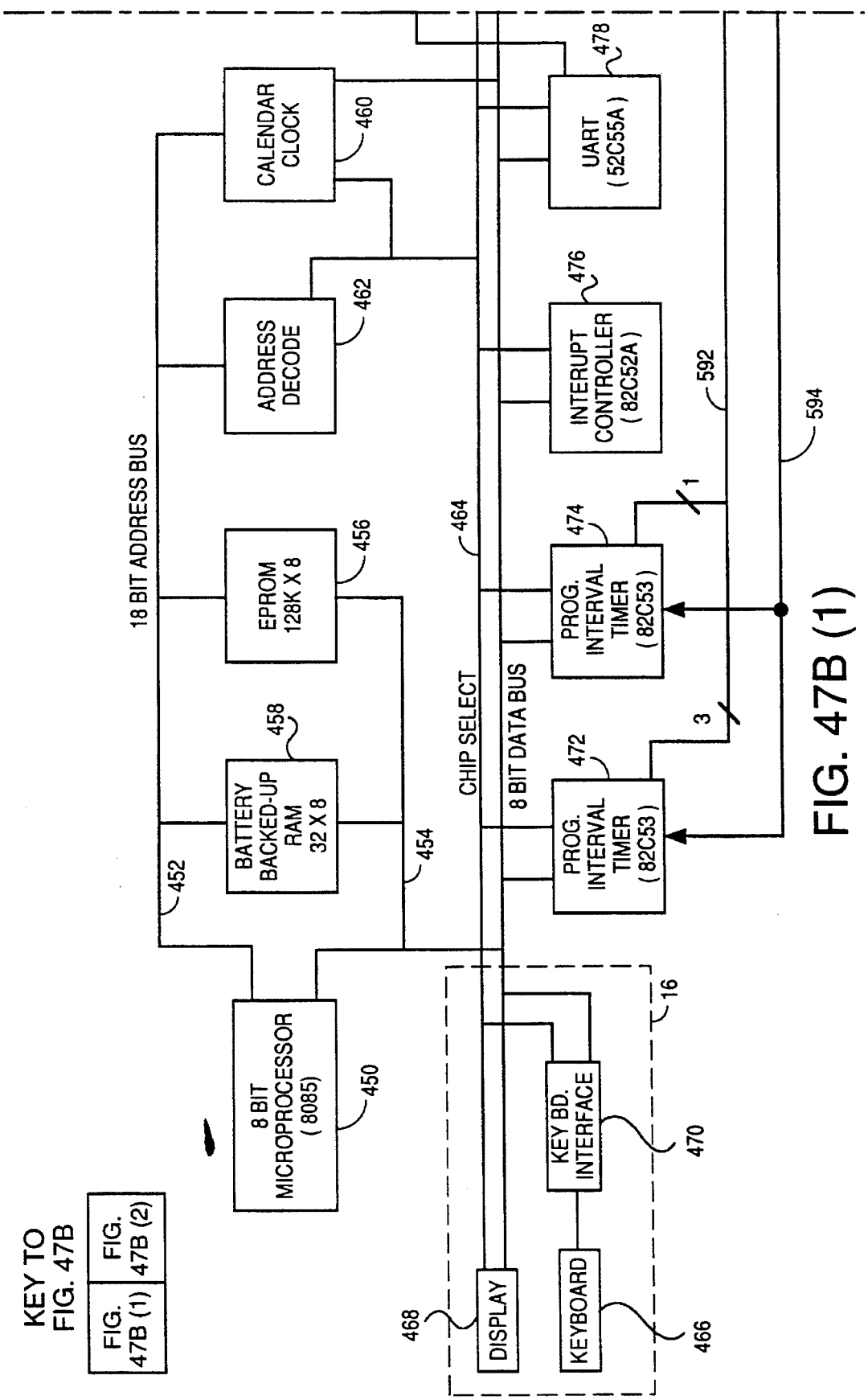
FIG. 47B (1)

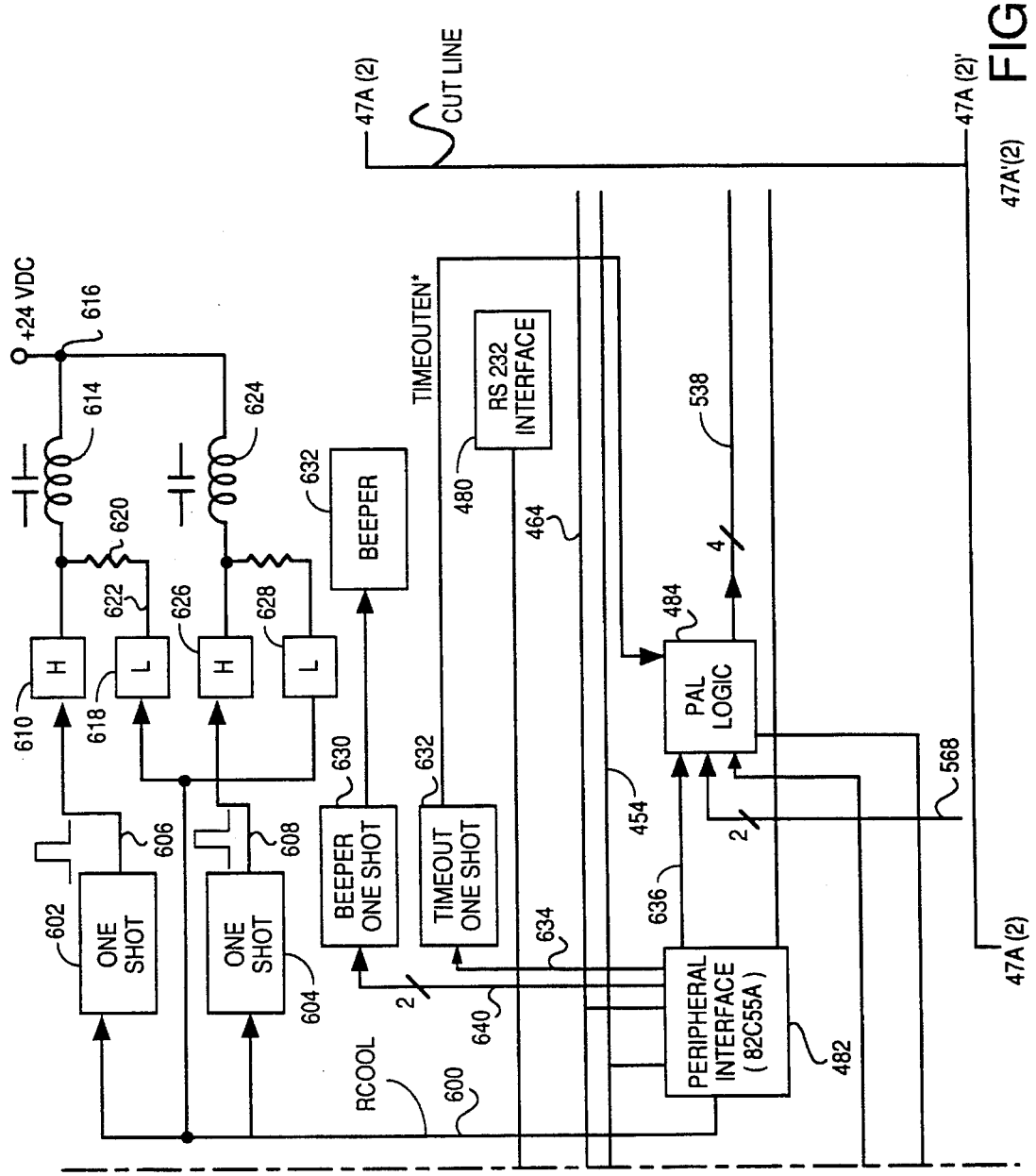
FIG. 47B (2)

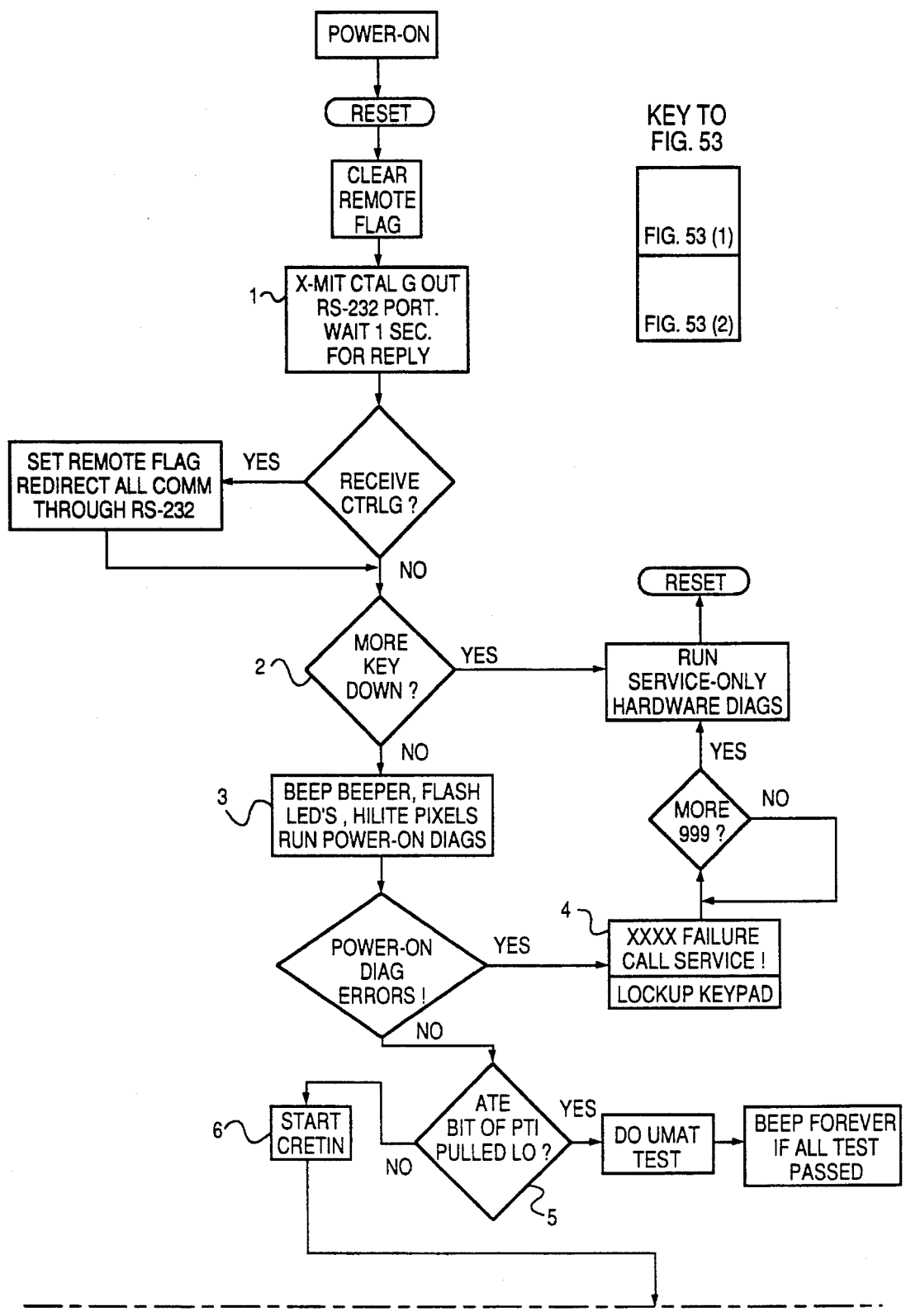
FIG. 53 (1)

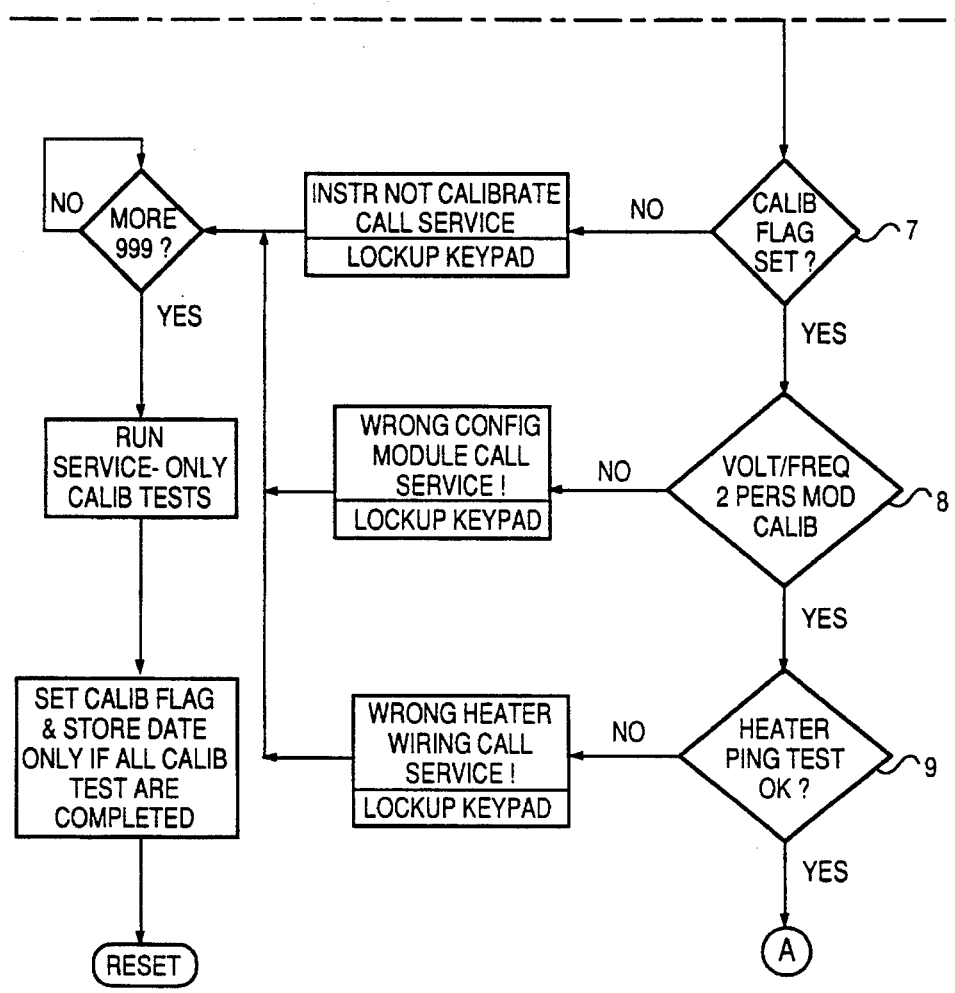
FIG. 53 (2)

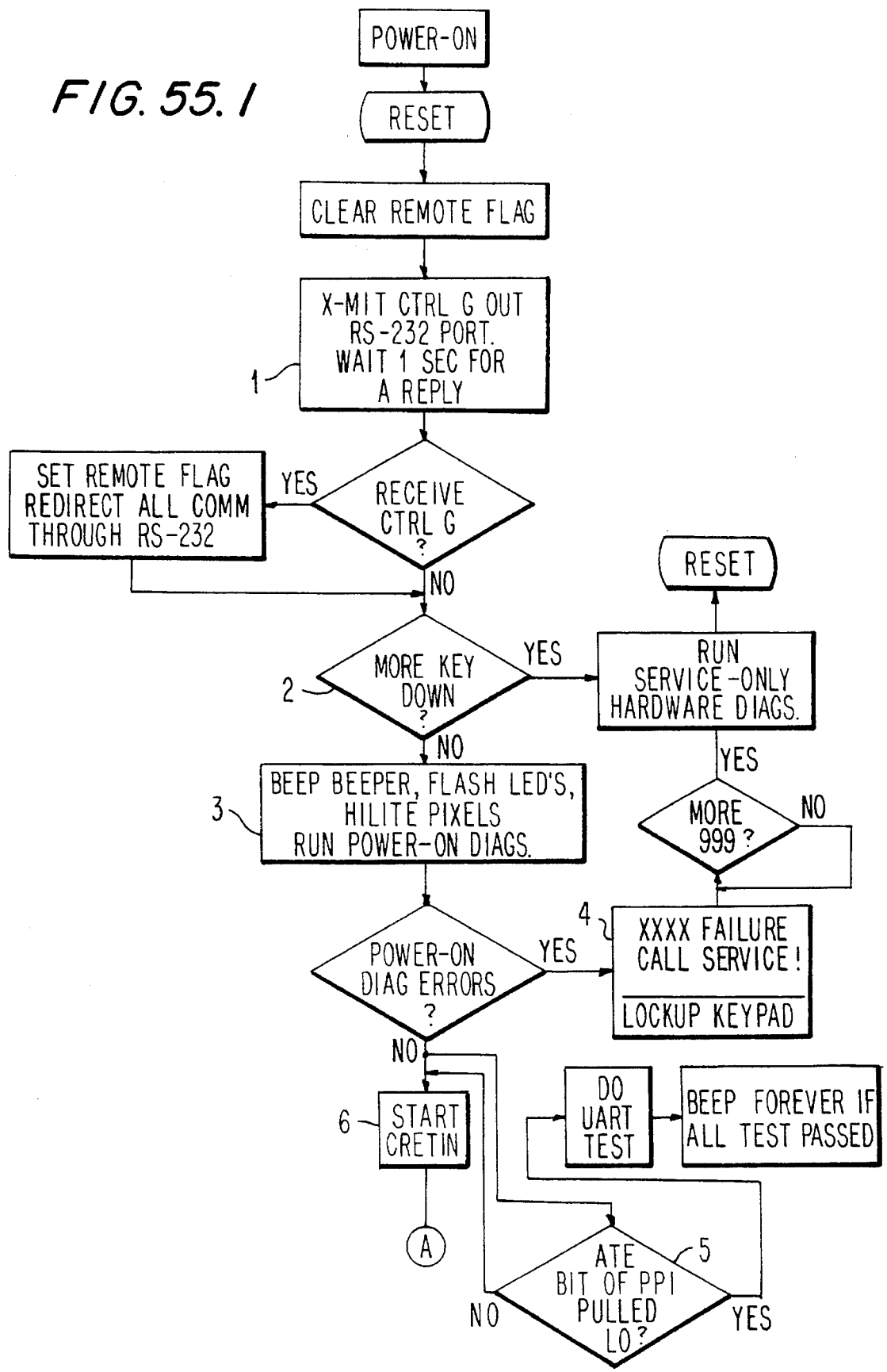
FIG. 55.1

(10 Microfiche, 890 Pages)
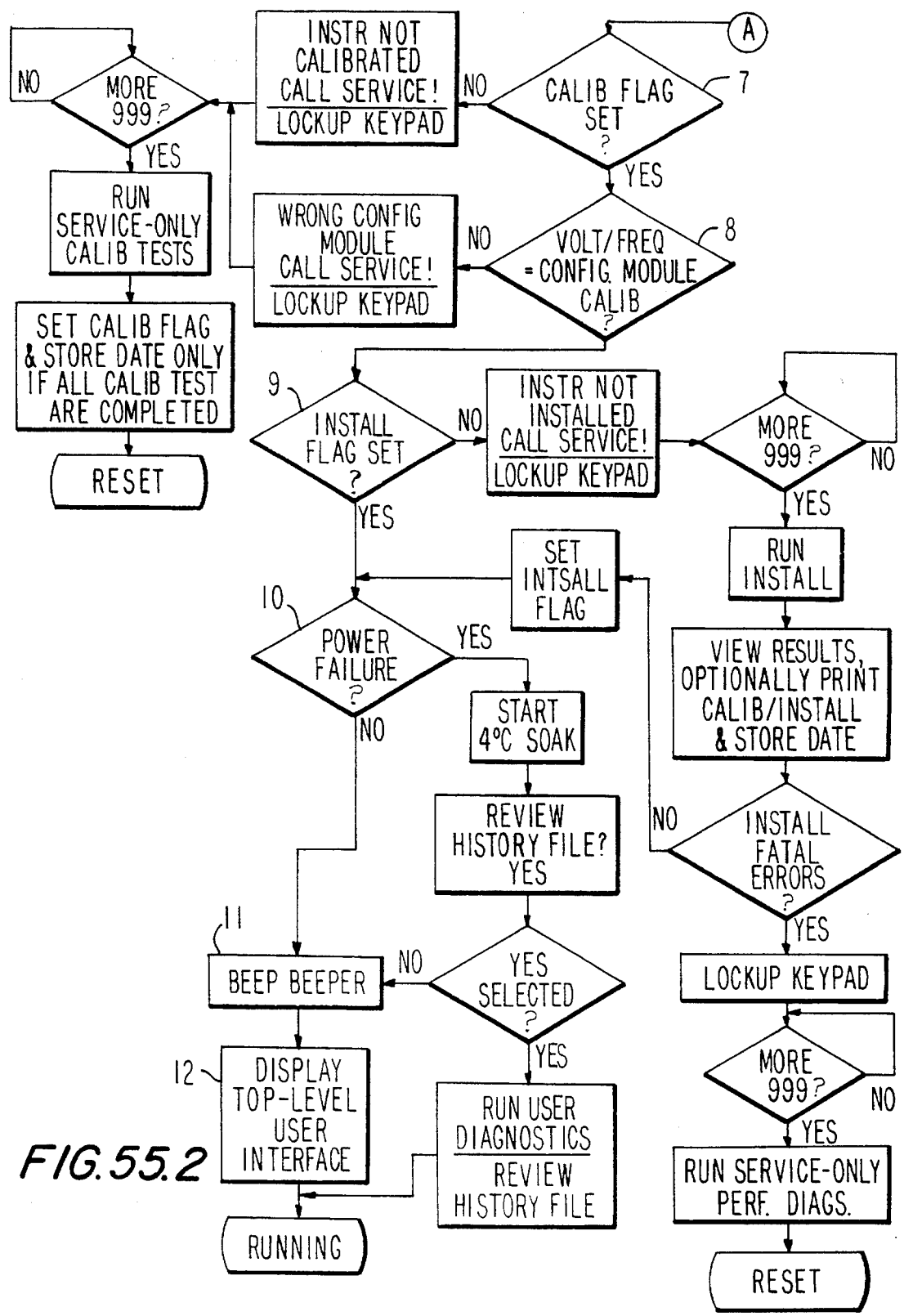
FIG. 55.2

THERMAL CYCLER FOR AUTOMATIC PERFORMANCE OF THE POLYMERASE CHAIN REACTION WITH CLOSE TEMPERATURE CONTROL

This is a continuation-in-part application of U.S. patent application Ser. No. 07/620,606, filed Nov. 29, 1990 by Mossa et al. and U.S. patent application Ser. No. 07/670,545, filed Mar. 14, 1991, both of which are hereby incorporated herein by reference both abandoned. Microfiche Appendicies C–F are attached, including 10 sheets of microfiche comprising 890 frames.

The invention pertains to the field of computer directed instruments for performing the polymerase chain reaction (hereafter PCR). More particularly, the invention pertains to automated instruments that can perform the polymerase chain reaction simultaneously on many samples with a very high degree of precision as to results obtained for each sample. This high precision provides the capability, among other things, of performing so-called "quantitative PCR".

To amplify DNA (Deoxyribose Nucleic Acid) using the PCR process, it is necessary to cycle a specially constituted liquid reaction mixture through a PCR protocol including several different temperature incubation periods. The reaction mixture is comprised of various components such as the DNA to be amplified and at least two primers selected in a predetermined way so as to be sufficiently complementary to the sample DNA as to be able to create extension products of the DNA to be amplified. The reaction mixture includes various enzymes and/or other reagents, as well as several deoxyribonucleoside triphosphates such as dATP, dCTP, dGTP and dTTP. Generally, the primers are oligonucleotides which are capable of acting as a point of initiation of synthesis when placed under conditions in which synthesis of a primer extension product which is complimentary to a nucleic acid strand is induced, i.e., in the presence of nucleotides and inducing agents such as thermostable DNA polymerase at a suitable temperature and pH.

The Polymerase Chain Reaction (PCR) has proven a phenomenally successful technology for genetic analysis, largely because it is so simple and requires relatively low cost instrumentation. A key to PCR is the concept of thermocycling: alternating steps of melting DNA, annealing short primers to the resulting single strands, and extending those primers to make new copies of double stranded DNA. In thermocycling, the PCR reaction mixture is repeatedly cycled from high temperatures (>90° C.) for melting the DNA, to lower temperatures (40° C. to 70° C.) for primer annealing and extension. The first commercial system for performing the thermal cycling required in the polymerase chain reaction, the Perkin-Elmer Cetus DNA Thermal Cycler, was introduced in 1987.

Applications of PCR technology are now moving from basic research to applications in which large numbers of similar amplifications are routinely run. These areas include diagnostic research, biopharmaceutical development, genetic analysis, and environmental testing. Users in these areas would benefit from a high performance PCR system that would provide the user with high throughput, rapid turn-around time, and reproducible results. Users in these areas must be assured of reproducibility from sample-to-sample, run-to-run, lab-to-lab, and instrument-to-instrument.

For example, the physical mapping process in the Human Genome Project may become greatly simplified by utilizing sequence tagged sites. An STS is a short, unique sequence easily amplified by PCR and which identifies a location on the chromosome. Checking for such sites to make genome maps requires amplifying large numbers of samples in a short time with protocols which can be reproducibly run throughout the world.

As the number of PCR samples increases, it becomes more important to integrate amplification with sample preparation and post-amplification analysis. The sample vessels must not only allow rapid thermal cycling but also permit more automated handling for operations such as solvent extractions and centrifugation. The vessels should work consistently at low volumes, to reduce reagent costs.

Generally PCR temperature cycling involves at least two incubations at different temperatures. One of these incubations is for primer hybridization and a catalyzed primer extension reaction. The other incubation is for denaturation, i.e., separation of the double stranded extension products into single strand templates for use in the next hybridization and extension incubation interval. The details of the polymerase chain reaction, the temperature cycling and reaction conditions necessary for PCR as well as the various reagents and enzymes necessary to perform the reaction are described in U.S. Pat. Nos. 4,683,202, 4,683,195, EPO Publication 258,017 and U.S. Pat. No. 4,889,818 (Taq polymerase enzyme patent), which are hereby incorporated by reference.

The purpose of a polymerase chain reaction is to manufacture a large volume of DNA which is identical to an initially supplied small volume of "seed" DNA. The reaction involves copying the strands of the DNA and then using the copies to generate other copies in subsequent cycles. Under ideal conditions, each cycle will double the amount of DNA present thereby resulting in a geometric progression in the volume of copies of the "target" or "seed" DNA strands present in the reaction mixture.

A typical PCR temperature cycle requires that the reaction mixture be held accurately at each incubation temperature for a prescribed time and that the identical cycle or a similar cycle be repeated many times. A typical PCR program starts at a sample temperature of 94° C. held for 30 seconds to denature the reaction mixture. Then, the temperature of the reaction mixture is lowered to 37° C. and held for one minute to permit primer hybridization. Next, the temperature of the reaction mixture is raised to a temperature in the range from 50° C. to 72° C. where it is held for two minutes to promote the synthesis of extension products. This completes one cycle. The next PCR cycle then starts by raising the temperature of the reaction mixture to 94° C. again for strand separation of the extension products formed in the previous cycle (denaturation). Typically, the cycle is repeated 25 to 30 times.

Generally, it is desirable to change the sample temperature to the next temperature in the cycle as rapidly as possible for several reasons. First, the chemical reaction has an optimum temperature for each of its stages. Thus, less time spent at nonoptimum temperatures means a better chemical result is achieved. Another reason is that a minimum time for holding the reaction mixture at each incubation temperature is required after each said incubation temperature is reached. These minimum incubation times establish the "floor" or minimum time it takes to complete a cycle. Any time transitioning between sample incubation temperatures is time which is added to this minimum cycle time. Since the number of cycles is fairly large, this additional time unnecessarily lengthens the total time needed to complete the amplification.

In some prior automated PCR instruments, the reaction mixture was stored in a disposable plastic tube which is closed with a cap. A typical sample volume for such tubes was approximately 100 microliters. Typically, such instruments used many such tubes filled with sample DNA and reaction mixture inserted into holes called sample wells in a metal block. To perform the PCR process, the temperature of the metal block was controlled according to prescribed temperatures and times specified by the user in a PCR protocol file. A computer and associated electronics then controlled the temperature of the metal block in accordance with the user supplied data in the PCR protocol file defining the times, temperatures and number of cycles, etc. As the metal block changed temperature, the samples in the various tubes followed with similar changes in temperature. However, in these prior art instruments not all samples experienced exactly the same temperature cycle. In these prior art PCR instruments, errors in sample temperature were generated by nonuniformity of temperature from place to place within the metal sample block, i.e., temperature gradients existed within the metal of the block thereby causing some samples to have different temperatures than other samples at particular times in the cycle. Further, there were delays in transferring heat from the sample block to the sample, but the delays were not the same for all samples. To perform the PCR process successfully and efficiently, and to enable so called "quantitative" PCR, these time delays and temperature errors must be minimized to a great extent.

The problems of minimizing time delays for heat transfer to and from the sample liquid and minimizing temperature errors due to temperature gradients or nonuniformity in temperature at various points on the metal block become particularly acute when the size of the region containing samples becomes large. It is a highly desirable attribute for a PCR instrument to have a metal block which is large enough to accommodate 96 sample tubes arranged in the format of an industry standard microtiter plate.

The microtiter plate is a widely used means for handling, processing and analyzing large numbers of small samples in the biochemistry and biotechnology fields. Typically, a microtiter plate is a tray which is 3⅝ inches wide and 5 inches long and contains 96 identical sample wells in an 8 well by 12 well rectangular array on 9 millimeter centers. Although microtiter plates are available in a wide variety of materials, shapes and volumes of the sample wells, which are optimized for many different uses, all microtiter plates have the same overall outside dimensions and the same 8×12 array of wells on 9 millimeter centers. A wide variety of equipment is available for automating the handling, processing and analyzing of samples in this standard microtiter plate format.

Generally microtiter plates are made of injection molded or vacuum formed plastic and are inexpensive and considered disposable. Disposability is a highly desirable characteristic because of the legal liability arising out of cross contamination and the difficulty of washing and drying microtiter plates after use.

It is therefore a highly desirable characteristic for a PCR instrument to be able to perform the PCR reaction on up to 96 samples simultaneously said samples being arranged in a microtiter plate format.

Of course, the size of the metal block which is necessary to heat and cool 96 samples in an 8×12 well array on 9 millimeter centers is fairly large. This large area block creates multiple challenging engineering problems for the design of a PCR instrument which is capable of heating and cooling such a block very rapidly in a temperature range generally from 0° to 100° C. with very little tolerance for temperature variations between samples. These problems arise from several sources. First, the large thermal mass of the block makes it difficult to move the block temperature up and down in the operating range with great rapidity. Second, the need to attach the block to various external devices such as manifolds for supply and withdrawal of cooling liquid, block support attachment points, and associated other peripheral equipment creates the potential for temperature gradients to exist across the block which exceed tolerable limits.

There are also numerous other conflicts between the requirements in the design of a thermal cycling system for automated performance of the PCR reaction or other reactions requiring rapid, accurate temperature cycling of a large number of samples. For example, to change the temperature of a metal block rapidly, a large amount of heat must be added to, or removed from the sample block in a short period of time. Heat can be added from electrical resistance heaters or by flowing a heated fluid in contact with the block. Heat can be removed rapidly by flowing a chilled fluid in contact with the block. However, it is seemingly impossible to add or remove large amounts of heat rapidly in a metal block by these means without causing large differences in temperature from place to place in the block thereby forming temperature gradients which can result in nonuniformity of temperature among the samples.

Even after the process of addition or removal of heat is terminated, temperature gradients can persist for a time roughly proportional to the square of the distance that the heat stored in various points in the block must travel to cooler regions to eliminate the temperature gradient. Thus, as a metal block is made larger to accommodate more samples, the time it takes for temperature gradients existing in the block to decay after a temperature change causes temperature gradients which extend across the largest dimensions of the block can become markedly longer. This makes it increasingly difficult to cycle the temperature of the sample block rapidly while maintaining accurate temperature uniformity among all the samples.

Because of the time required for temperature gradients to dissipate, an important need has arisen in the design of a high performance PCR instrument to prevent the creation of temperature gradients that extend over large distances in the block. Another need is to avoid, as much as possible, the requirement for heat to travel across mechanical boundaries between metal parts or other peripheral equipment attached to the block. It is difficult to join metal parts in a way that insures uniformly high thermal conductance everywhere across the joint. Nonuniformities of thermal conductance will generate unwanted temperature gradients.

SUMMARY OF THE INVENTION

According to the teachings of the invention, there is disclosed herein a thin walled sample tube for decreasing the delay between changes in sample temperature of the sample block and corresponding changes in temperature of the reaction mixture. Two different sample tube sizes are disclosed, but each has a thin walled conical section that fits into a matching conical recess in the sample block. Typically, cones with 17° angles relative to the longitudinal axis are used to prevent jamming of the tubes into the sample block but to allow snug fit. Other shapes and angles would also suffice for purposes of practicing the invention.

Also, other types of heat exchangers can also be used other than sample blocks such as liquid baths, ovens, etc. However, the wall thickness of the section of the sample tube which is in contact with whatever heat exchange is being used should be as thin as possible so long as it is sufficiently strong to withstand the thermal stresses of PCR cycling and the stresses of normal use. Typically, the sample tubes are made of autoclavable polypropylene such as Himont PD701 with a wall thickness of the conical section in the range from 0.009 to 0.012 inches plus or minus 0.001 inches. Most preferably, the wall thickness is 0.012 inches for larger tubes as shown in FIG. 50.

In the preferred embodiment, the sample tube also has a thicker walled cylindrical section which joins with the conical section. This cylindrical section provides containment for the original reaction mixture or reagents which may be added after PCR processing.

The sample tube shown in FIG. 50 has industry standard configuration except for the thin walls for compatibility in other PCR systems. The sample tube of FIG. 15 is a shorter tube which can be used with the system disclosed herein. The other subject matter of the system environment in which use of the thin walled sample tubes is preferred are summarized below.

There is also described herein a novel method and apparatus for achieving very accurate temperature control for a very large number of samples arranged in the microtiter plate format during the performance of very rapid temperature cycling PCR protocols. The teachings of the invention contemplate a novel structure for a sample block, sample tubes and supporting mounting, heating and cooling apparatus, control electronics and software, a novel user interface and a novel method of using said apparatus to perform the PCR protocol.

The instrument described herein is designed to do PCR gene amplification on up to 96 samples with very tight tolerances of temperature control across the universe of samples. This means that all samples go up and down in temperature simultaneously with very little difference in temperature between different wells containing different samples, this being true throughout the polymerase chain reaction cycle. The instrument described herein is also capable of very tight control of the reaction mixture concentration through control of the evaporation and condensation processes in each sample well. Further, the instrument described herein is capable of processing up to 96 samples of 100 microliters each from different donor sources with substantially no cross-contamination between sample wells.

The teachings of the invention herein include a novel method of heating and cooling an aluminum sample block to thermally cycle samples in the standard 96-well microtiter plate format with the result that excellent sample-to-sample uniformity exists despite rapid thermal cycling rates, non-controlled varying ambient temperatures and variations in other operating conditions such as power line voltage and coolant temperatures.

The teachings of the invention also contemplate a novel design for a disposable plastic 96-well microtiter plate for accommodation of up to 96 individual sample tubes containing DNA for thermal cycling each sample tube having individual freedom of movement sufficient to find the best fit with the sample block under downward pressure from a heated cover. The microtiter plate design, by allowing each tube to find the best fit, provides high and uniform thermal conductance from the sample block to each sample tube even if differing rates of thermal expansion and contraction between the metal of the block and the plastic of the sample tube and microtiter plate structure cause the relative center-to-center dimensions of the wells in the sample block to change relative to the center-to-center distance of the sample tubes in the disposable microtiter plate structure.

The teachings of the invention also contemplate a novel method and apparatus for controlling the PCR instrument which includes the ability to continuously calculate and display the temperature of the samples being processed without directly measuring these temperatures. These calculated temperatures are used to control the time that the samples are held within the given temperature tolerance band for each target temperature of incubation. The control system also controls a three-zone heater thermally coupled to the sample block and gates fluid flow through directionally interlaced ramp cooling channels in the sample block which, when combined with a constant bias cooling flow of coolant through the sample block provides a facility to achieve rapid temperature changes to and precise temperature control at target temperatures specified by the user. The method and apparatus for controlling the three-zone heater includes an apparatus for taking into account, among other things, the line voltage, block temperature, coolant temperature and ambient temperature in calculating the amount of electrical energy to be supplied to the various zones of the three-zone heater. This heater has zones which are separately controllable under the edges or "guard bands" of the sample block so that excess heat losses to the ambient through peripheral equipment attached to the edges of the sample block can be compensated. This helps prevent thermal gradients from forming.

The teachings of the invention also contemplate a novel method and apparatus for preventing loss of solvent from the reaction mixtures when the samples are being incubated at temperatures near their boiling point. A heated platen covers the tops of the sample tubes and is in contact with an individual cap which provides a gas-tight seal for each sample tube. The heat from the platen heats the upper parts of each sample tube and the cap to a temperature above the condensation point such that no condensation and refluxing occurs within any sample tube. Condensation represents a relatively large heat transfer since an amount of heat equal to the heat of vaporization is given up when water vapor condenses. This could cause large temperature variations from sample to sample if the condensation does not occur uniformly. The heated platen prevents any condensation from occurring in any sample tube thereby minimizing this source of potential temperature errors. The use of the heated platen also reduces reagent consumption.

Furthermore, the heated platen provides a downward force for each sample tube which exceeds an experimentally determined minimum downward force necessary to keep all sample tubes pressed firmly into the temperature controlled sample block so as to establish and maintain uniform block-to-tube thermal conductance for each tube. This uniformity of thermal conductance is established regardless of variations from tube to tube in length, diameter, angle or other dimensional errors which otherwise could cause some sample tubes to fit more snugly in their corresponding sample wells than other sample tubes.

The heated platen softens the plastic of each cap but does not totally destroy the cap's elasticity. Thus, a minimum threshold downward forced is successfully applied to each tube despite differences in tube height from tube to tube.

The PCR instrument described herein reduces cycle times by a factor of 2 or more and lowers reagent cost by accommodating PCR volumes down to 20 ul but remains compatible with the industry standard 0.5 ml microcentrifuge tube.

BRIEF DESCRIPTION OF THE DRAWINGS

FIG. 3 is a side, elevation view of the sample block showing the bias and ramp cooling channels.

FIGS. 4 and 5 are end, elevation views of the sample block.

FIG. 4.1 is an elevation view of the edge of an alternate sample block.

FIG. 6 is a sectional view of the sample block taken along section line 6—6' in FIG. 2.

FIG. 14.1 is a graph of sample temperature versus time illustrating both the effect of an τ of a sample tube seating force F which is too low, and the block temperature overshoot effectuated by version 2 of the control software.

FIG. 36 is a sectional view of the retainer taken along section line 36—36' in FIG. 33.

FIG. 37 is a sectional view of the retainer taken along section line 37–37' in FIG. 33.

FIG. 40 is a side elevation view of the base.

FIG. 41 is an end elevation view of the base.

FIGS. 47A and 47B are a block diagram of the control electronics according to the teachings of the invention.

FIGS. 53 and 54 are flow charts of the power up test sequence.

FIG. 55 is a flow diagram representing the Power-Up sequence as it is implemented in Version 2 of the Electronics and Software.

DETAILED DESCRIPTION OF THE INVENTION

Figure 1:
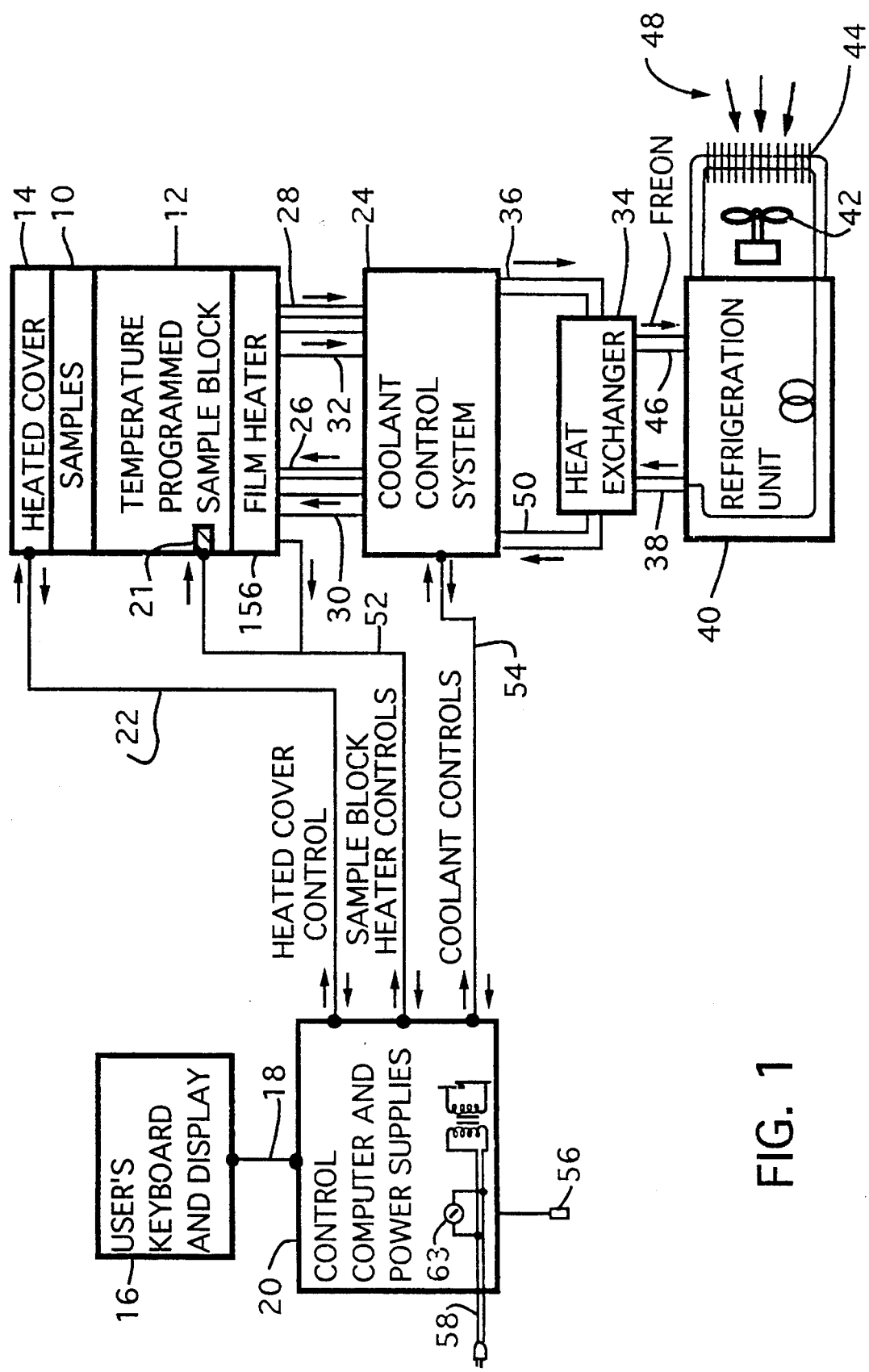
FIG. 1 is a block diagram of the thermal cycler according to the teachings of the invention.

Referring to FIG. 1 there is shown a block diagram of the major system components of one embodiment of a computer directed instrument for performing PCR according to the teachings of the invention. Sample mixtures including the DNA or RNA to be amplified are placed in the temperature-programmed sample block 12 and are covered by heated cover 14.

A user supplies data defining time and temperature parameters of the desired PCR protocol via a terminal 16 including a keyboard and display. The keyboard and display are coupled via bus 18 to a control computer 20 (hereafter sometimes referred to as a central processing unit or CPU). This central processing unit 20 includes memory which stores the control program described below, the data defining the desired PCR protocol and certain calibration constants described below. The control program causes the CPU 20 to control temperature cycling of the sample block 12 and implements a user interface which provides certain displays to the user and which receives data entered by the user via the keyboard of the terminal 16.

In the preferred embodiment, the central processing unit 20 is custom designed. The wiring diagrams for the CPU and support electronics is given in Microfiche Appendix E. The actual control program is given below in Microfiche Appendix C (Version 2 of the control program is included as Microfiche Appendix F). A block diagram of the electronics will be discussed in more detail below. In alternative embodiments, the central processing unit 20 and associated peripheral electronics to control the various heaters and other electro-mechanical systems of the instrument and read various sensors could be any general purpose computer such as a suitably programmed personal computer or microcomputer.

The samples 10 are stored in capped disposable tubes which are seated in the sample block 12 and are thermally isolated from the ambient air by a heated cover 14 which contacts a plastic disposable tray to be described below to form a heated, enclosed box in which the sample tubes reside. The heated cover serves, among other things, to reduce undesired heat transfers to and from the sample mixture by evaporation, condensation and refluxing inside the sample tubes. It also reduces the chance of cross contamination by keeping the insides of the caps dry thereby preventing aerosol formation when the tubes are uncapped. The heated cover is in contact with the sample tube caps and keeps them heated to a temperature of approximately 104° C. or above the condensation points of the various components of the reaction mixture.

The central processing unit 20 includes appropriate electronics to sense the temperature of the heated cover 14 and control electric resistance heaters therein to maintain the cover 14 at a predetermined temperature. Sensing of the temperature of the heated cover 14 and control of the resistance heaters therein is accomplished via a temperature sensor (not shown) and bus 22.

Figure 46:
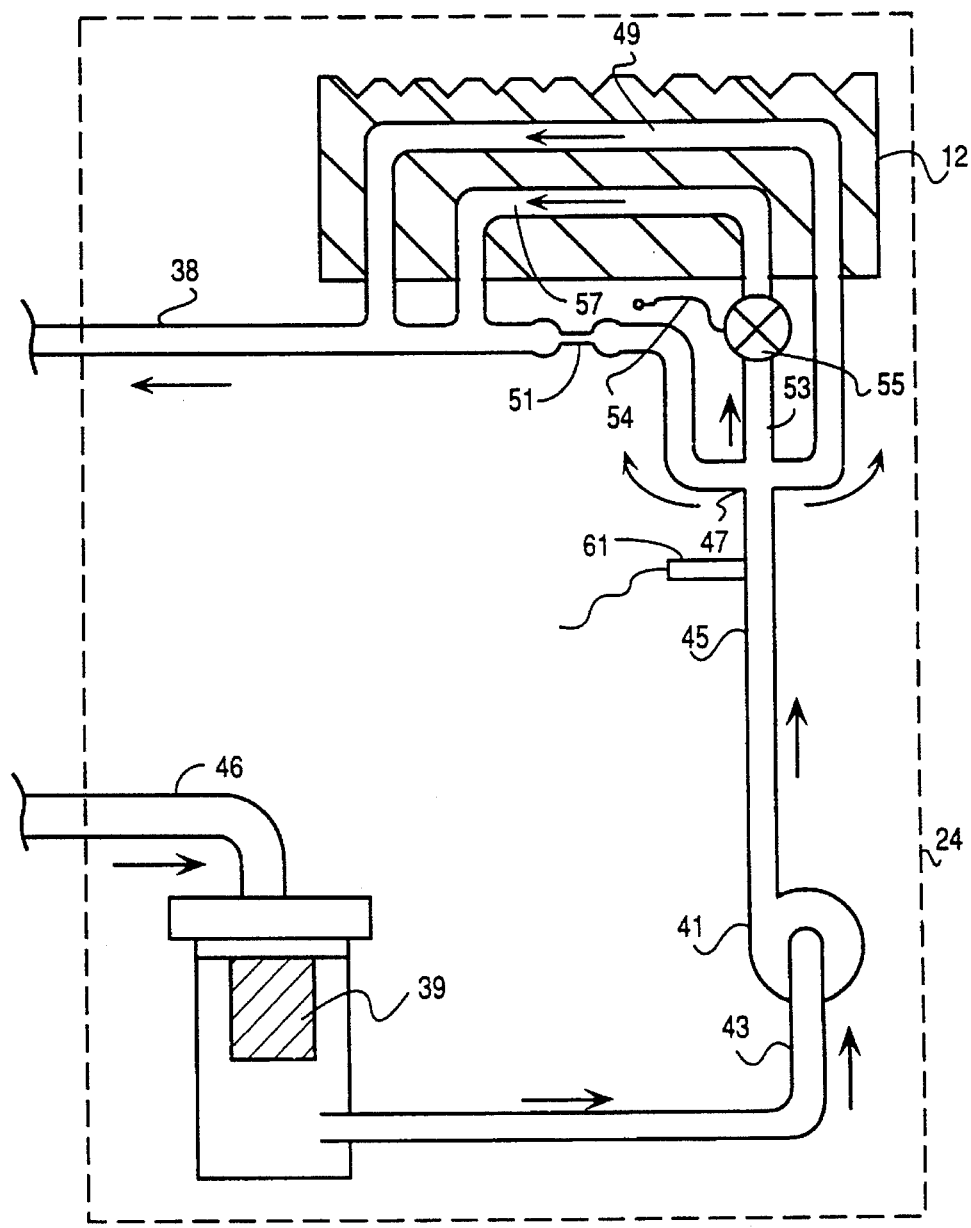
FIG. 46 is a diagram of the coolant control system 24 in FIG. 1.

A coolant control system 24 continuously circulates a chilled liquid coolant such as a mixture of automobile antifreeze and water through bias cooling channels (not shown) in the sample block 12 via input tubes 26 and output tube 28. The coolant control system 24 also controls fluid flow through higher volume ramp cooling fluid flow paths (not shown) in the sample block 12. The ramp cooling channels are used to rapidly change the temperature of the sample block 12 by pumping large volumes of chilled liquid coolant through the block at a relatively high flow rate. Ramp cooling liquid coolant enters the sample block 12 through tube 30 and exits the sample block through tube 32. The details of the coolant control system are shown in FIG. 46. The coolant control system will be discussed more fully below in the description of the electronics and software of the control system.

Typically, the liquid coolant used to chill the sample block 12 consists mainly of a mixture of water and ethylene glycol. The liquid coolant is chilled by a heat exchanger 34 which receives liquid coolant which has extracted heat from the sample block 12 via input tube 36. The heat exchanger 34 receives compressed liquid freon refrigerant via input tube 38 from a refrigeration unit 40. This refrigeration unit 40 includes a compressor (not shown), a fan 42 and a fin tube heat radiator 44. The refrigeration unit 40 compresses freon gas received from the heat exchanger 34 via tube 46. The gaseous freon is cooled and condensed to a liquid in the fin tube condenser 44. The pressure of the liquid freon is maintained above its vapor pressure in the fin tube condenser by a flow restrictor capillary tube 47. The output of this capillary tube is coupled to the input of the heat exchanger 34 via tube 38. In the heat exchanger, the pressure of the freon is allowed to drop below the freon vapor pressure, and the freon expands. In this process of expansion, heat is absorbed from the warmed liquid coolant circulating in the heat exchanger and this heat is transferred to the freon thereby causing the freon to boil. The warmed freon is then extracted from the heat exchanger via tube 46 and is compressed and again circulated through the fin tube condenser 44. The fan 42 blows air through the fin tube condenser 44 to cause heat in the freon from tube 46 to be exchanged with the ambient air. As symbolized by arrows 48. The refrigeration unit 40 should be capable of extracting 400 watts of heat at 30° C. and 100 watts of heat at 10° C. from the liquid coolant to support the rapid temperature cycling according to the teachings of the invention.

In the preferred embodiment, the apparatus of FIG. 1 is enclosed within a housing (not shown). The heat 48 expelled to the ambient air is kept within the housing to aid in evaporation of any condensation which occurs on the various tubes carrying chilled liquid coolant or freon from one place to another. This condensation can cause corrosion of metals used in the construction of the unit or the electronic circuitry and should be removed. Expelling the heat 48 inside the enclosure helps evaporate any condensation to prevent corrosion.

After exchanging its heat with the freon, the liquid coolant exits the heat exchanger 34 via tube 50 and reenters the coolant control system where it is gated as needed to the sample block during rapid cooling portions of the PCR cycle defined by data entered by the user via terminal 16.

Figure 11:
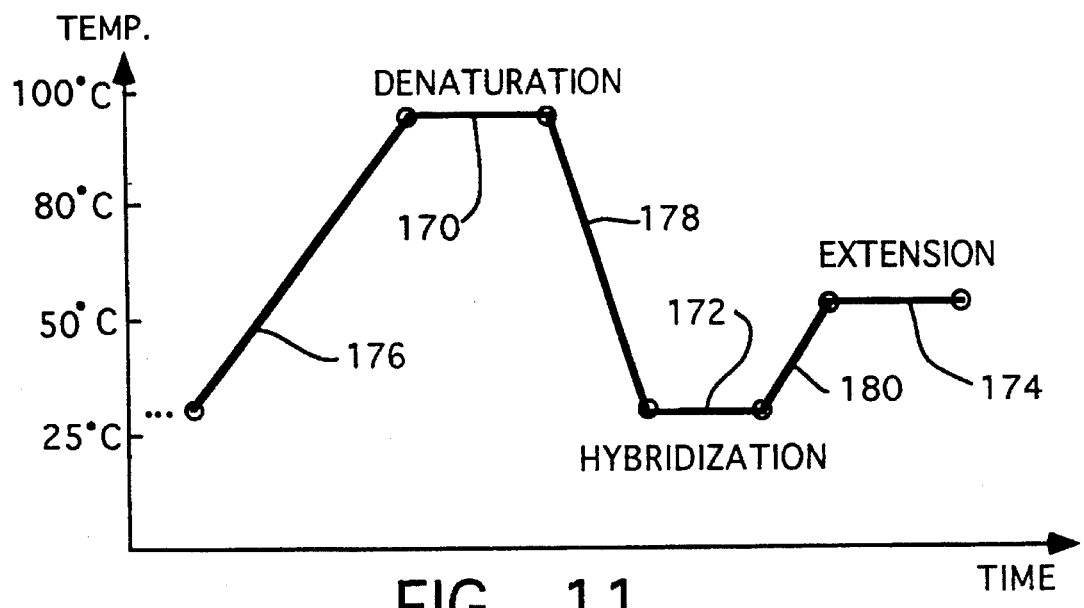
FIG. 11 is a temperature graph showing a typical three incubation temperature PCR protocol.

As noted above, the PCR protocol involves incubations at at least two different temperatures and often three different temperatures. A typical PCR cycle is shown in FIG. 11 with a denaturation incubation 170 done at a temperature near 94° C., a hybridization incubation 122 done at a temperature near room temperature (25° C.–37° C.) and an extension incubation 174 done at a temperature near 50° C. These temperatures are substantially different, and, therefore means must be provided to move the temperature of the reaction mixture of all the samples rapidly from one temperature to another. The ramp cooling system is the means by which the temperature of the sample block 12 is brought down rapidly from the high temperature denaturation incubation to the lower temperature hybridization and extension incubation temperatures. Typically the coolant temperature is in the range from 10°–20° C. When the coolant is at 20° C. it can pump out about 400 watts of heat from the sample block. Typically the ramp cooling channel dimensions, coolant temperature and coolant flow rate are set such that peak cooling of 5°–6° C. per second can be achieved near the high end of the operating range (100° C.) and an average cooling rate of 2.5° C. per second is achieved in bringing the sample block temperature down from 94° C. to 37° C.

The ramp cooling system, in some embodiments, may also be used to maintain the sample block temperature at or near the target incubation temperature also. However, in the preferred embodiment, small temperature changes of the sample block 12 in the downward direction to maintain target incubation temperature are implemented by the bias cooling system.

As seen in FIG. 46, a pump 41 constantly pumps coolant from a filter/reservoir 39 (130 milliliter capacity) via ½" pipe and pumps it via a ½" pipe to a branching intersection 47. The pump 41 supplies coolant to pipe 45 at a constant flow rate of 1–1.3 gallons per minute. At the intersection 47, a portion of the flow in tube 45 is diverted as the constant flow through the bias cooling channels 49. Another portion of the flow in tube 45 is diverted through a flow restrictor 51 to output tube 38. Flow restrictor 51 maintains sufficient pressure in the system such that a positive pressure exists at the input 53 of a two state solenoid operated valve 55 under the control of the CPU 20 via bus 54. When ramp cooling is desired to implement a rapid downward temperature change, the CPU 20 causes the solenoid operated valve 55 to open to allow flow of coolant through the ramp cooling channels 57. There are 8 ramp cooling channels so the flow rate through each ramp cooling channel is about ⅛ gallon per minute. The flow rate through the bias cooling channels is much less because of the greatly restricted cross-sectional area thereof.

The bias cooling system provides a small constant flow of chilled coolant through bias cooling channels 49 in the sample block 12. This causes a constant, small heat loss from the sample block 12 which is compensated by a multi-zone heater 156 which is thermally coupled to the sample block 12 for incubation segments where the temperature of the sample block is to be maintained at a steady value. The constant small heat loss caused by the bias cooling flow allows the control system to implement proportional control both upward and downward in temperature for small temperatures. This means both heating and cooling at controlled, predictable, small rates is available to the temperature servo system to correct for block temperature errors to cause the block temperature to faithfully track a PCR temperature profile entered by the user. The alternative would be to cut off power to the film heater and allow the sample block to cool by giving up heat to the ambient by radiation and convection when the block temperature got too high. This would be too slow and too unpredictable to meet tight temperature control specifications for quantitative PCR cycling.

This multi-zone heater 156 is controlled by the CPU 20 via bus 52 in FIG. 1 and is the means by which the temperature of the sample block 12 is raised rapidly to higher incubation temperatures from lower incubation temperatures and is the means by which bias cooling is compensated and temperature errors are corrected in the upward direction during temperature tracking and control during incubations.

In alternative embodiments, bias cooling may be eliminated or may be supplied by other means such as by the use of a cooling fan and cooling fins formed in the metal of the sample block, peltier junctions or constantly circulating tap water. Care must be taken however in these alternative embodiments to insure that temperature gradients are not created in the sample block which would cause the temperature of some samples to diverge from the temperature of other samples thereby possibly causing different PCR amplification results in some sample tubes than in others. In the preferred embodiment, the bias cooling is proportional to the difference between the block temperature and the coolant temperature.

The CPU 20 controls the temperature of the sample block 12 by sensing the temperature of the metal of the sample block via temperature sensor 21 and bus 52 in FIG. 1 and by sensing the temperature of the circulating coolant liquid via bus 54 and a temperature sensor in the coolant control system. The temperature sensor for the coolant is shown at 61 in FIG. 46. The CPU also senses the internal ambient air temperature within the housing of the system via an ambient air temperature sensor 56 in FIG. 1. Further, the CPU 20 senses the line voltage for the input power on line 58 via a sensor symbolized at 63. All these items of data together with items of data entered by the user to define the desired PCR protocol such as target temperatures and times for incubations are used by a control program to be described in more detail below. This control program calculates the amount of power to apply to the various zones of the multi-zone sample block film heater 156 via the bus 52 and generates a coolant control signal to open or close the solenoid operated valve 55 in the coolant control system 24 via bus 54 so as to cause the temperature of the sample block to follow the PCR protocol defined by data entered by the user.

Figure 2:
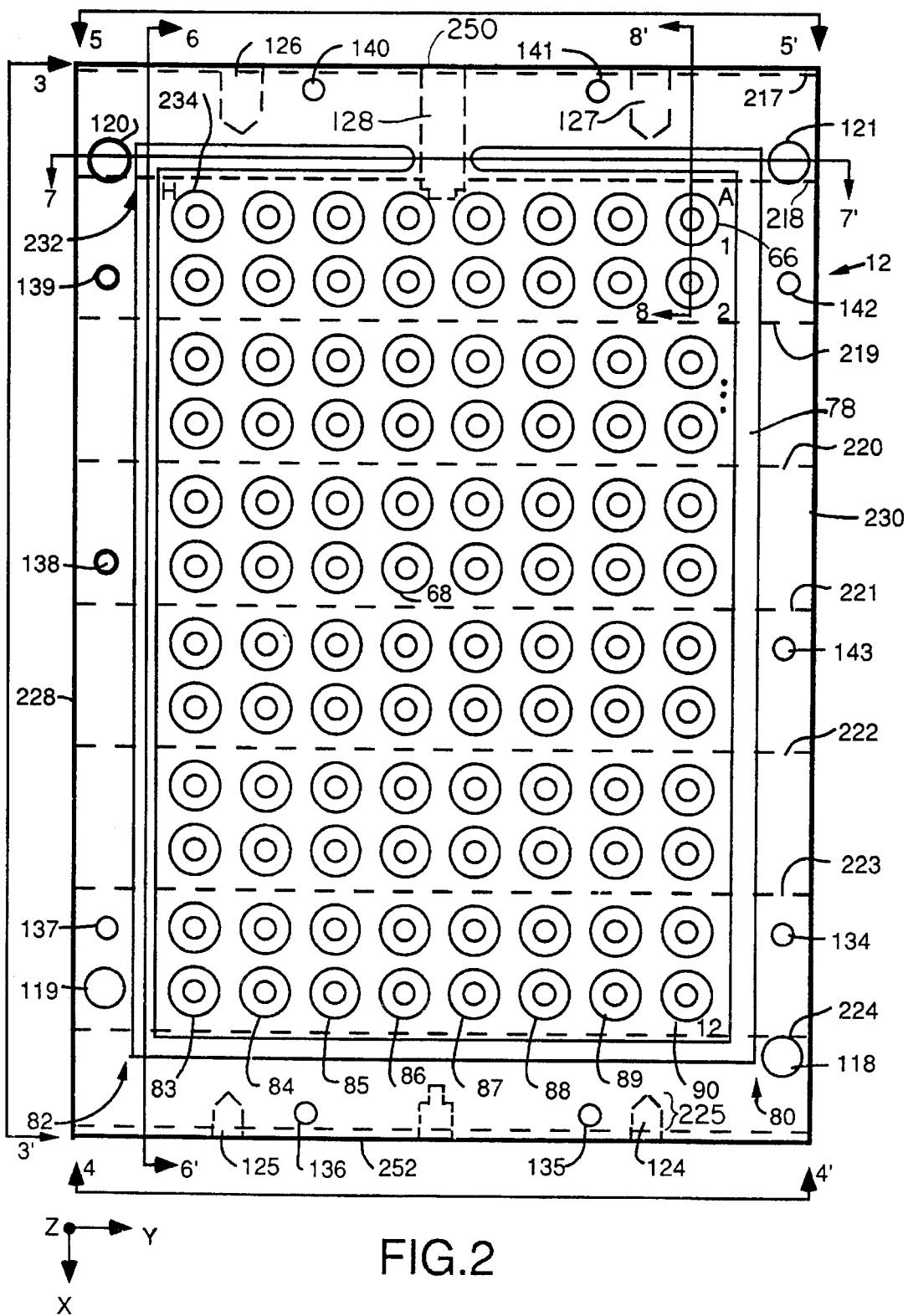
FIG. 2 is a plan view of a sample block according to the teachings of the invention.

Referring to FIG. 2, there is shown a top view of the sample block 12. The purpose of the sample block 12 is to provide a mechanical support and heat exchange element for an array of thin walled sample tubes where heat may be exchanged between the sample liquid in each sample tube and liquid coolant flowing in the bias cooling and ramp cooling channels formed in the sample block 12. Further, it is the function of the sample block 12 to provide this heat exchange function without creating large temperature gradients between various ones of the sample wells such that all sample mixtures in the array experience the same PCR cycle even though they are spatially separated. It is an overall objective of the PCR instrument described herein to provide very tight temperature control over the temperature of the sample liquid for a plurality of samples such that the temperature of any sample liquid does not vary appreciably (approximately plus or minus 0.5° C.) from the temperature of any other sample liquid in another well at any point in the PCR cycle.

There is an emerging branch of PCR technology called "quantitative" PCR. In this technology, the objective is to perform PCR amplification as precisely as possible by causing the amount of target DNA to exactly double on every cycle. Exact doubling on every cycle is difficult or impossible to achieve but tight temperature control helps.

There are many sources of errors which can cause a failure of a PCR cycle to exactly double the amount of target DNA (hereafter DNA should be understood as also referring to RNA) during a cycle. For example, in some PCR amplifications, the process starts with a single cell of target DNA. An error that can easily occur results when this single cell sticks to the wall of the sample tube and does not amplify in the first several cycles.

Another type of error is the entry of a foreign nuclease into the reaction mixture which attacks the "foreign" target DNA. All cells have some nonspecific nuclease that attacks foreign DNA that is loose in the cell. When this happens, it interferes with or stops the replication process. Thus, if a drop of saliva or a dandruff particle or material from another sample mixture were inadvertently to enter a sample mixture, the nuclease materials in these cells could attack the target DNA and cause an error in the amplification process. It is highly desirable to eliminate all such sources of cross-contamination.

Another source of error is nonprecise control over sample mixture temperature as between various ones of a multiplicity of different samples. For example, if all the samples are not precisely controlled to have the proper annealing temperature (a user selected temperature usually in the range from 50° to 60° C.) for the extension incubation certain forms of DNA will not extend properly. This happens because the primers used in the extension process anneal to the wrong DNA if the temperature is too low. If the annealing temperature is too high, the primers will not anneal to the target DNA at all.

One can easily imagine the consequences of performing the PCR amplification process inaccurately when PCR amplification is part of diagnostic testing such as for the presence HIV antibodies, hepatitis, or the presence of genetic diseases such as sickle cell anemia, etc. A false positive or false negative result in such diagnostic testing can have disastrous personal and legal consequences. Accordingly, it is an object for the design of the PCR instrument described herein to eliminate as many of these sources of possible errors as possible such as cross-contamination or poor temperature control while providing an instrument which is compatible with the industry standard 96-well microtiter plate format. The instrument must rapidly perform PCR in a flexible manner with a simple user interface.

In the preferred embodiment, the sample block 12 is machined out of a solid block of relatively pure but corrosion resistant aluminum such as the 6061 aluminum alloy. Machining the block structure out of a solid block of aluminum results in a more thermally homogeneous structure. Cast aluminum structures tend not to be as thermally homogenous as is necessary to meet the very tight desired temperature control specifications.

Sample block 12 is capable of rapid changes in temperature because the thermal mass of the block is kept low. This is done by the formation in the block of many cooling passageways, sample wells, grooves and other threaded and unthreaded holes. Some of these holes are used to attach the block to supports and to attach external devices such as manifolds and spillage trays thereto.

Figure 7:
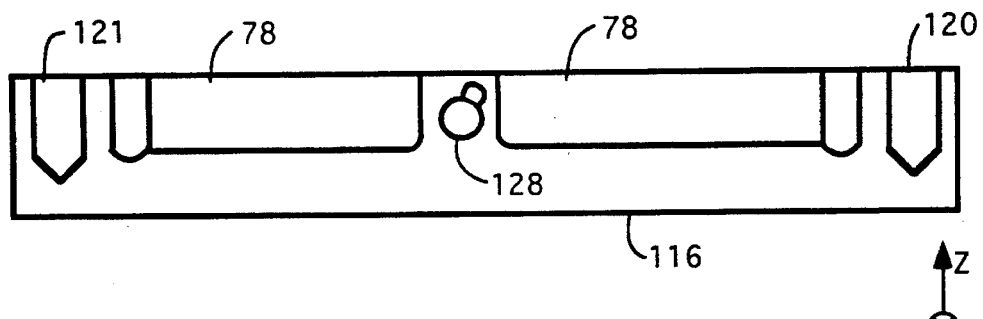
FIG. 7 is a sectional view of the sample block taken along section line 7—7' in FIG. 2.
Figure 8:
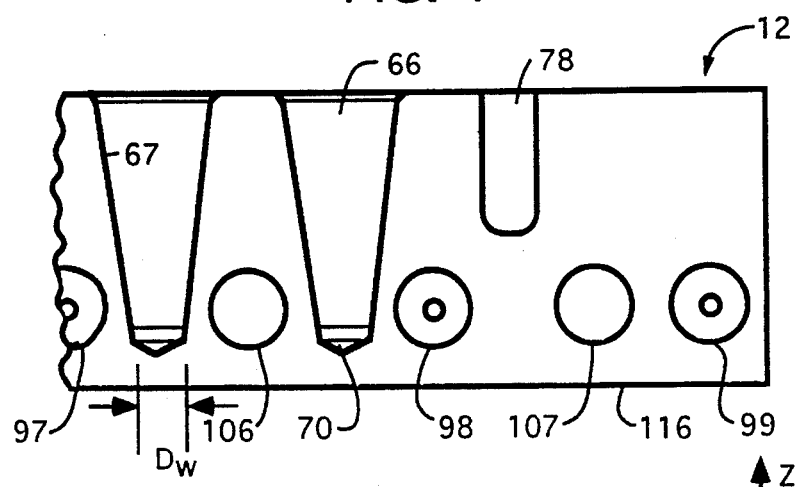
FIG. 8 is a sectional view of the sample block taken along section line 8—8' in FIG. 2

To best appreciate the "honeycomb" nature of the sample block structure, the reader should refer simultaneously to FIG. 2 which shows the block in plan view as well as FIGS. 3 through 8 which show elevation views and strategically located sectional views of the sample block. For example, FIG. 3 is a side elevation view showing the cooling channel positions taken from the vantage point of the view line 3–3' in FIG. 2. The elevation view of the sample block 12, looking at the opposite edge, is identical. FIG. 4 is an elevation view of the edge of the sample block 12 from the perspective of view line 4–4' in FIG. 2. FIG. 5 is an elevation view of the end of the sample block 12 taken from the perspective of view line 5–5' in FIG. 2. FIG. 6 is a sectional view of the sample block 12 taken along the section line 6–6' in FIG. 2. FIG. 7 is a sectional view of the sample block 12 taken along section line 7–7' in FIG. 2. FIG. 8 is a sectional view of the sample block 12 taken along section line 8–8' in FIG. 2.

The top surface of the sample block 12 is drilled with an 8× 12 array of conical sample wells of which wells 66 and 68 are typical. The conical configuration of each sample well is best seen if FIG. 8. The walls of each sample well are drilled at an angle of 17° to match the angle of the conical section of each sample tube. This is done by drilling a pilot hole having the diameter $D_w$ in FIG. 8. Then a 17° countersink is used to form the conical walls 67.

The bottom of each sample well includes a sump 70 which has a depth which exceeds the depth of penetration of the tip of the sample tube. The sump 70 is created by the pilot hole and provides a small open space beneath the sample tube when the sample tube is seated in the corresponding sample well. This sump provides a space for liquid such as condensation that forms on the well walls to reside without interfering with the tight fit of each sample tube to the walls of the sample well. This tight fit is necessary to insure that the thermal conductance from the well wall to the sample liquid is uniform and high for each sample tube. Any contamination in a well which causes a loose fit for one tube will destroy this uniformity of thermal conductance across the array. That is, because liquid is substantially incompressible at the pressures involved in seating the sample tubes in the sample wells, if there were no sump 70, the presence of liquid in the bottom of the sample well could prevent a sample tube from fully seating in its sample well. Furthermore, the sump 70 provides a space in which a gaseous phase of any liquid residing in the sump 70 can expand during high temperature incubations such that large forces of such expansion which would be present if there were no sump 70 are not applied to the sample tube to push the tube out of flush contact with the sample well.

It has been found experimentally that it is important for each sample tube to be in flush contact with its corresponding sample well and that a certain minimum threshold force be applied to each sample tube to keep the thermal conductivity between the walls of the sample well and the reaction mixture uniform throughout the array. This minimum threshold seating force is shown as the force vector F in FIG. 15 and is a key factor in preventing the thermal conductivity through the walls of one sample tube from being different than the thermal conductivity through the walls of another sample tube located elsewhere in the block. The minimum threshold seating force F is 30 grams and the preferred force level is between 50 and 100 grams.

The array of sample wells is substantially completely surrounded by a groove 78, best seen in FIGS. 2, 6 and 8, which has two functions. The main function is to reduce the thermal conductivity from the central area of the sample block to the edge of the block. The groove 78 extends about ⅔ through the thickness of the sample block. This groove minimizes the effects of unavoidable thermal gradients caused by the necessary mechanical connections to the block of the support pins, manifolds, etc. A secondary function is to remove thermal mass from the sample block 12 so as to allow the temperature of the sample block 12 to be altered more rapidly and to simulate a row of wells in the edge region called the "guard band". The amount of metal removed by the portion of the groove 78 between points 80 and 82 in FIG. 2 is designed to be substantially equal to the amount of metal removed by the adjacent column of eight sample wells 83 through 90. The purpose of this is to match the thermal mass of the guard band to the thermal mass of the adjacent "local zone", a term which will be explained more fully below.

Referring specifically to FIGS. 3, 6 and 8, there is shown the number and relative positions of the various bias cooling and ramp cooling channels which are formed in the metal of the sample block 12. There are nine bias cooling channels marked with reference numerals 91 through 99. Likewise, there are eight ramp cooling channels marked with reference numerals 100 through 107.

Each of these bias cooling and ramp cooling channels is gun drilled through the aluminum of the sample block. The gun drilling process is well known and provides the ability to drill a long, very straight hole which is as close as possible to the bottom surface 110 of the sample block 12. Since the gun drilling process drills a straight hole, this process is preferred so as to prevent any of the bias cooling or ramp cooling channels from straying during the drilling process and penetrating the bottom surface 110 of the sample block or otherwise altering its position relative to the other cooling channels. Such mispositioning could cause undesirable temperature gradients by upsetting the "local balance" and "local symmetry" of the local zones. These concepts are explained below, but for now the reader should understand that these notions and the structures which implement them are key to achieving rapid temperature cycling of up to 96 samples without creating excessive temperature errors as between different sample wells.

The bias cooling channels 91 through 99 are lined with silicone rubber in the preferred embodiment to reduce the thermal conductivity across the wall of the bias cooling channel. Lowering of the thermal conductivity across the channel wall in the bias cooling channels is preferred so as to prevent too rapid of a change in temperature of the sample block 12 when the multizone heater 156 is turned off and heat loss from the sample block 12 is primarily through the bias cooling channels. This is the situation during the control process carried out when the sample block temperature has strayed slightly above the desired target incubation temperature and the control system is attempting to bring the sample block temperature back down to the user's specified incubation temperature. Too fast a cooling rate in this situation could cause overshoot of the desired incubation temperature before the control system's servo feedback loop can respond although a "controlled overshoot" algorithm is used as will be described below. Since the block temperature servo feedback loop has a time constant for reacting to stimuli, it is desirable to control the amount of heating and cooling and the resulting rate of temperature change of the sample block such that overshoot is minimized by not changing the sample block temperature at a rate faster than the control system can respond to temperature errors.

In the preferred embodiment, the bias cooling channels are 4 millimeters in diameter, and the silicone rubber tube has a one millimeter inside diameter and a 1.5 millimeter wall thickness. This provides a bias cooling rate of approximately 0.2° C. per second when the block is at the high end of the operating range, i.e., near 100° C., and a bias cooling rate of approximately 0.1° C. per second when the sample block 12 is at a temperature in the lower end of the operating range. The coolant control system 24 in FIG. 1 causes a flow rate for coolant in the bias cooling channels of approximately ¹⁄₂₀th to ¹⁄₃₀th of the flow rate for liquid coolant through the ramp cooling channels, 100 through 107. The bias cooling and ramp cooling channels are the same size, i.e., 4 millimeters in diameter, and extend completely through the sample block 12.

The bias cooling channels are lined by inserting a stiff wire with a hook at the end thereof through the bias cooling channel and hooking it through a hole in the end of a silicone rubber tube which has an outside diameter which is slightly greater than 4 millimeters. The hook in the wire is then placed through the hole in the silicone rubber tube, and the silicone tube is pulled through the bias cooling channel and cut off flush with the end surfaces of the sample block 12.

Threaded holes 108 through 114 are used to bolt a coolant manifold to each side of the sample block 12. There is a coolant manifold bolted to each end of the block. These two coolant manifolds are coupled to the coolant channels 26, 28, 30 and 32 in FIG. 1, and are affixed to the sample block 12 with a gasket material (not shown) interposed between the manifold and the sample block metal. This gasket prevents leaks of coolant and limits the thermal conductivity between the sample block 12 and the manifold which represents a heat sink. Preferably, the gasket material is ethylene propylene. Any gasket material which serves the above stated purposes will suffice for practicing the invention.

The positions of the bias cooling and ramp cooling channels relative to the position of the groove 78 are best seen in the sectional view of FIG. 6. The positions of the bias cooling and ramp cooling channels relative to the positions of the sample wells is best seen in FIG. 8. The bias cooling and ramp cooling channels are generally interposed between the positions of the tips of the sample wells. Further, FIG. 8 reveals that the bias cooling and ramp cooling channels such as channels 106 and 97 cannot be moved in the positive z direction very far without risking penetration of the walls of one or more sample wells. Likewise, the cooling channels cannot be moved in the negative z direction very far without creating the possibility of penetrating the bottom surface 116 of the sample block 12. For clarity, the positions of the bias and ramp cooling channels are not shown in hidden lines in FIG. 2 relative to the positions of the sample wells and other structures. However, there is either a bias cooling channel or a ramp cooling channel between every column of sample wells.

Referring to FIG. 2, the holes 118, 119, 120 and 121 are threaded and are used to attach the sample block 12 to machinery used to machine the various holes and grooves formed therein. In FIGS. 2, 4 and 5, the holes 124, 125, 126 and 127 are used to attach the sample block 12 to a support bracket shown in FIG. 9 to be described in more detail below. Steel bolts extend through this support bracket into the threaded holes 124 through 127 to provide mechanical support of the sample block 12. These steel bolts also represent heat sinks or heat sources which tend to add thermal mass to the sample block 12 and provide additional pathways for transfer of thermal energy between the sample block 12 and the surrounding environment. These support pins and the manifolds are two important factors in creating the need for the guard bands to prevent the thermal energy transferred back and forth to these peripheral structures from affecting these sample temperatures.

Referring to FIG. 5, the holes 128, 130 and 132 are mounting holes for an integrated circuit temperature sensor (not shown) which is inserted into the sample block through hole 128 and secured thereto by bolts which fasten to threaded holes 130 and 132. The extent of penetration of the hole 128 and the relative position of the temperature sensor to the groove 78 and the adjacent column of sample wells is best seen in FIG. 2.

Figure 19:
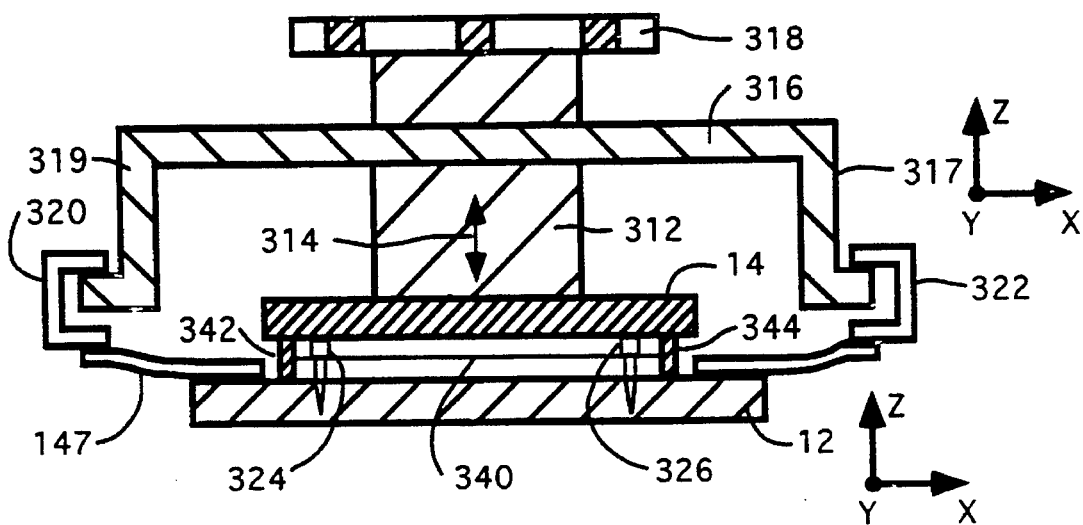
FIG. 19 is a cross-sectional view of the sliding cover and heated platen.

Referring to FIG. 2, holes 134 through 143 are mounting holes which are used to mount a spill collar 147 (not shown). This spill collar 147 is shown in FIG. 19 detailing the structure of the heated platen 14, sliding cover 316 and lead screw assembly 312. The purpose of the spill collar is to prevent any liquid spilled from the sample tubes from getting inside the instrument casing where it could cause corrosion.

Figure 9:
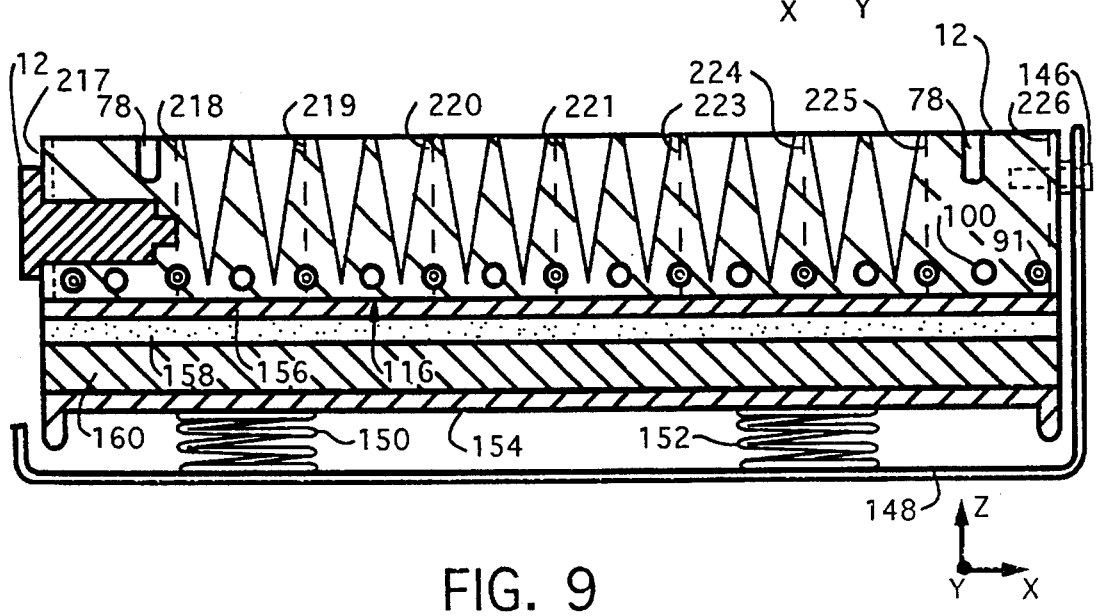
FIG. 9 is a cross-sectional, elevation view of the sample block structure after assembly with the three-zone film heater and block support.

Referring to FIG. 9, there is shown in cross-section a view of the support system and multi-zone heater 156 configuration for the sample block 12. The sample block 12 is supported by four bolts of which bolt 146 is typical. These four bolts pass through upright members of a steel support bracket 148. Two large coil springs 150 and 152 are compressed between a horizontal portion of the support bracket 148 and a steel pressure plate 154. The springs 150 and 152 are compressed sufficiently to supply approximately 300 lbs. per square inch of force in the positive z direction acting to compress a film heater 156 to the bottom surface 116 of the sample block 12. This three layer film heater structure is comprised of a multi-zone film heater 156, a silicone rubber pad 158 and a layer of epoxy resin foam 160. In the preferred embodiment the film heater 156 has three separately controllable zones. The purpose of the film heater 156 is to supply heat to the sample block 12 under the control of the CPU 20 in FIG. 1. The purpose of the silicone rubber pad 158 is to lower the thermal conductivity from the film heater layer 156 to the structures below. These lower structures serve as heat sinks and heat sources between which undesired heat energy may be transferred to and from the sample block 12. The silicone rubber pad 158 has the additional function of compensating for surface irregularities in the film heater 156 since some film heaters embody nichrome wires and may not be not perfectly flat.

The purpose of the steel plate 154 and the epoxy resin foam 160 is to transfer the force from the springs 150 and 152 to the silicone rubber pad 158 and the multi-zone film heater 156 so as to compress the film heater to the bottom surface 116 of the sample block with as flush a fit as possible. The epoxy resin foam should be stiff so as to not be crushed under the force of the springs but it should also be a good insulator and should have low thermal mass, i.e., it should be a nondense structure. In one embodiment, the foam 160 is manufactured under the trademark ECKO foam. In alternative embodiments, other structures may be substituted for the silicone rubber layer 158 and/or the epoxy resin foam layer 160. For example, a stiff honeycomb structure such as is used in airplane construction could be placed between the pressure plate 154 and the film heater 156 with insulating layers therebetween. Whatever structure is used for layers 158 and 160 should not absorb substantial amounts of heat from the sample block 12 while the block is being heated and should not transfer substantial amounts of heat to the sample block 12 when the block is being cooled. Perfect isolation of the block from its surrounding structures however, is virtually impossible. Every effort should be made in designing alternative structures that will be in contact with the sample block 12 so as to thermally isolate the sample block from its environment as much as possible to minimize the thermal mass of the block and enable rapid temperature changes of the sample block and the sample mixtures stored therein.

Precise temperature control of the sample block temperature is achieved by the CPU 20 in FIG. 1 by controlling the amount of heat applied to the sample block by the multi-zone film heater 156 in FIG. 9. The film heater is driven using a modified form of pulse width modulation. First, the 120 volt waveform from the power line is rectified to preserve only half cycles of the same polarity. Then portions of each half cycle are gated to the appropriate zones of the foil heater, with the percentage of each half cycle which is applied to the various zones of the foil heater being controlled by the CPU 20.

Figure 10:
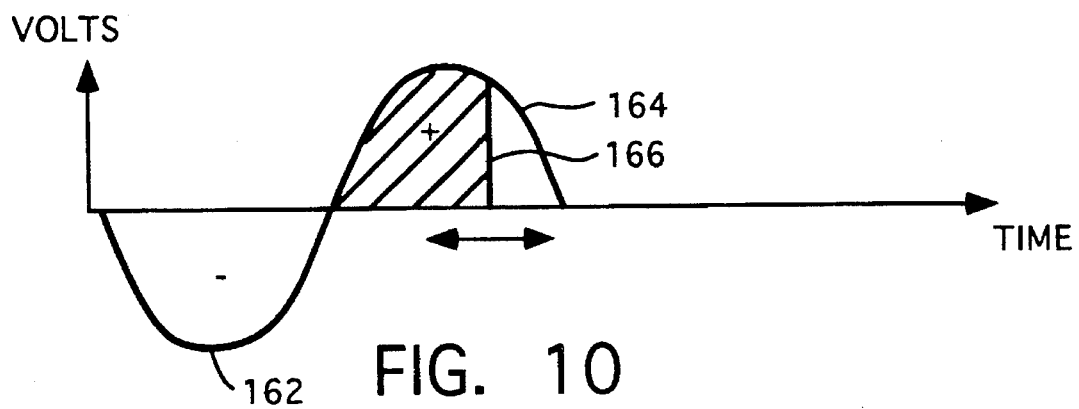
FIG. 10 is a graph of power line voltage illustrating the form of power control to the three-zone film heater.

FIG. 10 illustrates one embodiment of a power control concept for the film heater 156. FIG. 10 is a diagram of the voltage waveform of the supply line voltage. Rectification to eliminate the negative half cycle 162 occurs. Only positive half cycles remain of which half cycle 164 is typical. The CPU 20 and its associated peripheral electronic circuitry then controls the portion of each half cycle which is applied to the various zones of the film heater 156 by selecting a portion of each half cycle to apply according to a power level computed for each zone based upon equations given below for each zone. That is, the dividing line 166 is moved forward or backward along the time axis to control the amount of power to the film heater based upon a number of factors which are related in a special equation for each zone. The cross-hatched area under the positive half cycle 164 represents the amount of power applied to the film heater 156 for the illustrated position of the dividing line 166. As the dividing line 166 is moved to the right, more power is applied to the film heater, and the sample block 12 gets hotter. As the dividing line is moved to the left along the time axis, the cross-hatched area becomes smaller and less power is applied to the film heater. How the CPU 20 and its associated software and peripheral circuitry control the temperature of block 12 will be described in more detail below.

The amount of power supplied to the film heater is continuously variable from 0 to 600 watts. In alternative embodiments, the amount of power supplied to the film heater 156 can be controlled using other schemes such as computer control over the current flow through or voltage applied to a DC film heater or by the zero crossing switching scheme described below.

In other embodiments, heating control of the sample block 12 may be performed by control over the flow rate and/or temperature of hot gases or hot liquid which is gated through heating control channels which are formed through the metal of the sample block 12. Of course in such alternative embodiments, the number of sample wells in the block would have to be reduced since there is no room for additional heating channels in the sample block 12 shown in FIGS. 2 through 8. Such alternative embodiments could still be compatible with the 96-well microtiter plate format if, for example, every other well were removed to make room for a heating channel in the sample block. This would provide compatibility only as to the dimensions of such microtiter plates and not as to the simultaneous processing of 96 different samples. Care must be taken to preserve local balance and local symmetry in these alternative embodiments.

In the embodiment described herein, the maximum power that can be delivered to the block via the film heater is 1100 watts. This limitation arises from the thermal conductivity of the block/heater interface. It has been found experimentally that the supply of more than approximately 1100 watts to the film heater 156 will frequently cause self-destruction of the device.

Typical power for heating or cooling when controlling block temperatures at or near target incubation temperatures is in the range of plus or minus 50 watts.

Referring to FIG. 11, there is shown a time versus temperature plot of a typical PCR protocol. Large downward changes in block temperature are accomplished by gating chilled liquid coolant through the ramp cooling channels while monitoring the sample block temperature by the temperature sensor 21 in FIG. 1. Typically these rapid downward temperature changes are carried out during the ramp following the denaturation incubation 170 to the temperature of hybridization incubation 172. Typically, the user must specify the protocol by defining the temperatures and times in one fashion or another so as to describe to the CPU 20 the positions on the temperature/time plane of the checkpoints symbolized by the circled intersections between the ramp legs and the incubation legs. Generally, the incubation legs are marked with reference numerals 170, 172 and 174 and the ramps are marked with reference numerals 176, 178 and 180. Generally the incubation intervals are conducted at a single temperature, but in alternative embodiments, they may be stepped or continuously ramped to different temperatures within a range of temperatures which is acceptable for performing the particular portion of the PCR cycle involved. That is, the denaturation incubation 170 need not be carried out at one temperature as shown in FIG. 11, but may be carried out at any of a plurality of different temperatures within the range of temperatures acceptable for denaturation. In some embodiments, the user may specify the length of the ramp segments 176, 178 and 180. In other embodiments, the user may only specify the temperature or temperatures and duration of each incubation interval, and the instrument will then move the temperature of the sample block as rapidly as possible between incubation temperatures upon the completion of one incubation and the start of another. In the preferred embodiment, the user can also have temperatures and/or incubation times which are different for each cycle or which automatically increment on every cycle.

The average power of ramp cooling during a transition from a 95° C. denaturation incubation to a 35° C. hybridization incubation is more than one kilowatt typically. This results in a temperature change for the sample block of approximately 4°–6° C. per second when the block temperature is at the high end of the operating range, and approximately 2° C. per second when the block temperature is at the low end of the operating range. Generally it is desirable to have as high a cooling rate as possible for ramp cooling.

Because so much heat is being removed from the sample block during ramp cooling, temperature gradients across the sample block from one end of a ramp cooling channel to the other could occur. To prevent this and minimize these types of temperature gradients, the ramp cooling channels are directionally interlaced. That is, in FIG. 3, the direction of coolant flow through ramp cooling channels 100, 102, 104, and 106 is into the page as symbolized by the x's inside these ramp cooling channel holes. Ramp cooling liquid flow in interlaced ramp cooling channels 101, 103, 105, and 107 is out of the page as symbolized by the single points in the center of these ramp cooling channel holes. This interlacing plus the high flow rate through the ramp cooling channels minimizes any temperature gradients which might otherwise occur using noninterlaced flow patterns or lower flow rates because the distances between the hot and cold ends of the channels is made smaller. A slower flow rate results in most or all of the heat being taken from the block in the first inch or so of travel which means that the input side of the block will be at a lower temperature than the output side of the block. A high flow rate minimizes the temperature gradient along the channel. Interlacing means the hot end of the channels running in one direction are "sandwiched" between the cold ends of channels wherein flow is in the opposite direction. This is a smaller distance than the length of the channel. Thus, temperature gradients are reduced because the distances heat must travel to eliminate the temperature gradient are reduced. This causes any temperature gradients that form because of cooling in the ramp channels to be quickly eliminated before they have time to differentially heat some samples and not others. Without interlacing, one side of the sample block would be approximately 1° C. hotter than the other side. Interlacing results in dissipation of any temperature gradients that result in less than approximately 15 seconds.

In order to accurately estimate the amount heat added to or removed from the block, the CPU 20 measures the block temperature using temperature sensor 21 in FIG. 1 and measures the coolant temperature by way of temperature sensor 61 in FIG. 46 coupled to bus 54 in FIG. 1. The ambient air temperature is also measured by way of temperature sensor 56 in FIG. 1, and the power line voltage, which controls the power applied to the film heaters on bus 52, is also measured. The thermal conductance from the sample block to ambient and from the sample block to the coolant are known to the CPU 20 as a result of measurements made during an initialization process to set control parameters of the system.

For good temperature uniformity of the sample population, the block, at constant temperature, can have no net heat flow in or out. However, temperature gradients can occur within the sample block arising from local flows of heat from hot spots to cold spots which have zero net heat transfer relative to the block borders. For instance, a slab of material which is heated at one end and cooled at the other is at a constant average temperature if the net heat flow into the block is zero. However, in this situation a significant temperature nonuniformity, i.e., a temperature gradient, can be established within the slab due to the flow of heat from the hot edge to the cold edge. When heating and cooling of the edges of the block are stopped, the flow of heat from the hot edge to the cold edge eventually dissipates this temperature gradient and the block reaches a uniform temperature throughout which is the average between the hot temperature and cool temperature at the beginning of heat flow.

If a slab of cross sectional area A in length L has a uniform thermal conductivity K, and the slab is held at constant average temperature because heat influx from a heat source $Q_{in}$ is matched by heat outflow to a heat sink $Q_{out}$, the steady state temperature profile which results from the heat flow is:

$$\text{Delta } T = \frac{Q_{in} L}{A K}$$

Where,
Delta T= the temperature gradient
L= the thermal path length
A= the area of the thermal path
K= the thermal conductance through the path In general, within any material of uniform thermal conductance, the temperature gradient will be established in proportion to the heat flow per unit area. Heat flow and temperature nonuniformity are thus intimately linked.

Practically speaking, it is not possible to control the temperature of a sample block without some heat flow in and out. The cold bias control cooling requires some heat flow in from the strip heaters to balance the heat removed by the coolant flowing through the bias cooling channels to maintain the block temperature at a stable value. The key to a uniform sample block temperature under these conditions is a geometry which has "local balance" and "local symmetry" of heat sources and heat sinks both statically and dynamically, and which is arranged such that any heat flow from hot spots to cold spots occurs only over a short distance.

Stated briefly, the concept of "static local balance" means that in a block at constant temperature where the total heat input equals the total heat output, the heat sources and heat sinks are arranged such that within a distinct local region, all heat sources are completely balanced by heat sinks in terms of heat flows in and heat flows out of the block. Therefore, each local region, if isolated, would be maintained at a constant temperature.

The concept of "static local symmetry" means that, within a local region and for a constant temperature, the center of mass of heat sources is coincident with the center of mass of heat sinks. If this were not the case, within each local region, a temperature gradient across each local region can exist which can add to a temperature gradient in an adjacent local region thereby causing a gradient across the sample block which is twice as large as the size of a single local region because of lack of local symmetry even though local balance within each local region exists. The concepts of local balance and local symmetry are important to the achievement of a static temperature balance where the temperature of the sample block is being maintained at a constant level during, for example, an incubation interval.

For the dynamic case where rapid temperature changes in the sample block are occurring, the thermal mass, or heat capacity of each local region becomes important. This is because the amount of heat that must flow into each local region to change its temperature is proportional to the thermal mass of that region.

Therefore, the concept of static local balance can be expanded to the dynamic case by requiring that if a local region includes x percent of the total dynamic heat source and heat sink, it must also include x percent of the thermal mass for "dynamic local balance" to exist. Likewise, "dynamic local symmetry" requires that the center of mass of heat capacity be coincident with the center of mass of dynamic heat sources and sinks. What this means in simple terms is that the thermal mass of the sample block is the metal thereof, and the machining of the sample block must be symmetrical and balanced such that the total mass of metal within each local zone is the same. Further, the center of mass of the metal in each local zone should be coincident with the center of mass of the dynamic heat sources and sinks. Thus, the center of mass of the multi-zone heater 156, i.e., its geometric center, and the geometric center of the bias and ramp cooling channels must coincide. From a study of FIGS. 2–9, it will be seen from the detailed discussion below that both static and dynamic local balance and local symmetry exist in sample block 12.

Figure 12:
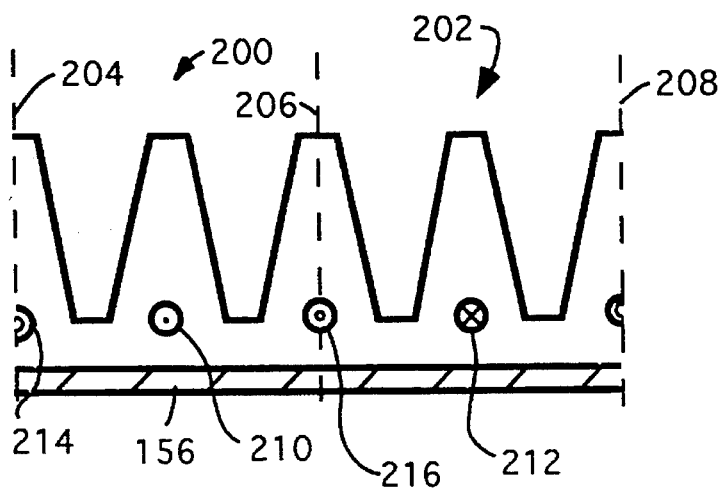
FIG. 12 is a cross-sectional view of the sample block illustrating the local zone concept.

FIG. 12 illustrates two local regions side by side for the design of the sample block 12 according to the teachings of the invention. In FIG. 12, the boundaries of two local regions, 200 and 202, are marked by dashed lines 204, 206 and 208. FIG. 12 shows that each local region which is not in the guard band is comprised of: two columns of sample wells; a portion of the foil heater 156 which turns out to be ⅛th of the total area of the heater; one ramp cooling channel such as ramp cooling channels 210 and 212; and, one bias cooling channel. To preserve local symmetry, each local region is centered on its ramp cooling channel and has one-half of a bias cooling channel at each boundary. For example, local region 200 has a center over the ramp cooling channel 210 and bias cooling channels 214 and 216 are dissected by the local region boundaries 204 and 206, respectively. Thus the center of mass of the ramp cooling channel (the middle thereof), coincides (horizontally) with the center of mass of the bias cooling channels (the center of the local region) and with the center of mass of the film heater portion coupled to each local region. Static local balance will exist in each local region when the CPU 20 is driving the film heater 156 to input an amount of heat energy that is equal to the amount of heat energy that is being removed by the ramp cooling and bias cooling channels. Dynamic local balance for each local region exists because each local region in the center portion of the block where the 96 sample mixtures reside contains approximately ⅛th the total thermal mass of the entire sample block, contains ⅛th of the total number of ramp cooling channels and contains ⅛th of the total number of bias cooling channels. Dynamic local symmetry exists for each local region, because the center of mass of the metal of each local region is horizontally coincident with: the center of film heater portion underlying the local region; the center of the ramp cooling channel; and, the center of mass of the two half bias cooling channels.

By virtue of these physical properties characterized as static and dynamic local balance and local symmetry, the sample block heats and cools all samples in the population much more uniformly than prior art thermal cyclers.

Referring to FIG. 2, the plan view of the boundaries of the local regions are illustrated by dashed lines 217 through 225. Inspection of FIG. 2 reveals that the central region of the 96 sample wells are divided into six adjacent local regions bounded by boundaries 218 through 224. In addition, two guard band local regions are added at each edge. The edge local region (local regions are sometimes herein also called local zones) having the most negative x coordinate is bounded by boundary lines 217 and 218. The edge local region having the most positive x coordinate is bounded by boundary lines 224 and 225. Note that the edge local regions contain no sample well columns but do contain the groove 78 simulating a column of wells. The depth and width of the groove 78 is designed to remove the same metal mass as a column of wells thereby somewhat preserving dynamic local symmetry. The edge local zones are therefore different in thermal mass (they also have additional thermal mass by virtue of the external connections such as manifolds and support pins) than the six local zones in the central part of the sample block. This difference is accounted for by heating the edge local zones or guard bands with separately controllable zones of said multizone heater so that more energy may be put into the guard band than the central zone of the block.

The local regions at each edge of the block approximate, but do not exactly match the thermal properties of the six centrally located local regions. The edge local regions are called "guard band" regions because they complete a guard band which runs around the periphery of the sample block 12. The purpose of this guard band is to provide some thermal isolation of the central portion of the sample block containing the 96 sample wells from uncontrolled heat sinks and sources inherently embodied in mechanical connections to the block by such things as support pins, manifolds, drip collars and other devices which must be mechanically affixed to the sample block 12. For example in FIG. 2, the edge surfaces 228 and 230 of the sample block have plastic manifolds attached thereto which carry coolant to and from the ramp and bias cooling passages. The guard band along edges 228 and 230 consists of portions of the slot 78 which are parallel to and closest to the edges 228 and 230. The depth of the groove 78 is such that the bottom of the groove is as close to the perimeters of the bias and ramp cooling channels as is possible without actually intersecting them. The width of the groove 78 coupled with this depth is such that the volume of metal removed by the slot 78 between points 82 and 232 in FIG. 2 approximately equals the volume of metal removed by the adjacent row of sample wells starting with sample well 234 and ending with sample well 83. Also, the slot 78 all around the perimeter of the block is located approximately where such an additional row of wells would be if the periodic pattern of sample wells were extended by one row or column of wells in each direction.

Along the edges 250 and 252 where the support connections are made to the sample block, the guard band local regions contain, in addition to a portion of the slot 78, the full length of several cooling channels. Referring to FIG. 3, these include: ½ of a bias cooling channel (e.g., 92) which merges with the adjacent ½ bias cooling channel of the adjacent local region to form a whole bias cooling channel; a ramp cooling channel (e.g., 100); and a whole bias cooling channel (e.g., 91). For the edge local region at edge 250, these cooling channels are 107, 198 and 99.

The whole bias cooling channels in the guard bands are slightly displaced inward from the edge of the block. The reason that these whole bias cooling channels are used is because a "half" cooling channel is impractical to build. Since the bias cooling channels require such a thick walled rubber lining, it would be difficult to keep a hole through a lining of a "half" bias cooling channel reliably open. This asymmetry in the edge local regions causes a small excess loss of heat to the coolant from the edge guard band local regions, but it is sufficiently remote from the central region of the sample block containing the sample wells that its contribution to sample temperature nonuniformities is small. Also, since the temperature affects of this small asymmetry are predictable, the effect can be further minimized by the use of a separately controllable zone of the multi-zone heater system under each guard band.

Figure 13:
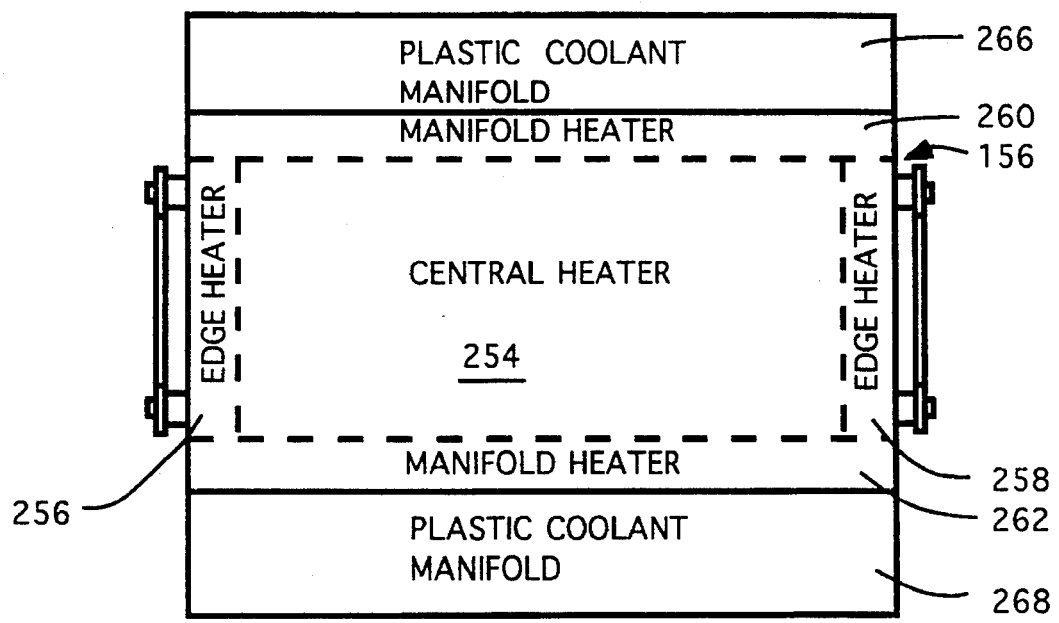
FIG. 13 is a plan view of the three-zone heater.

Referring to FIG. 13, there are shown three separately controlled zones within the film heater layer 156 in FIG. 9. These separately controlled zones include edge heater zones which are situated under the guard bands at the exposed edges of the sample block 12 which are coupled to the support bracket 148. There are also separately controlled manifold heater zones situated under the guard bands for the edges 228 and 230 which are attached to the coolant manifolds. Finally, there is a central heater zone that underlies the sample wells. The power applied to each of these zones is separately controlled by the CPU 20 and the control software.

The film heater 156 is composed of a pattern of electrical conductors formed by etching a thin sheet of metal alloy such as Inconel™. The metal alloy selected should have high electrical resistance and good resistance to heat. The pattern of conductors so etched is bonded between thin sheets of an electrically insulating polymeric material such as Kapton™. Whatever material is used to insulate the electrical resistance heating element, the material must be resistant to high temperatures, have a high dielectric strength and good mechanical stability.

The central zone 254 of the film heater has approximately the same dimensions as the central portion of the sample block inside the guard bands. Central region 254 delivers a uniform power density to the sample well area.

Edge heater regions 256 and 258 are about as wide as the edge guard bands but are not quite as long.

Manifold heater regions 260 and 262 underlie the guard bands for edges 228 and 230 in FIG. 2.

The manifold heater zones 260 and 262 are electrically connected together to form one separately controllable heater zone. Also, the edge heater sections 256 and 258 are electrically coupled together to form a second separately controllable heater zone. The third separately controllable heater zone is the central section 254. Each of these three separately controllable heater zones has separate electrical leads, and each zone is controlled by a separate control algorithm which may be run on separate microprocessors or a shared CPU as is done in the preferred embodiment.

The edge heater zones 256 and 258 are driven to compensate for heat lost to the support brackets. This heat loss is proportional to the temperature difference between the sample block 12 and the ambient air surrounding it. The edge heater zones 256 and 258 also compensate for the excess loss of heat from the sample block to the full bias cooling channels at each edge of the block. This heat loss is proportional to the temperature difference between the sample block 12 and the coolant flowing through these bias cooling channels.

The manifold heater sections 260 and 262 are also driven so as to compensate for heat lost to the plastic coolant manifolds 266 and 268 in FIG. 13 which are attached to the edges of the sample block 12. The power for the manifold heater sections 260 and 262 compensates for heat loss which is proportional mainly to the temperature difference between the sample block and the coolant, and to a lesser degree, between the sample block and the ambient air.

For practical reasons, it is not possible to match the thermal mass of the guard band local regions with the thermal masses of the local regions which include the sample wells overlying central heater section 254. For example, the plastic coolant manifolds 266 and 268 not only conduct heat away from the guard band, but they also add a certain amount of thermal mass to the guard band local regions to which they are attached. The result of this is that during rapid block temperature changes, the rates of rise and fall of guard band temperature do not exactly match that of the sample well local regions. This generates a dynamic temperature gradient between the guard bands and sample wells, which if allowed to become large, could persist for a time which is longer than is tolerable. This temperature gradient effect is roughly proportional to the rate of change of block temperature and is minimized by adding or deleting heat from each guard band local zone at a rate which is proportional to the rate of change of block temperature.

The coefficients of proportionality for the guard band zone heaters are relatively stable properties of the design of the system, and are determined by engineering measurements on prototypes. The values for these coefficients of proportionality are given below in connection with the definitions of the terms of Equations (3) through (5). These equations define the amounts of power to be applied to the manifold heater zone, the edge heater zone and the central zone, respectively in an alternative embodiment. The equations used in the preferred embodiment are given below in the description of the software (Equations (46)–(48), power distributed by area).

$$P_m = A_m P + K_{ml}(T_{BLK} - T_{AMB}) + K_{M2}(T_{BLK} - T_{COOL}) + K_{M3}(dt_{BLK}/dt) \quad (3)$$

where, $P_m$=power supplied to the manifold heater zones 260 and 262.

$A_m$=area of the manifold heater zone.

P=power needed to cause the block temperature to stay at or move to the desired temperature at any particular time in a PCR thermal cycle protocol.

$K_{M1}$=an experimentally determined constant of proportionality to compensate for excess heat loss to ambient through the manifolds, equal to 0 watts/degree Kelvin.

$K_{M2}$=an experimentally determined constant of proportionality to compensate for excess heat loss to the coolant, equal to 0.4 watts/degree Kelvin.

$K_{M3}$=an experimentally determined constant of proportionality to provide extra power to compensate for additional thermal mass of the manifold edge guard bands caused by the attachment of the plastic manifolds etc., equal to 66.6 watt-seconds/degree Kelvin.
$T_{BLK}$=the temperature of the sample block 12.
$T_{AMB}$=the temperature of the ambient air.
$T_{COOL}$=the temperature of the coolant.
$dt_{BLK}/dt$=the change in sample block temperature per unit time.

$$P_E = A_E P + K_{E1}(T_{BLK} - T_{AMB}) + K_{E2}(T_{BLK} - T_{COOL}) + K_{E3}(dt_{BLK}/dt) \quad (4)$$

where,
$P_E$=power to be applied to the edge heater zones
$A_E$= the area of the edge heater zones
$K_{E1}$=an experimentally determined constant of proportionality to compensate for excess heat loss to ambient through the manifolds, equal to 0.5 watts/degree Kelvin.
$K_{E2}$= an experimentally determined constant of proportionality to compensate for excess heat loss to the coolant, equal to 0.15 watts/degree Kelvin.
$K_{E3}$=an experimentally determined constant of proportionality to provide extra power to compensate for additional thermal mass of the exposed edge guard bands caused by the attachment of the sample block 12 to the support pins and bracket, the temperature sensor etc., equal to 15.4 watt-sec/degree Kelvin.

$$P_c = A_c P \quad (5)$$

where
$P_c$=the power to be applied to the central zone 254 of the multi-zone heater.
$A_c$=the area of the central zone 254.

In each of Equations (3) through (5), the power term, P is a variable which is calculated by the portion of the control algorithm run by the CPU 20 in FIG. 1 which reads the user defined setpoints and determines what to do next to cause the sample block temperature to stay at or become the proper temperature to implement the PCR temperature protocol defined by the time and temperature setpoints stored in memory by the user. The manner in which the setpoints are read and the power density is calculated will be described in more detail below.

The control algorithm run by CPU 20 of FIG. 1 senses the temperature of the sample block via temperature sensor 21 in FIG. 1 and FIG. 9 and bus 52 in FIG. 1. This temperature is differentiated to derive the rate of change of temperature of the sample block 12. The CPU then measures the temperature of the ambient air via temperature sensor 56 in FIG. 1 and measures the temperature of the coolant via the temperature sensor 61 in the coolant control system 24 shown in FIG. 46. The CPU 20 then computes the power factor corresponding to the particular segment of the PCR protocol being implemented and makes three calculations in accordance with Equations (3), (4) and (5) by plugging in all the measured temperatures, the constants of proportionality (which are stored in nonvolatile memory), the power factor P for that particular iteration of the control program and the areas of the various heater zones (which are stored in nonvolatile memory). The power factor is the total power needed to move the block temperature from its current level to the temperature level specified by the user via a setpoint. More details on the calculations performed by the CPU to control heating and cooling are given below in the description of the control software "PID task".

After the required power to be applied to each of the three zones of the heater 156 is calculated, another calculation is made regarding the proportion of each half cycle of input power which is to be applied to each zone in some embodiments. In the preferred embodiment described below, the calculation mode is how many half cycles of the total number of half cycles which occur during a 200 millisecond sample period are to be applied to each zone. This process is described below in connection with the discussion of FIGS. 47A and 47B (hereafter referred to as FIG. 47) and the "PID Task" of the control software. In the alternative embodiment symbolized by FIG. 10, the computer calculates for each zone, the position of the dividing line 166 in FIG. 10. After this calculation is performed, appropriate control signals are generated to cause the power supplies for the multi-zone heater 156 to do the appropriate switching to cause the calculated amount of power for each zone to be applied thereto.

In alternative embodiments, the multi-zone heater can be implemented using a single film heater which delivers uniform power density to the entire sample block, plus one or two additional film heaters with only one zone apiece for the guard bands. These additional heaters are superimposed over the single film heater that covers the entire sample block. In such an embodiment, only the power necessary to make up the guard band losses is delivered to the additional heater zones.

The power factor P in Equations (3) through (5) is calculated by the CPU 20 for various points on the PCR temperature protocol based upon the set points and ramp times specified by the user. However, a limitation is imposed based upon the maximum power delivery capability of the zone heater mentioned above.

The constants of proportionality in Equations (3) through (5) must be properly set to adequately compensate for excess heat losses in the guard band for good temperature uniformity.

Figure 17:
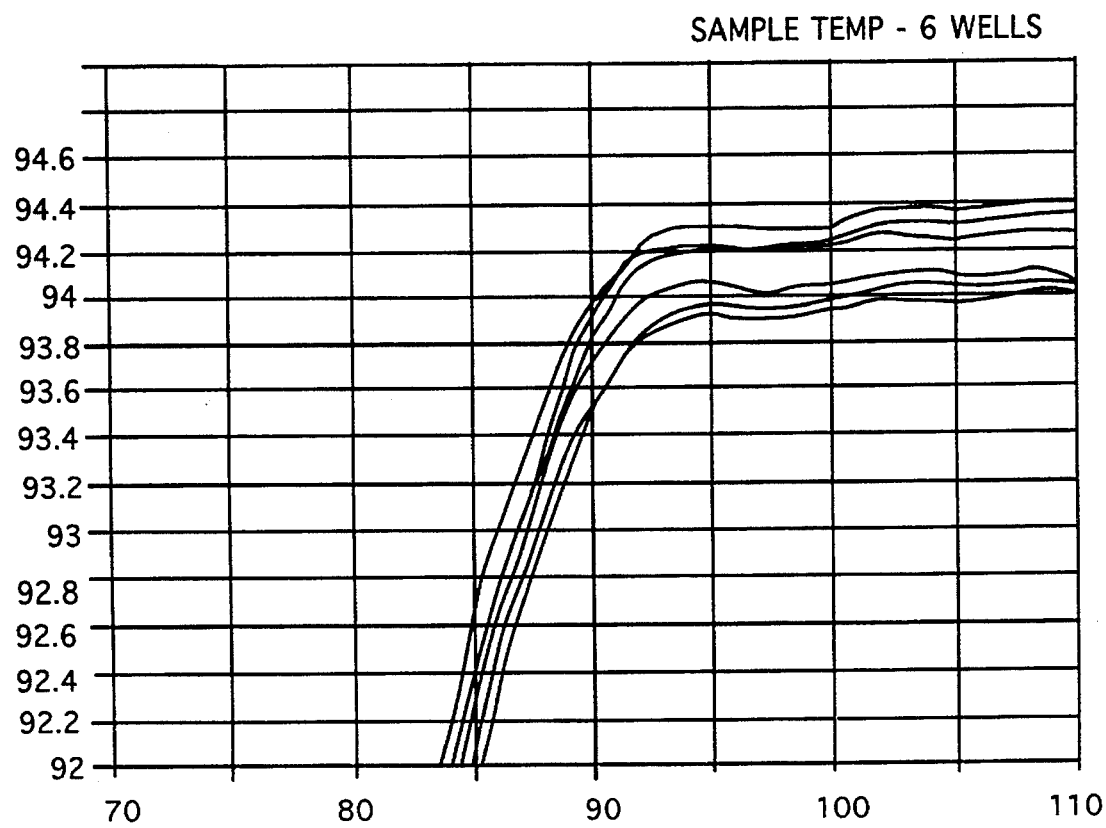
FIG. 17 illustrates how the calculated temperatures of six different samples all converge on a target temperature to within about 0.5° C. of each other when the constants of proportionality for the equations used to control the three zone heater are properly set.

Referring to FIG. 17, there is shown a graph of the differences between calculated sample temperatures for a plurality of different sample in response to a step change in block temperature to raise the temperature of the sample block toward a denaturation incubation target temperature of approximately 94° C. from a substantially lower temperature. FIG. 17 illustrates the calculated sample liquid temperatures when the multi-zone heater 156 is properly managed using the constants of proportionality given above in the definitions of the terms for Equations (3) through (5). The various wells which were used to derive the graph of FIG. 17 are indicated thereon by a single letter and number combination. The 8×12 well array showing FIG. 2 is coded by lettered columns and numbered rows. Thus, for example, sample well 90 is also designated sample well A12, while sample well 89 is also designated sample well B12. Likewise, sample well 68 is also designated sample well D6, and so on. Note that the well temperatures settle in asymptotically at temperatures which are within approximately 0.5° C. of each other because of the overall thermal design described herein to eliminate temperature gradients.

The foregoing description illustrates how the sample block temperature may be controlled to be uniform and to be quickly changeable. However, in the PCR process, it is the temperature of the sample reaction mixture and not the block temperature that is to be programmed. In the preferred embodiment according to the teachings of the invention, the user specifies a sequence of target temperatures for the sample liquid itself and specifies the incubation times for the sample liquid at each of these target temperatures for each stage in the PCR process. The CPU 20 then manages the sample block temperature so as to get the sample reaction mixtures to the specified target incubation temperatures and to hold the sample mixtures at these target temperatures for the specified incubation times. The user interface code run by the CPU 20 displays, at all stages of this process, the current calculated sample liquid temperature on the display of terminal 16.

The difficulty with displaying an actual measured sample temperature is that to measure the actual temperature of the reaction mixture requires insertion of a temperature measuring probe therein. The thermal mass of the probe can significantly alter the temperature of any well in which it is placed since the sample reaction mixture in any particular well is often only 100 microliters in volume. Thus, the mere insertion of a temperature probe into a reaction mixture can cause a temperature gradient to exist between that reaction mixture and neighboring mixtures. Since the extra thermal mass of the temperature sensor would cause the reaction mixture in which it is immersed to lag behind in temperature from the temperatures of the reaction mixtures in other wells that have less thermal mass, errors can result in the amplification simply by attempting to measure the temperature.

Accordingly, the instrument described herein calculates the sample temperature from known factors such as the block temperature history and the thermal time constant of the system and displays this sample temperature on the display. It has been found experimentally for the system described herein that if the sample tubes are pressed down into the sample wells with at least a minimum threshold force F, then for the size and shape of the sample tubes used in the preferred embodiment and the sample volumes of approximately 100 microliters, thermally driven convection occurs within the sample reaction mixture and the system acts thermally like a single time constant, linear system. Experiments have shown that each sample tube must be pushed down with approximately 50 grams of force for good well-wall-to-liquid thermal conductivity from well to well. The heated platen design described below is designed to push down on each sample tube with about 100 grams of force. This minimum force, symbolized by force vector F in FIG. 15, is necessary to insure that regardless of slight differences in external dimensions as between various sample tubes and various sample wells in the sample block, they all will be pushed down with sufficient force to guarantee the snug and flush fit for each tube to guarantee uniform thermal conductivity. Any design which has some sample tubes with loose fits in their corresponding sample wells and some tubes with tight fits will not be able to achieve tight temperature control for all tubes because of non-uniform thermal conductivity. An insufficient level of force F results in a temperature response of the sample liquid to a step change in block temperature as shown at 286 in FIG. 14. An adequate level of force F results in the temperature response shown at 282.

The result achieved by the apparatus constructed according to the teachings of the invention is that the temperature of each sample mixture behaves as if the sample is being well mixed physically during transitions to new temperatures. In fact, because of the convection currents caused in each sample mixture, the sample reaction mixture in each sample tube is being well mixed.

The surprising result is that the thermal behavior of the entire system is like an electrical RC circuit with a single time constant of 9 seconds which is about 1.44 times the half-life of the decay of the difference between the block temperature and the sample temperature. A GeneAmp™ sample tube filled with 50 milliliters of sample has a time constant of about 23 seconds. In other words, during an upward change in temperature of the sample block, the temperature of the reaction mixture acts like the rise in voltage on the capacitor C in a series RC electrical circuit like that shown in FIG. 16D in response to a step change in the voltage output of the voltage source V.

Figure 14:
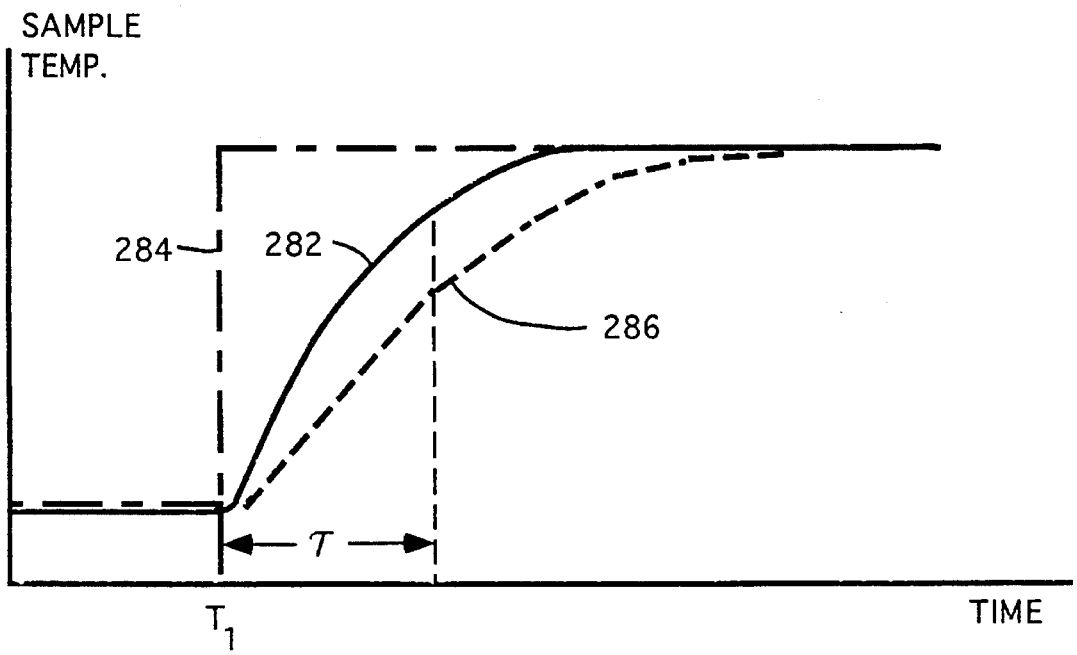
FIG. 14 is a graph of sample temperature versus time illustrating the effect of an τ of a sample tube seating force F which is too low.
Figure 15:
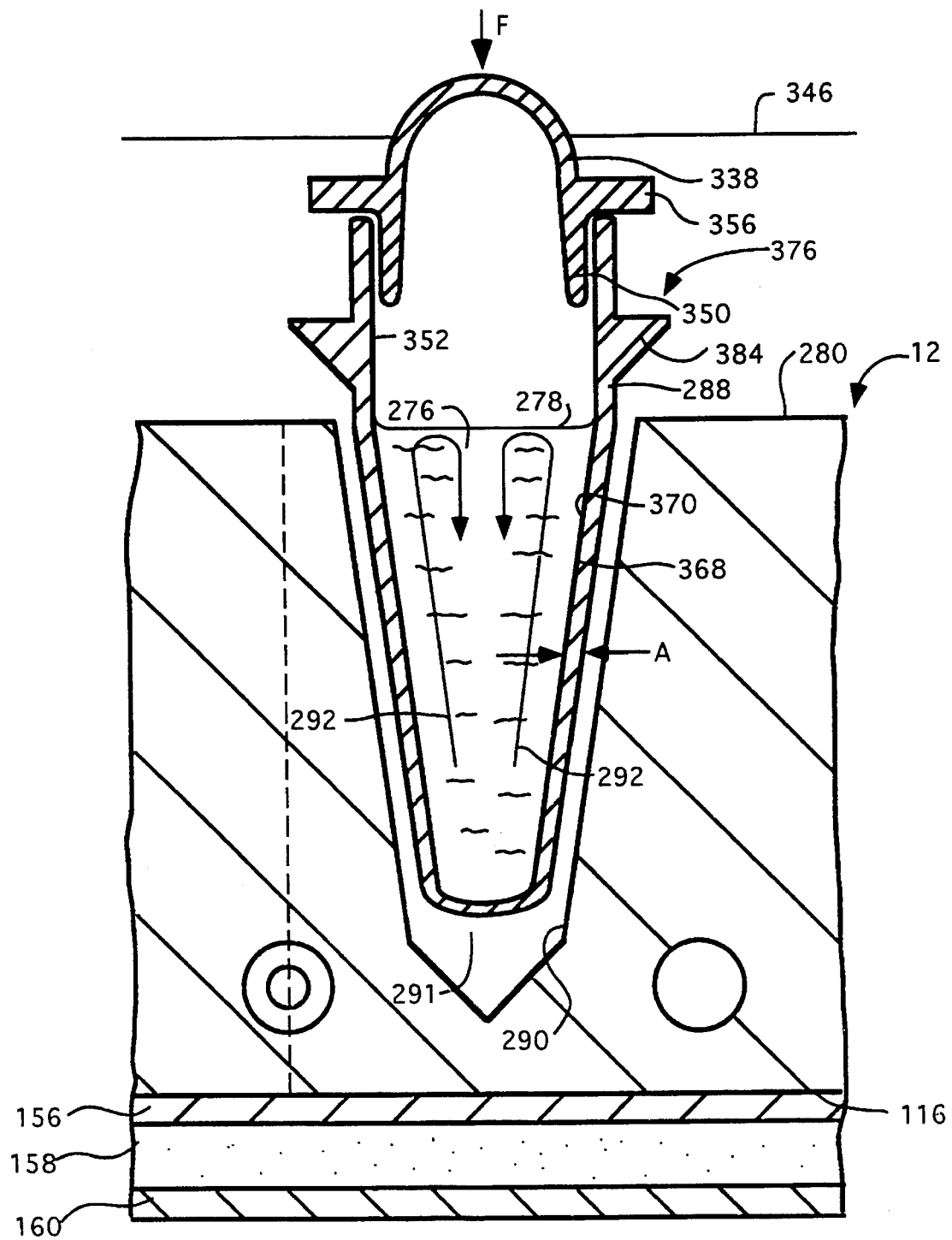
FIG. 15 is a cross-sectional view of a sample tube and cap seated in the sample block.

To illustrate these concepts, refer to FIG. 14 which shows different temperature responses of the sample liquid to a step change in block temperature and to FIG. 15 which shows a cross section through a sample well/sample tube combination. It has been found experimentally that when the volume of sample liquid 276 is approximately 100 microliters and the dimensions of the tube are such that the meniscus 278 is located below the top surface 280 of the sample block 12, and the force F pushing the sample tube into the sample well is at least 30 grams, the thermal time constant τ (tau) of the system shown in FIG. 15 is approximately nine seconds for a sample tube wall thickness in the conical section of 0.009 inches (dimension A). It has also been found experimentally that for these conditions, the thermal time constant τ varies by about 1 second for every 0.001 inch change in wall thickness for the sample tube frustum (cone). Thicker tube walls result in longer time constants and more lag between a change in sample block temperature and the resulting change in sample liquid temperature.

Mathematically, the expression for the thermal response of the sample liquid temperature to a change in temperature of the sample block is:

$$T_{sample} = \Delta T(1 - e^{-t/\tau}) \quad (6)$$

where $T_{sample}$ = temperature of the sample liquid $\Delta T$ = the temperature difference between the temperature of the sample block 12 and the temperature of the sample liquid t = elapsed time τ = thermal time constant of the system, or the heat capacity of sample divided by the thermal conductance from sample well wall to the sample liquid In FIG. 14, the curve 282 represents this exponential temperature response to a theoretical step change in sample block temperature when the force F pushing down on the sample tube is sufficiently high. The step change in temperature of the sample block is shown as function 284, with rapid rise in temperature starting at time $T_1$. Note how the temperature of the sample liquid exponentially increases in response to the step change and asymptotically approaches the final sample block temperature. As mentioned briefly above, the curve 286 represents the thermal response when the downward seating force F in FIG. 15 is insufficient to cause a snug, flush fit between the cone of the sample tube and the wall 290 of the sample well. Generally, the thermal response of curve 286 will result if the force F is less than 30 grams. Note that although FIG. 15 shows a small layer of air between the cone of the sample tube and the sample well wall for clarity, this is exactly the opposite of the desired situation since air is a good insulator and would substantially increase the thermal time constant of the system.

The thermal time constant τ is analogous to the RC time constant in a series RC circuit where R corresponds to the thermal resistance between the wall of the sample well and the sample liquid and C is the heat capacity of the sample liquid. Thermal resistance is equal to the inverse of thermal conductance which is expressed in units watts-seconds per degree Kelvin.

Because of the convection currents 292 shown in the sample liquid in FIG. 15, everywhere in the reaction mixture the sample liquid is at very nearly the same temperature, and the flow of heat between the block and the sample is very nearly proportional to the difference in temperature between the sample block and the sample reaction mixture. The constant of proportionality is the thermal conductance between the wall of the sample well in the sample block 12 and the reaction mixture. For different sample volumes or different tubes, i.e., different wall thicknesses or materials, the thermal time constant will be different. In such a case, the user can as part of his specification of the PCR protocol enter the sample volume or tube type and the machine will automatically look up the correct thermal time constant for use in calculating the sample temperature. In some embodiments, the user may enter the actual time constant, and the machine will use it for sample temperature temperature calculation.

To keep the thermal time constant as small as possible, the conical walls of the sample tubes should be as thin as possible. In one embodiment, these conical walls are 0.009 inches thick whereas the walls of the cylindrical portion of the sample tube are 0.030 inches thick. The conical shape of the sample tube provides a relatively large surface area of contact with the metal of the sample well wall in relation to the volume of the sample mixture. The tube-to-tube variation of the size and shape of the conical section should be controlled so that variation in projection of the tube above the block when the tube is seated in the sample well is within a range of 0.010 inches.

Molding of the sample tubes is done using a "cold runner" system and a four cavity mold such that four sample tubes are molded at each injection. The molten plastic is injected at the tip of the sample tube cone so that any remnant of plastic will project into the cavity 291 between the tip of the sample tube and the tip of the sample well. This prevents any remnant from interfering with the flush fit between the tube and the well. A maximum limit of 0.030 inches is placed on the size of any remnant plastic.

In various embodiments, 3 different grades of polypropylene each with different advantages can be used. The preferred polypropylene is PD701 from Himont because it is autoclavable. However this plastic is difficult to mold because it has a low melt index. This plastic has a melt index of 35 and a molecular density of 9. PD701 tends to leave flash and creates somewhat spotty quality parts but would work better if it was injected into the thick walled part of the mold instead of at the tip of the conical section as is currently done. Generally, it is desirable to have a high melt index for ease of molding but also a high molecular density to maintain good strength and to prevent crazing or cracks under the thermal stress of the autoclaving process at 260° F. Another plastic, PPW 1780 from American Hoescht has a melt index of 75 and a molecular density of 9 and is autoclavable. Another plastic which may be used in some embodiments is Himont 444. This plastic is not autoclavable and needs to be sterilized in another manner.

In alternative embodiments, the tubes may be molded using a "hot runner" or "hot nozzle" system where the temperature of the molten plastic is controlled right up to the gate of the mold. Also, in some embodiments, multiple gates may be used. However, neither of these techniques has been experimentally proven at the time of filing to be better than the currently used "cold runner" system.

The fact that the system acts thermally like a single time constant RC circuit is an important result, because it means that if the thermal conductance from the sample block to the sample reaction mixture is known and uniform, the thermal response of the sample mixtures will be known and uniform. Since the heat capacity of the sample reaction mixture is known and constant, the temperature of the sample reaction mixture can be computed accurately using only the measured history of the block temperature over time. This eliminates the need to measure the sample temperature thereby eliminating the errors and mechanical difficulty of putting a probe with nonnegligible thermal mass into a sample well to measure the sample temperature directly thereby changing the thermal mass of the sample in the probed well.

The algorithm which makes this calculation models the thermal behavior of the system after a single time constant series R-C electrical circuit. This model uses the ratio of the heat capacity of the liquid sample divided by the thermal conductance from the sample block to the sample reaction mixture. The heat capacity of the sample reaction mixture is equal to the specific heat of the liquid times the mass of the liquid. The thermal resistance is equal to one over the thermal conductance from the sample block to the liquid reaction mixture through the sample tube walls. When this ratio of heat capacity divided by thermal conductance is expressed in consistent units, it has the dimension of time. For a fixed sample volume and a fixed sample composition both of which are the same in every sample well and a fixed thermal conductance, the ratio is also a constant for every sample well, and is called the thermal time constant of the system. It is the time required for the sample temperature to come within 36.8% of the block temperature after a sudden step change in the block temperature.

Figure 16A:
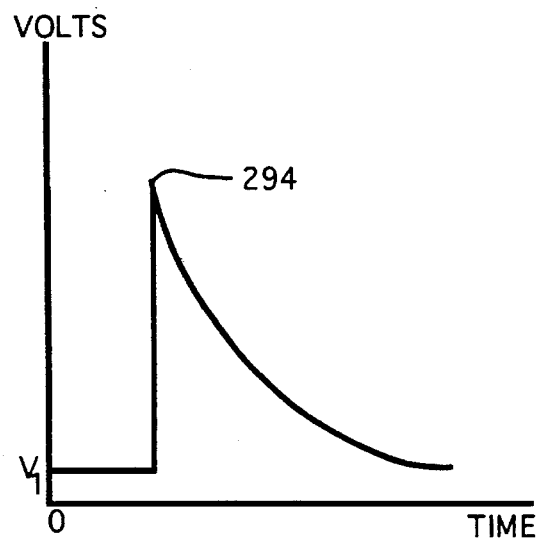
FIG. 16A is a graph of the impulse response of an RC circuit.
Figure 16B:
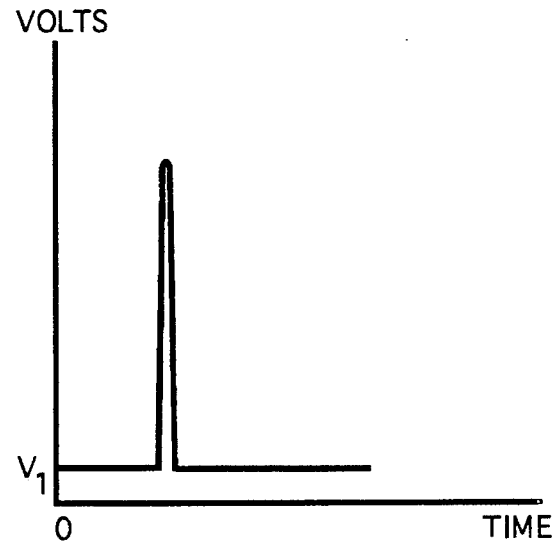
FIG. 16B is a graph of an impulse excitation pulse.

There is a mathematical theorem used in the analysis of electronic circuits that holds that it is possible to calculate the output response of a filter or other linear system if one knows the impulse response of the system. This impulse response is also known as the transfer function. In the case of a series RC circuit, the impulse response is an exponential function as shown in FIG. 16A. The impulse stimulus resulting in the response of FIG. 16A is as shown in FIG. 16B. The mathematical theorem referred to above holds that the output response of such a linear system can be determined by calculating the convolution of the input signal and a weighting function where the weighting function is the impulse response of the system reversed in time. The convolution is otherwise known as a running weighted average although a convolution is a concept in calculus with infinitely small step sizes whereas a running weighted average has discreet step sizes, i.e., multiple samples. The impulse response of the series RC circuit shown in FIG. 16D as such that when the voltage of the voltage generator V suddenly rises and falls with a spike of voltage as shown in FIG. 16B, the voltage on the capacitor C suddenly rises to a peak at 294 in FIG. 16A which is equal to the peak voltage of the impulse shown in FIG. 16B and then exponentially decays back to the steady state voltage $V_1$. The resulting weighting function is the impulse response of FIG. 16A turned around in time as shown in FIG. 16C at 385.

Figure 16C:
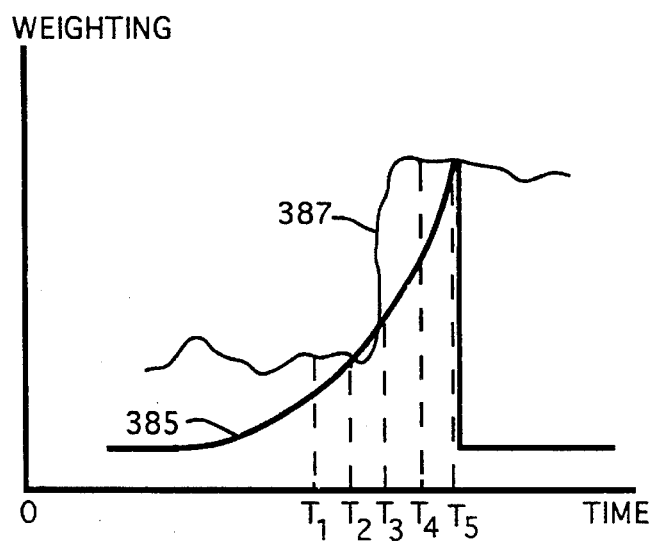
FIG. 16C is a graph illustrating how the convolution of the thermal impulse response and the temperature history of the block give the calculated sample temperature.
Figure 16D:
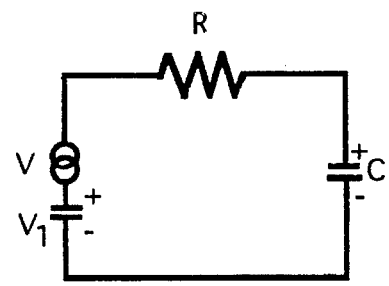
FIG. 16D illustrates the electrical analog of the thermal response of the sample block/sample tube system.

Superimposed upon FIG. 16C is a hypothetical curve 387 illustrating a typical temperature history for the temperature of the sample block 12 for an approximate step change in temperature. Also shown superimposed upon FIG. 16C are the times of five temperature sample periods labelled $T_1$ through $T_5$. According to the teachings of the invention, the sample temperature is calculated by multiplying the temperature at each one of these times $T_1$ through $T_5$ by the value of the weighting function at that particular time and then summing all these products and dividing by 5. The fact that the thermal system acts like a single time constant linear circuit is a surprising result based upon the complexities of thermal heat transfer considerations for this complicated thermal system.

In one embodiment, the calculation of the sample temperature is adjusted by a short delay to account for transport lag caused by different thermal path lengths to the block temperature sensor and the sample liquid. The calculated sample temperature is displayed for the user's information on the terminal 16 shown in FIG. 1.

FIG. 17 shows the temperature response results for six different wells spread throughout the 96 well sample block for a step change in sample block temperature from a relatively lower temperature in the hybridization/extension temperature range to the relatively higher temperature of approximately 94° C. used for denaturation. The graph of FIG. 17 shows good agreement between the predicted exponential rise in sample temperature if the system were perfectly analogous to the series RC circuit shown in FIG. 16D, and also shows excellent uniformity of temperature response in that the temperatures of the six sample wells used for this study asymptotically settle in at temperatures very close to each other and in a denaturation temperature "tolerance" band which is approximately 0.5° C. wide.

In one embodiment, the ten most recent block temperature samples are used for the running weighted average, but in other embodiments a different number of temperature history samples may be used. The good agreement with theoretically predicted results stems from the fact that the thermal convection currents make the sample liquids well mixed thereby causing the system to act in a linear fashion.

The uniformity between sample temperatures in various sample wells spread throughout the 96 well array results from dynamic and static local balance and local symmetry in the sample block structure as well as all the other thermal design factors detailed herein. Note however that during rapid temperature changes all the sample wells will have temperatures within 0.5° C. of each other only if the user has carefully loaded each sample well with the same mass of sample liquid. Inequality of mass in different wells does not cause unequal temperatures in steady state, unchanging conditions, only during rapid changes. The mass of the sample liquid in each well is the dominant factor in determining the heat capacity of each sample and, therefore, is the dominant factor in the thermal time constant for that particular sample well.

Note that the ability to cause the sample liquid in all the sample wells to cycle up and down in temperature in unison and to stabilize at target temperatures very near each other, i.e., in tolerance bands that are only 0.5° C. wide, also depends upon the force F in FIG. 15. This force must exceed a minimum threshold force before the thermal time constants of all sample wells loaded with similar masses of sample liquid will have the same time constant. This minimum threshold force has been experimentally determined to be 30 grams for the sample tube and sample well configuration described herein. For higher levels of accuracy, the minimum threshold force F in FIG. 15 should be established at at least 50 grams and preferably 100 grams for an additional margin of safety as noted above.

Figure 18:
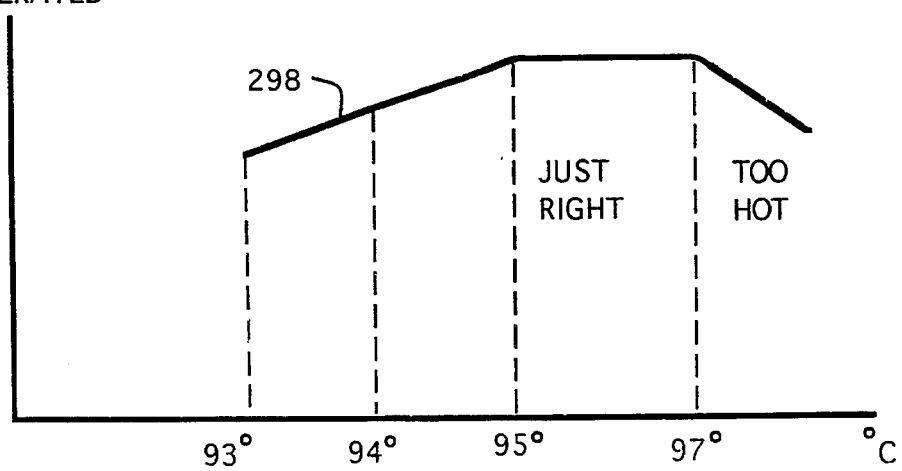
FIG. 18 is a graph illustrating how the denaturation target temperature affects the amount of DNA generated.

The importance of thermal uniformity in sample well temperature can be appreciated by reference to FIG. 18. This figure shows the relationship between the amount of DNA generated in a PCR cycle and the actual sample temperature during the denaturation interval for one instance of amplification of a certain segment of DNA. The slope of function 298 between temperatures 93 and 95 degrees centigrade is approximately 8% per degree centigrade for this particular segment of DNA and primers. FIG. 18 shows the general shape of the curve which relates the amount of DNA generated by amplification, but the details of the shape of the curve vary with every different case of primers and DNA target. Temperatures for denaturation above 97 degrees centigrade are generally too hot and result in decreasing amplification for increasing denaturation temperature. Temperatures between 95 and 97 degrees centigrade are generally just right.

FIG. 18 illustrates that any sample well containing this particular DNA target and primer combination which stabilizes at a denaturation temperature of approximately 93° C. is likely to have 8% less DNA generated over the course of a typical PCR protocol than wells denatured at 94° C. Likewise, sample liquids of this mixture that stabilize at denaturation temperatures of 95° C. are likely to have 8% more DNA generated therein than is generated in sample wells which stabilize at denaturation temperatures of 94° C. Because all curves of this nature have the same general shape, it is important to have uniformity in sample temperature.

The sample temperatures calculated as described above are used by the control algorithm for controlling the heaters and flow through the ramp cooling channels and to determine how long the samples have been held at various target temperatures. The control algorithm uses these times for comparison with the desired times for each incubation period as entered by the user. When the times match, the control algorithm takes the appropriate steps to heat or cool the sample block toward the target temperature defined by the user for the next incubation.

When the calculated sample temperature is within one degree centigrade of the setpoint, i.e., the incubation temperature programmed by the user, the control program causes a timer to start. This timer may be preset to count down from a number set so as to time out the interval specified by the user for the incubation being performed. The timer starts to count down from the preset count when the calculated sample temperature is within one degree centigrade. When the timer reaches a zero count, a signal is activated which causes the CPU to take actions to implement the next segment of the PCR protocol. Any way to time the specified interval will suffice for purposes of practicing the invention.

Typically, the tolerance band around any particular target temperature is plus or minus 0.5° C. Once the target temperature is reached, the computer holds the sample block at the target temperature using the bias cooling channels and the film heater such that all the samples remain close to the target temperature for the specified interval.

For the thermal system described herein to work well, the thermal conductance from the sample block to each sample must be known and uniform to within a very close tolerance. Otherwise, not all samples will be held within the specified tolerance band of the target temperature when the timer starts and, not all the samples will experience the same incubation intervals at the target temperature.

Also, for this thermal system to work well, all sample tubes must be isolated from variables in the ambient environment. That is, it is undesirable for some sample tubes to be cooled by drafts while other sample tubes in different physical positions do not experience the same cooling effects. For good uniformity it is highly desirable that the temperatures of all the samples be determined by the temperature of the sample block and by nothing else.

Isolation of the tubes from the ambient, and application of the minimum threshold force F pushing down on the sample tubes is achieved by a heated cover over the sample tubes and sample block.

Even though the sample liquid is in a sample tube pressed tightly into a temperature-controlled metal block, tightly capped, with a meniscus well below the surface of the temperature-controlled metal block, the samples still lose their heat upward by convection. Significantly, when the sample is very hot (the denaturation temperature is typically near the boiling point of the sample liquid), the sample liquid can lose a very significant amount of heat by refluxing of water vapor. In this process, water evaporates from the surface of the hot sample liquid and condenses on the inner walls of the cap and the cooler upper parts of the sample tube above the top surface of the sample block. If there is a relatively large volume of sample, condensation continues, and condensate builds up and runs back down the walls of the sample tube into the reaction mixture. This "refluxing" process carries about 2300 joules of heat per gram of water refluxed. This process can cause a drop of several degrees in the surface temperature of a 100 microliter reaction mixture thereby causing a large reduction of efficiency of the reaction.

If the reaction mixture is small, say 20 microliters, and the sample tube has a relatively large surface area above the top surface of the sample block, a significant fraction of the water in the reaction mixture may evaporate. This water may then condense inside the upper part of the sample tube and remain there by surface tension during the remainder of the high temperature part of the cycle. This can so concentrate the remaining reaction mixture that the reaction is impaired or fails completely.

In the prior art PCR thermal cyclers, this refluxing problem was dealt with by overlaying the reaction mixture with a layer of oil or melted wax. This immiscible layer of oil or wax floated on the aqueous reaction mixture and prevented rapid evaporation. However, labor was required to add the oil which raised processing costs. Further, the presence of oil interfered with later steps of processing and analysis and created a possibility of contamination of the sample. In fact, it is known that industrial grade mineral oils have in the past contaminated samples by the unknown presence of contaminating factors in the oil which were unknown to the users.

The need for an oil overlay is eliminated, and the problems of heat loss and concentration of the reaction mixture by evaporation and unpredictable thermal effects caused by refluxing are avoided according to the teachings of the invention by enclosing the volume above the sample block into which the upper parts of the sample tubes project and by heating this volume from above by a heated cover sometimes hereafter also called the platen.

Referring to FIG. 19, there is shown a cross sectional view of the structure which is used to enclose the sample tubes and apply downward force thereto so as to supply the minimum threshold force F in FIG. 15. A heated platen 14 is coupled to a lead screw 312 so as to move up and down along the axis symbolized by arrow 314 with rotation of the lead screw 312. The lead screw is threaded through an opening in a sliding cover 316 and is turned by a knob 318. The platen 314 is heated to a temperature above the boiling point of water by resistance heaters (not shown) controlled by computer 20.

The sliding cover 316 slides back and forth along the Y axis on rails 320 and 322. The cover 316 includes vertical sides 317 and 319 and also includes vertical sides parallel to the X-Z plane (not shown) which enclose the sample block 12 and sample tubes. This structure substantially prevent drafts from acting on the sample tubes of which tubes 324 and 326 are typical.

Figure 20:
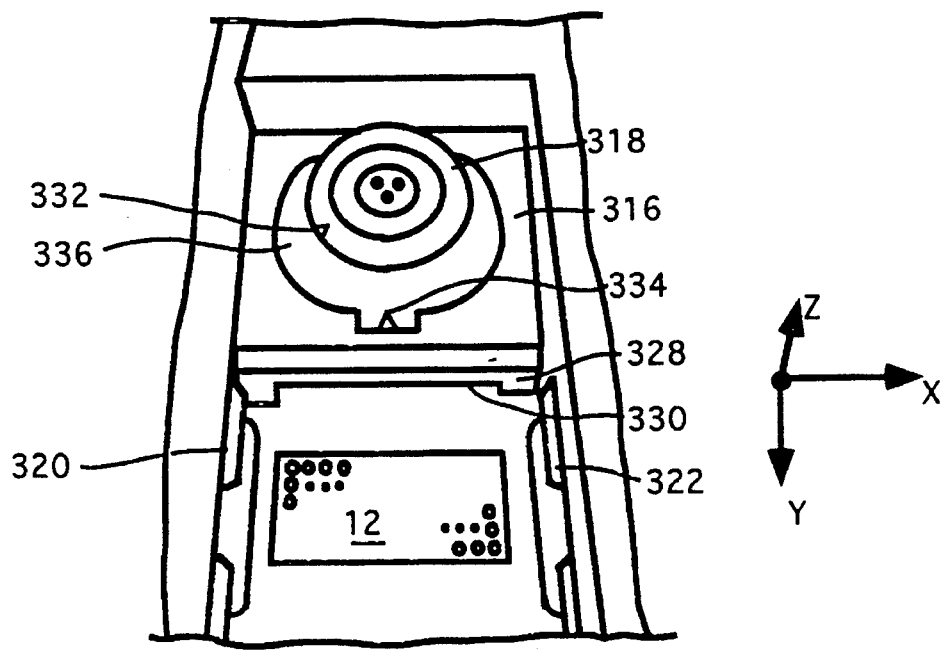
FIG. 20 is a perspective view of the sliding cover, sample block and the knob used to lower the heated platen.

FIG. 20 is a perspective view of the sliding cover 316 and sample block 12 with the sliding cover in retracted position to allow access to the sample block. The sliding cover 316 resembles the lid of a rectangular box with vertical wall 328 having a portion 330 removed to allow the sliding cover 316 to slide over the sample block 12. The sliding cover is moved along the Y axis in FIG. 20 until the cover is centered over the sample block 12. The user then turns the knob 318 in a direction to lower the heated platen 14 until a mark 332 on the knob 318 lines up with a mark 334 on an escutcheon plate 336. In some embodiments, the escutcheon plate 336 may be permanently affixed to the top surface of the sliding cover 316. In other embodiments, the escutcheon 336 may be rotatable such that the index mark 334 may be placed in different positions when different size sample tubes are used. In other words, if taller sample tubes are used, the heated platen 14 need not be lowered as much to apply the minimum threshold force F in FIG. 15. In use, the user screws the screw 318 to lower the platen 14 until the index marks line up. The user then knows that the minimum threshold force F will have been applied to each sample tube.

Referring jointly to FIGS. 15 and 19, prior to lowering the heated platen 14 in FIG. 19, the plastic cap 338 for each sample tube sticks up about 0.5 millimeters above the level of the top of the walls of a plastic tray 340 (FIG. 19) which holds all the sample tubes in a loose 8×12 array on 9 millimeter centers. The array of sample wells can hold up to 96 MicroAmp™ PCR tubes of 100 µL capacity or 48 larger GeneAmp™ tubes of 0.5 ml capacity. The details of this tray will be discussed in greater detail below. The tray 340 has a planar surface having an 8×12 array of holes for sample tubes. This planar surface is shown in FIGS. 15 and 19 as a horizontal line which intersects the sample tubes 324 and 326 in FIG. 19. Tray 340 also has four vertical walls two of which are shown at 342 and 344 in FIG. 19. The top level of these vertical walls, shown at 346 in FIG. 15, establishes a rectangular box which defines a reference plane.

As best seen in FIG. 15, the caps 338 for all the sample tubes project above this reference plane 346 by some small amount which is designed to allow the caps 338 to be softened and deformed by the heated platen 14 and "squashed" down to the level of the reference plane 346. In the preferred embodiment, the heated platen 14 is kept at a temperature of 105° C. by the CPU 20 in FIG. 1 and the bus 22 coupled to resistance heaters (not shown) in the platen 14. In the preferred embodiment, the knob 318 in FIG. 19 and the lead screw 312 are turned until the heated platen 14 descends to and makes contact with the tops of the caps 338. In the preferred embodiment, the caps 338 for the sample tubes are made of polypropylene. These caps soften shortly after they come into contact with the heated platen 14. As the caps soften, they deform, but they do not lose all of their elasticity. After contacting the caps, the heated platen is lowered further until it rests upon the reference plane 346. This further lowering deforms the caps 338 and causes a minimum threshold force F of at least 50 grams to push down on each sample tube to keep each tube well seated firmly in its sample well. The amount by which the caps 338 project above the reference plane 346, and the amount of deformation and residual elasticity when the heated platen 14 rests upon the reference plane 346 is designed such that a minimum threshold force F of at least 50 grams and preferably 100 grams will have been achieved for all sample tubes then present after the heated platen 14 has descended to the level of the reference plane 346.

The heated platen 14 and the four vertical walls and planar surface of the tray 340 form a heated, sealed compartment when the platen 14 is in contact with the top edge 346 of the tray. The plastic of the tray 340 has a relatively poor thermal conductivity property. It has been found experimentally that contacting the heated platen 14 with the caps 338 and the isolation of the portion of the sample tubes 288 which project above the top level 280 of the sample block 12 by a wall of material which has relatively poor thermal conductivity has a beneficial result. With this structure, the entire upper part of the tube and cap are brought to a temperature which is high enough that little or no condensation forms on the inside surfaces of the tube and cap since the heated platen is kept at a temperature above the boiling point of water. This is true even when the sample liquid 276 in FIG. 15 is heated to a temperature near its boiling point. This eliminates the need for a layer of immiscible material such as oil or wax floating on top of the sample mixture 276 thereby reducing the amount of labor involved in a PCR reaction and eliminating one source of possible contamination of the sample.

It has been found experimentally that in spite of the very high temperature of the heated cover and its close proximity to the sample block 12, there is little affect on the ability of the sample block 12 to cycle accurately and rapidly between high and low temperatures.

The heated platen 14 prevents cooling of the samples by the refluxing process noted earlier because it keeps the temperature of the caps above the condensation point of water thereby keeping the insides of the caps dry. This also prevents the formation of aerosols when the caps are removed from the tubes.

In alternative embodiments, any means by which the minimum acceptable downward force F in FIG. 15 can be applied to each individual sample tube regardless of the number of sample tubes present and which will prevent condensation and refluxing and convection cooling will suffice for purposes of practicing the invention. The application of this downward force F and the use of heat to prevent refluxing and undesired sample liquid concentration need not be both implemented by the same system as is done in the preferred embodiment.

The sample tubes may vary by a few thousandths of an inch in their overall height. Further, the caps for the sample tubes may also vary in height by a few thousandths of an inch. Also, each conical sample well in the sample block 12 may not be drilled to exactly the same depth, and each conical sample well in the sample block may be drilled to a slightly different diameter and angle. Thus, when a population of capped tubes is placed in the sample block so as to be seated in the corresponding sample well, the tops of the caps will not all necessarily be at the same height. The worst case discrepancy for this height could be as much as 0.5 millimeters from the highest to the lowest tubes.

If a perfectly flat unheated platen 14 mounted so that it is free to find its own position were to be pressed down on such an array of caps, it would first touch the three tallest tubes. As further pressure was applied and the tallest tubes were compressed somewhat, the platen would begin to touch some caps of lower tubes. There is a distinct possibility that unless the tube and cap assemblies were compliant, the tallest tubes would be damaged before the shortest tubes were contacted at all. Alternatively, the force necessary to compress all the tall tubes sufficiently so as to contact the shortest tube could be too large for the device to apply. In either case, one or more short tubes might not be pressed down at all or might be pressed down with an insufficient amount of force to guarantee that the thermal time constant for that tube was equal to the thermal time constants for all the other tubes. This would result in the failure to achieve the same PCR cycle for all tubes in the sample block since some tubes with different thermal time constants would not be in step with the other tubes. Heating the platen and softening the caps eliminates these risks by eliminating the manufacturing tolerance errors which lead to differing tube heights as a factor.

In an alternative embodiment, the entire heated platen 14 is covered with a compliant rubber layer. A compliant rubber layer on the heated platen would solve the height tolerance problem, but would also act as a thermal insulation layer which would delay the flow of heat from the heated platen to the tube caps. Further, with long use at high temperatures, most rubber materials deteriorate or become hard. It is therefore desirable that the heated platen surface be a metal and a good conductor of heat.

In another alternative embodiment, 96 individual springs could be mounted on the platen so that each spring individually presses down on a single sample tube. This is a complex and costly solution, however, and it requires that the platen be aligned over the tube array with a mechanical precision which would be difficult or bothersome to achieve.

The necessary individual compliance for each sample tube in the preferred embodiment is supplied by the use of plastic caps which collapse in a predictable way under the force from the platen but which, even when collapsed, still exert a downward force F on the sample tubes which is adequate to keep each sample tube seated firmly in its well.

In the sample tube cap 338 shown in FIG. 15, the surface 350 should be free of nicks, flash and cuts so that it can provide a hermetic seal with the inner walls 352 of the sample tube 288. In the preferred embodiment, the material for the cap is polypropylene. A suitable material might be Valtec HH-444 or PD701 polypropylene manufactured by Himont as described above or PPW 1780 by American Hoescht. As shown in FIG. 15, in the preferred embodiment, the wall thickness for the domed portion of the cap is about the same as the wall thickness of the adjacent tube portion, most preferably 0.018–0.022 inches. The thickness of the shoulder portion 356 is 0.025 inches and the width of the domed shaped portion of the cap is 0.203 inches in the preferred embodiment.

Any material and configuration for the caps which will cause the minimum threshold force F in FIG. 15 to be applied to all the sample tubes and which will allow the cap and upper portions of the sample tubes to be heated to a temperature high enough to prevent condensation and refluxing will suffice for purposes of practicing the invention. The dome shaped cap 338 has a thin wall to aid in deformation of the cap. Because the heated platen is kept at a high temperature, the wall thickness of the domed shaped cap can be thick enough to be easily manufactured by injection molding since the necessary compliance to account for differences in tube height is not necessary at room temperature.

The platen can be kept at a temperature anywhere from 94° C. to 110° C. according to the teachings of the invention although the range from 100° C. to 110° C. is preferred to prevent refluxing since the boiling point of water is 100° C. In this temperature range, it has been experimentally found that the caps soften just enough to collapse easily by as much as 1 millimeter. Studies have shown that the elastic properties of the polypropylene used are such that even at these temperatures, the collapse is not entirely inelastic. That is, even though the heated platen causes permanent deformation of the caps, the material of the caps still retain a significant enough fraction of their room temperature elastic modulus that the minimum threshold force F is applied to each sample tube. Further, the heated platen levels all the caps that it contacts without excessive force regardless of how many tubes are present in the sample block because of the softening of the cap.

Because the cap temperature is above the boiling point of water during the entire PCR cycle, the inside surfaces of each cap remain completely dry. Thus, at the end of a PCR process, if the samples are cooled to room temperature before being removed from the sample block, if the caps on each sample tube are opened, there is no possibility of creating an aerosol spray of the sample tube contents which could result in cross contamination. This is because there is no liquid at the cap to tube seal when the seal is broken.

This is extremely advantageous, because tiny particles of aerosol containing amplified product DNA can contaminate a laboratory and get into sample tubes containing samples from other sources, e.g., other patients, thereby possibly causing false positive or negative diagnostic results which can be very troublesome. Users of the PCR amplification process are extremely concerned that no aerosols that can contaminate other samples be created.

Figure 21A:
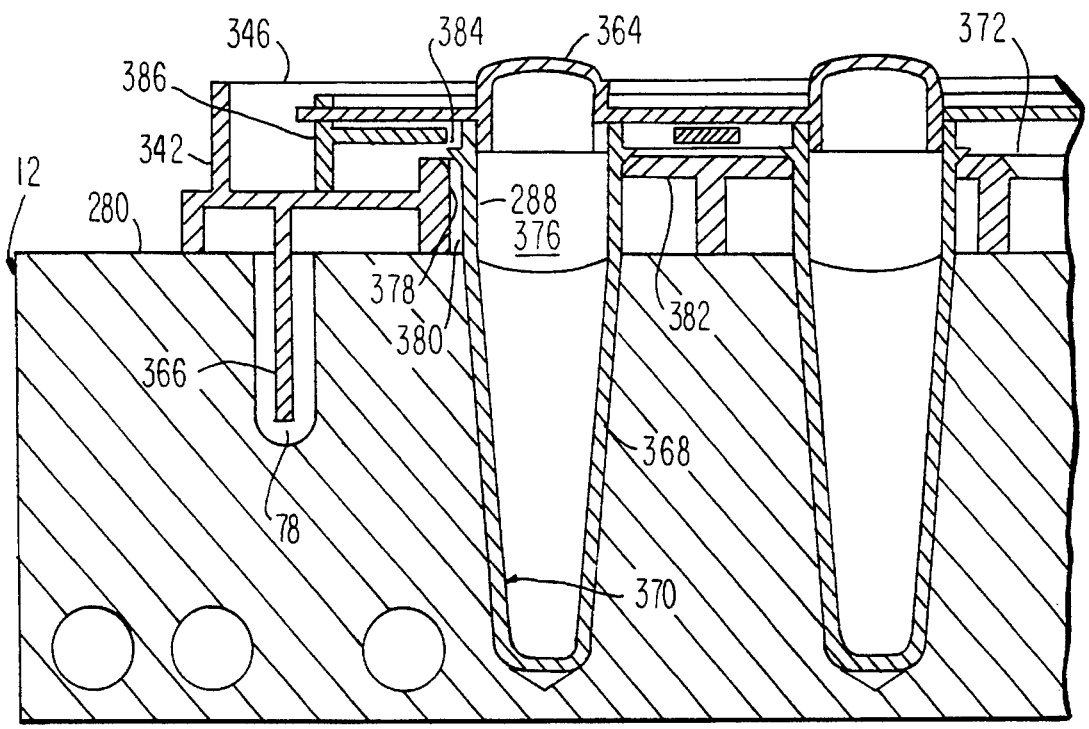
FIG. 21A is a cross-sectional view of the assembly of one embodiment of the frame, retainer, sample tube and cap when seated on a sample block.
Figure 21B:
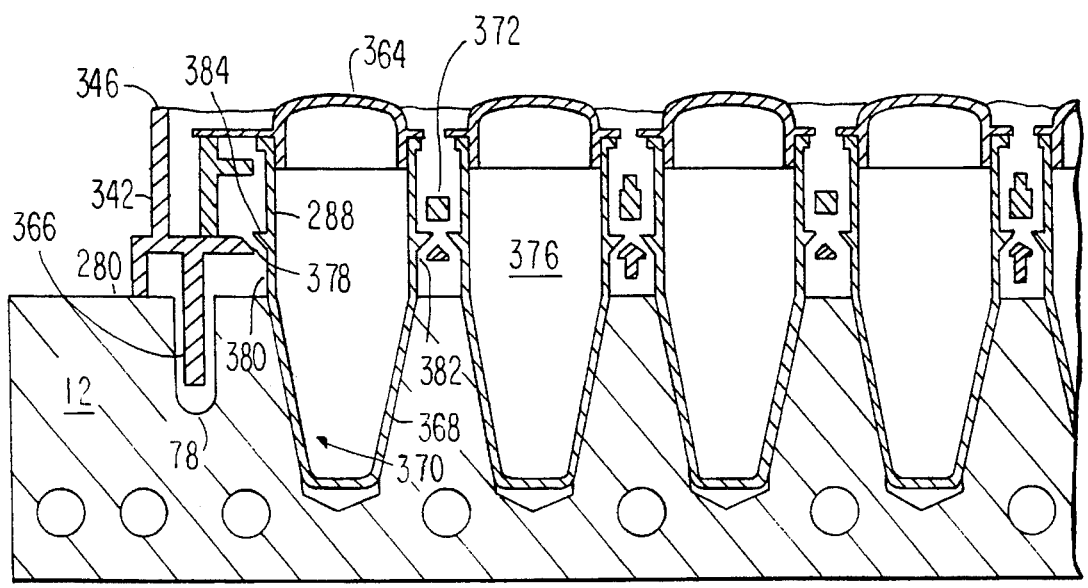
FIG. 21B is a cross-sectional view of the assembly of the preferred embodiment of the frame, retainer, sample tube and cap when seated on the sample block.

A system of disposable plastic items is used to convert the individual sample tubes to an 8×12 array which is compatible with microtiter plate format lab equipment but which maintains sufficient individual freedom of movement to compensate for differences in the various rates of thermal expansion of the system components. The relationship of the thermally compliant cap to the rest of this system is best seen in FIG. 21A which is a cross sectional view of the sample block, and two sample tubes with caps in place with the sample tubes being held in place by the combination of one embodiment of a plastic 96 well microtiter tray and a retainer. FIG. 21B is an alternative, preferred embodiment showing the structure and interaction of most of the various plastic disposable items of the system. The rectangular plastic 96 well microtiter plate tray 342 rests on the surface of the sample block 12. The top edge 346 of the frame 342 has a height which is approximately 0.5 millimeters shorter than the height of the caps of which cap 364 is exemplary. All of the capped tubes will project higher than the edge 346 of the frame 342. The frame 342 is configured such that a downward extending ridge 366 extends into the guardband groove 78 through its entire length. The frame 342 does however have a gap (not shown) which corresponds to the gap in the groove 78 for the temperature sensor shown in FIG. 2 in plan view and in FIG. 7 in cross-sectional view.

The reference plane 346 mentioned above is established by the top of the frame 342. How this reference plane interacts with the heated platen is as follows. Prior to screwing down the knob 318 in FIG. 20 to line up the index marks 332 and 334 to start an amplification run, a calibration process will have been performed to locate the position of the index mark on the escutcheon platen 336 in FIG. 20. This calibration is started by placing the frame 342 in FIG. 21 in position on the sample block. The frame 342 will be empty however or any sample tubes therein will not have any caps in place. Then, the knob 318 is screwed down until the heated platen 14 is firmly in contact with the top edge 346 of the frame 342 around its entire parameter. When the knob 318 has been screwed down sufficiently to allow the heated platen to rest on the reference plane 346 and to press the frame 342 firmly against the top surface 280 of the sample block, the rotatable escutcheon 336 of the preferred embodiment will be rotated until the index mark 334 on the escutcheon lines up with the index mark 332 on the knob 318. Then, the knob 318 is rotated counterclockwise to raise the platen 14 and the cover 316 in FIG. 19 is slid in the negative Y direction to uncover the frame 342 and the sample block 12. Sample tubes with caps loaded with a sample mixture may then be placed in position in the frame 342. The heated cover 316 is then placed back over the sample block, and the knob 318 is turned clockwise to lower the heated platen 14 until the index mark 332 on the knob lines up with the index mark 334 as previously positioned. This guarantees that all tubes have been firmly seated with the minimum force F applied. The use of the index marks gives the user a simple, verifiable task to perform.

If there are only a few sample tubes in place, it will take only a small amount of torque to line up the index marks 332 and 334. If there are many tubes, however, it will take more torque on the knob 318 to line up the index marks. This is because each tube is resisting the downward movement of the heated platen 14 as the caps deform. However, the user is assured that when the index marks 332 and 334 are aligned, the heated platen will once again be tightly placed against the top edge 346 of the frame 342 and all tubes will have the minimum threshold force F applied thereto. This virtually guarantees that the thermal time constant for all the tubes will be substantially the same.

In alternative embodiments, the index marks 332 and 334 may be dispensed with, and the knob 318 may simply be turned clockwise until it will not turn any more. This condition will occur when the heated platen 314 has reached the top edge or reference plane 346 and the plastic frame 342 has stopped further downward movement of the heated platen 14. Obviously in this alternative embodiment, and preferably in the index mark embodiment described above, the plastic of the frame 342 will have a melting temperature which is sufficiently high to prevent deformation of the plastic of the frame 342 when it is in contact with the heated platen 14. In the preferred embodiment, the plastic of the frame 342 is celanese nylon 1503 with a wall thickness of 0.05 inches.

An advantage of the above described system is that sample tubes of different heights may be used simply by using frames 342 having different heights. The frame 342 should have a height which is approximately 0.5 millimeters shorter than the plane of the tips of the capped tubes when both are seated in the sample block. In the preferred embodiment, two different tube heights are used. The range of motion of the lead screw 312 which drives the heated platen 14 in FIG. 19 must be sufficient for all the different sizes of sample tubes to be used. Of course, during any particular PCR processing cycle, all tubes must be the same height.

The system described above provides uniform temperatures in the sample block, uniform thermal conductance from block to sample, and isolation of the sample tubes from the vagaries of the ambient environment. Any number of sample tubes up to 96 may be arrayed in the microtiter plate format. The system allows accurate temperature control for a very large number of samples and a visual indication of the sample temperatures for all samples without actually measuring the temperature of any sample.

As the container for PCR reactions, it has been common in the prior art to use polypropylene tubes which were originally designed for microcentrifuges. This prior art tube had a cylindrical cross-section closed at the top by a snap-on cap which makes a gas-tight seal. This prior art tube had a bottom section which comprised the frustum of a cone with an included angle of approximately 17 degrees.

When such a conical sample tube is pressed down into a sample well of a sample block with a conical cavity with the same included angle, and when the sample mixture in the tube lies entirely within the conical volume and below the top surface of the sample block, the thermal conductance between the block and the liquid can be made adequately predictable for good uniformity of sample temperature throughout the array. To achieve adequate control of the thermal conductance between the sample block and the sample mixture, the included angles of the conical tube and the sample well must match closely, and the conical surfaces of the tube and well must be smooth and held together in flush relation. Further, the minimum threshold force F must be applied to each sample tube to press each tube tightly into the sample well so that it does not rise up or loosen in the well for any reason during thermal cycling, such as steam formation from trapped liquid in space 291 in FIG. 15. Finally, each tube must be loaded with the same amount of sample liquid. If the above listed conditions are met, the thermal conductance between the sample block and the sample liquid in each tube will be predominantly determined by the conductance of the conical plastic wall 368 in FIG. 15 and a boundary layer, (not shown) of the sample liquid at the inside surface 370 of the conical sample tube wall.

The thermal conductance of the plastic tube walls is determined by their thickness, which can be closely controlled by the injection molding method of manufacture of the tubes. The sample liquid in all the sample tubes has virtually identical thermal properties.

It has been found by experiment and by calculation that a molded, one-piece, 96-well microtiter plate is only marginally feasible for PCR because the differences in the thermal expansion coefficients between aluminum and plastic lead to dimensional changes which can destroy the uniformity of thermal conductance to the sample liquid across the array. That is, since each well in such a one-piece plate is connected to each other well through the surface of the plate, the distances between the wells are determined at the time of initial manufacture of the plate but change with changing temperature since the plastic of the plate has a significant coefficient of thermal expansion. Also, distances between the sample wells in the metal sample block 12 are dependent upon the temperature of the sample block since aluminum also has a significant coefficient of thermal expansion which is different than that of plastic. To have good thermal conductance, each sample well in a one-piece 96-well microtiter plate would have to fit almost perfectly in the corresponding well in the sample block at all temperatures. Since the temperature of the sample block changes over a very wide range of temperatures, the distances between the sample wells in the sample block vary cyclically during the PCR cycle. Because the coefficients of thermal expansion for plastic and aluminum are substantially different, the distances of the well separation in the sample block would vary differently over changing temperatures than would the distances between the sample wells of a plastic, one-piece, 96-well microtiter plate.

Thus, as an important criteria for a perfect fit between a sample tube and the corresponding sample well over the PCR temperature range, it is necessary that each sample tube in the 96-well array be individually free to move laterally and each tube must be individually free to be pressed down vertically by whatever amount is necessary to make flush contact with the walls of the sample well.

The sample tubes used in the invention are different from the prior art microcentrifuge tubes in that the wall thickness of the conical frustum position of the sample tube is much thinner to allow faster heat transfer to and from the sample liquid. The upper part of these tubes has a thicker wall thickness than the conical part. In FIG. 15, the wall thickness in the cylindrical part 288 in FIG. 15 is generally 0.030 inches while the wall thickness for the conical wall 368 is 0.009 inches. In a preferred embodiment, the wall thickness in the cylindrical part above shoulder 384 is about 0.022 inches, the wall thickness in the cylindrical part below shoulder 384 is about 0.015 inches, and the wall thickness in the conical section is in the range 0.009±0.001 inches average, although intra-wall variations can vary from nominal by up to four times that amount. Because thin parts cool faster than thick parts in the injection molding process, it is important to get the mold full before the thin parts cool off.

The material of the sample tubes must be compatible chemically with the PCR reaction. Glass is not a PCR compatible material, because DNA sticks to glass and will not come off which would interfere with PCR amplification. Preferably an autoclavable polypropylene is used. Three types of suitable polypropylene were identified earlier herein. Some plastics are not compatible with the PCR process because of outgassing of materials from the plastic or because DNA sticks to the plastic walls. Polypropylene is the best known class of plastics at this time.

Conventional injection molding techniques and mold manufacture techniques for the injection mold will suffice for purposes of practicing the invention.

The use of cone shaped sample tubes translates substantially all manufacturing tolerance errors to height errors, i.e., a variance from tube to tube in the height of the tip of the cap to the top of the sample block when the sample tube is seated in the sample well. For example, an angle error for the angle of the sample tube walls is converted to a height error when the tube is placed in the sample block because of the mismatch between the tube wall angle and the sample well wall angle. Likewise, a diameter error in the dimensions of the cone would also translate into a height error since the conical part of the tube would either penetrate deeper or not as much as a properly dimensional tube.

For good uniformity of thermal conductance across the array, a good fit between the sample tubes and the sample well must exist for all 96-wells over the full temperature range of 0° to 100° C. regardless of differences in thermal expansion rates. Also, each of the 96 sample tubes must have walls with dimensions and wall thicknesses which are uniform to a very high degree. Each sample tube in which sample mixture is to be held should be fitted with a removable gas-tight cap that makes a gas-tight seal to prevent loss of water vapor from the reaction mixture when this mixture is at or near its boiling point such that the volume of the sample mixture does not decrease. All these factors combine to make a one-piece microtiter plate with 96 individual sample wells extremely difficult to manufacture in a manner so as to achieve uniform thermal conductance for all 96 wells.

Any structure which provides the necessary individual lateral and vertical degrees of freedom for each sample tube will suffice for purposes of practicing the invention.

According to the teachings of the preferred embodiment of the invention, all the above noted requirements have been met by using a 4 piece disposable plastic system. This system gives each sample tube sufficient freedom of motion in all necessary directions to compensate for differing rates of thermal expansion and yet retains up to 96 sample tubes in a 96 well microtiter plate format for user convenience and compatibility with other laboratory equipment which is sized to work with the industry standard 96-well microtiter plate. The multi-piece disposable plastic system is very tolerant of manufacturing tolerance errors and the differing thermal expansion rates over the wide temperature range encountered during PCR thermal cycling.

Figure 22:
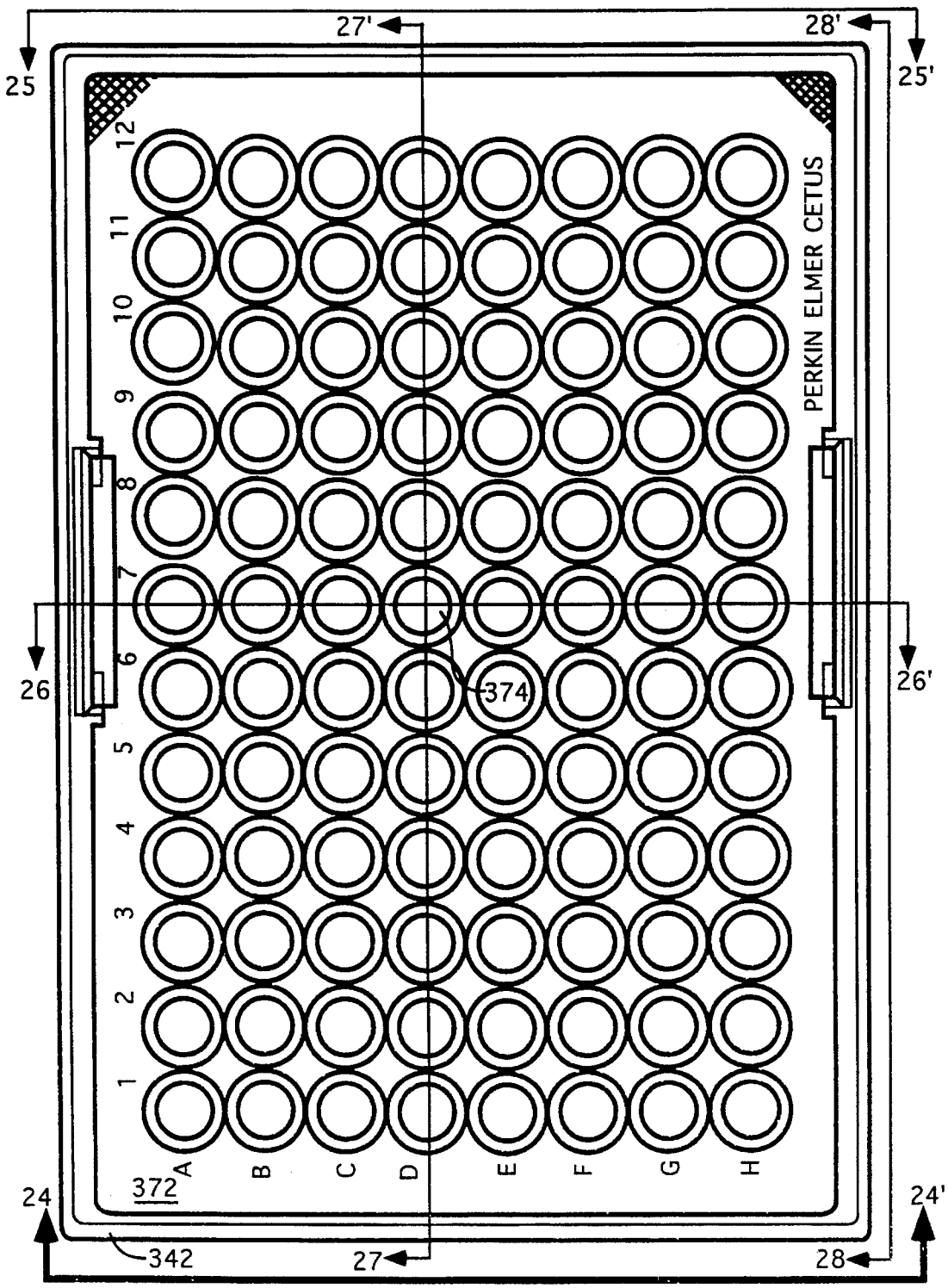
FIG. 22 is a top, plan view of the plastic, disposable frame for the microtiter plate.
Figure 23:
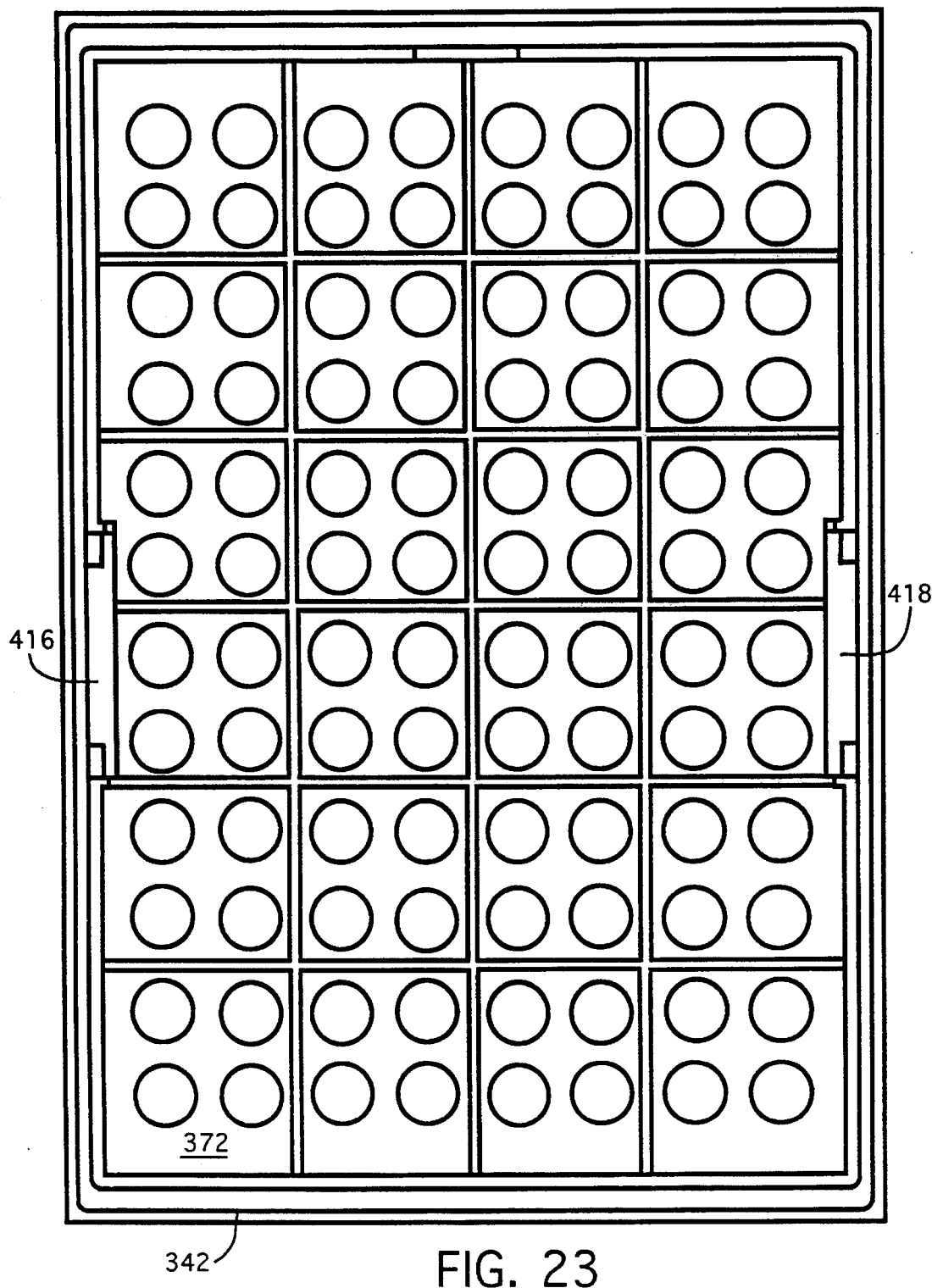
FIG. 23 is a bottom, plan view of the frame.
Figure 24:
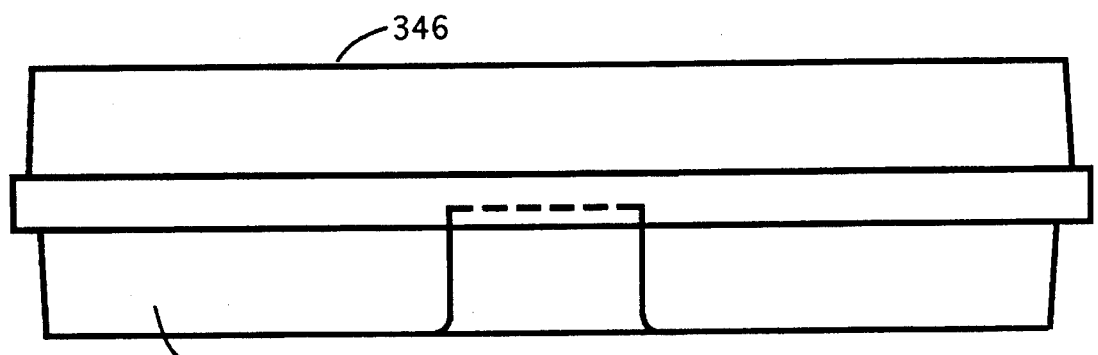
FIG. 24 is an end, elevation view of the frame.
Figure 25:
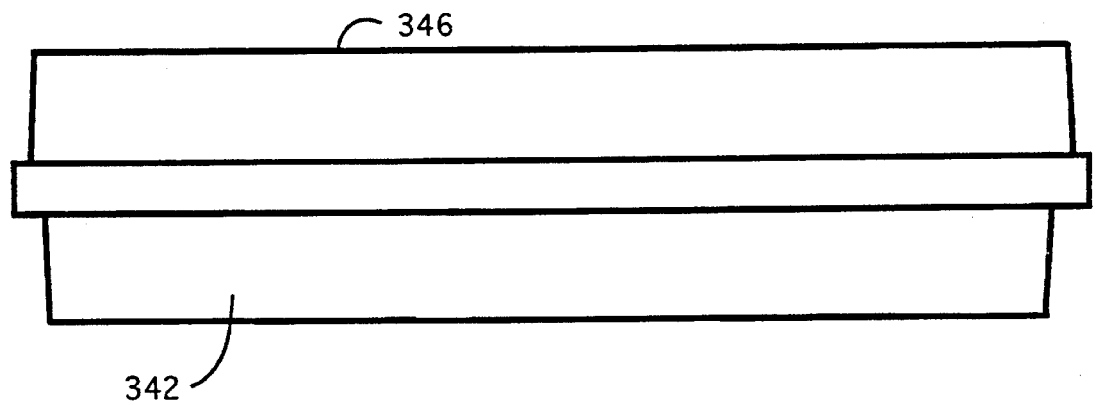
FIG. 25 is another end, elevation view of the frame.
Figure 26:
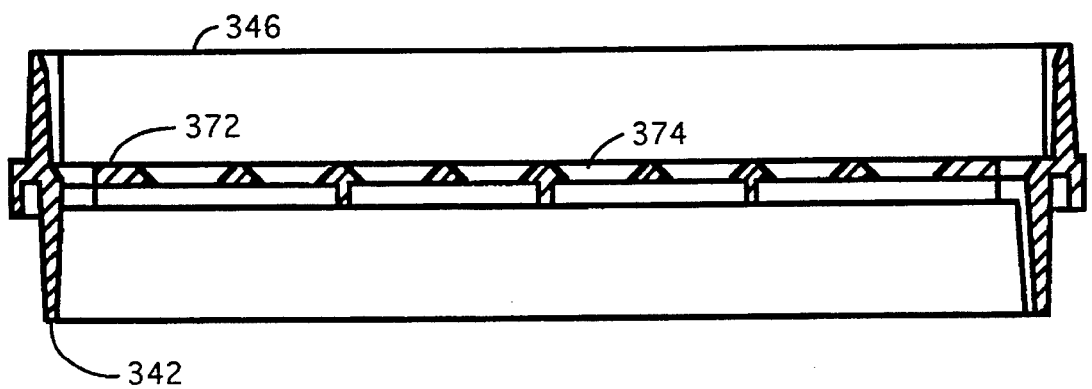
FIG. 26 is a cross-sectional view of the frame taken along section line 26—26' in FIG. 22.
Figure 27:
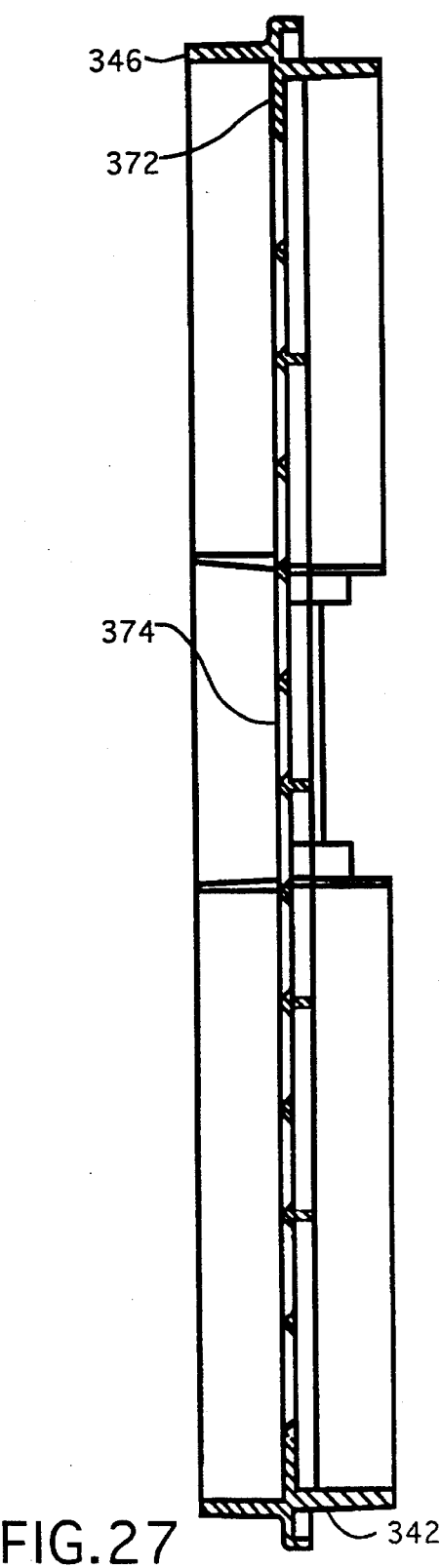
FIG. 27 is a cross-sectional view of the frame taken along section line 27—27' in FIG. 22.
Figure 28:
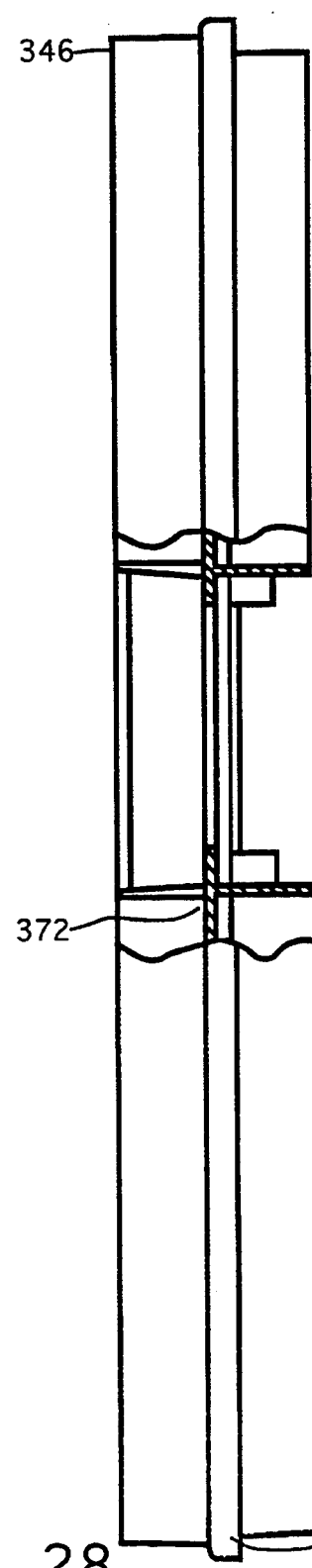
FIG. 28 is an edge elevation view and partial section of the frame.
Figure 45:
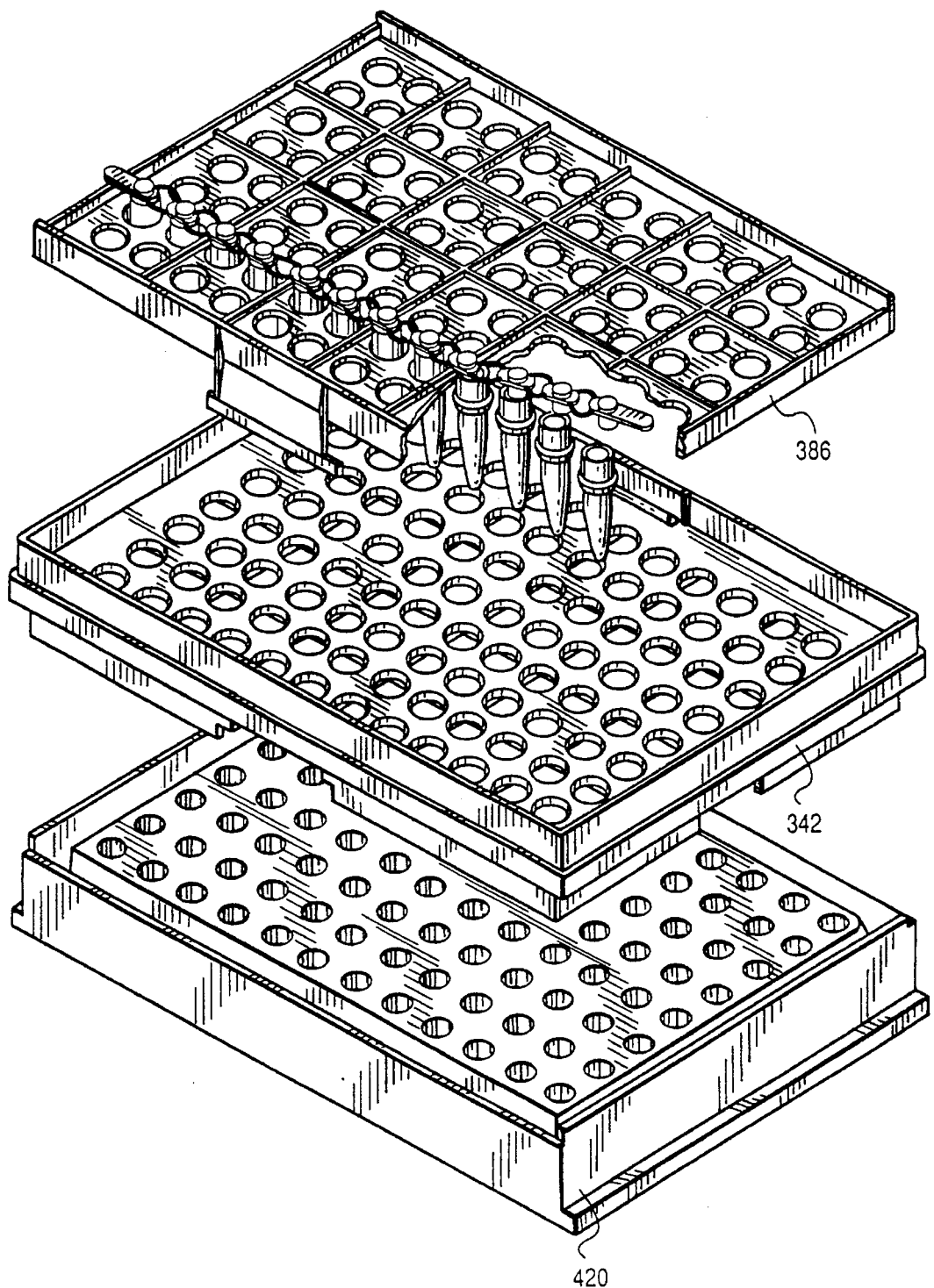
FIG. 45 is a perspective exploded view of the plastic disposable items that comprise the microtiter tray with some sample tubes and caps in place.

FIGS. 21A and 21B show alternative embodiments of most of the four piece plastic system components in cross-section as assembled to hold a plurality of sample tubes in their sample wells with sufficient freedom of motion to account for differing rates of thermal expansion. FIG. 45 shows all the parts of the disposable plastic microtiter plate emulation system in an exploded view. This figure illustrates how the parts fit together to form a microtiter plate with all the sample tubes loosely retained in an 8×12 microtiter plate format 96 well array. FIG. 22 shows a plan view of a microtiter plate frame 342 according to the teachings of the invention which is partially shown in cross-section in FIGS. 21A and 21B. FIG. 23 shows a bottom view plan view of the frame 342. FIG. 24 is an end view of the frame 342 taken from view line 24–24' in FIG. 22. FIG. 25 is an end view of the frame 342 taken from view line 25–25' in FIG. 22. FIG. 26 is a cross section through the frame 342 at section line 26–26' in FIG. 22. FIG. 27 is a cross sectional view through the frame 342 taken along section line 27–27' in FIG. 22. FIG. 28 is a side view of the frame 342 taken along view line 28–28' in FIG. 22 with a partial cut away to show in more detail the location where a retainer to be described below clips to the frame 342.

Referring jointly to FIGS. 21A, 21B and 22 through 28, the frame 342 is comprised of a horizontal plastic plate 372 in which there are formed 96 holes spaced on 9 millimeter centers in the standard microtiter plate format. There are 8 rows labeled A through H and 12 columns labeled 1 through 12. Hole 374 at row D, column 7 is typical of these holes. In each hole in the frame 342 there is placed a conical sample tube such as the sample tube 376 shown in FIG. 15. Each sample tube is smaller in diameter than the hole in which it is placed by about 0.7 millimeters, so that there is a loose fit in the hole. This is best seen in FIGS. 21A and 21B by observing the distance between the inside edge 378 of a typical hole and the side wall 380 of the sample tube placed therein. Reference numeral 382 in FIGS. 21A and 21B shows the opposite edge of the hole which is also spaced away from the outside wall of the cylindrical portion of the sample tube 376.

Each sample tube has a shoulder shown at 384 in FIGS. 15, 21A and 21B. This shoulder is molded around the entire circumference of the cylindrical portion 288 of each sample tube. As is shown in a preferred embodiment of FIGS. 21A, 21B and 26, the lower surface of shoulder 384 is beveled and the hole 374 is countersunk. This aids in centering the tube upright in hole 374 in frame 342. The diameter of this shoulder 384 is large enough that it will not pass through the holes in the frame 342, yet not so large as to touch the shoulders of the adjacent tubes in neighboring holes.

Once all the tubes are placed in their holes in the frame 42, a plastic retainer 386 (best seen in FIGS. 21A and 21B FIG. 45) is snapped into apertures in the frame 342. The purpose of this retainer is to keep all the tubes in place such that they cannot fall out or be knocked out of the frame 342 while not interfering with their looseness of fit in the frame 342. The retainer 386 is sized and fitted to the frame 342 such that each sample tube has freedom to move vertically up and down to some extent before the shoulder 384 of the tube encounters either the retainer 386 or the frame 342. Thus, the frame and retainer, when coupled, provide a microtiter plate format for up to 96 sample tubes but provide sufficient horizontal and vertical freedom such that each tube is free to find its best fit at all temperatures under the influence of the minimum threshold force F in FIG. 15. As shown in the embodiment depicted in FIG. 15, shoulder 384 may be located approximately in the midsection of cylindrical portion 288 of tube 376.

Figure 29:
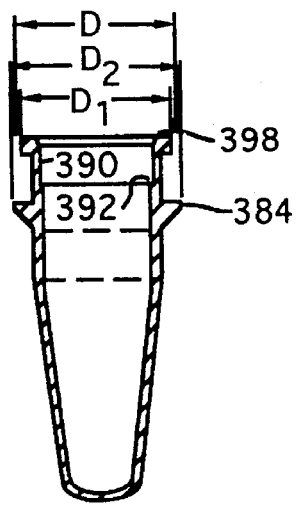
FIG. 29 is a sectional view of the preferred sample tube.
Figure 30:
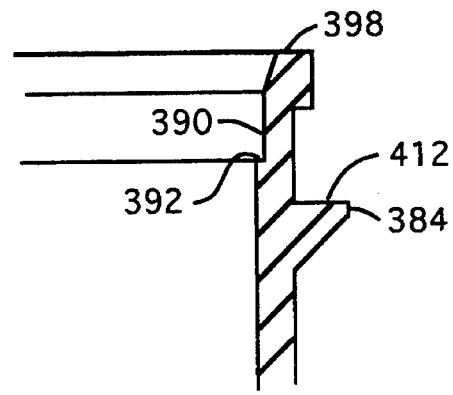
FIG. 30 is a sectional view of the upper part of the sample tube.

A more clear view of the sample tube and shoulder may be had by reference to FIGS. 29 and 30. FIGS. 29 and 30 are an elevation sectional view and a partial upper section of the shoulder portion, respectively, of a typical sample tube. A plastic dome-shaped cap such as will be described in more detail below is inserted into the sample tube shown in FIG. 29 and forms a hermetic seal with the inside wall 390 of the top at the sample tube. A ridge 392 formed in the inside wall of the sample tube acts as a stop for the dome-shaped cap to prevent further penetration. Normally, the dome-shaped caps come in strips connected by web.

Figure 31:
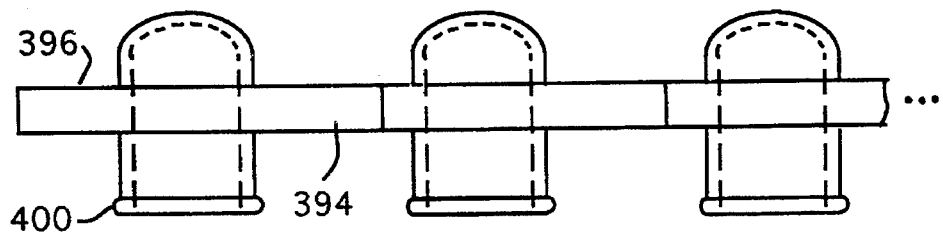
FIG. 31 is an elevation view of a portion of the cap strip.
Figure 32:
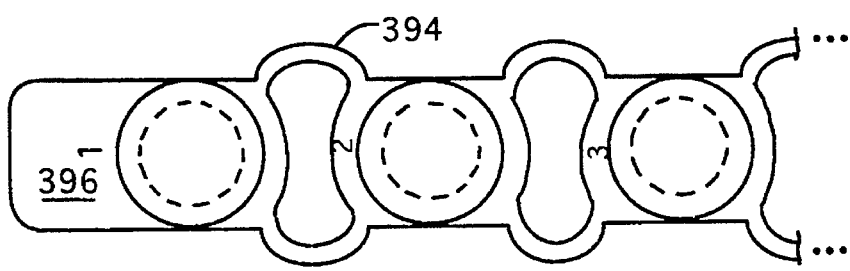
FIG. 32 is a top view of a portion of the cap strip.

FIG. 31 shows three caps in elevation view connected by a web 394 and terminated in a tab 396. The tab aids the user in removing an entire row of caps by a single pull. Normally, the web 394 rests on the top surface 398 of the sample tube and prevents further penetration of the cap into the sample tube. Each cap includes a ridge 400 which forms the hermetic seal between the cap and the inside wall of the sample tube. As shown particularly in FIGS. 30 and 31, the bottom outside of the cap side or ridge 400 may be beveled, the top of inner wall 390 of the tube may be flared, or both. This aids in inserting the cap into the tube. FIG. 32 shows a top view of three caps in a typical strip of 12 connected caps.

Figure 33:
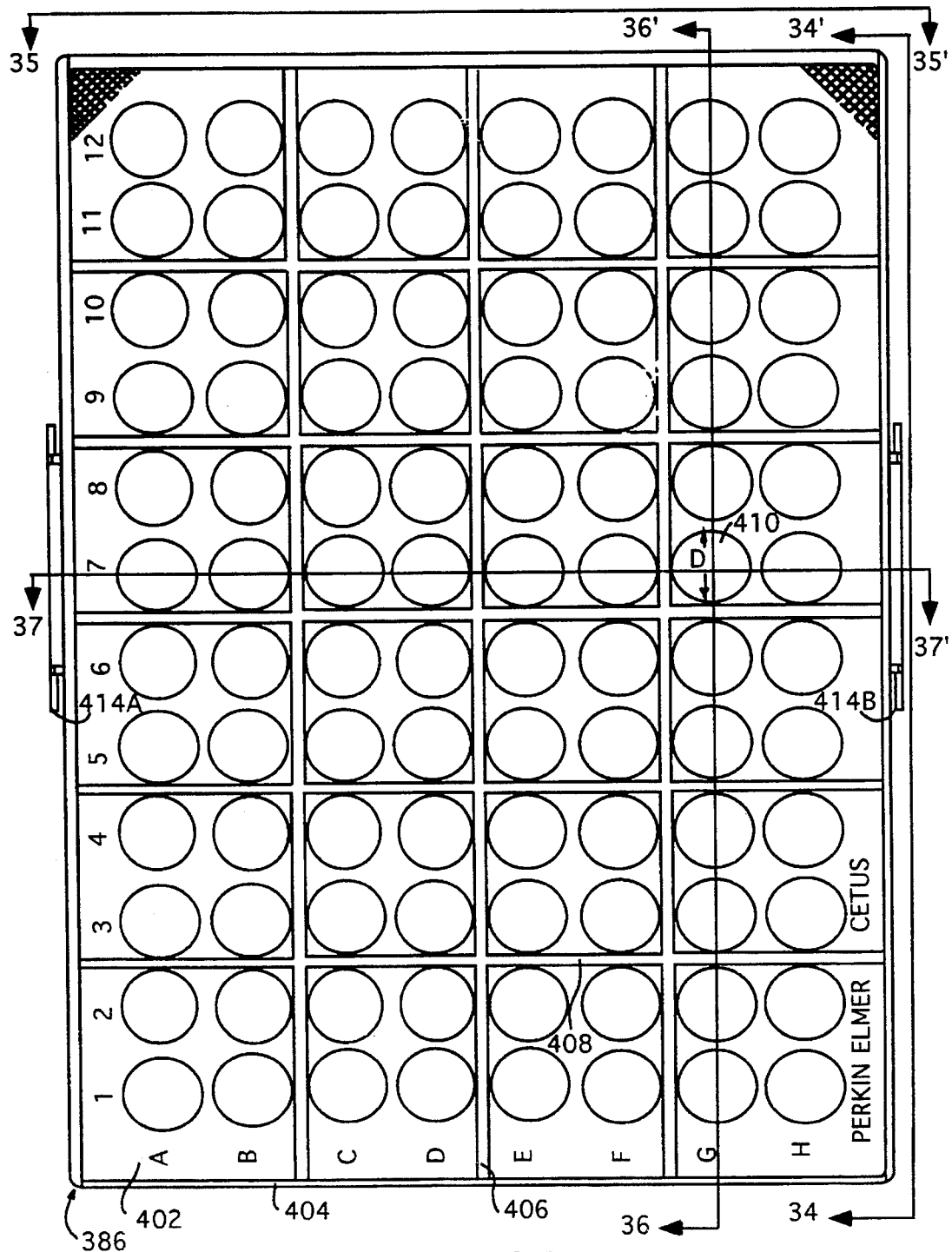
FIG. 33 is a top, plan view of the plastic, disposable retainer portion of the 96 well microtiter tray.
Figure 34:
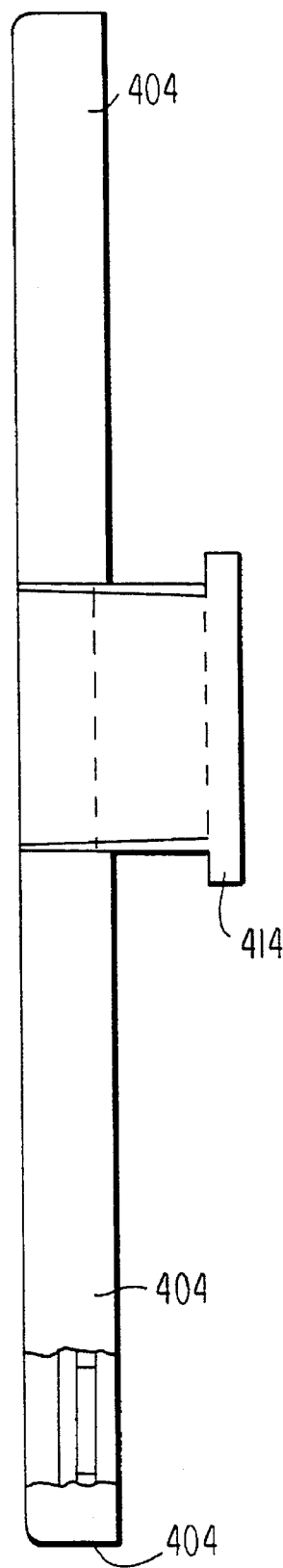
FIG. 34 is a side, elevation view with a partial section of the retainer.
Figure 35:
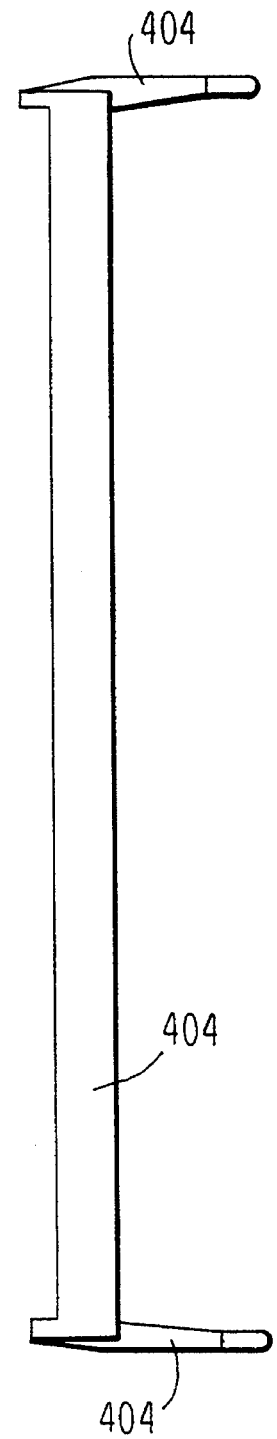
FIG. 35 is an end, elevation view of the retainer.

For a more detailed understanding of the retainer, refer to FIGS. 33 through 37. FIG. 33 is a top view of the plastic retainer. FIG. 34 is an elevation view of the retainer taken along view line 34–34' in FIG. 33. FIG. 35 is an end elevation view of the retainer taken along view line 35–35' in FIG. 33. FIG. 36 is a sectional view taken along section line 36–36"in FIG. 33. FIG. 37 is a sectional view through the retainer taken along section line 37–37' in FIG. 33.

Referring jointly to FIGS. 33–37, the retainer 386 is comprised of a single horizontal plastic plane 402 surrounded by a vertical wall 404. The plane 402 has an 8×12 array of 96 holes formed therein divided into 24 groups of four holes per group. These groups are set off by ridges formed in the plane 402 such as ridges 406 and 408. Each hole, of which hole 410 is typical, has a diameter D which is larger than the diameter $D_1$ in FIG. 29 and smaller than the diameter $D_2$. This allows the retainer to be slipped over the sample tubes after they have been placed in the frame 342 but prevents the sample tubes from falling out of the frame since the shoulder 384 is too large to pass through the hole 410.

The retainer snaps into the frame 342 by means of plastic tabs 414 shown in FIGS. 34 and 36. These plastic tabs are pushed through the slots 416 and 418 in the frame as shown in FIG. 23. There are two plastic tabs 414, one on each long edge of the retainer. These two plastic tabs are shown as 414A and 414B in FIG. 33.

The frame 342 of FIGS. 22–28, with up to 96 sample tubes placed therein and with the retainer 386 snapped into place, forms a single unit such as is shown in FIGS. 21A and 21B which can be placed in the sample block 12 for PCR processing.

Figure 38:
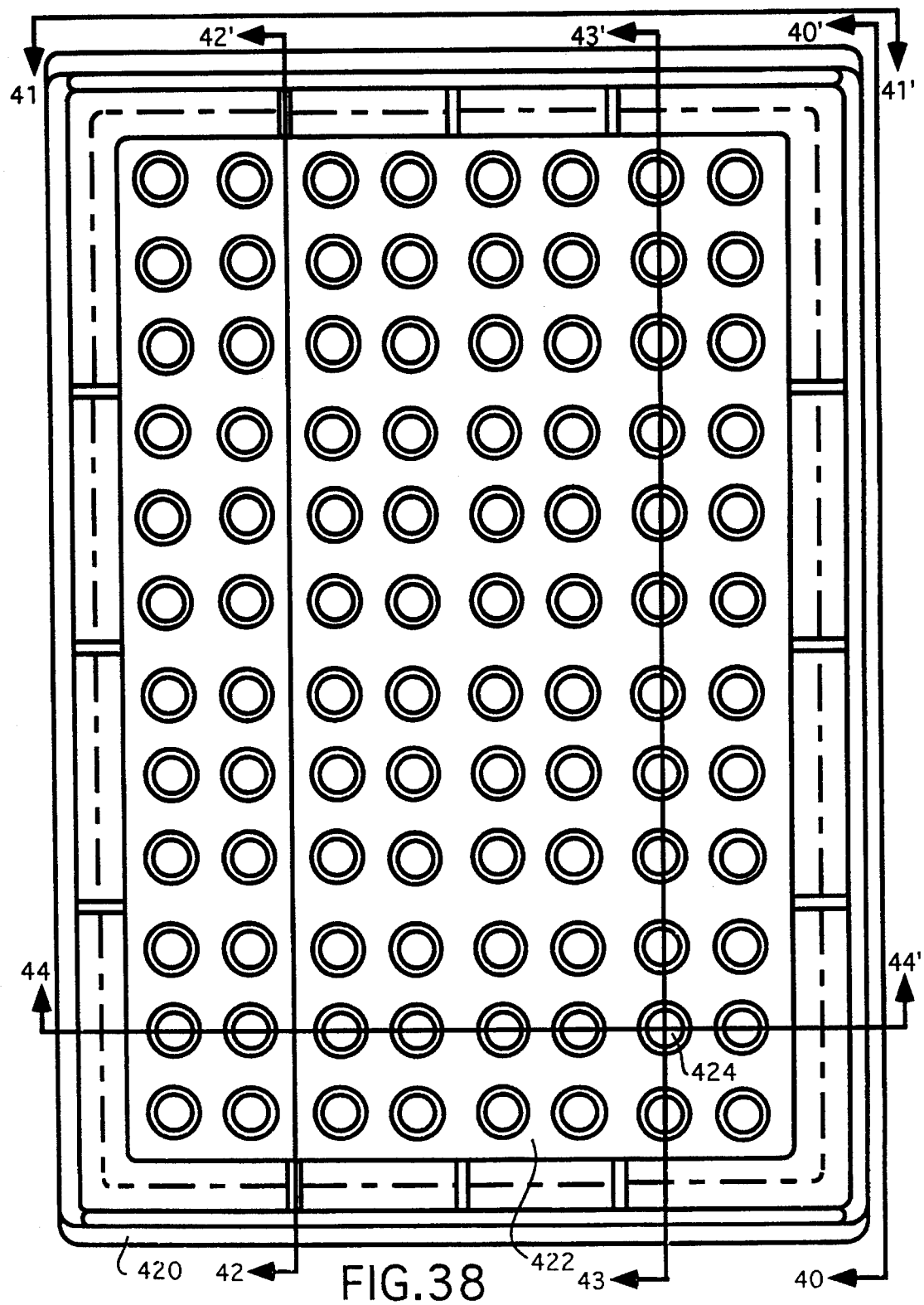
FIG. 38 is a plan view of the plastic disposable support base of the 96 well microtiter tray.
Figure 39:
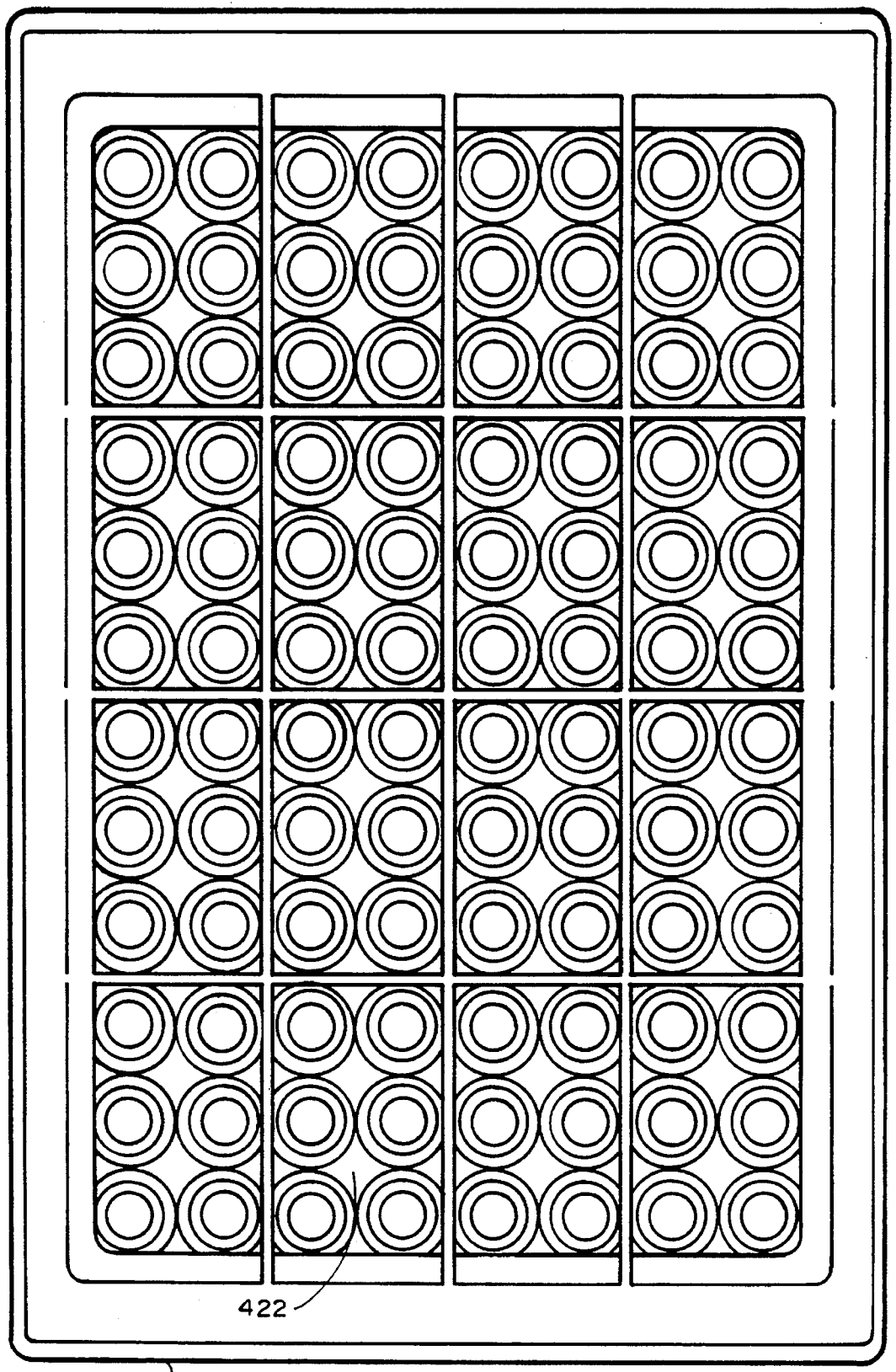
FIG. 39 is a bottom plan view of the base.
Figure 42:
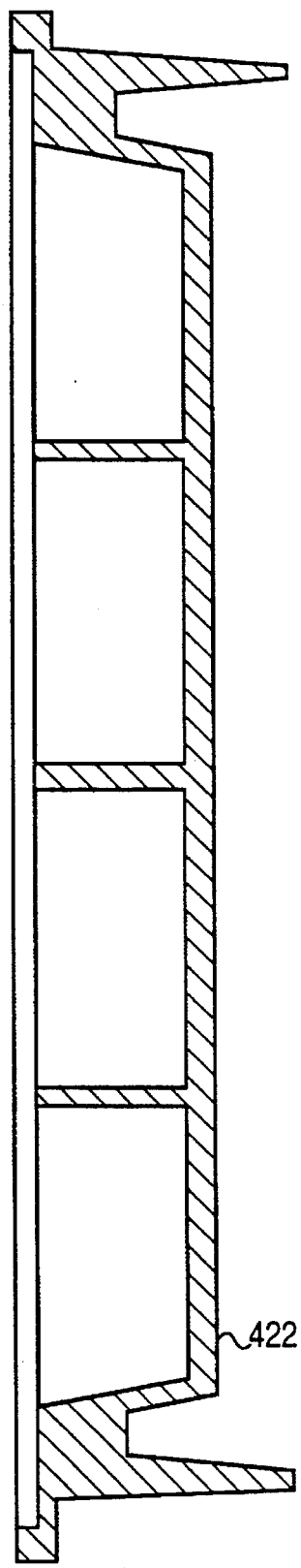
FIG. 42 is a sectional view of the support base taken along section line 42–42' in FIG. 38.
Figure 43:
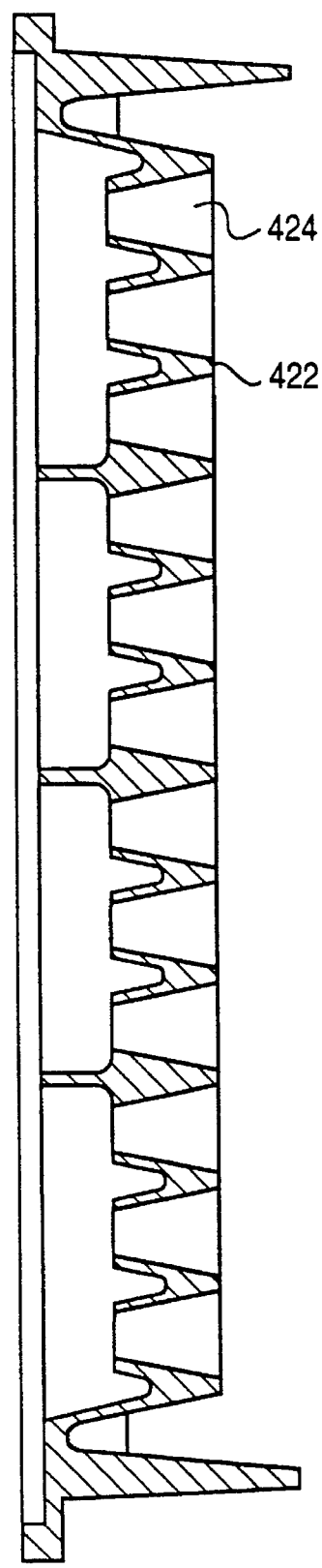
FIG. 43 is a sectional view of the support base taken along section line 43–43' in FIG. 38.
Figure 44:
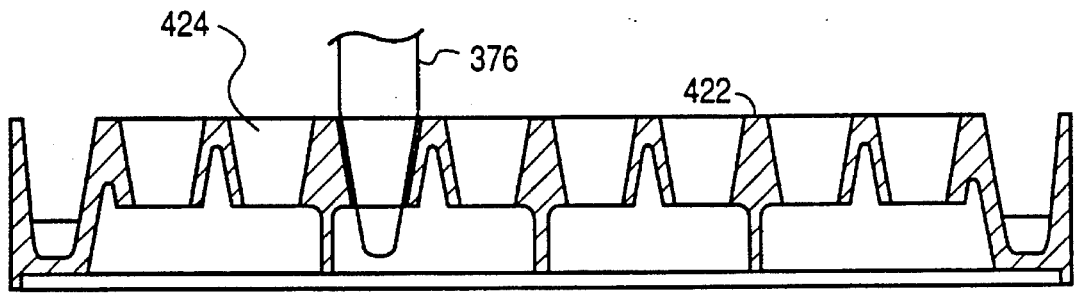
FIG. 44 is a section view of the base taken along section line 44–44' in FIG. 38.

After processing, all the tubes may be removed simultaneously by lifting the frame 342 out of the sample block. For convenience and storage, the frame 342 with sample tubes and retainer in place can be inserted into another plastic component called the base. The base has the outside dimensions and footprint of a standard 96-well microtiter plate and is shown in FIGS. 38 through 44. FIG. 38 is a top plan view of the base 420, while FIG. 39 is a bottom plan view of the base. FIG. 40 is an elevation view of the base taken from view line 40–40' in FIG. 38. FIG. 41 is an end elevation view taken from view line 41–41' in FIG. 38. FIG. 42 is a sectional view taken through the base along section line 42–42' in FIG. 38. FIG. 43 is a sectional view through the base taken along section line 43–43' in FIG. 38. FIG. 44 is a sectional view taken along section line 44–44' in FIG. 38.

The base 420 includes a flat plane 422 of plastic in which an 8×12 array of holes with sloped edges is formed. These holes have dimensions and spacing such that when the frame 342 is seated in the base, the bottoms of the sample tubes fit into the conical holes in the base such that the sample tubes are held in the same relationship to the frame 342 as the sample tubes are held when the frame 342 is mounted on the sample block. Hole 424 is typical of the 96 holes formed in the base and is shown in FIGS. 38, 44 and 43. The individual sample tubes, though loosely captured between the tray and retainer, become firmly seated and immobile when the frame is inserted in the base. The manner in which a typical sample tube 424 fits in the base is shown in FIG. 44.

In other words, when the frame, sample tubes and retainer are seated in the base 420 the entire assembly becomes the exact functional equivalent of an industry standard 96-well microtiter plate, and can be placed in virtually any automated pipetting or sampling system for 96-well industry standard microtiter plates for further processing.

After the sample tubes have been filled with the necessary reagents and DNA sample to be amplified, the sample tubes can be capped. In an alternative embodiment of the cap strip shown in FIGS. 31 and 32, an entire mat of 96 caps with a compliant web connecting them in an 8×12 array may be used. This web, shown at 394 in FIG. 31 must be sufficiently compliant so that the caps do not restrain the sample tubes from making the small motions these sample tubes must make to fit perfectly in the conical wells of the sample block at all temperatures.

The assembly of tubes, caps, frames, retainer and base is brought after filling the tubes to the thermal cycler. There, the frame, capped tubes and retainer plate are removed from the base as a unit. This unit is then placed in the sample block 12 to make the assembly shown in FIG. 21A or 21B with the tubes loosely held in the conical wells in the sample block. As shown in FIG. 21, the frame 342 is seated on the top surface 280 of the guardband. In the preferred embodiment, the ridge 366 extends down into the groove 78 of the guardband, but this is not essential.

Next, the heated cover is slid over the samples, and the heated platen is screwed down as previously described until it contacts the top edge 346 of the frame 342.

Within seconds after the heated platen 14 in FIG. 19 touches the caps, the caps begin to soften and yield under the downward pressure from the lead screw 312 in FIG. 19. The user then continues to turn to knob 318 until the index marks 332 and 334 in FIG. 20 line up which indicates that every sample tube has been tightly pressed into the sample block with at least the minimum threshold force F and all air gaps between the heated platen 14, the sample block and the top edge 346 of the frame 342 have been tightly closed. The sample tubes are now in a completely closed and controlled environment, and precision cycling of temperature can begin.

At the end of the PCR protocol, the heated platen 14 is moved upward and away from the sample tubes, and the heated cover 316 is slid out of the way to expose the frame 342 and sample tubes. The frame, sample tubes and retainer are then removed and replaced into an empty base, and the caps can be removed. As each cap or string of caps is pulled off, the retainer keeps the tube from coming out of the tray. Ribs formed in the base (not shown in FIGS. 38–44) contact the retainer tabs 414A and 414B shown in FIG. 33 to keep the retainer snapped in place such that the force exerted on the tubes by removing the caps does not dislodge the retainer 386.

Obviously, the frame 342 may be used with fewer than 96 tubes if desired. Also, the retainer 386 can be removed if desired by unsnapping it.

A user who wishes to run only a few tubes at a time and handle these tubes individually can place an empty frame 342 without retainer on the sample block. The user may then use the base as a "test tube rack" and set up a small number of tubes therein. These tubes can then be filled manually and capped with individual caps. The user may then transfer the tubes individually into wells in the sample block, close the heated cover and screw down the heated platen 14 until the marks line up. PCR cycling may then commence. When the cycling is complete, the cover 316 is removed and the sample tubes are individually placed in an available base. The retainer is not necessary in this type of usage.

Figure 50:
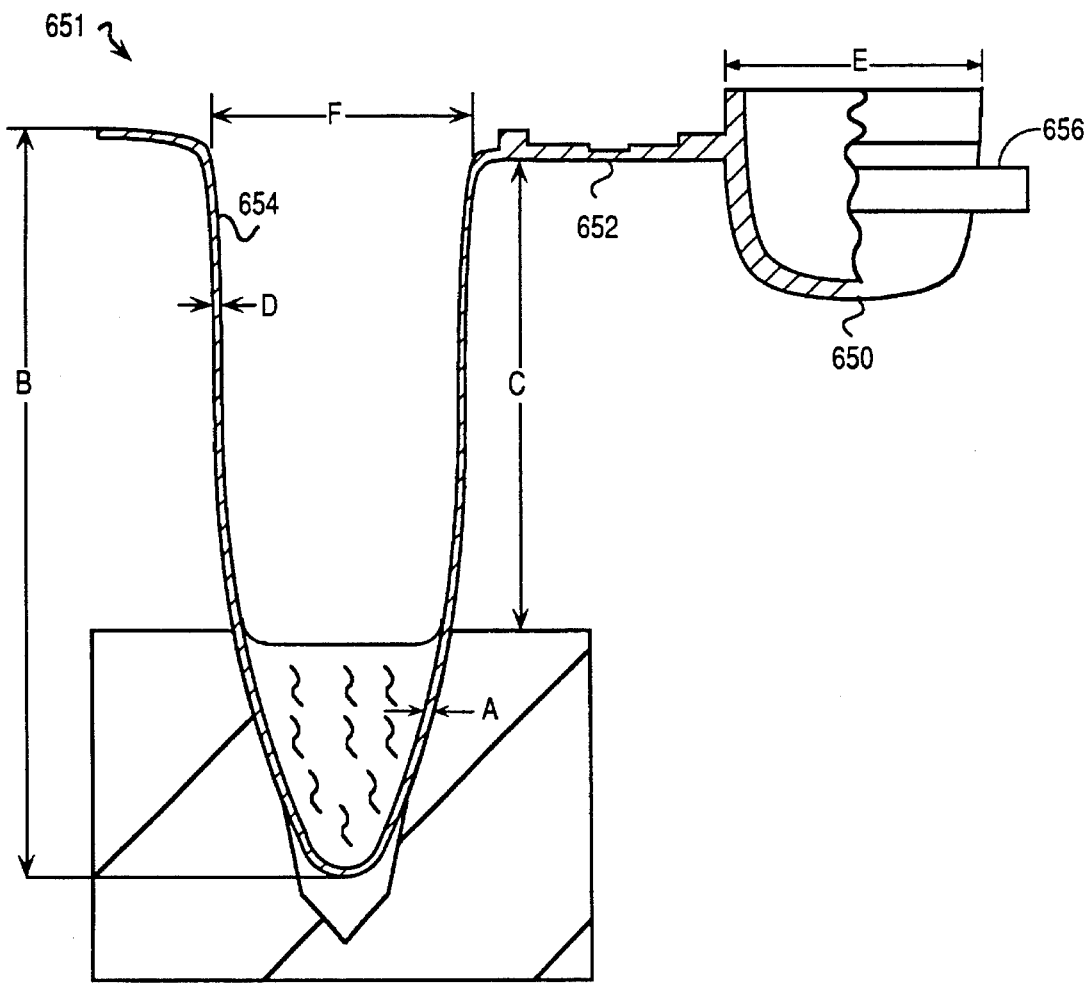
FIG. 50 is elevation sectional view of a tall thin walled sample tube marketed under the trademark MAXIAMP.

Referring to FIG. 50, there is shown a cross-sectional view of a larger volume, thin walled reaction tube marketed under the trademark MAXIAMP. This tube is useful for PCR reactions wherein reagents or other materials need to be added to the reaction mixture which will bring the total volume to greater than 200 microliters. The larger tube shown in FIG. 50 made of Himont PD701 polypropylene or Valtec HH-444 polypropylene and has a thin wall in contact with the sample block. Whatever material is selected should be compatible with the DNA and other components of the PCR reaction mixture so as to not impair PCR reaction processing such as by having the target DNA stick to the walls and not replicate. Glass is generally not a good choice because DNA has been known to stick to the walls of glass tubes.

The dimension A in FIG. 50 is typically 0.012±0.001 inches (half the thickness of cylindrical wall section D) and the wall angle relative to the longitudinal axis of the tube is typically 17°. The advantage of a 17° wall angle is that while downward force causes good thermal contact with the sample block, the tubes do not jam in the sample wells. The advantage of the thin walls is that it minimizes the delay between changes in temperature of the sample block and corresponding changes in temperature of the reaction mixture. This means that if the user wants the reaction mixture to remain within 1° C. of 94° C. for 5 seconds in the denaturation segment, and programs in these parameters, he or she gets the 5 second denaturation interval with less time lag than with conventional tubes with thicker walls. This performance characteristic of being able to program a short soak interval such as a 5 second denaturation soak and get a soak at the programmed temperature for the exact programmed time is enabled by use of a calculated sample temperature to control the timer. In the system described herein, the timer to time an incubation or soak interval is not started until the calculated sample temperature reaches the programmed soak temperature.

Further, with the thin walled sample tubes, it only takes about one-half to two-thirds as long for the sample mixture to get within 1° C. of the target temperature as with prior art thick-walled microcentrifuge tubes and this is true both with the tall MAXIAMP™ tube shown in FIG. 50 and the smaller thin walled MICROAMP™ tube shown in FIG. 15.

The wall thickness of both the MAXIAMP™ and MICROAMP™ tubes is controlled tightly in the manufacturing process to be as thin as possible consistent with adequate structural strength. Typically, for polypropylene, this will be anywhere from 0.009 to 0.012 inches. If new, more exotic materials which are stronger than polypropylene are used to achieve the advantage of speeding up the PCR reaction, the wall thickness can be less so long as adequate strength is maintained to withstand the downward force to assure good thermal contact, and other stresses of normal use. With a height (dimension B in FIG. 50) of 1.12 inches and a dimension C of 0.780 inches, the MAXIAMP tube's time constant is approximately 14 seconds although this has not been precisely measured as of the time of filing. The MICROAMP tube time constant for the shorter tube shown in FIG. 15 is typically approximately 9.5 seconds with a tube wall thickness in the conical section of 0.009 inches plus or minus 0.001 inches.

Figure 51:
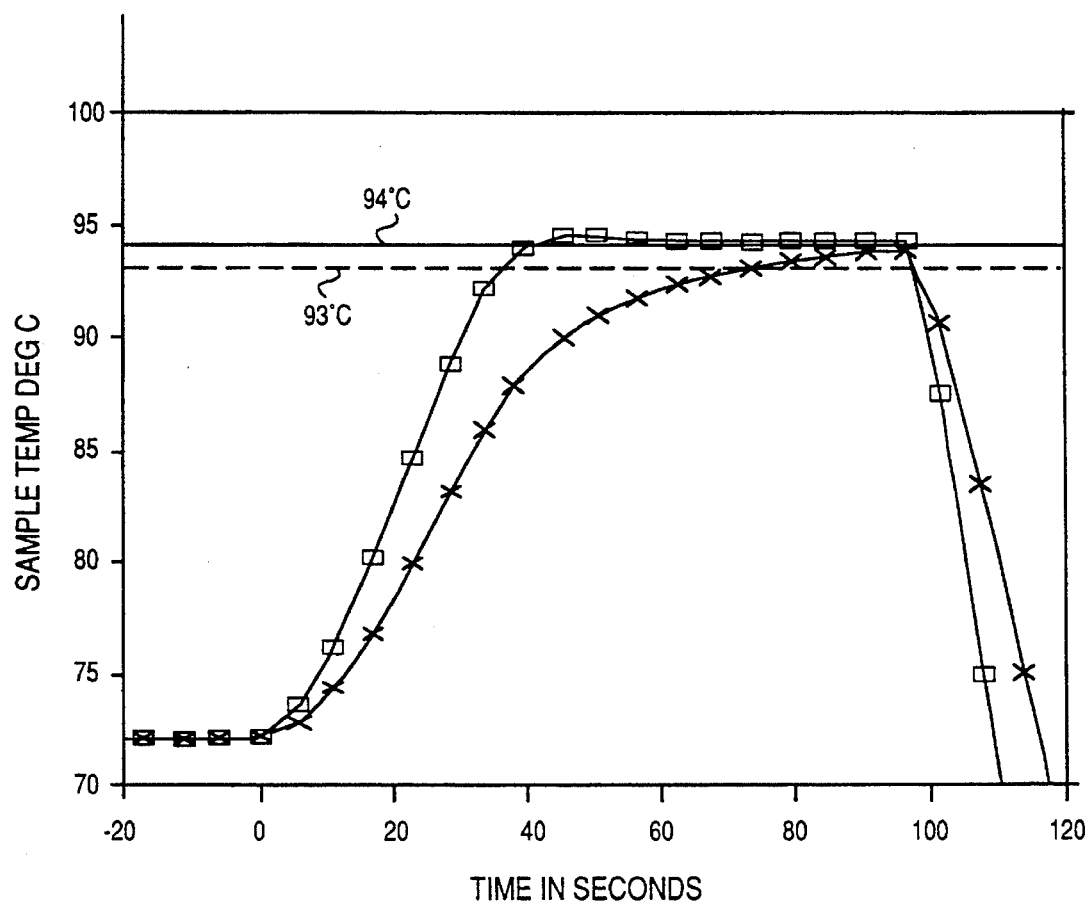
FIG. 51 is a graph showing the difference in response time between the thin walled sample tubes and the thick walled prior art tubes.

FIG. 51 shows the results of use of the thinner walled MICROAMP tube. A similar speeded up attainment of target temperatures will result from use of the thin walled MAXIAMP tube.

Referring to FIG. 51, there is shown a graph of the relative times for the calculated sample temperature in a MICROAMP tube versus the time for a prior art tube to reach a temperature within 1° C. of a target denaturation temperature of 94° C from a starting temperature of 72° C. In FIG. 51, a 100 microliter sample was present in each tube. The curve with data points marked by open boxes is the calculated sample temperature response for a MICROAMP tube with a 9.5 second response time and a 0.009 inch wall thickness. The curve with data points marked by X's represents the calculated sample temperature for a 100 microliter sample in a prior art, thick walled microcentrifuge tube with a 0.030 inch wall thickness. This graph shows that the thin walled MICROAMP tube sample reaches a calculated temperature within 1° C. of the 94° C. target soak temperature within approximately 36 seconds while the prior art tubes take about 73 seconds. This is important because in instruments which do not start their timers until the soak temperature is substantially achieved, the prior art tubes can substantially increase overall processing time especially when considered in light of the fact that each PCR cycle will have at least two ramps and soaks and there are generally very many cycles performed. Doubling the ramp time for each ramp by using prior art tubes can therefore drastically increase processing time. In systems which start their times based upon block/bath/oven temperature without regard to actual sample temperature, these long delays between changes in block/bath/oven temperature and corresponding changes in sample mixture temperature can have serious negative consequences. The problem is that the long delay can cut into the time that the reaction mixture is actually at the temperature programmed for a soak. For very short soaks as are popular in the latest PCR processes, the reaction mixture may never actually reach the programmed soak temperature before the heating/cooling system starts attempting to change the reaction mixture temperature.

FIG. 50 shows a polypropylene cap 650 connected to the MAXIAMP sample tube by a plastic web 652. The outside diameter E of the cap and the inside diameter F of the tube upper section are sized for an interference fit of between 0.002 and 0.005 inches. The thickness of the wall and dome portions of the cap in a preferred embodiment is approximately 0.020 inches. The inside surface 654 of the tube should be free of flash, nicks and scratches so that a gas-tight seal with the cap can be formed.

Figure 52:
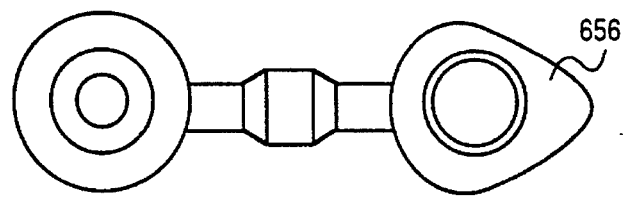
FIG. 52 is a plan view of a sample tube and cap.

FIG. 52 shows a plan view of the tube 651, the cap 650 and the web 652. A shoulder 656 prevents the cap from being pushed too far down into the tube and allows sufficient projection of the cap above the top edge of the sample tube for making contact with the heated platen. This also allows sufficient cap deformation such that the minimum acceptable force F in FIG. 15 can be applied by deformation of the cap.

In the preferred embodiment, the tube and cap are made of Himont PD701 polypropylene which is autoclavable at temperatures up to 126° C. for times up to 15 minutes. This allows the disposable tubes to be sterilized before use. Since the caps are permanently deformed in use in machines with heated platens, the tubes are designed for use only once.

Caps for the MICROAMP tubes are available in connected strips of 8 or 12 caps with each cap numbered or as individual caps. Single rows of caps may be used and the rows may be easily shortened to as few as desired or individual caps may be cut off the strip. Caps for MAXIAMP tubes are either attached as shown in FIG. 50, or are separate individual caps.

The maximum volume for post-PCR reagent additions to permit mixing on the MICROAMP tube is 200 microliters and is up to 500 microliters for the MAXIAMP tube. Temperature limits are −70° C. to 126° C.

The response time depends upon the volume of the sample. Response is measured as the time for the sample to come within 37% of the new temperature when the block suddenly changes temperature. Typical response time for a 50 microliter fill are 7.0 seconds and for a 20 microliter fill are 5.0 seconds.

Electronics and Software Version 1

Referring to FIGS. 47A and 47B (hereafter FIG. 47), there is shown a block diagram for the electronics of a preferred embodiment of a control system in a class of control systems represented by CPU block 10 in FIG. 1. The purpose of the control electronics of FIG. 47 is, inter alia, to receive and store user input data defining the desired PCR protocol, read the various temperature sensors, calculate the sample temperature, compare the calculated sample temperature to the desired temperature as defined by the user defined PCR protocol, monitor the power line voltage and control the film heater zones and the ramp cooling valves to carry out the desired temperature profile of the user defined PCR protocol.

A microprocessor (hereafter CPU) 450 executes the control program described below and given in Microfiche Appendix C in source code form. In the preferred embodiment, the CPU 450 is an OKI CMOS 8085. The CPU drives an address bus 452 by which various ones of the other circuit elements in FIG. 47 are addressed. The CPU also drives a data bus 454 by which data is transmitted to various of the other circuit elements in FIG. 47.

The control program of Microfiche Appendix C and some system constants are stored in EPROM 456. User entered data and other system constants and characteristics measured during the install process (install program execution described below) are stored in battery backed up RAM 458. A system clock/calendar 460 supplies the CPU 450 with date and time information for purposes of recording a history of events during PCR runs and the duration of power failures as described below in the description of the control software.

An address decoder 462 receives and decodes addresses from the address bus 452 and activates the appropriate chip select lines on a chip select bus 464.

The user enters PCR protocol data via a keyboard 466 in response to information displayed by CPU on display 468. The two way communication between the user and the CPU 450 is described in more detail below in the user interface section of the description of the control software. A keyboard interface circuit 470 converts user keystrokes to data which is read by the CPU via the data bus 454.

Two programmable interval timers 472 and 474 each contain counters which are loaded with counts calculated by the CPU 450 to control the intervals during which power is applied to the various film heater zones.

An interrupt controller 476 sends interrupt requests to the CPU 450 every 200 milliseconds causing the CPU 450 to run the PID task described below in the description of the control software. This task reads the temperature sensors and calculates the heating or cooling power necessary to move the sample temperature from its current level to the level desired by the user for that point in time in the PCR protocol being executed.

A UART 478 services an RS232 interface circuit 480 such that data stored in the RAM 480 may be output to a printer. The control software maintains a record of each PCR run which is performed with respect to the actual temperatures which existed at various times during the run for purposes of user validation that the PCR protocol actually executed corresponded to the PCR protocol desired by the user. In addition, user entered data defining the specific times and temperatures desired during a particular PCR protocol is also stored. All this data and other data as well may be read by the CPU 450 and output to a printer coupled to the RS232 port via the UART 478. The RS232 interface also allows an external computer to take control of the address and data buses for purposes of testing.

A peripheral interface chip (hereafter PIC) 482 serves as a programmable set of 4 input/output registers. At power-up, the CPU 450 selects the PIC 482 via the address decoder 462 and the chip select bus 464. The CPU then writes a data word to the PIC via data bus 454 to program the PIC 482 regarding which registers are to be output ports and which are to be input ports. Subsequently, the CPU 450 uses the output registers to store data words written therein by the CPU via the data bus 454 to control the internal logic state of a programmable array logic chip (PAL) 484.

The PAL 484 is a state machine which has a plurality of input signals and a plurality of output signals. PAL's in general contain an array of logic which has a number of different states. Each state is defined by the array or vector of logic states at the inputs and each state results in a different array or vector of logic states on the outputs. The CPU 450, PIC 482, PAL 484 and several other circuits to be defined below cooperate to generate different states of the various output signals from the PAL 484. These different states and associated output signals are what control the operation of the electronics shown in FIG. 47 as will be described below.

Figure 48:
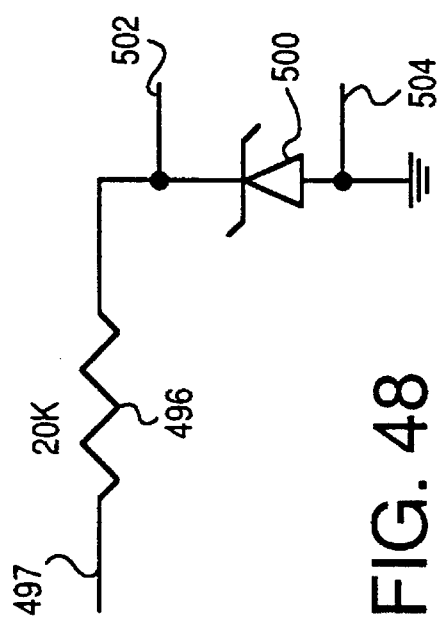
FIG. 48 is a schematic of a typical zener temperature sensor.

A 12 bit analog-to-digital converter (A/D) 486 converts analog voltages on lines 488 and 490 to digital signals on data bus 454. These are read by the CPU by generating an address for the A/D converter such that a chip select signal on bus 464 coupled to the chip select input of the A/D converter goes active and activates the converter. The analog signals on lines 488 and 490 are the output lines of two multiplexers 492 and 494. Multiplexer 492 has four inputs ports, each having two signal lines. Each of these ports is coupled to one of the four temperature sensors in the system. The first port is coupled to the sample block temperature sensor. The second and third ports are coupled to the coolant and ambient temperature sensors, respectively and the fourth port is coupled to the heated cover temperature sensor. A typical circuit for each one of these temperature sensors is shown in FIG. 48. A 20,000 ohm resistor 496 receives at a node 497 a regulated +15 volt regulated power supply 498 in FIG. 47 via a bus connection line which is not shown. This +15 volts D.C. signal reverse biases a zener diode 500. The reverse bias current and the voltage drop across the zener diode are functions of the temperature. The voltage drop across the diode is input to the multiplexer 292 via lines 502 and 504. Each temperature sensor has a similar connection to the multiplexer 292.

Multiplexer 494 also has 4 input ports but only three are connected. The first input port is coupled to a calibration voltage generator 506. This voltage generator outputs two precisely controlled voltage levels to the multiplexer inputs and is very thermally stable. That is, the reference voltage output by voltage source 506 drifts very little if at all with temperature. This voltage is read from time to time by the CPU 450 and compared to a stored constant which represents the level this reference voltage had at a known temperature as measured during execution of the install process described below. If the reference voltage has drifted from the level measured and stored during the install process, the CPU 450 knows that the other electronic circuitry used for sensing the various temperatures and line voltages has also drifted and adjusts their outputs accordingly to maintain very accurate control over the temperature measuring process.

The other input to the multiplexer 494 is coupled via line 510 to an RMS-to-DC converter circuit 512. This circuit has an input 514 coupled to a step-down transformer 516 and receives an A.C. voltage at input 514 which is proportional to the then existing line voltage at A.C. power input 518. The RMS-to-DC converter 512 rectifies the A.C. voltage and averages it to develop a D.C. voltage on line 510 which also is proportional to the A.C. input voltage on line 518.

Four optically coupled triac drivers 530, 532, 534 and 536 receive input control signals via control bus 538 from PAL logic 484. Each of the triac drivers 530, 532 and 534 controls power to one of the three film heater zones. These heater zones are represented by blocks 254, 260/262 and 256/258 (the same reference numerals used in FIG. 13). The triac driver 536 controls power to the heated cover, represented by block 544 via a thermal cut-out switch 546. The heater zones of the film heater are protected by a block thermal cutout switch 548. The purpose of the thermal cutout switches is to prevent meltdown of the film heater/sample block on the heated cover in case of a failure leading to the triac drivers being left on for an unsafe interval. If such an event happens, the thermal cut-out switches detect an overly hot condition, and shut down the triacs via signals on lines 552 or 554.

The main heater zone of the film heater is rated at 360 watts while the manifold and edge heater zones are rated at 180 watts and 170 watts respectively. The triac drivers are Motorola MAC 15A10 15 amp triacs. Each heater zone is split into 2 electrically isolated sections each dissipating ½ the power. The 2 halves are connected in parallel for line voltages at 518 less than 150 volts RMS. For line voltages greater than this, the two halves are connected in series. These alternate connections are accomplished through a "personality" plug 550.

The AC power supply for the film heater zones is line 559, and the AC supply for the heated cover is via line 560.

A zero crossing detector 566 provides basic system timing by emitting a pulse on line 568 at each zero crossing of the AC power on line 518. The zero crossing detector is a National LM 311N referenced to analog ground and has 25 mV of hysteresis. The zero crossing detector takes its input from transformer 516 which outputs A.C. signal from 0 to 5.52 volts for an A.C. input signal of from 0 to 240 volts A.C.

pump 41 that pumps coolant through the ramp and bias cooling channels. The refrigeration unit 40 also receives its A.C. power from the transformer 570 via another portion of the personality plug 550. The transformer 550 also supplies power to three regulated power supplies 572, 498 and 574 and one unregulated power supply 576.

For accuracy purposes in measuring the temperatures, the calibration voltage generator 506 uses a series of very precise, thin-film, ultralow temperature drift 20K ohm resistors (not shown in FIG. 47 but shown as resistors RA1 in the schematics of Microfiche Appendix E). These same ultralow drift resistors are used to set the gain of an analog amplifier 578 which amplifies the output voltage from the selected temperature sensor prior to conversion to a digital value. These resistors drift only 5 ppm/C°.

All the temperature sensors are calibrated by placing them (separated from the structures whose temperatures they measure) first in a stable, stirred-oil, temperature controlled bath at 40° C. and measuring the actual output voltages at the inputs to the multiplexer 492. The temperature sensors are then placed in a bath at a temperature of 95° C. and their output voltages are again measured at the same points. The output voltage of the calibration voltage generator 506 is also measured at the input of the multiplexer 494. For each temperature, the digital output difference from the A/D converter 486 between each of the temperature sensor outputs and the digital output that results from the voltage generated by the calibration voltage generator 506 is measured. The calibration constants for each temperature sensor to calibrate each for changes in temperature may then be calculated.

The sample block temperature sensor is then subjected to a further calibration procedure. This procedure involves driving the sample block to two different temperatures. At each temperature level, the actual temperature of the block in 16 different sample wells is measured using 16 RTD thermocouple probes accurate to within 0.02° C. An average profile for the temperature of the block is then generated and the output of the A/D converter 464 is measured with the block temperature sensor in its place in the sample block. This is done at both temperature levels. From the actual block temperature as measured by the RTD probes and the A/D output for the block temperature sensor, a further calibration factor can be calculated. The temperature calibration factors so generated are stored in battery backed up RAM 458. Once these calibration factors are determined for the system, it is important that the system not drift appreciably from the electrical characteristics that existed at the time of calibration. It is important therefore that low drift circuits be selected and that ultralow drift resistors be used. The selections made for the analog components for an exemplary embodiment are given in Microfiche Appendix E.

The manner in which the CPU 450 controls the sample block temperature can be best understood by reference to the section below describing the control program. However, to illustrate how the electronic circuitry of FIG. 47 cooperates with the control software to carry out a PCR protocol consider the following.

The zero crossing detector 566 has two outputs in output bus 568. One of these outputs emits a negative going pulse for every positive going transition of the A.C. signal across the zero voltage reference. The other emits a negative pulse upon every negative-going transition of the A.C. signal across the zero reference voltage level. These two pulses, shown typically at 580 define one complete cycle or two half cycles. It is the pulse trains on bus 568 which define the 200 millisecond sample periods. For 60 cycle/sec A.C. as found in the U.S., 200 milliseconds contains 24 half cycles.

Figure 49:
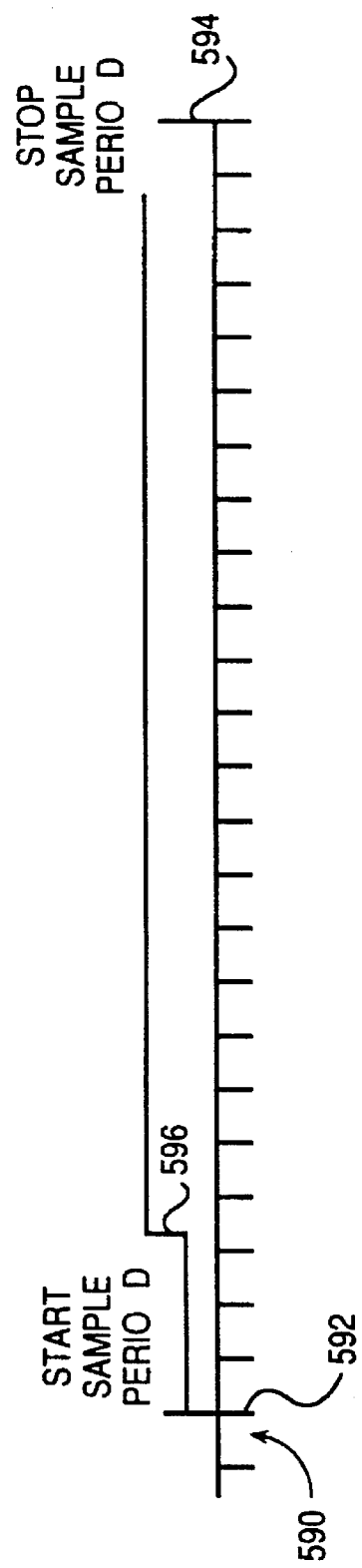
FIG. 49 is a time line diagram of a typical sample period.

A typical sample period is shown in FIG. 49. Each "tick" mark in FIG. 49 represents one half cycle. During each 200 msec sample period, the CPU 450 is calculating the amount of heating or cooling power needed to maintain the sample block temperature at a user defined setpoint or incubation temperature or to move the block temperature to a new temperature depending upon where in the PCR protocol time line the particular sample period lies. The amount of power needed in each film heater zone is converted into a number of half cycles each heater zone is to remain off during the next 200 msec sample period. Just before the end of the current sample period in which these calculations are made, the CPU 450 addresses each of the 4 timers in the programmable interval timer (PIT) 472. To each timer, the CPU writes data constituting a "present" count representing the number of half cycles the heater zone associated with that timer is to remain off in the next sample period. In FIG. 49, this data is written to the timers during interval 590 just preceding the starting time 592 of the next sample period. Assume that a rapid ramp up to the denaturation temperature of 94° C. is called for by the user setpoint data for an interval which includes the sample interval between times 592 and 594. Accordingly, the film heaters will be on for most of the period. Assume that the central zone heater is to be on for all but three of the half cycles during the sample period. In this case, the CPU 450 writes a three into the counter in PIT 472 associated with the central zone heater during interval 590. This write operation automatically causes the timer to issue a "shut off" signal on the particular control line of bus 592 which controls the central zone heater. This "shut off" signal causes the PAL 484 to issue a "shut off" signal on the particular one of the signal lines in bus 538 associated with the central zone. The triac driver 530 then shuts off at the next zero crossing, i.e., at time 592. The PIT receives a pulse train of positive-going pulses on line 594 from the PAL 484. These pulses are translations of the zerocrossing pulses on 2-line bus 568 by PAL 484 into positive going pulses at all zero crossing pulses on 2-line bus 568 by PAL 484 into positive going pulses at all zero crossings on a single line, i.e., line 594. The timer in PIT 472 associated with the central film heater zone starts counting down from its present count of 3 using the half cycle marking pulses on line 594 as its clock. At the end of the third half cycle, this timer reaches 0 and causes its output signal line on bus 592 to change states. This transition from the off to on state is shown at 596 in FIG. 49. This transition is communicated to PAL 484 and causes it to change the state of the appropriate output signal on bus 538 to switch the triac driver 530 on at the third zero-crossing. Note that by switching the triacs on at the zero crossings as is done in the preferred embodiment, switching off of a high current flowing through an inductor (the film heater conductor) is avoided. This minimizes the generation of radio frequency interference or other noise. Note that the technique of switching a portion of each half cycle to the film heater in accordance with the calculated amount of power needed will also work as an alternative embodiment, but is not preferred because of the noise generated by this technique.

The other timers of PIT 472 and 474 work in a similar manner to manage the power applied to the other heater zones and to the heated cover in accordance with power calculated by the CPU.

Ramp cooling is controlled by CPU 450 directly through the peripheral interface 482. When the heating/cooling power calculations performed during each sample period indicate that ramp cooling power is needed, the CPU 450 addresses the peripheral interface controller (PIC) 482. A data word is then written into the appropriate register to drive output line 600 high. This output line triggers a pair of monostable multivibrators 602 and 604 and causes each to emit a single pulse, on lines 606 and 608, respectively. These pulses each have peak currents just under 1 ampere and a pulse duration of approximately 100 milliseconds. The purpose of these pulses is to drive the solenoid valve coils that control flow through the ramp cooling channels very hard to turn on ramp cooling flow quickly. The pulse on line 606 causes a driver 610 to ground a line 612 coupled to one side of the solenoid coil 614 of one of the solenoid operated valves. The other terminal of the coil 614 is coupled to a power supply "rail" 616 at +24 volts DC from power supply 576. The one shot 602 controls the ramp cooling solenoid operated valve for flow in one direction, and the one shot 604 controls the solenoid operated valve for flow in the opposite direction.

Simultaneously, the activation of the RCOOL signal on line 600 causes a driver 618 to be activated. This driver grounds the line 612 through a current limiting resistor 620. The value of this current limiting resistor is such that the current flowing through line 622 is at least equal to the hold current necessary to keep the solenoid valve 614 open. Solenoid coils have transient characteristics that require large currents to turn on a solenoid operated valve but substantially less current to keep the valve open. When the 100 msec pulse on line 606 subsides, the driver 612 ceases directly grounding the line 612 leaving only the ground connection through the resistor 620 and driver 618 for holding current.

The solenoid valve 614 controls the flow of ramp cooling coolant through the sample block in only ½ the ramp cooling tubes, i.e., the tubes carrying the coolant in one direction through the sample block. Another solenoid operated valve 624 controls the coolant flow of coolant through the sample block in the opposite direction. This valve 624 is driven in exactly the same way as solenoid operated valve 614 by drivers 626 and 628, one shot 604 and line 608.

The need for ramp cooling is evaluated once every sample period. When the PID task of the control software determines from measuring the block temperature and comparing it to the desired block temperature that ramp cooling is no longer needed, the RCOOL signal on line 600 is deactivated. This is done by the CPU 450 by addressing the PIC 482 and writing data to it which reverses the state of the appropriate bit in the register in PIC 482 which is coupled to line 600.

The logic equations for PAL 484 are attached hereto as Microfiche Appendix D. The logic equations for the address decoder 462, which is also programmable array logic, are also attached hereto is Microfiche Appendix D.

The PIT 474 also has two other timers therein which time a 20 Hz interrupt and a heating LED which gives a visible indication when the sample block is hot and unsafe to touch.

The system also includes a beeper one shot 630 and a beeper 632 to warn the user when an incorrect keystroke has been made.

The programmable interrupt controller 476 is used to detect 7 interrupts; Level 1-test; Level 2–20 Hz; Level 3 - Transmit Ready; Level 4 - Receive ready; Level 5 - Keyboard interrupt; Level 6 - Main heater turn on; and, Level 7 - A.C. line zero cross.

The programmable peripheral interface 482 has four outputs (not shown) for controlling the multiplexers 492 and 494. These signals MUX1 EN and MUX2 EN enable one or the other of the two multiplexers 492 and 494 while the signals MUX 0 and MUX 1 control which channel is selected for input to the amplifier 578. These signals are managed so that only one channel from the two multiplexers can be selected at any one time.

An RLTRIG* signal resets a timeout one shot 632 for the heaters which disables the heaters via activation of the signal TIMEOUT EN* to the PAL 484 if the CPU crashes. That is, the one shot 632 has a predetermined interval which it will wait after each reset before it activates the signal TIMEOUT EN* which disables all the heater zones. The CPU 450 executes a routine periodically which addresses the PIC 482 and writes data to the appropriate register to cause activation of a signal on line 634 to reset the one shot 632. If the CPU 450 "crashes" for any reason and does not execute this routine, the timeout one-shot 632 disables all the heater zones.

The PIC 482 also has outputs COVHTR EN* and BLKHTREN* (not shown) for enabling the heated cover and the sample block heater. Both of these signals are active low and are controlled by the CPU 450. They are output to the PAL 484 via bus 636.

The PIC 482 also outputs the signals BEEP and BEEPCLR* on bus 640 to control the beeper one shot 630.

The PIC 482 also outputs a signal MEM1 (not shown) which is used to switch pages between the high address section of EPROM 456 and the low address section of battery RAM 458. Two other signals PAGE SEL 0 and PAGE SEL 1 (not shown) are output to select between four 16K pages in EPROM 456.

The four temperature sensors are National LM 135 zener diode type sensors with a zener voltage/temperature dependence of 10 mV/° K. The zener diodes are driven from the regulated power supply 498 through the 20K resistor 496. The current through the zeners varies from approximately 560 µA to 615 µA over the 0° C. to 100° C. operating range. The zener self heating varies from 1.68 mW to 2.10 mW over the same range.

The multiplexers 492 and 494 are DG409 analog switches. The voltages on lines 488 and 490 are amplified by an AD625KN instrumentation amplifier with a transfer function of $V_{OUT}=3*V_{IN}-7.5$. The A/D converter 486 is an AD7672 with an input range from 0–5 volts. With the zener temperature sensor output from 2.73 to 3.73 volts over the 0° C. to 100° C. range, the output of the amplifier 578 will be 0.69 volts to 3.69 volts, which is comfortably within the A/D input range.

The keys to highly accurate system performance are good accuracy and low drift with changes in ambient temperature. Both of these goals are achieved by using a precision voltage reference source, i.e., calibration voltage generator 506, and continuously monitoring its output through the same chain of electronics as are used to monitor the outputs of the temperature sensors and the AC line voltage on line 510.

The calibration voltage generator 506 outputs two precision voltages on lines 650 and 652. One voltage is 3.75 volts and the other is 3.125 volts. These voltages are obtained by dividing down a regulated supply voltage using a string of ultralow drift, integrated, thin film resistors with a 0.05% match between resistors and a 5 ppm/degree C. temperature drift coefficient between resistors. The calibration voltage generator also generates −5 volts for the A/D converter reference voltage and 7.5 volts for the instrumentation amplifier offset. These two voltages are communicated to the A/D 486 and the amplifier 578 by lines which are not shown. These two negative voltages are generated using the same thin film resistor network and OP 27 GZ op-amps (not shown). The gain setting resistors for the operational amplifier 578 are also the ultralow drift, thin-film, integrated, matched resistors.

The control firmware, control electronics and the block design are designed such that well-to-well and instrument-to-instrument transportability of PCR protocols is possible.

High throughput laboratories benefit from instruments which are easy to use for a wide spectrum of lab personnel and which require a minimal amount of training. The software for the invention was developed to handle complex PCR thermocycling protocols while remaining easy to program. In addition, it is provided with safeguards to assure the integrity of samples during power interruptions, and can document the detailed events of each run in safe memory.

Figure 54:
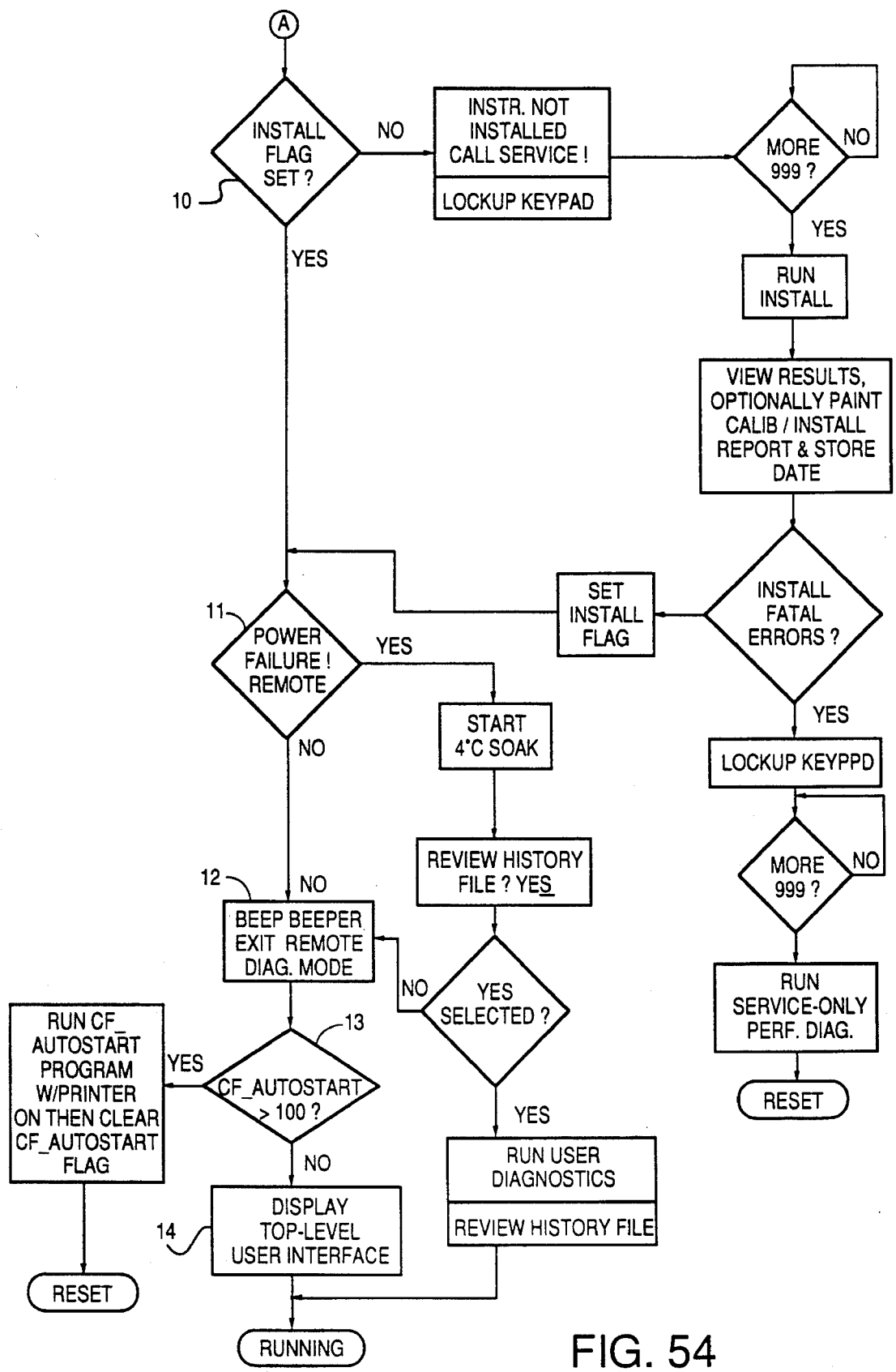

After completing power-up self-checks shown in FIGS. 53 and 54, to assure the operator that the system is operating properly, the user interface of the invention offers a simple, top-level menu, inviting the user to run, create or edit a file, or to access a utility function. No programming skills are required, since pre-existing default files can be quickly edited with customized times and temperatures, then stored in memory for later use. A file protection scheme prevents unauthorized changes to any user's programs. A file normally consists of a set of instructions to hold a desired temperature or to thermocycle. Complex programs are created by linking files together to form a method. A commonly used file, such as a 4° C. incubation following a thermocycle, can be stored and then incorporated into methods created by other users. A new type of file, the AUTO file is a PCR cycling program which allows the user to specify which of several types of changes to control parameters will occur each cycle: time incrementing (auto segment extension, for yield enhancement), time decrementing, or temperature incrementing or decrementing. For the highest degree of control precision and most reliable methods transferability, temperatures are setable to 0.1° C., and times are programmed to the nearest second. The invention has the ability to program a scheduled PAUSE at one or more setpoints during a run for reagent additions or for removal of tubes at specific cycles.

The system of the invention has the ability to store a 500 record history file for each run. This feature allows the user to review the individual steps in each cycle and to flag any special status or error messages relating to irregularities. With the optional printer, the invention provides hardcopy documentation of file and method parameters, run-time time/temperature data with a time/date stamp, configuration parameters, and sorted file directories.

In order to assure reproducible thermocycling, the computed sample temperature is displayed during the ramp and hold segments of each cycle. A temperature one degree different than the set temperature is normally used to trigger the ramp-time and hold-time clocks, but this can be altered by the user. Provided the proper time constant for the type of tube and volume is used (described more fully elsewhere herein), the sample will always approach the desired sample temperature with the same accuracy, regardless of whether long or short sample incubation times have been programmed. Users can program slow ramps for the specialized annealing requirements of degenerate primer pools, or very short (1–5 sec) high-temperature denaturation periods for very GC rich targets. Intelligent defaults are preprogrammed for 2 - and 3-temperature PCR cycles.

Diagnostic tests can be accessed by any users to check the heating and cooling system status, since the software gives Pass/Fail reports. In addition, a system performance program performs a comprehensive subsystem evaluation and generates a summary status report.

The control firmware is comprised of several sections which are listed below:
Diagnostics
Calibration
  Install
Real time operating system
Nine prioritized tasks that manage the system
Start-up sequence
User interface The various sections of the firmware will be described with either textual description, pseudocode or both. The actual source code in C language is included below as Microfiche Appendix C.

Features of the firmware are:

1. A Control system that manages the average sample block temperature to within ±0.1° C. as well as maintaining the temperature non-uniformity as between wells in the sample block to within ±0.5° C.

2. A temperature control system that measures and compensates for line voltage fluctuations and electronic temperature drift.

3. Extensive power up diagnostics that determine if system components are working.

4. Comprehensive diagnostics in the install program which qualify the heating and cooling systems to insure they are working properly.

5. A logical and organized user interface, employing a menu driven system that allows instrument operation with minimal dependency on the operators manual.

6. The ability to link up to 17 PCR protocols and store them as a method.

7. The ability to store up to 150 PCR protocols and methods in the user interface.

8. A history file that records up to 500 events of the previous run as part of the sequence task.

9. The ability to define the reaction volume and tube size type at the start of a run for maximum temperature accuracy and control as part of the user interface and which modifies tau (the tube time constant) in the PID task.

10. Upon recovery from a power failure, the system drives the sample block to 4° C. to save any samples that may be loaded in the sample compartment. The analyzer also reports the duration of the power failure as part of the start-up sequence.

11. The ability to print history file contents, "run time" parameters and stored PCR protocol parameters as part of the print task.

12. The ability to configure the temperature to which the apparatus will return during any idle state.

13. The ability to check that the setpoint temperature is reached within a reasonable amount of time.

14. The ability to control the instrument remotely via an RS232 port.

There are several levels of diagnostics which are described below:

A series of power-up tests are automatically performed each time the instrument is turned on. They evaluate critical areas of the hardware without user intervention. Any test that detects a component failure will be run again. If the test fails twice, an error message is displayed and the keyboard is electronically locked to prevent the user from continuing.

The following areas are tested:
Programmable Peripheral Interface device
Battery RAM device Battery RAM checksum
EPROM devices
Programmable Interface Timer devices
Clock/Calendar device
Programmable Interrupt Controller device
Analog to Digital section
Temperature sensors
Verify proper configuration plug A Series of service only diagnostics are available to final testers at the manufacturer's location or to field service engineers through a "hidden" keystroke sequence (i.e. unknown to the customer). Many of the tests are the same as the ones in the start up diagnostics with the exception that they can be continually executed up to 99 times.

The following areas are tested:
Programmable Peripheral Interface device
Battery RAM device
Battery RAM checksum
EPROM devices
Programmable Interface Timer devices
Clock/Calendar device
Programmable Interrupt Controller device
Analog to Digital section
RS-232 section
Display section
Keyboard
Beeper
Ramp Cooling Valves
Check for EPROM mismatch
Firmware version level
Battery RAM Checksum and Initialization
Autostart Program Flag
Clear Calibration Flag
Heated Cover heater and control circuitry
Edge heater and control circuitry
Manifold heater and control circuitry
Central heater and control circuitry
Sample block thermal cutoff test
Heated cover thermal cutoff test User diagnostics are also available to allow the user to perform a quick cool and heat ramp verification test, an extensive confirmation of the heating and cooling system. These diagnostics also allow the user to view the history file, which is a sequential record of events that occurred in the previous run. The records contain time, temperature, setpoint number, cycle number, program number and status messages.

Remote Diagnostics are available to allow control of the system from an external computer via the RS-232 port. Control is limited to the service diagnostics and instrument calibration only.

Calibration to determine various parameters such as heater resistance, etc. is performed. Access to the calibration screen is limited by a "hidden" key sequence (i.e. unknown to the customer). The following parameters are calibrated:

The configuration plug is a module that rewires the chiller unit, sample block heaters, coolant pump and power supplies for the proper voltage and frequency (100V/50 Hz, 100/60 Hz, 120/60 Hz, 220/50 Hz or 230/50 Hz). The user enters the type of configuration plug installed. The firmware uses this information to compute the equivalent resistance of the sample block heaters. Upon power-up, the system verifies that the configuration plug selected is consistent with the current line voltage and frequency.

The heater resistance must be determined in the calibration process so that precise calculations of heater power delivered can be made. The user enters the actual resistances of the six sample block heaters (two main heaters, two manifold heaters and two edge heaters). The configuration plug physically wires the heater in series for 220–230 VAC and in parallel for 100–120 VAC operation. The firmware computes the equivalent resistance of each of the three heaters by the following formula:

$$\text{For 100--120 VAC: } R_{eq}=(R_1 * R_2)/R_1+R_2 \qquad (7)$$

$$\text{For 220--230 VAC: } R_{eq}= R_1+R_2 \qquad (8)$$

The equivalent resistance is used to deliver a precise amount of heating power to the sample block (Power= Voltage$^2$×Resistance).

The calibration of the A/D circuit is necessary so that temperatures can be precisely measured. This is performed by measuring two test point voltages (TP6 and TP7 on the CPU board) and entering the measured voltages. The output of the A/D at each voltage forms the basis of a two point calibration curve. These voltages are derived from a 5 volt precision source and are accurate and temperature independent. At the start of each run, these voltages are read by the system to measure electronic drift due to temperature because any changes in A/D output is due to temperature dependencies in the analog chain (multiplexer, analog amplifier and A/D converter).

Calibration of the four temperature sensors (sample block, ambient, coolant and heated cover) is performed for accurate temperature measurements. Prior to installation into an instrument, the ambient, coolant, and heated cover temperature sensors are placed in a water bath where their output is recorded (XX.X° C. at YYYY mV). These values are then entered into the system. Since temperature accuracy in these areas is not critical, a one point calibration curve is used.

The sample block sensor is calibrated in the instrument. An array of 15 accurate temperature probes is strategically placed in the sample block in the preferred embodiment. The output of the temperature probes is collected and averaged by a computer. The firmware commands the block to go to 40° C. After a brief stabilizing period the user enters the average block temperature as read by the 15 probes. This procedure is repeated at 95° C. forming a two point calibration curve.

Calibration of the AC to DC line voltage sampling circuit is performed by entering into the system the output of the AC to DC circuit for two given AC input voltages, forming a two point calibration curve. The output of the circuit is not linear over the required range (90–260 VAC) and therefore requires two points at each end (100 and 120, 220 and 240 VAC), but only uses one set based on the current input voltage.

An accurate measure of AC voltage is necessary to deliver a precise amount of power to the sample block (Power= Voltage$^2$×Resistance). The Install program is a diagnostic tool that performs an extensive test of the cooling and heating systems. Install measures or calculates control cooling conductance, ramp cooling conductance at 10° C. and 18° C., cooling power at 10° C. and 20° C., sample block thermal and coolant capacity and sample block sensor lag. The purpose of install is three fold:

1. To uncover marginal or faulty components.

2. To use some of the measured values as system constants stored in battery backed up RAM to optimize the control system for a given instrument.

3. To measure heating and cooling system degradation over time.

Install is executed once before the system is shipped and should also be run before use or whenever a major component is replaced. The Install program may also be run by the user under the user diagnostics.

The heater ping test verifies that the heaters are properly configured for the current line voltage (i.e. in parallel for 90–132 VAC and in series for 208–264 VAC). The firmware supplies a burst of power to the sample block and then monitors the rise in temperature over a 10second time period. If the temperature rise is outside a specified ramp rate window, then the heaters are incorrectly wired for the current line voltage and the install process is terminated.

The control cooling conductance tests measures the thermal conductance $K_{cc}$ across the sample block to the control cooling passages. This test is performed by first driving the sample block temperature to 60° C. (ramp valves are closed), then integrating the heater power required to maintain the block at 60° C. over a 30 second time period. The integrated power is divided by the sum of the difference between the block and coolant temperature over the interval.

$$K_{cc} = \Sigma \text{ Heater Power}_{60° C}/\Sigma \text{ Block–Coolant Temp} \quad (9)$$

Typical values are 1.40 to 1.55 Watts/C. A low $K_{cc}$ may indicate a clogged liner(s). A high $K_{cc}$ may be due to a ramp valve that is not completely closed, leakage of the coolant to the outside diameter of the liner, or a liner that has shifted.

The block thermal capacity (Blk Cp) test measures the thermal capacity of the sample block by first controlling the block at 35° C. then applying the maximum power to the heaters for 20 seconds. The block thermal capacity is equal to the integrated power divided by the difference in block temperature. To increase accuracy, the effect of bias cooling power is subtracted from the integrated power.

$$\text{Blk Cp} = \text{ramp time} * (\text{heater–control cool pwr})/ \text{delta temp.} \quad (10)$$

where:
ramp time=20 seconds
heater power=500 watts
control cool=$(\Sigma \text{ block–coolant temp}) * K_{cc}$
delta temp=$\text{TBlock}_{t=20} - \text{TBlock}_{t=0}$ The typical value of Block Cp is 540 watt-seconds/°C.±30. Assuming a normal $K_{cc}$ value, an increase in block thermal capacity is due to an increase in thermal loads, such as moisture in the foam backing, loss of insulation around the sample block, or a decrease in heater power such as a failure of one of the six heater zones or a failure of the electronic circuitry that drives the heater zones, or an incorrect or an incorrectly wired voltage configuration module.

A chiller test measures the system cooling output in watts at 10° C. and 18° C. The system cooling power, or chiller output, at a given temperature is equal to the summation of thermal loads at that temperature. The main components are:
1. heating power required to maintain the block at a given temperature, 2. power dissipated by the pump used to circulate the coolant around the system, and 3. losses in the coolant lines to the ambient. The chiller power parameter is measured by controlling the coolant temperature at either 10° C. or 18° C. and integrating the power applied to the sample block to maintain a constant coolant temperature, over a 32 second interval. The difference between the block and coolant temperature is also integrated to compute losses to ambient temperature.

$$\text{Chiller power} = \Sigma \text{ Heating power} + \text{Pump power} + (\text{Kamb} * \Sigma ( \text{blk–cool temp})) \quad (11)$$

where:
heating power=Sum of heating power required to maintain coolant at 10° C. or 18° C. over time 32 seconds.
Pump Power=Circulating pump, 12 watts
Kamb=Conductance to ambient, 20 watts/°C.
blk–cool temp= Sum of difference in block and coolant temp over time 32 seconds The typical value for chiller power is 230 watts±40 at C. and 370 watts±30 at 18° C. Low chiller power may be due to an obstruction in the fan path, a defective fan, or a marginal or faulty chiller unit. It may also be due to a miswired voltage configuration plug.

A ramp cooling conductance ($K_c$) test measures the thermal conductance at 10° C. and 18° C. across the sample block to the ramp and control cooling passages. This test is performed by first controlling the coolant temperature at 10° C. or 18° C., then integrating, over a 30 second time interval, the heating power applied to maintain the coolant at the given temperature divided by the difference of block and coolant temperature over the time interval.

$$K_c = \Sigma \text{ Heating power}/\Sigma \text{ (block–coolant temperature)} \quad (12)$$

Typical values for $K_c$ are 28 watts/° C. ±3 at 10° C. and 31 watts/°C. ±3 at 18° C. A low $K_c$ may be due to a closed or obstructed ramp valve, kinked coolant tubing, weak pump or a hard water/Prestone™ mixture.

A sensor lag test measures the block sensor lag by first controlling the block temperature to 35° C. and then applying 500 watts of heater power for 2 seconds and measuring the time required for the block to rise 1° C. Typical values are 13 to 16 units, where each unit is equal to 200 ms. A slow or long sensor lag can be due to a poor interface between the sensor and the block, such as lack of thermal grease, a poorly machined sensor cavity or a faulty sensor.

The remaining install tests are currently executed by the install program but have limited diagnostic purposes due to the fact that they are calculated values or are a function of so many variables that their results do not determine the source of a problem accurately.

The install program calculates the slope of the ramp cooling conductance ($S_c$) between 18° C. and 10° C. It is a measure of the linearity of the conductance curve. It is also used to approximate the ramp cooling conductance at 0° C. Typical values are 0.40±0.2. The spread in values attest to the fact that it is just an approximation.

$$S_c = (Kc\_18° - Kc\_10°)/(18° C. - 10° C.) \quad (13)$$

The install program also calculates the cooling conductance $K_{c0}$. $K_{c0}$ is an approximation of the cooling conductance at 0° C. The value is extrapolated from the actual conductance at 10° C. Typical values are 23 watts/°C.±5. The formula used is:

$$K_{c0} = Kc\_10 - (Sc * 10° C.)$$

The install program also calculates coolant capacity (Cool Cp) which is an approximation of thermal capacity of the entire coolant stream (coolant, plumbing lines, heat exchanger, and valves). The cooling capacity is equal to components that pump heat into the coolant minus the components that remove heat from the coolant. The mechanics used to measure and calculate these components are complex and are described in detail in the source code description section. In this measurement, the coolant is allowed to stabilize at 10° C. Maximum heater power is applied to the sample block for a period of 128 seconds.

(15) Cool Cp = Heat Sources − Coolant sources
(16) Cool Cp = Heater Power + Pump Power + Kamb
  * (ΣTamb − ΣTcool)
  − Block Cp * (Tblock$_{t=0}$ − Tblock$_{t=128}$)
  − Average Chiller Power between Tcool$_{t=0}$ and Tcool$_{t=128}$ Characters enclosed in { } indicate the variable names used in the source code.

Heater-Ping Test Pseudocode:
The heater ping test verifies that the heaters are properly wired for the current line voltage.
Get the sample block and coolant to a known and stable point.
Turn ON the ramp cooling valves
Wait for the block and coolant to go below 5° C.
Turn OFF ramp cooling valves
Measure the cooling effect of control cooling by measuring the block temperature drop over a 10 second time interval. Wait 10 seconds for stabilization before taking any measurements.
Wait 10 seconds
temp1= block temperature
Wait 10 seconds
temp2= block temperature
{tempa}=temp2−temp1

Examine the variable {linevolts} which contains the actual measured line voltage. Pulse the heater with 75 watts for a line voltage greater than or equal to 190 V or with 300 watts if it less than or equal to 140 V.

```
if ({linevolts} >=190 Volts) then
    deliver 75 watts to heater
else if ({linevolts} <=140 volts) then
    deliver 300 watts to heater
else
    display an error message
```

Measure the temperature rise over a 10 second time period. The result is the average heat rate in 0.01°/second.
temp1=block temperature
Wait 10 seconds
temp2=block temperature {tempb}=temp2−temp1
Subtract the average heat rate {tempb} from the control cooling effect to calculate true heating rate $$\text{heat\_rate} = \{tempb\} - \{tempa\} \quad (17)$$

Evaluate the heat_rate. For 220 V–230 V, the heat rate should be less than 0.30°/second. For 100 V–120 V the heat rate should be greater than 0.30°/second.

```
if (linevoltage = 220 V and heat_rate > 0.30 °/second)
then
    Error → Heaters wired for 120 V
    Lock up keyboard
if (linevoltage = 120 V and heat_rate < 0.30 °/second)
then
    Error → Heaters wired for 220 V
    Lock up keyboard
```

KCC$_{13}$ Test Pseudocode:
This test measures the control cooling conductance also known as K$_{cc}$.
K$_{cc}$ is measured at a block temperature of 60° C.
Drive block to 60° C.
Maintain block temperature at 60° C. for 300 seconds
Integrate the power being applied to the sample block heaters over a 30 second time period. Measure and integrate the power required to maintain the block temperature with control cooling bias.

{dt_sum}        = 0 (delta temperature sum)
{main_pwr_sum}  = 0 (main heater power sum)
{aux_pwr_sum}   = 0 (auxiliary heater power sum)

```
for (count = 1 to 30)
{
    {dt_sum} = {dt_sum} + (block temperature − coolant
                            temperature)
    wait 1 sec
```

Accumulate the power applied to the main and auxiliary heaters. The actual code resides in the PID control task and is therefore summed every 200 ms.

```
    {main_pwr_sum} = {main_pwr_sum} + {actual_power}
    {aux_pwr_sum} = {aux_pwr_sum} + {aux1_actual} +
                    {aux2_actual}
}
```

Compute the conductance by dividing the power sum by the temperature sum. Note that the units are 10 mW/° C.

$$K_{cc} = (\{main\_pwr\_sum\} + \{aux\_pwr\_sum\}) / \{dt\_sum\} \quad (18)$$

BLOCK_CP Test Pseudocode:
This test measures the sample block thermal capacity.
Drive the block to 35° C.
Control block temperature at 35° C. for 5 seconds and record initial temperature.
initial_temp=block temperature
Deliver maximum power to heaters for 20 seconds while summing the difference in block to coolant temperature as well as heater power.

```
Deliver 500 watts
{dt_sum} = 0 for (count = 1 to 20 seconds)
{
    {dt_sum} = {dt_sum} + (block temperature − coolant
                            temperature)
    wait 1 second
}
(19) delta_temp = block temperature − initial_temp
```

Compute the joules in cooling power due to control cooling which occurs during ramp.

cool_joule=Control cooling conductance (K$_{cc}$)* {dt_sum}

Compute the total joules applied to the block from the main heater and control cooling. Divide by temp change over the interval to compute thermal capacity.

Block CP=ramptime*(heater power−cool_joule)/ delta_temp  (21)

where: ramptime=20 seconds
heater power=500 Watts

COOL_PWR_10:
This test measures the chiller power at 10° C.
Control the coolant temperature at 10° C. and stabilize for 120 secs.

```
count = 120
do while (count ! = 0)
{
```

-continued
```
if (coolant temperature = 10 ± 0.5° C.) then
    count = count − 1
else
    count = 120
wait 1 second
}
```

At this point, the coolant has been at 10° C. for 120 seconds and has stabilized. Integrate, over 32 seconds, the power being applied to maintain a coolant temperature of 10° C.

```
{cool_init}           = coolant temperature
{main_pwr_sum}    = 0
{aux_pwr_sum}     = 0
{delta_temp_sum}  = 0 for (count = 1 to 32)
    {
    Accumulate the power applied to the main and
    auxiliary heaters. The actual code resides in the
    control task.
    main_pwr_sum} = {main_pwr_sum} + actual_power
    {aux_pwr_sum} = {aux_pwr_sum} + aux1_actual +
                    aux2_actual delta_temp_sum = delta_temp_sum + (ambient temp −
                    coolant temp)
            wait 1 second
    }
```

Compute the number of joules of energy added to the coolant mass during the integration interval. "(coolant temp−cool_init)" is the change in coolant temp during the integration interval. 550 is the Cp of the coolant in joules, thus the product is in joules. It represents the extra heat added to the coolant which made it drift from setpoint during the integration interval. This error is subtracted below from the total heat applied before calculating the cooling power.

$$cool\_init = (coolant\ temp - cool\_init) * 550J \qquad (22)$$

Add the main power sum to the aux heater sum to get joules dissipated in 32 seconds. Divide by 32 to get the average joules/sec.

$$\{main\_pwr\_sum\} = (\{main\_pwr\_sum\} + \{aux\_pwr\_sum\} - cool\_init)/32 \qquad (23)$$

Compute the chiller power at 1° C. by summing all the chiller power components.

$$Power_{10°\ C.} = main\_power\_sum + PUMP\ PWR + (K\_AMB * delta\_temp\_sum) \qquad (24)$$

where:
{main_pwr_sum}=summation of heater power over interval
PUMP PWR=12 Watts, pump that circulates coolant
delta_temp_sum= summation of amb−coolant over interval
K_AMB=20 Watts/K, thermal conductance from cooling to ambient.

KC $_{10}$ Test Pseudocode:

This test measures the ramp cooling conductance at 10° C.
Control the coolant temperature at 10° C. ±0.5 and allow it to stabilize for 10 seconds.
At this point, the coolant is at setpoint and is being controlled. Integrate, over a 30 second time interval, the power being applied to the heaters to maintain the coolant at 10° C. Sum the difference between the block and coolant temperatures.

```
{main_pwr_sum}    = 0
{aux_pwr_sum}     = 0
{dt_sum}          = 0 for (count = 1 to 30)
    {
    Accumulate the power applied to the main and
    auxiliary heaters. The actual code resides in the
    PID control task.

{main_pwr_sum} = {main_pwr_sum} + actual_power
    {aux_pwr_sum} = {aux_pwr_sum} + aux1_actual +
                    aux2_actual {dt_sum} = {dt_sum} + (block temperature − coolant
    temp)
            wait 1 second
    }
```

Compute the energy in joules delivered to the block over the summation period. Units are in 0.1 watts.

$$\{main\_pwr\_sum\} = \{main\_pwr\_sum\} + \{aux\_pwr\_sum\} \qquad (25)$$

Divide the power sum by block−coolant temperature sum to get ramp cooling conductance in 100 mW/K.

$$Kc\_10 = \{main\_pwr\_sum\}/\{dt\_sum\} \qquad (26)$$

COOL_PWR_18 Test Pseudocode:

This test measures the chiller power at 18° C.
Get the sample block and coolant to a known and stable point. Control the coolant temperature at 18° C. and stabilize for 120 secs.

```
count = 120
do while (count != 0)
{
if (coolant temperature = 18° C. ± 0.5) then
    count = count − 1
else
    count = 120
wait 1 second
}
```

At this point the coolant has been at 18° C. for 120 seconds and has stabilized. Integrate, over 32 seconds, the power being applied to maintain a coolant temperature of 18° C.

```
{cool_init}           = coolant temperature
{main_pwr_sum}    = 0
{aux_pwr_sum}     = 0
{delta_temp_sum}  = 0 for (count = 1 to 32)
    {
    Accumulate the power applied to the main and
    auxiliary heaters. The actual code resides in the
    control task.

{main_pwr_sum} = {main_pwr_sum} + actual_power
    {aux_pwr_sum} = {aux_pwr_sum} + aux1_actual +
                    aux2_actual
```

-continued $$\text{delta\_temp\_sum} = \text{delta\_temp\_sum} + (\text{ambient temp} - \text{coolant temp})$$
wait 1 second
}

Compute the number of joules of energy added to the coolant mass during the integration interval. "(coolant temp–cool_init)" is the change in coolant temp during the integration interval. 550 is the Cp of the coolant in joules, thus the product is in joules. It represents the extra heat added to the coolant which made it drift setpoint during the integration interval. This error is subtracted below from the total heat applied before calculating the cooling power.

$$\text{cool\_init} = (\text{coolant temp} - \text{cool\_init}) * 550J \quad (27)$$

Add main power sum to aux heater sum to get joules dissipated in 32 seconds. Divide by 32 to get the average joules/sec.

$$\{\text{main\_pwr\_sum}\} = (\{\text{main\_pwr\_sum}\} + \{\text{aux\_pwr\_sum}\} - \text{cool\_init})/32 \quad (28)$$

Compute the chiller power at 18° C. by summing all the chiller power components.

$$\text{Power}_{18° C.} = \text{main\_power\_sum} + \text{PUMP PWR} + (K\_AMB * \text{delta\_temp\_sum}) \quad (29)$$

where:
{main_pwr_sum}=summation of heater power over interval
PUMP PWR=12 Watts, pump that circulates coolant
delta_temp_sum=summation of amb–coolant over interval
K_AMB=20 Watts/K, Thermal conductance from cooling to ambient.

KC_18 Test Pseudocode:
 This test measures the ramp cooling conductance at 18° C.
 Control the coolant temperature at 18° C.±0.5 and allow it to stabilize for 10 seconds.
 At this point, the coolant is at setpoint and being controlled. Integrate, over a 30 second time interval, the power being applied to the heaters to maintain the coolant at 18° C. Sum the difference between the block and coolant temperature.

```
{main_pwr_sum}   = 0
{aux_pwr_sum}    = 0
{dt_sum}         = 0 for (count = 1 to 30)
{
Accumulate the power applied to the main and
auxiliary heaters. The actual code resides in the
control task.

{main_pwr_sum} = {main_pwr_sum} + actual_power
{aux_pwr_sum} = {aux_pwr_sum} + aux1_actual +
                aux2_actual {dt_sum} = {dt_sum} + (block temperature – coolant
          temp)
wait 1 second
}
```

Compute the energy in joules delivered to the block over the summation period. Units are in 0.1 watts.

$$\{\text{main\_pwr\_sum}\} = \{\text{main\_pwr\_sum}\} + \{\text{aux\_pwr\_sum}\}$$

Divide power sum by block–coolant temperature sum to get ramp cooling conductance in 100 mW/K.

$$Kc\_18 = \{\text{main\_pwr\_sum}\}/\{\text{dt\_sum}\} \quad (31)$$

SENLAG Test Pseudocode:
 This test measures the sample block sensor lag.
 Drive the block to 35° C. Hold within ±0.2° C. for 20 seconds then record temperature of block.
 {tempa}=block temperature
 Deliver 500 watts of power to sample block.
 Apply 500 watts of power for the next 2 seconds and count the amount of iterations through the loop for the block temperature to increase 1° C. Each loop iteration executes every 200 ms, therefore actual sensor lag is equal to count * 200 ms.

```
secs    = 0 count   = 0 do while (TRUE)
{
if (secs >= 2 seconds) then
   shut heaters off
if (block temperature – tempa > 1.0° C.) then
   exit while loop
count = count + 1
}
end do while
sensor lag = count
```

Coolant CP Test Pseudocode:
 This test computes the coolant capacity of the entire system.
 Stabilize the coolant temperature at 10° C.±0.5.
 Send message to the PID control task to ramp the coolant temperature from its current value (about 10° C.) to 18° C.
 Wait for the coolant to cross 12° C. so that the coolant CP ramp always starts at the same temperature and has clearly started ramping. Note the initial ambient and block temperatures.

```
do while (coolant temperature < 12° C.)
{
wait 1 second
}

{blk_delta}    = block temperature

{h2o_delta}    = coolant temperature
```

For the next two minutes, while the coolant temperature is ramping to 18° C., sum the coolant temperature and the difference between the ambient and coolant temperatures.

```
{temp_sum}   = 0

{cool_sum}   = 0 for (count 1 to 128 seconds)
{
(32)  {cool_sum} = cool_temp_sum + coolant
       temperature.
(33)  {temp_sum} = ambient – coolant temperature
      wait 1 second
      count = count + 1
}
```

Calculate the change in temperatures over the two minute period.

$$\{\text{blk\_delta}\} = \text{block temperature} - \{\text{blk\_delta}\} \quad (34)$$

$$\{h2o\_delta\} = \text{coolant temperature} - \{h2o\_delta\} \quad (35)$$

Compute KChill, i.e., the rate of change of chiller power with coolant temperature over the coolant range of 10° C. to 20° C. Note that units are in watts/10° C.

$$Kchill = (\text{Chiller Pwr} @ 18° C. - \text{Chiller Pwr} @ 10° C.) \quad (36)$$

Compute Sc which is the slope of the ramp cooling conductivity versus the temperature range of 18° C. to 10° C. The units are in watts/10° C./10° C.

$$Sc = (Kc\_18 - Kc\_10)/8 \quad (37)$$

Compute $Kc\_0$, the ramp cooling conductance extrapolated to 0°C.

$$Kc\_0 = Kc\_10 - (Sc*10) \quad (38)$$

Compute Cp_Cool, the Cp of the coolant by:

$$(39) \quad Cp\_Cool = (\ \text{HEATPOWER} * 128 + \text{PUMP\_PWR} * 128$$
$$- \text{Power} @ 0° C. * 128$$
$$- \text{Block\_Cp} * blk\_delta$$
$$+ K\_AMB * temp\_sum$$
$$- Kchill \quad * cool\_temp\_sum) /$$
$$h2o\_delta$$

where:
HEATPOWER=500 W, the heater power applied to warm the block, thus heating the coolant. It is multiplied by 128, as the heating interval was 128 secs.

$PUMP_{PWR}$=12 W, the power of the pump that circulates the coolant multiplied by 128 seconds.

Pwr_0° C.=The chiller power at 0° C. multiplied by 128 seconds.

Block_Cp=Thermal capacity of sample block.

blk_delta = Change in block temp over the heating interval.

K_AMB=20 Watts/K, thermal conductance from cooling to ambient.

temp_sum=The sum once per second of ambient-coolant temperature over the interval.

h2o_delta=Change in coolant temperature over interval of heating (approximately 6° C.).

Kchill=Slope of chiller power versus coolant temp.

cool_sum=The sum of coolant temp, once per second, over the heating interval.

REAL TIME OPERATING SYSTEM-CRETIN

CRETIN is a stand alone, multitasking kernel that provides system services to other software modules called tasks. Tasks are written in the "C" language with some time critical areas written in Intel 8085 assembler. Each task has a priority level and provides an independent function. CRETIN resides in low memory and runs after the startup diagnostics have successfully been executed.

CRETIN handles the task scheduling and allows only one task to run at a time. CRETIN receives all hardware interrupts thus enabling waiting tasks to run when the proper interrupt is received. CRETIN provides a real time clock to allow tasks to wait for timed events or pause for known intervals. CRETIN also provides intertask communication through a system of message nodes.

The firmware is composed of nine tasks which are briefly described in priority order below. Subsequent sections will describe each task in greater detail.

1. The control task (PID) is responsible for controlling the sample block temperature.

2. The keyboard task is responsible for processing keyboard input from the keypad.

3. The timer task waits for a half second hardware interrupt, then sends a wake up message to both the sequence and the display task.

4. The sequence task executes the user programs.

5. The pause task handles programmed and keypad pauses when a program is running.

6. The display task updates the display in real time.

7. The printer task handles the RS-232 port communication and printing.

8. The LED task is responsible for driving the heating LED. It is also used to control the coolant temperature while executing Install.

9. The link task starts files that are linked together in a method by simulating a keystroke.

Block Temperature Control Program (PID Task)

The Proportional Integral Differential (PID) task is responsible for controlling the absolute sample block temperature to 0.1° C., as well as controlling the sample block temperature non-uniformity (TNU, defined as the temperature of the hottest well minus the temperature of the coldest well) to less than ± 0.5° C. by applying more heating power to the perimeter of the block to compensate for losses through the guard band edges. The PID task is also responsible for controlling the temperature of the heated cover to a less accurate degree. This task runs 5 times per second and has the highest priority.

The amount of heating or cooling power delivered to the sample block is derived from the difference or "error" between the user specified sample temperature stored in memory, called the setpoint, and the current calculated sample temperature. This scheme follows the standard loop control practice. In addition to a power contribution to the film heaters directly proportional to the current error, i.e., the proportional component, (setpoint temperature minus sample block temperature), the calculated power also incorporates an integral term that serves to close out any static error (Setpoint temperature-Block temperature less than 0.5° C.). This component is called the integral component. To avoid integral term accumulation or "wind-up", contributions to the integral are restricted to a small band around the setpoint temperature. The proportional and integral component gains have been carefully selected and tested, as the time constants associated with the block sensor and sample tube severely restrict the system's phase margin, thus creating a potential for loop instabilities. The proportional term gain is P in Equation (46) below and the integral term gain is Ki in Equation (48) below.

The PID task uses a "controlled overshoot algorithm" where the block temperature often overshoots its final steady state value in order for the sample temperature to arrive at its desired temperature as rapidly as possible. The use of the overshoot algorithm causes the block temperature to overshoot in a controlled manner but does not cause the sample temperature to overshoot. This saves power and is believed to be new in PCR instrumentation.

The total power delivered to all heater of the sample block to achieve a desired ramp rate is given by:

$$\text{Power} = (CP/\text{ramp\_rate}) + \text{bias} \quad (40)$$

where:
CP=Thermal mass of block
bias=bias or control cooling power
ramp_rate=$T_{final}-T_{initial}$/desired ramp rate This power is clamped to a maximum of 500 watts of heating power for safety.

With every iteration of the task (every 200 ms) the system applies heating or ramp cooling power (if necessary) based on the following algorithms.

The control system is driven by the calculated sample temperature. The sample temperature is defined as the average temperature of the liquid in a thin walled plastic sample tube placed in one of the wells of the sample block (hereafter the "block"). The time constant of the system (sample tube and its contents) is a function of the tube type and volume. At the start of a run, the user enters the tube type and the amount of reaction volume. The system computes a resultant time constant ($\tau$ or tau). For the MicroAmp™ tube and 100 microliters of reaction volume, tau is approximately 9 seconds.

$$T_{blk-new}=T_{blk}+\text{Power}*(200 \text{ ms}/CP) \quad (41)$$

$$T_{samp-new}=T_{samp}+(T_{blk-new}-T_{samp})*200 \text{ ms/tau} \quad (42)$$

where:
$T_{blk-new}$=Current block temperature
$T_{blk}$=Block temperature 200 ms ago
Power=Power applied to block
CP= Thermal mass of block
$T_{samp-new}$=Current sample temperature
$T_{samp}$=Sample temperature 200 ms ago
tau=Thermal Time Constant of sample tube, adjusted for sensor lag (approximately 1.5)

The error signal or temperature is simply:

$$\text{error}=\text{Setpoint}-T_{samp-new} \quad (43)$$

As in any closed loop system, a corrective action (heating or cooling power) is applied to close out part of the current error. In Equation (45) below, F is the fraction of the error signal to be closed out in one sample period (200 mS).

$$T_{samp-new}T_{samp}+F*(SP-T_{samp}) \quad (44)$$

where SP= the user setpoint temperature

Due to the large lag in the system (long tube time constant), the fraction F is set low.
Combining formulas (42) and (44) yields:

$$T_{samp-new}=T_{samp}+(T_{blk-new}-T_{samp})*0.2/\text{tau}=T_{samp}+F*(SP-T_{samp}) (45)$$

Combining formulas (41) and (45) and adding a term P (the proportional term gain) to limit block temperature oscillations and improve system stability yields:

$$\text{Pwr}=CP*P/T*((SP-T_{samp})*F*\text{tau}/T+T_{samp}-T_{blk}) \quad (46)$$

where
p=the proportional term gain and
T=the sample period of 0.2 seconds (200 msec). and
P/T=1 in the preferred embodiment Equation (46) is a theoretical equation which gives the power (Pwr) needed to move the block temperature to some desired value without accounting for losses to the ambient through the guardbands, etc.

Once the power needed to drive the block is determined via Equation (46), this power is divided up into the power to be delivered to each of the three heater zones by the areas of these zones. Then the losses to the manifolds are determined and a power term having a magnitude sufficient to compensate for these losses is added to the amount of power to be delivered to the manifold heater zone. Likewise, another power term sufficient to compensate for power lost to the block support pins, the block temperature sensor and the ambient is added to the power to be delivered to the edge heater zones. These additional terms and the division of power by the area of the zones convert Equation (46) to Equations (3), (4) and (5) given above.

Equation (46) is the formula used by the preferred embodiment of the control system to determine the required heating or cooling power to the sample block.

When the computed sample temperature is within the "integral band", i.e., ±0.5° C. around the target temperature (SP), the gain of the proportional term is too small to close out the remaining error. Therefore an integral term is added to the proportional term to close out small errors. The integral term is disabled outside the integral band to prevent a large error signal from accumulating. The algorithm inside the "integral band" is as follows:

$$\text{Int\_sum (new)}=\text{Int\_sum (old)}+(SP-T_{samp}) \quad (47)$$

$$\text{pwr\_adj}=\text{ki}*\text{Int\_sum (new)} \quad (48)$$

where,
Int_sum=the sum of the sample period of the difference between the SP and $T_{SAMP}$ temperature, and
Ki= the integral gain (512) in the preferred embodiment).

Once a heating power has been calculated, the control software distributes the power to the three film heater zones 254, 262 and 256 in FIG. 13 based on area in the preferred embodiment. The edge heaters receive additional power based upon the difference between the block temperature and ambient temperature. Similarly, the manifold heaters receive additional power based upon the difference between the block temperature and the coolant temperature.

Characters enclosed in {} in the pseudocode given below for the PID task correspond to the variable names used in the source code of Microfiche Appendix C.

PID Pseudocode

Upon System Power up or Reset
Initialize PID variables
Read the line frequency
Initialize PIT and system clock
Turn off ramp cooling
Turn off all heaters
Calculate heater resistances
Do Forever-executes every 200 ms
If (block temperature>105) then
Turn off heaters
Turn on ramp valves
Display error message
    Read the line voltage {linevolts}
    Read the coolant sensor and convert to temperature {h2otemp}
    Read the ambient sensor and convert to temperature {ambtemp}
    Read the heated cover sensor and convert to temperature {cvrtemp}
    Read the sample block sensor and convert to temperature {blktemp}.

This portion of the code also reads the temperature stable voltage reference and compares the voltage to a reference voltage that was determined during calibration of the instrument. If there is any discrepancy, the electronics have drifted and the voltage readings from the temperature sensors are adjusted accordingly to obtain accurate temperature readings. Compute the sample temperature {tubetenths} or the temperature that gets displayed by using a low-pass digital filter.

$$\text{tubetenths} = TT_{n-1} + (TB_n - TT_{n-1}) * T/\tau \qquad (49)$$

where $TT_{n-1}$=last sample temp {tubetenths}
$TB_n$= current block sensor temp {blktenths}
T=sample interval in seconds =200ms
tau=tau tube {cf_tau}-tau sensor {cf_lag}

Equation (49) represents the first terms of a Taylor series expansion of the exponential that defines the calculated sample temperature given as Equation (6) above.

Compute the temperature of the foam backing underneath the sample block, {phantenths} known as the phantom mass. The temperature of the phantom mass is used to adjust the power delivered to the block to account for heat flow in and out of the phantom mass. The temperature is computed by using a low pass digital filter implemented in software.

$$\text{phantenths} = TT_{n-1} + (TB_n - TT_{n-1}) * T/\tau \qquad (50)$$

where $TT_{n-1}$=Last phantom mass temp {phantenths}
$TB_n$=Current block sensor temp {blktenths}
T=Sample interval in seconds =200 ms
$\tau_{foam}$=Tau of foam block=30 secs.

Compute the sample temperature error (the difference between the sample temperature and the setpoint temperature) {abs_tube_err}.

Determine ramp direction {fast_ramp}=UP_RAMP or DN_RAMP

If (sample temperature is within ERR of setpoint (SP)) then
PID not in fast transition mode. {fast_ramp}=OFF where ERR=the temperature width of the "integral band", i.e., the error band surrounding the target or setpoint temperature.

Calculate current control cooling power {cool_ctrl} to determine how much heat is being lost to the bias cooling channels.

Calculate current ramp cooling power {cool_ramp}

Calculate {cool_brkpt}. {cool_brkpt} is a cooling power that is used to determine when to make a transition from ramp to control cooling on downward ramps. It is a function of block and coolant temperature.

The control cooling power {cool_ctrl} and the ramp cooling power {cool_ramp} are all factors which the CPU must know to control downward temperature ramps, i.e., to calculate how long to keep the ramp cooling solenoid operated valves open. The control cooling power is equal to a constant plus the temperature of the coolant times the thermal conductance from the block to the bias cooling channels. Likewise, the ramp cooling power is equal to the difference between the block temperature and the coolant temperature times the thermal conductance from the block to the ramp cooling channels. The cooling breakpoint is equal to a constant (given in Microfiche Appendix C) times the difference in temperature between the block and the coolant.

Calculate a heating or cooling power {int_pwr} needed to move the block temperature from its current temperature to the desired setpoint (SP) temperature.

$$\{int\_pwr\} = KP*CP*[(SP-T_{SAMP})*\{cf\_kd\} + Ts - T_{BLK}] \qquad (51)$$

where:

KP=Proportional gain=P/T in Equation (46)= approximately one in the preferred embodiment
CP=Thermal mass of block
SP=Temperature setpoint
$T_{SAMP}$=Sample temperature
$T_{BLK}$=Block temperature
cf_kd=Tau*$K_d$/Delta_t where tau is the same tau as used in Equation (49) and $K_d$ is a constant given in Microfiche Appendix C and Delta_t is the 200 msec sample period.

If (sample temperature is within {cf_iband} of setpoint) then integrate sample error {i_sum}
else
(52)         clear {i_sum = 0}.

Calculate the integral term power.

$$\text{integral term} = \{i\_sum\} * \text{constant } \{cf\_term\}. \qquad (53)$$

Add the integral term to the power.

$$\{int\_pwr\} = \{int\_pwr\} + \text{integral term} \qquad (54)$$

Adjust power to compensate for heating load due to the effects of the phantom mass (foam backing) by first finding the phantom mass power then adding it to power {int_pwr}.

Calculate phantom mass power {phant_pwr} by:

$$\text{phant\_pwr} = C*(\text{blktenths} - \text{phantenths})/10 \qquad (55)$$

where: C=thermal mass of foam backing (1.0 W/K) Adjust heater power $$\{int\_pwr\} = \{int\_pwr\} + \{phant\_pwr\}$$

Compute power needed in manifold heaters {aux1_power{ which will compensate for loss from the sample block into the manifold edges that have coolant flowing through it. Note that if the system is in a downward ramp, {aux1_power}=0.

The manifold zone power required is described below:

$$\{aux1\_power\} = K1*(T_{BLK} - T_{AMB}) + K2*(T_{BLK} - T_{COOL}) + K5*(dT/dt)$$

where:
K1=Coefficient {cf_1coeff}
K2=Coefficient {cf_2coeff}
K5=Coefficient {cf_5coeff}
dT/dt=Ramp rate
$T_{BLK}$=Block temperature
$T_{AMB}$=Ambient temperature
$T_{COOL}$=Coolant temperature Compute power needed in edge heaters {aux2_power} which will compensate for losses from the edges of the sample block to ambient. Note that if we are in a downward ramp {aux2_power}=0. The edge zone power required is described below:

$$\{aux2\_power\} = K3*(T_{BLK} - T_{AMB}) + K4*(T_{BLK} - T_{COOL}) + K6*(dT/dt)$$

where:
K3=Coefficient {cf_3coeff}
K4=Coefficient {cf_4coeff}
K6=Coefficient {cf_6coeff} dT/dt=Ramp rate
$T_{BLK}$=Block temperature
$T_{AMB}$=Ambient temperature
$T_{COOL}$=Coolant temperature Delete contribution of manifold {aux1_power} and edge heater power {aux2_power} to obtain total power that must be supplied by main heaters and coolers.

$$\{int\_pwr\}=\{int\_pwr\}-\{aux1\_power\}-\{aux2\_power\} \quad (59)$$

Decide if the ramp cooling should be applied. Note that {cool_brkpt} is used as a breakpoint from ramp cooling to control cooling.

If (int_pwr<-cool_brkpt and performing downward ramp) to decide whether block temperature is so much higher than the setpoint temperature that ramp cooling is needed then Turn ON ramp valves else Turn OFF ramp valves and depend upon bias cooling At this point, {int_pwr} contains the total heater power and {aux1_power} and {aux2_power} contain the loss from the block out to the edges. The power supplied to the auxiliary heaters is composed of two components: aux_power and int_power. The power is distributed {int_pwr} to the main and auxiliary heaters based on area.

total_pwr=int_pwr int_pwr=total_pwr*66% aux1_power=total_pwr*20%+aux1_power aux2_power=total_pwr*14%+aux2_power

Compute the number of half cycles for the triac to conduct for each end zone and each iteration of the control loop to send the appropriate amount of power to the heaters. This loop executes once every ⅕ second, therefore there are $^{120}\!/_5$=24 half cycles at 60 Hz or $^{100}\!/_5$=20 at 50Hz. The number of half cycles is a function of requested power {int_pwr}, the current line voltage {linevolts} and the heater resistance. Since the exact power needed may not be delivered each loop, a remainder is calculated {delta_power} to keep track of what to include from the last loop.

$$int\_pwr=int\_pwr+delta\_power \quad (60)$$

Calculate the number of ½ cycles to keep the triac on. Index is equal to the number of cycles to keep the triac on.

$$index=power*main\ heater\ ohms*[20\ or\ 24]/linevolts\ squared$$

where Equation (61) is performed once for each heater zone and where "power"=int_*pwr for the main heater zone, aux1_pwr for the manifold heater zone and aux2_pwr for the edge heater zone. (61)

Calculate the amount of actual power delivered.

$$actual\_power=linevolts\ squared*index/main\ heater\ resistance \quad (62)$$

Calculate the remainder to be added next time.

$$delta\_power=int\_pwr-actual\_power \quad (63)$$

Calculate the number of ½ cycles for the edge and manifold heaters using the same technique described for the main heaters by substituting {aux1_pwr} and {aux2_pwr} into Equation (60).

Load the calculated counts into the counters that control the main, manifold and edge triacs.

Look at heated cover sensor. If heated cover is less than 100° C., then load heated cover counter to supply 50 watts of power.

Look at sample temperature If it is greater than 50° C., turn on HOT LED to warn user not to touch block. END OF FOREVER LOOP

Keyboard Task

The purpose of the keyboard task is to wait for the user to press a key on the keypad, compare the key to a list of valid keystrokes for the current state, execute the command function associated with the valid key and change to a new state. Invalid keystrokes are indicated with a beep and then ignored. This task is the heart of the state driven user interface. It is "state driven" because the action taken depends on the current state of the user interface.

Keyboard Task Pseudocode:

Initialize keyboard task variables.
Turn off the cursor.
If (install flag not set) then Run the install program.
Send a message to pid task to turn on the heated cover.
If (the power failed while the user was running a program) then Compute and display the number of minutes the power was off for.
Write a power failure status record to the history file.
Send a message to the sequence task to start a 4° C. soak.
Give the user the option of reviewing the history file.
If (the user request to review the history file) then Go to the history file display.
Display the top level screen.
Do Forever
Send a message to the system that this task is waiting for a hardware interrupt from the keypad.
Go to sleep until this interrupt is received.
When awakened, read and decode the key from the keypad.
Get a list of the valid keys for the current state.
Compare the key to the list of valid keys.
If (the key is valid for this state) then Get the "action" and next state information for this key.
Execute the "action" (a command function) for this state.
Go to the next state.
Else
Beep the beeper for an invalid key.
End of Forever Loop

Timer Task Overview

The purpose of the timer task is to wake up the sequence and the real time display task every half a second. The timer task asks the system (CRETIN) to wake it up whenever the half second hardware interrupt that is generated by the clock/calendar device is received. The timer task then in turn sends 2 wake up messages to the sequence task and the real time display task respectively. This intermediate task is necessary since CRETIN will only service one task per interrupt and thus only the higher priority task (the sequence task) would execute.

Timer Task Pseudocode:

Do Forever
Send a message to the system that this task is waiting for a hardware interrupt from the clock/calendar device.
Go to sleep until this interrupt is received.
When awakened, send a message to the sequence and to the real time display task.
End Forever Loop

Sequence Task Overview

The purpose of the sequence task is to execute the contents of a user defined program. It sequentially steps through each setpoint in a cycle, consisting of a ramp and a hold segment, and sends out setpoint temperature messages to the pid task which in turn controls the temperature of the sample block. At the end of each segment, it sends a message to the real time display task to switch the display and a message to the printer task to print the segment's runtime information. The user can pause a running program by pressing the PAUSE key on the keypad then resume the program by pressing the START key. The user can prematurely abort a program by pressing the STOP key. This task executes every half a second when it is awakened by the timer task.

Sequence Task Pseudocode:

Do Forever
Initialize sequence task variables.
Wait for a message from the keyboard task that the user has pressed the START key or selected START from the menu or a message from link task that the next program in a method is ready to run. Go to sleep until this message is received. When awakened, update the ADC calibration readings to account for any drift in the analog circuitry.
If (not starting the 4° C. power failure soak sequence) then
Send a message to the printer task to print the PE title line, system time and date, program configuration parameters, the program type and its number.
If (starting a HOLD program) then
Get the temperature to hold at {hold_tp}.
Get the number of seconds to hold for {hold_time}.
If (ramping down more than 3° C. and {hold_tp}>45° C.) then Post an intermediate setpoint.
Else
Post the final setpoint {hold_tp}. While (counting down the hold time {hold_time{})
Wait for half second wake up message from timer task.
Check block sensor for open or short.
If (keyboard task detected a PAUSE key) then Post a setpoint of current sample temp.
Send a message to wake up the pause task.
Go to sleep until awakened by the pause task.
Post pre-pause setpoint.
If (an intermediate setpoint was posted) then Post the final setpoint.
If (the setpoint temp is below ambient temp and will be there for more than 4 min.) then
Set a flag to tell pid task to turn off the heated cover.
Increment the half second hold time counter {store_time}.
Post the final setpoint again in case the hold time expired before the intermediate setpoint was reached-this insures the correct setpoint will be written the history file. Write a data record to the history file. Send a message to the printer task to print the HOLD info. End of HOLD program
Else if (starting a CYCLE program) then
Add up the total number of seconds in a cycle {secs_in_run}, taking into account the instrument ramp time and the user programmed ramp and hold times.
Get the total number of seconds in the program by multiplying the number of seconds in a cycle by the number of cycles in a program {num_cyc}.
Total {secs_in_run}={secs_in_run}per cycle*{num_cyc}.
While (counting down the number of cycles {num_cyc})
While (counting down the number of setpoints {num_seg})
Get the ramp time {ramp_time}.
Get the final setpoint temp {t_final}.
Get the hold time {local_time}.
Send a message to the real time display task to display the ramp segment information.
If (the user programmed a ramp time) then Compute the error {ramp_err} between the programmed ramp time and the actual ramp time as follows. This equation is based on empirical data.

$$\{ramp\_err\} = prog\ ramp\_rate * 15 + 0.5 (up\ ramp)$$

$$\{ramp\_err\} = prog\ ramp\_rate * 6 + 1.0 (down\ ramp)$$

where:
prog ramp_rate=(abs($T_f - T_c$)−1)/{ramp_time}
$T_f$=setpoint temp {t_final}
$T_c$=current block temp {blktemp}
abs=absolute value of the expression
Note: the '−1' is there because the clock starts within 1° C. of setpoint.
new ramp_time=old{ramp_time}−{ramp_err}
If (new ramp_time>old {ramp_time}) then new ramp_time=old {ramp_time}.
Else new ramp_time=0.
While (sample temp is not within a user configured temp {cf_clk_dev} of setpoint) Wait for half second wake up message from timer task. Post a new ramp setpoint every second.
Else if (ramping down more than 3° C. and {t_final}> 45° C.) then
Post an intermediate setpoint.
While (sample temp is not within a user configured temp {cf_clk_dev} of setpoint) Wait for half second wake up message from, timer task. Increment the half second ramp time counter. Check block sensor for open or short. If (keyboard task detected a PAUSE key) then
Post a setpoint of current sample temp.
Send a message to wake up the pause task.
Go to sleep until awakened by the pause task.
Post pre-pause setpoint.
Post the final setpoint.
While (sample temp is not within a user configured temp {cf_clk_dev} of setpoint) Wait for half second wake up message from timer task.
Increment the half second ramp time counter.
Check block sensor for open or short.
If (keyboard task detected a PAUSE key) then Post a setpoint of current sample temp.
Send a message to wake up the pause task.
Go to sleep until awakened by the pause task.
Post pre-pause setpoint.
Send a message to the printer task to print the ramp information.
Beep beeper to signal end of ramp segment.
Send a message to the real time display task to display the hold segment information.
While (counting down the hold time)
Wait for half second wake up message from timer task.
Increment the half second hold time counter.
Check block sensor for open or short.
If (keyboard task detected a PAUSE key) then
Post a setpoint of current sample temp.
Send a message to wake up the pause task.
Go to sleep until awakened by the pause task.
Post pre-pause setpoint.
Write a data record to the history file.
Send a message to the printer task to print the hold information.
If (the final setpoint temp has drifted more than the user configurable amount {cf_temp_dev}) then
Write an error record to the history file.

Check for a programmed pause and execute if necessary.
  Go to next segment.
Send a message to the printer task to print an end of cycle
  message.
  Go to next cycle. End of CYCLE program.
  Else if (starting an AUTO-CYCLE program) then Add up
the total number of seconds in each program {secs_in_run}
taking into account the instrument ramp time and the user
programmed hold times and temperatures which can be
automatically incremented or decremented by a pro-
grammed amount each cycle. While (counting down the
number of cycles {num_cyc})
While (counting down the number of setpoints {num_seg})
  Get the final setpoint temp {t_final}. Get the hold
  time{time_hold}.
  Check if the user programmed an auto increment or
decrement of the setpoint temp and/or the hold time and
adjust them accordingly. If (the auto increment or decrement
of the temp causes the setpoint to go below 0° C. or above
99.9° C.) then An error record is written to the history file.
  The setpoint is capped at either 0° C. or 99.9° C. If (the
auto decrement of the hold time causes the hold time to go
below 0 seconds) then An error record is written to the
history file.
  The hold time is capped at 0° C. Send a message to real
time display task to display the ramp segment information.
If (ramping down more than 3° C. and {t_final}>45° C.)
then Post an intermediate setpoint.
While (sample temp is not within a user configured temp
  {cf_clk_dev} of setpoint) Wait for half second wake up
  message from timer task. Increment the half second ramp
  time counter. Check block sensor for open or short. If
  (keyboard task detected a PAUSE key) then Post a set-
  point of current sample temp. Send a message to wake up
  the pause task. Go to sleep until awakened by the pause
  task. Post pre-pause setpoint. Post the final setpoint.
  While (sample temp is not within a user configured temp
{cf_clk_dev} of setpoint) Wait for half second wake up
message from timer task. Increment the half second ramp
time counter. Check block sensor for open or short.
If (keyboard task detected a PAUSE key) then Post a
  setpoint of current sample temp. Send a message to wake
  up the pause task. Go to sleep until awakened by the pause
  task. Post pre-pause setpoint.
  Send a message to the printer task to print the ramp
segment information. Beep beeper to signal end of ramp
portion of segment. Send a message to the real time display
task to display the hold segment information. While (count-
ing down the hold time) Wait for half second wake up
message from timer task.
Increment the half second hold time counter. Check block
  sensor for open or short. If (keyboard task detected a
  PAUSE key) then Post a setpoint of current sample temp.
  Send a message to wake up the pause task. Go to sleep
  until awakened by the pause task. Post pre-pause setpoint.
  Write a data record to the history file. Send a message to
the printer task to print the hold information. If (the final
setpoint temp has drifted more than the user configurable
amount {cf_temp_dev}) then
  Write an error recored to the history file.
  Go to next segment.
  Send a message to the printer task to print an end of cycle
message.
  Go to next cycle.
End of AUTO-CYCLE program.
Else if (starting a POWER FAILURE sequence) then
  Post a setpoint of 4° C.

Set a flag {subamb_hold} so that the pid task will shut off
the heated cover.
  DO FOREVER
  Wait for a half second wake up message from the timer
task.
  Increment the half second hold time counter.
  END FOREVER LOOP
End of power failure sequence
Write a run end status record to the history file.
If (running a method)
  Set a flag {weird_flag} so the link task will know to send
  a message to the sequence task to start the next program
  running.
Else
  Return user interface to idle state display.
End of Forever Loop
Pause Task Overview
  The purpose of the pause task is to handle either a pause
that the user programs in a CYCLE program or a pause when
the user presses the PAUSE key on the keypad.
  When the sequence task encounters a programmed pause
while executing a CYCLE program, it goes to sleep and
awakens the pause task. The pause task in turn sends a
message to the real time display task to continually display
and decrement the time the user asked to pause for. When the
pause timer times out, the pause task sends a message to
awaken the sequence task and then goes to sleep. The user
can prematurely resume the program by pressing the START
key on the keypad cr can prematurely abort the program by
pressing the STOP key.
  When the keyboard task detects a PAUSE key while a
program is running, it sets a flag {pause_flag} then waits for
the sequence task to acknowledge it. When the sequence
task sees this flag set, it sends an acknowledgment message
back to the keyboard task then puts itself to sleep. When the
keyboard task receives this message, it awakens the pause
task. The pause task sends a message to the real time display
task to continually display and increment the amount of time
the program is paused for. The timer will time out when it
reaches the pause time limit set by the user in the configu-
ration section. The user can resume the program by pressing
the START key on the keypad or abort the program by
pressing the STOP key.
Pause Task Pseudocode:
Do Forever
  Wait for a message from the keyboard task indicating a
keypad pause, or a message form the sequence task indicat-
ing a user programmed pause.
  Go to sleep until a message is received.
  When awakened, check a flag for the type of pause
initiated.
If (it is a programmed pause) then
  Send a message to the real time display task to display the
pause timer counting up.
Else
  Send a message to the real time display task to display the
pause timer counting down.
While (counting down the time out counter)
  Send a message to the system to suspend this task for half
a second.
  Send a message to the printer task to print the pause
information.
If (it is a programmed pause) then
  Write a status record to the history file.
  The pause has timed out so send a message to the wake
up the sequence task.
  Send a message to the real time display task to halt the
pause display.

Send a message to the real time display task to resume the running program display.
Else (it is a keypad pause)
The pause has timed out and the program must be aborted so send a message to the system to halt the sequence task and send it back to the top of its FOREVER loop.
If (the program running was a HOLD program)
Send a message to the printer task to print the hold information.
Write a status record to the history file.
Return the user interface to its idle state.
Display an abort message.
End of Forever Loop
Display Task Overview
The purpose of the real time display task is to display temperatures, timers, sensor readings, ADC channel readings, and other parameters that need to be continually updated every half second.
Display Task Pseudocode:
Initialize display task variables.
Do Forever
Wait for a message every half second from the timer task.
Go to sleep until the message is received.
When awakened, check if another task has sent a list of parameters to display or a flag to halt the current update.
Toggle the half second flag {half_sec}.
If (there's a list of parameters to display) then
Set a semaphore so no one else will update the display.
Turn off the cursor.
While (stepping through the list of parameters)
If (it is a time parameter) then
Display the time.
If (half second flag {half_sec} is set) then
Increment or decrement the time variable.
Else if (it is a decimal number) then
Display a decimal number.
Else if (it is an integer number) then
Display the integer.
Else if (it is an ADC channel readout) then
Read the counts from the ADC channel.
If (need it displayed as mV) then
Convert counts to mV.
Display the value.
Else if (it is a power display) then
Display the power in terms of watts.
Else if (it is the hours left parameter) then
Convert seconds to tenths of hours.
Display the hours left in tenths of hours.
If (half second flag {half_sec} is set) then
Decrement the seconds variable.
If (the cursor was on) then
Turn it back on.
Store the current system time in battery RAM.
Clear the semaphore to release the display.
End of Forever Loop
Printer Task Overview
The purpose of the printer task is to handle the runtime printing. It is a low priority task and should not interfere with other time critical tasks.
Printer Task Pseudocode:
Do Forever
Wait for a message from another task that wishes to print.
Go to sleep until a message is received.
When awaken, make local copies of the global variables to be printed.
Post a printer acknowledgement message.
If (need to print a status or error message) then
Print the information contained in the current history record.
Else if (need to print the page header) then
Print the company name, instrument ID, firmware version number and the current system time and date.
Else if (need to print the program header) then
Print the type of program and its number.
Else if (need to print the program configuration parameters) then
Print the tube type, reaction volume and the sample temperature deviation from setpoint that starts the clock.
Else if (need to print end of cycle information) then
Print the ending time and temperature.
Else if (need to print segment information) then
Print either the ramp or hold segment information.
Else if (need to print a pause status message) then
Print the amount of time paused for and at what temp.
End of Forever Loop
LED Task Overview
The purpose of the LED task is to make the illumination of the "Heating" LED reflect the power applied to the main heater. This is a low priority task that runs once a second.
LED Task Pseudocode:
Initialize LED task variables.
Do Forever
Send a message to the system to wake this task every second.
Go to sleep.
When awaken, load counter 2 of PIC timer A with a value that reflects the power applied to the main heater as follows:
load counter with value={K_htled}*{ht_led}
Where:
{K_htled} holds a constant to compute the time to pulse the heating LED and is equal to 15200/500. 15200 is a little greater than the PIC's clock of 14.4 KHz and this is the value loaded into the timer to keep the LED constantly on. 500 is the main heater power.
{ht_led} will be a value between 0 and 500 and will be equal to the watts applied to the main heater.
End of Forever Loop
Link Task Overview
The purpose of the link task is to simulate the user pressing the START key on the keypad. This task is necessary so that programs can be executed one right after the other (as in a method) without user intervention. The link task wakes up the sequence task and it begins running the next program as if the START key were pressed.
Link Task Pseudocode:
Initialize link task variables.
Do Forever
If (the flag {weird_flag} is set and it is not the first file in the method) then
Send a message to the sequence task to wake up and run a program.
End of Forever Loop Start Up Sequence

POWER-UP SEQUENCE

When the power to the instrument is turned on or the software does a RESET, the following sequence takes place. Note: the numbers below correspond to numbers on the flow chart in FIGS. 53 and 54.

1. Transmit a Ctrl-G (decimal 7) character out the RS-232 printer port. Poll the RS-232 port for at least 1 second and if a Ctrl-G is received, it is assumed that an external computer is attached to the port and all communication during the power-up sequence will be redirected from the keypad to the RS-232 port. If no Ctrl-G is received, the power-up sequence continues as normal.

2. Check if the MORE key is depressed. If so, go straight to the service-only hardware diagnostics.
3. The next 3 tests are an audio/visual check and cannot report an error: 1) the beeper beeps 2) the hot, cooling, and heating LEDs on the keypad are flashed 3) each pixel of the display is highlighted. The copyright and instrument ID screens are displayed as the power-up diagnostics execute.
4. Should an error occur in one of the power-up diagnostics, the name of the component that failed is displayed and the keypad is locked except for the code 'MORE 999' which will gain access to the service-only hardware diagnostics.
5. Check channel 0 of the PPI-B device to see if the automated test bit is pulled low. If it is, run the UART test. If the test passes, beep the beeper continuously.
6. Start the CRETIN operating system which in turn will start up each task by priority level.
7. Check a flag in battery RAM to see if the instrument has been calibrated. If not, display an error message and lock the keypad except for the code 'MORE 999' which will gain access to the service-only calibration tests.
8. Run a test that measures the voltage and line frequency and see if both these values match the configuration plug selected while calibrating the instrument. If not, display an error message and lock the keypad except for the code 'MORE 999' which will gain access to the service-only calibration tests.
9. Perform the heater ping test as described in the Install section. If the heaters are wired wrong, display an error message and lock the keypad except for the code 'MORE 999' which will gain access to the service-only calibration tests.
10. Check a flag in battery RAM to see if the instrument has been installed. If not, display an error message and lock the keypad except for the code 'MORE 999' which will gain access to the install routine.
11. If not in remote mode, check a flag in battery RAM to see if there was a power failure while the instrument was running. If so, start a 4° C. soak and display the amount of time the power was off for. Ask the user if they wish to view the history file which will tell them exactly how far along they were in the run when the power went off. If they select yes, they go straight to the user diagnostics.
12. Beep the beeper and clear the remote mode flag so all communication now is back through the keypad.
13. Check a flag in battery RAM to see if manufacturing wants their test program automatically started. If so, start the program running and reset the instrument after its done.
14. Display the top level user interface screen.

Electronics and Software Version 2

Referring to FIGS. 47A and 47B (hereafter FIG. 47), there is shown a block diagram for the electronics of a preferred embodiment of a control system in a class of control systems represented by CPU block 10 in FIG. 1. The purpose of the control electronics of FIG. 47 is, inter alia, to receive and store user input data defining the desired PCR protocol, read the various temperature sensors, calculate the sample temperature, compare the calculated sample temperature to the desired temperature as defined by the user defined PCR protocol, monitor the power line voltage and control the film heater zones and the ramp cooling valves to carry out the desired temperature profile of the user defined PCR protocol.

A microprocessor (hereafter CPU) 450 executes the control program described below and given in Microfiche Appendix F in source code form. In the preferred embodiment, the CPU 450 is an OKI CMOS 8085. The CPU drives an address bus 452 by which various ones of the other circuit elements in FIG. 47 are addressed. The CPU also drives a data bus 454 by which data is transmitted to various of the other circuit elements in FIG. 47.

The control program of Microfiche Appendix F and some system constants are stored in EPROM 456. User entered data and other system constants and characteristics measured during the install process (install program execution described below) are stored in battery backed up RAM 458. A system clock/calendar 460 supplies the CPU 450 with date and time information for purposes of recording a history of events during PCR runs and the duration of power failures as described below in the description of the control software.

An address decoder 462 receives and decodes addresses from the address bus 452 and activates the appropriate chip select lines on a chip select bus 464.

The user enters PCR protocol data via a keyboard 466 in response to information displayed by CPU on display 468. The two way communication between the user and the CPU 450 is described in more detail below in the user interface section of the description of the control software. A keyboard interface circuit 470 converts user keystrokes to data which is read by the CPU via the data bus 454.

Two programmable interval timers 472 and 474 each contain counters which are loaded with counts calculated by the CPU 450 to control the intervals during which power is applied to the various film heater zones.

An interrupt controller 476 sends interrupt requests to the CPU 450 every 200 milliseconds causing the CPU 450 to run the PID task described below in the description of the control software. This task reads the temperature sensors and calculates the heating or cooling power necessary to move the sample temperature from its current level to the level desired by the user for that point in time in the PCR protocol being executed.

A UART 478 services an RS232 interface circuit 480 such that data stored in the RAM 480 may be output to a printer. The control software maintains a record of each PCR run which is performed with respect to the actual temperatures which existed at various times during the run for purposes of user validation that the PCR protocol actually executed corresponded to the PCR protocol desired by the user. In addition, user entered data defining the specific times and temperatures desired during a particular PCR protocol is also stored. All this data and other data as well may be read by the CPU 450 and output to a printer coupled to the RS232 port via the UART 478. The RS232 interface also allows an external computer to simulate the keypad and display.

A programmable peripheral interface (hereafter PPI) 482 serves as a programmable set of 3 input/output registers. At power-up, the CPU 450 selects the PPI 482 via the address decoder 462 and the chip select bus 464. The CPU then writes a data word to the PPI via data bus 454 to program the PPI 482 regarding which registers are to be output ports and which are to be input ports. Subsequently, the CPU 450 uses the output registers to store data words written therein by the CPU via the data bus 454 to control the internal logic state of a programmable array logic chip (PAL) 484.

The PAL 484 is a state machine which has a plurality of input signals and a plurality of output signals. PAL's in general contain an array of logic which has a number of different states. Each state is defined by the array or vector of logic states at the inputs and each state results in a different array or vector of logic states on the outputs. The CPU 450, PPI 482, PAL 484 and several other circuits to be defined below cooperate to generate different states of the various output signals from the PAL 484. These different states and associated output signals are what control the operation of the electronics shown in FIG. 47 as will be described below.

A 12 bit analog-to-digital converter (A/D) 486 converts analog voltages on lines 488 and 490 to digital signals on data bus 454. These are read by the CPU by generating an address for the A/D converter such that a chip select signal on bus 464 coupled to the chip select input of the A/D converter goes active and activates the converter. The analog signals on lines 488 and 490 are the output lines of two multiplexers 492 and 494. Multiplexer 492 has four inputs ports, each having two signal lines. Each of these ports is coupled to one of the four temperature sensors in the system. The first port is coupled to the sample block temperature sensor. The second and third ports are coupled to the coolant and ambient temperature sensors, respectively and the fourth port is coupled to the heated cover temperature sensor. A typical circuit for each one of these temperature sensors is shown in FIG. 48. A 20,000 ohm resistor 496 receives at a node 497 a regulated +15 volt regulated power supply 498 in FIG. 47 via a bus connection line which is not shown. This +15 volts D.C. signal reverse biases a zener diode 500. The reverse bias current and the voltage drop across the zener diode are functions of the temperature. The voltage drop across the diode is input to the multiplexer 292 via lines 502 and 504. Each temperature sensor has a similar connection to the multiplexer 292.

Multiplexer 494 also has 4 input ports but only three are connected. The first input port is coupled to a calibration voltage generator 506. This voltage generator outputs two precisely controlled voltage levels to the multiplexer inputs and is very thermally stable. That is, the reference voltage output by voltage source 506 drifts very little if at all with temperature. This voltage is read from time to time by the CPU 450 and compared to a stored constant which represents the level this reference voltage had at a known temperature as measured during execution of the install process described below. If the reference voltage has drifted from the level measured and stored during the install process, the CPU 450 knows that the other electronic circuitry used for sensing the various temperatures and line voltages has also drifted and adjusts their outputs accordingly to maintain very accurate control over the temperature measuring process.

The other input to the multiplexer 494 is coupled via line 510 to an RMS-to-DC converter circuit 512. This circuit has an input 514 coupled to a step-down transformer 516 and receives an A.C. voltage at input 514 which is proportional to the then existing line voltage at A.C. power input 518. The RMS-to-DC converter 512 rectifies the A.C. voltage and averages it to develop a D.C. voltage on line 510 which also is proportional to the A.C. input voltage on line 518.

Four optically coupled triac drivers 530, 532, 534 and 536 receive input control signals via control bus 538 from PAL logic 484. Each of the triac drivers 530, 532 and 534 controls power to one of the three film heater zones. These heater zones are represented by blocks 254, 260/262 and 256/258 (the same reference numerals used in FIG. 13). The triac driver 536 controls power to the heated cover, represented by block 544 via a thermal cut-out switch 546. The heater zones of the film heater are protected by a block thermal cutout switch 548. The purpose of the thermal cutout switches is to prevent meltdown of the film heater/sample block on the heated cover in case of a failure leading to the triac drivers being left on for an unsafe interval. If such an event happens, the thermal cut-out switches detect an overly hot condition, and shut down the triacs via signals on lines 552 or 554.

The main heater zone of the film heater is rated at 360 watts while the manifold and edge heater zones are rated at 180 watts and 170 watts respectively. The triac drivers are Motorola MAC 15A10 15 amp triacs. Each heater zone is split into 2 electrically isolated sections each dissipating ½ the power. The 2 halves are connected in parallel for line voltages at 518 less than 150 volts RMS. For line voltages greater than this, the two halves are connected in series. These alternate connections are accomplished through a "personality" plug 550.

The AC power supply for the film heater zones is line 559, and the AC supply for the heated cover is via line 560.

A zero crossing detector 566 provides basic system timing by emitting a pulse on line 568 at each zero crossing of the AC power on line 518. The zero crossing detector is a National LM 311N referenced to analog ground and has 25 mV of hysteresis. The zero crossing detector takes its input from transformer 516 which outputs A.C. signal from 0 to 5.52 volts for an A.C. input signal of from 0 to 240 volts A.C.

A power transformer 570 supplies A.C. power to the pump 41 that pumps coolant through the ramp and bias cooling channels. The refrigeration unit 40 also receives its A.C. power from the transformer 570 via another portion of the personality plug 550. The transformer 550 also supplies power to three regulated power supplies 572, 498 and 574 and one unregulated power supply 576.

For accuracy purposes in measuring the temperatures, the calibration voltage generator 506 uses a series of very precise, thin-film, ultralow temperature drift 20K ohm resistors (not shown in FIG. 47 but shown as resistors RA1 in the schematics of Microfiche Appendix E). These same ultralow drift resistors are used to set the gain of an analog amplifier 578 which amplifies the output voltage from the selected temperature sensor prior to conversion to a digital value. These resistors drift only 5 ppm/C°.

All the temperature sensors are calibrated by placing them (separated from the structures whose temperatures they measure) first in a stable, stirred-oil, temperature controlled bath at 40° C. and measuring the actual output voltages at the inputs to the multiplexer 492. The temperature sensors are then placed in a bath at a temperature of 95° C. and their output voltages are again measured at the same points. The output voltage of the calibration voltage generator 506 is also measured at the input of the multiplexer 494. For each temperature, the digital output difference from the A/D converter 486 between each of the temperature sensor outputs and the digital output that results from the voltage generated by the calibration voltage generator 506 is measured. The calibration constants for each temperature sensor to calibrate each for changes in temperature may then be calculated.

The sample block temperature sensor is then subjected to a further calibration procedure. This procedure involves driving the sample block to two different temperatures. At each temperature level, the actual temperature of the block in 16 different sample wells is measured using 16 RTD thermocouple probes accurate to within 0.02° C. An average profile for the temperature of the block is then generated and the output of the A/D converter 464 is measured with the block temperature sensor in its place in the sample block. This is done at both temperature levels. From the actual block temperature as measured by the RTD probes and the A/D output for the block temperature sensor, a further calibration factor can be calculated. The temperature calibration factors so generated are stored in battery backed up RAM 458. Once these calibration factors are determined for the system, it is important that the system not drift appreciably from the electrical characteristics that existed at the time of calibration. It is important therefore that low drift circuits be selected and that ultralow drift resistors be used. The selections made for the analog components for an exemplary embodiment are given in Microfiche Appendix E.

The manner in which the CPU 450 controls the sample block temperature can be best understood by reference to the section below describing the control program. However, to illustrate how the electronic circuitry of FIG. 47 cooperates with the control software to carry out a PCR protocol consider the following.

The zero crossing detector 566 has two outputs in output bus 568. One of these outputs emits a negative going pulse for every positive going transition of the A.C. signal across the zero voltage reference. The other emits a negative pulse upon every negative-going transition of the A.C. signal across the zero reference voltage level. These two pulses, shown typically at 580 define one complete cycle or two half cycles. It is the pulse trains on bus 568 which define the 200 millisecond sample periods. For 60 cycle/sec A.C. as found in the U.S., 200 milliseconds contains 24 half cycles.

A typical sample period is shown in FIG. 49. Each "tick" mark in FIG. 49 represents one half cycle. During each 200 msec sample period, the CPU 450 is calculating the amount of heating or cooling power needed to maintain the sample block temperature at a user defined setpoint or incubation temperature or to move the block temperature to a new temperature depending upon where in the PCR protocol time line the particular sample period lies. The amount of power needed in each film heater zone is converted into a number of half cycles each heater zone is to remain off during the next 200 msec sample period. Just before the end of the current sample period in which these calculations are made, the CPU 450 addresses each of the 4 timers in the programmable interval timer (PIT) 472. To each timer, the CPU writes data constituting a "present" count representing the number of hafl cycles the heater zone associated with that timer is to remain off in the next sample period. In FIG. 49, this data is written to the timers during interval 590 just preceding the starting time 592 of teh next sample period. Assume that a rapid ramp up to the denaturation temperature of 94° C. is called for by the user setpoint data for an interval which includes the sample interval between times 592 and 594. Accordingly, the film heaters will be on for most of the period. Assume that the central zone heater is to be on for all but three of the half cycles during the sample period. In this case, the CPU 450 writes a three into the counter in PIT 472 associated with the central zone heater during interval 590. This write operation automatically causes the timer to issue a "shut off" signal on the particular control line of bus 592 which controls the central zone heater. This "shut off" signal couaes the PAL 484 to issue a "shut off" signal on the particular one of the signal lines in bus 538 associated with the central zone. The triac driver 530 then shuts off at the next zero crossing, i.e., at time 592. The PIT receives a pulse train of positive-going pulses on line 594 from the PAL 484. These pulses are translations of the zero-crossing pulses on 2-line bus 568 by PAL 484 into positive going pulses at all zero crossing pulses on 2-line bus 568 by PAL 484 into positive going pulses at all zero crossings on a single line, i.e., line 594. The timer in PIT 472 associated with the central film heater zone starts counting down from its present count of 3 using the half cycle marking pulses on line 594 as its clock. At the end of the third half cycle, this timer reaches 0 and causes its output signal line on bus 592 to change states. This transition from the off to one state is shown at 596 in FIG. 49. This transition is communicated to PAL 484 and causes it to change the state of the appropriate output signal on bus 538 to switch the triac driver 530 on at the third zero-crossing. Note that by switching the triacs on at the zero crossings as is done in the preferred embodiment, switching off of a high current flowing through an inductor (the film heater conductor) is avoided. This minimizes the generation of radio frequency interference or other noise. Note that the technique of switching a portion of each half cycle to the film heater in accordance with the calculated amount of power needed will also work as an alternative embodiment, but is not preferred because of the noise generated by this technique.

The other timers of PIT 472 and 474 work in a similar manner to manage the power applied to the other heater zones and to the heated cover in accordance with power calculated by the CPU.

Ramp cooling is controlled by CPU 450 directly through the peripheral interface 482. When the heating/cooling power calculations performed during each sample period indicate that ramp cooling power is needed, the CPU 450 addresses the programmable peripheral interface (PPI) 482. A data word is then written into the appropriate register to drive output line 600 high. This output line triggers a pair of monostable multivibrators 602 and 604 and causes each to emit a single pulse, on lines 606 and 608, respectively. These pulses each have peak currents just under 1 ampere and a pulse duration of approximately 100 milliseconds. The purpose of these pulses is to drive the solenoid valve coils that control flow through the ramp cooling channels very hard to turn on ramp cooling flow quickly. The pulse on line 606 causes a driver 610 to ground a line 612 coupled to one side of the solenoid coil 614 of one of the solenoid operated valves. The other terminal of the coil 614 is coupled to a power supply "rail" 616 at +24 volts DC from power supply 576. The one shot 602 controls the ramp cooling solenoid operated valve for flow in one direction, and the one shot 604 controls the solenoid operated valve for flow in the opposite direction.

Simultaneously, the activation of the RCOOL signal on line 600 causes a driver 618 to be activated. This driver grounds the line 612 through a current limiting resistor 620. The value of this current limiting resistor is such that the current flowing through line 622 is at least equal to the hold current necessary to keep the solenoid valve 614 open. Solenoid coils have transient characteristics that require large currents to turn on a solenoid operated valve but substantially less current to keep the valve open. When the 100 msec pulse on line 606 subsides, the driver 612 ceases directly grounding the line 612 leaving only the ground connection through the resistor 620 and driver 618 for holding current.

The solenoid valve 614 controls the flow of ramp cooling coolant through the sample block in only ½ the ramp cooling tubes, i.e., the tubes carrying the coolant in one direction through the sample block. Another solenoid operated valve 624 controls the coolant flow of coolant through the sample block in the opposite direction. This valve 624 is driven in exactly the same way as solenoid operated valve 614 by drivers 626 and 628, one shot 604 and line 608.

The need for ramp cooling is evaluated once every sample period. When the PID task of the control software determines from measuring the block temperature and comparing it to the desired block temperature that ramp cooling is no longer needed, the RCOOL signal on line 600 is deactivated. This is done by the CPU 450 by addressing the PIC 482 and writing data to it which reverses the state of the appropriate bit in the register in PIC 482 which is coupled to line 600.

The logic equations for PAL 484 are attached hereto as Microfiche Appendix D. The logic equations for the address decoder 462, which is also programmable array logic, are also attached hereto is Microfiche Appendix D.

The PIT 474 also has two other timers therein which time a 20 Hz interrupt and a heating LED which gives a visible indication when the sample block is hot and unsafe to touch.

The system also includes a beeper one shot 630 and a beeper 632 to warn the user when an incorrect keystroke has been made.

The programmable interrupt controller 476 is used to detect 6 interrupts; Level 2–20 Hz; Level 3 - Transmit Ready; Level 4 - Receive ready; Level 5 - Keyboard interrupt; Level 6 - 2 Hz signal for the display and sequence task; and, Level 7 - A.C. line zero cross.

The programmable peripheral interface 482 has four outputs (not shown) for controlling the multiplexers 492 and 494. These signals MUX1 EN and MUX2 EN enable one or the other of the two multiplexers 492 and 494 while the signals MUX 0 and MUX 1 control which channel is selected for input to the amplifier 578. These signals are managed so that only one channel from the two multiplexers can be selected at any one time.

An RLTRIG* signal resets a timeout one shot 632 for the heaters which disables the heaters via activation of the signal TIMEOUT EN* to the PAL 484 if the CPU crashes. That is, the one shot 632 has a predetermined interval which it will wait after each reset before it activates the signal TIMEOUT EN* which disables all the heater zones. The CPU 450 executes a routine periodically which addresses the PIC 482 and writes data to the appropriate register to cause activation of a signal on line 634 to reset the one shot 632. If the CPU 450 "crashes" for any reason and does not execute this routine, the timeout one-shot 632 disables all the heater zones.

The PIC 482 also has outputs COVHTR EN* and BLKHTREN* (not shown) for enabling the heated cover and the sample block heater. Both of these signals are active low and are controlled by the CPU 450. They are output to the PAL 484 via bus 636.

The PIC 482 also outputs the signals BEEP and BEEPCLR* on bus 640 to control the beeper one shot 630.

The PIC 482 also outputs a signal MEM1 (not shown) which is used to switch pages between the high address section of EPROM 456 and the low address section of battery RAM 458. Two other signals PAGE SEL 0 and PAGE SEL 1 (not shown) are output to select between four 16K pages in EPROM 456.

The four temperature sensors are National LM 135 zener diode type sensors with a zener voltage/temperature dependence of 10 mV/°K. The zener diodes are driven from the regulated power supply 498 through the 20K resistor 496. The current through the zeners varies from approximately 560 μA to 615 μA over the 0° C. to 100° C. operating range.

The zener self heating varies from 1.68 mW to 2.10 mW over the same range.

The multiplexers 492 and 494 are DG409 analog switches. The voltages on lines 488 and 490 are amplified by an AD625KN instrumentation amplifier with a transfer function of $V_{OUT}=3*V_{IN}-7.5$. The A/D converter 486 is an AD7672 with an input range from 0–5 volts. With the zener temperature sensor output from 2.73 to 3.73 volts over the 0° C. to 100° C. range, the output of the amplifier 578 will be 0.69 volts to 3.69 volts, which is comfortably within the A/D input range.

The keys to highly accurate system performance are good accuracy and low drift with changes in ambient temperature. Both of these goals are achieved by using a precision voltage reference source, i.e., calibration voltage generator 506, and continuously monitoring its output through the same chain of electronics as are used to monitor the outputs of the temperature sensors and the AC line voltage on line 510.

The calibration voltage generator 506 outputs two precision voltages on lines 650 and 652. One voltage is 3.75 volts and the other is 3.125 volts. These voltages are obtained by dividing down a regulated supply voltage using a string of ultralow drift, integrated, thin film resistors with a 0.05% match between resistors and a 5 ppm/degree C. temperature drift coefficient between resistors. The calibration voltage generator also generates −5 volts for the A/D converter reference voltage and −7.5 volts for the instrumentation amplifier offset. These two voltages are communicated to the A/D 486 and the amplifier 578 by lines which are not shown. These two negative voltages are generated using the same thin film resistor network and OP 27 GZ op-amps (not shown). The gain setting resistors for the operational amplifier 578 are also the ultralow drift, thin-film, integrated, matched resistors.

The control firmware, control electronics and the block design are designed such that well-to-well and instrument-to-instrument transportability of PCR protocols is possible.

High throughput laboratories benefit from instruments which are easy to use for a wide spectrum of lab personnel and which require a minimal amount of training. The software for the invention was developed to handle complex PCR thermocycling protocols while remaining easy to program. In addition, it is provided with safeguards to assure the integrity of samples during power interruptions, and can document the detailed events of each run in safe memory.

After completing power-up self-checks shown in FIGS. 53 and 54, to assure the operator that the system is operating properly, the user interface of the invention offers a simple, top-level menu, inviting the user to run, create or edit a file, or to access a utility function. No programming skills are required, since preexisting default files can be quickly edited with customized times and temperatures, then stored in memory for later use. A file protection scheme prevents unauthorized changes to any user's programs. A file normally consists of a set of instructions to hold a desired temperature or to thermocycle. Complex programs are created by linking files together to form a method. A commonly used file, such as a 4° C. incubation following a thermocycle, can be stored and then incorporated into methods created by other users. A new type of file, the AUTO file is a PCR cycling program which allows the user to specify which of several types of changes to control parameters will occur each cycle: time incrementing (auto segment extension, for yield enhancement), time decrementing, or temperature incrementing or decrementing. For the highest degree of control precision and most reliable methods transferability, temperatures are setable to 0.1° C., and times are programmed to the nearest second. The invention has the ability to program a scheduled PAUSE at one or more setpoints during a run for reagent additions or for removal of tubes at specific cycles.

The system of the invention has the ability to store a 500 record history file for each run. This feature allows the user to review the individual steps in each cycle and to flag any special status or error messages relating to irregularities. With the optional printer, the invention provides hardcopy documentation of file and method parameters, run-time time/temperature data with a time/date stamp, configuration parameters, and sorted file directories.

In order to assure reproducible thermocycling, the computed sample temperature is displayed during the ramp and hold segments of each cycle. A temperature one degree different than the set temperature is normally used to trigger the ramp-time and hold-time clocks, but this can be altered by the user. For some tube types, the invention will provide the proper time constant for the type of tube and volume used (a capability is provided for users to enter time constants in a table for other tube types, so subsequently only the tube type would have to be entered before a run), so the sample will always approach the desired sample temperature with the same accuracy, regardless of whether long or short sample incubation times have been programmed. Users can program slow ramps for the specialized annealing requirements of degenerate primer pools, or very short (1–5 sec) high-temperature denaturation periods for very GC rich targets. Intelligent defaults are preprogrammed for 2- and 3-temperature PCR cycles.

Diagnostic tests can be accessed by any users to check the heating and cooling system status and to verify the calibration, since the software gives Pass/Fail reports. In addition, a system performance program performs a comprehensive subsystem evaluation and generates a summary status report.

The control firmware is comprised of several sections which are listed below:
—Diagnostics
—Calibration
—Install
—Real time operating system
—Nine prioritized tasks that manage the system
—Start-up sequence
—User interface The various sections of the firmware will be described with either textual description, pseudocode or both. The actual source code in C language is included below as Microfiche Appendix F.

Features of the firmware are:

1. A Control system that manages the average sample block temperature to within ±0.1° C. as well as maintaining the temperature non-uniformity as between wells in the sample block to within ±0.5° C.

2. A temperature control system that measures and compensates for line voltage fluctuations and electronic temperature drift.

3. Extensive power up diagnostics that determine if system components are working.

4. Comprehensive diagnostics in the install program which qualify the heating and cooling systems to insure they are working properly.

5. A logical and organized user interface, employing a menu driven system that allows instrument operation with minimal dependency on the operators manual.

6. The ability to link up to 17 PCR protocols and store them as a method.

7. The ability to store up to 150 PCR protocols and methods in the user interface.

8. A history file that records up to 500 events of the previous run as part of the sequence task.

9. The ability to define the reaction volume and tube size type at the start of a run for maximum temperature accuracy and control as part of the user interface and which modifies tau (the tube time constant) in the PID task.

10. Upon recovery from a power failure, the system drives the sample block to 4° C. to save any samples that may be loaded in the sample compartment. The analyzer also reports the duration of the power failure as part of the start-up sequence.

11. The ability to print history file contents, "run time" parameters and stored PCR protocol parameters as part of the print task.

12. The ability to configure the temperature to which the apparatus will return during any idle state.

13. The ability to check that the setpoint temperature is reached within a reasonable amount of time.

14. The ability to control the instrument remotely via an RS232 port.

There are several levels of diagnostics which are described below:

A series of power-up tests are automatically performed each time the instrument is turned on. They evaluate critical areas of the hardware without user intervention. Any test that detects a component failure will be run again. If the test fails twice, an error message is displayed and the keyboard is electronically locked to prevent the user from continuing.

The following areas are tested:
Programmable Peripheral Interface device
Battery RAM device
Battery RAM checksum
EPROM devices
Programmable Interface Timer devices
Clock/Calendar device
Programmable Interrupt Controller device
Analog to Digital section
Temperature sensors
Verify proper configuration plug A Series of service only diagnostics are available to final testers at the manufacturer's location or to field service engineers through a "hidden" keystroke sequence (i.e. unknown to the customer). Many of the tests are the same as the ones in the start up diagnostics with the exception that they can be continually executed up to 99 times.

The following areas are tested:
Programmable Peripheral Interface device
Battery RAM device
Battery RAM checksum
EPROM devices
Programmable Interface Timer devices
Clock/Calendar device
Programmable Interrupt Controller device
Analog to Digital section
RS-232 section
Display section
Keyboard
Beeper
Ramp Cooling Valves
Check for EPROM mismatch
Firmware version level
Battery RAM Checksum and Initialization
Clear Calibration Flag
Heated Cover heater and control circuitry
Edge heater and control circuitry Manifold heater and control circuitry
Central heater and control circuitry
Sample block thermal cutoff test
Heated cover thermal cutoff test User diagnostics are also available to allow the user to perform a quick cool and heat ramp verification test, an extensive confirmation of the heating and cooling system and to verify sample block calibration. These diagnostics also allow the user to view the history file, which is a sequential record of events that occurred in the previous run. The records contain time, temperature, setpoint number, cycle number, program number and status messages.

Remote Diagnostics are available to allow control of the system from an external computer via the RS-232 port. All user functions and service diagnostics and instrument calibration can be performed remotely.

Calibration to determine various parameters such as heater resistance, etc. is performed. Access to the calibration screen is limited by a "hidden" key sequence (i.e. unknown to the customer). The following parameters are calibrated:

The configuration plug is a module that rewires the chiller unit, sample block heaters, coolant pump and power supplies for the proper voltage and frequency (100 V/50 Hz, 100/60 Hz, 120/60 Hz, 220/50 Hz or 230/50 Hz). The user enters the type of configuration plug installed. The firmware uses this information to compute the equivalent resistance of the sample block heaters. Upon power-up, the system verifies that the configuration plug selected is consistent with the current line voltage and frequency.

The heater resistance must be determined in the calibration process so that precise calculations of heater power delivered can be made. The user enters the actual resistances of the six sample block heaters (two main heaters, two manifold heaters and two edge heaters). The configuration plug physically wires the heater in series for 220–230 VAC and in parallel for 100–120 VAC operation. The firmware computes the equivalent resistance of each of the three heaters by the following formula:

For 100–120 VAC: $R_{eq}=(R_1*R_2)/R_1+R_2$ (7)

For 220–230 VAC: $R_{eq}=R_1+R_2$ (8)

The equivalent resistance is used to deliver a precise amount of heating power to the sample block (Power=Voltage$^2$×Resistance).

The calibration of the A/D circuit is necessary so that temperatures can be precisely measured. This is performed by measuring two test point voltages (TP6 and TP7 on the CPU board) and entering the measured voltages. The output of the A/D at each voltage forms the basis of a two point calibration curve. These voltages are derived from a 5 volt precision source and are accurate and temperature independent. At the start of each run, these voltages are read by the system to measure electronic drift due to temperature because any changes in A/D output is due to temperature dependencies in the analog chain (multiplexer, analog amplifier and A/D converter).

Calibration of the four temperature sensors (sample block, ambient, coolant and heated cover) is performed for accurate temperature measurements. Prior to installation into an instrument, the ambient, coolant, and heated cover temperature sensors are placed in a water bath where their output is recorded (XX.X °C. at YYYY mV). These values are then entered into the system. Since temperature accuracy in these areas is not critical, a one point calibration curve is used.

The sample block sensor is calibrated in the instrument. An array of 15 accurate temperature probes is strategically placed in the sample block in the preferred embodiment. The output of the temperature probes is collected and averaged by a computer. The firmware commands the block to go to 40° C. After a brief stabilizing period the user enters the average block temperature as read by the 15 probes. This procedure is repeated at 95° C., forming a two point calibration curve.

Calibration of the AC to DC line voltage sampling circuit is performed by entering into the system the output of the AC to DC circuit for two given AC input voltages, forming a two point calibration curve. The output of the circuit is not linear over the required range (90–260 VAC) and therefore requires two points at each end (100 and 120, 220 and 240 VAC), but only uses one set based on the current input voltage.

An accurate measure of AC voltage is necessary to deliver a precise amount of power to the sample block (Power=Voltage$^2$×Resistance). The Install program is a diagnostic tool that performs an extensive test of the cooling and heating systems. Install measures or calculates control cooling conductance, ramp cooling conductance at 10° C. and 18° C., cooling power at 10° C. and 20° C., sample block thermal and coolant capacity and sample block sensor lag. The purpose of install is three fold:

1. To uncover marginal or faulty components.
2. To use some of the measured values as system constants stored in battery backed up RAM to optimize the control system for a given instrument.
3. To measure heating and cooling system degradation over time.

Install is executed once before the system is shipped and should also be run before use or whenever a major component is replaced. The Install program may also be run by the user under the user diagnostics.

The heater ping test verifies that the heaters are properly configured for the current line voltage (i.e. in parallel for 90–132 VAC and in series for 208–264 VAC). The firmware supplies a burst of power to the sample block and then monitors the rise in temperature over a 10 second time period. If the temperature rise is outside a specified ramp rate window, then the heaters are incorrectly wired for the current line voltage and the install process is terminated.

The control cooling conductance tests measures the thermal conductance $K_{cc}$ across the sample block to the control cooling passages. This test is performed by first driving the sample block temperature to 60° C. (ramp valves are closed), then integrating the heater power required to maintain the block at 60° C. over a 90 second time period. The integrated power is divided by the sum of the difference between the block and coolant temperature over the interval.

$$K_{cc}=\Sigma \text{ Heater Power}_{60° C}/\Sigma \text{ Block–Coolant Temp} \quad (9)$$

Typical values are 1.31 to 1.78 Watts/°K. A low $K_{cc}$ may indicate a clogged liner(s). A high $K_{cc}$ may be due to a ramp valve that is not completely closed, leakage of the coolant to the outside diameter of the liner, or a liner that has shifted.

The block thermal capacity (Blk Cp) test measures the thermal capacity of the sample block by first controlling the block at 35° C. then applying the maximum power to the heaters for 20 seconds. The block thermal capacity is equal to the integrated power divided by the difference in block temperature. To increase accuracy, the effect of bias cooling power is subtracted from the integrated power.

$$\text{Blk Cp=ramp time*(heater–control cool pwr)/delta temp.} \quad (10)$$

where:

ramp time=20 seconds
heater power=500 watts
control cool=(Z block−coolant temp)*$K_{cc}$
delta temp=TBlock$_{t=20}$−TBlock$_{t=0}$ The typical value of Block Cp is 567 Joules/°K.±45 for a 60 Hz instrument. Assuming a normal $K_{cc}$ value, an increase in block thermal capacity is due to an increase in thermal loads, such as moisture in the foam backing, loss of insulation around the sample block, or a decrease in heater power such as a failure of one of the six heater zones or a failure of the electronic circuitry that drives the heater zones, or an incorrect or an incorrectly wired voltage configuration module.

A chiller test measures the system cooling output in watts at 10° C. and 18° C. The system cooling power, or chiller output, at a given temperature is equal to the summation of thermal loads at that temperature. The main components are: 1. heating power required to maintain the block at a given temperature, 2. power dissipated by the pump used to circulate the coolant around the system, and 3. losses in the coolant lines to the ambient. The chiller power parameter is measured by controlling the coolant temperature at either 10° C. or 18° C. and integrating the power applied to the sample block to maintain a constant coolant temperature, over a 32 second interval. The difference between the block and coolant temperature is also integrated to compute losses to ambient temperature.

$$\text{Chiller power}=\Sigma \text{ Heating power}+\text{Pump power}+(K_{amb}*\Sigma \text{ (blk-cool temp))} \quad (11)$$

where:
heating power=Sum of heating power required to maintain coolant at 10° C. or 18° C. over time 32 seconds.
Pump Power=Circulating pump, 12 watts
Kamb=Conductance to ambient, 20 watts/°C.
blk-cool temp=Sum of difference in block and coolant temp over time 32 seconds The typical value for chiller power is 256 watts±76 for a 60 Hz instrument at 10° C. and 383 watts±48 at 18° C. Low chiller power may be due to an obstruction in the fan path, a defective fan, or a marginal or faulty chiller unit. It may also be due to a miswired voltage configuration plug.

A ramp cooling conductance ($K_c$) test measures the thermal conductance at 10° C. and 18° C. across the sample block to the ramp and control cooling passages. This test is performed by first controlling the coolant temperature at 10° C. or 18° C., then integrating, over a 30 second time interval, the heating power applied to maintain the coolant at the given temperature divided by the difference of block and coolant temperature over the time interval.

$$K_c=\Sigma \text{ Heating power}/\Sigma \text{ (block−coolant temperature)}$$

Typical values for $K_c$ are 33.4 watts/°K.±7.4 at 10° C. and 37.6 watts/°K.±5 at 18° C. A low $K_c$ may be due to a closed or obstructed ramp valve, kinked coolant tubing, weak pump or a hard water/Prestone™ mixture.

A sensor lag test measures the block sensor lag by first controlling the block temperature to 35° C. and then applying 500 watts of heater power for 2 seconds and measuring the time required for the block to rise 1° C. Typical values are 13 to 15 units, where each unit is equal to 200 ms. A slow or long sensor lag can be due to a poor interface between the sensor and the block, such as lack of thermal grease, a poorly machined sensor cavity or a faulty sensor.

The remaining install tests are currently executed by the install program but have limited diagnostic purposes due to the fact that they are calculated values or are a function of so many variables that their results do not determine the source of a problem accurately.

The install program calculates the slope of the ramp cooling conductance ($S_c$) between 18° C. and 10° C. It is a measure of the linearity of the conductance curve. It is also used to approximate the ramp cooling conductance at 0° C. Typical values are 0.40±0.2. The spread in values attest to the fact that it is just an approximation.

$$S_c=(Kc\_18°-Kc\_10°)/(18° \text{ C.}-10° \text{ C.}) \quad (13)$$

The install program also calculates the cooling conductance $K_{c0}$. $K_{c0}$ is an approximation of the cooling conductance at 0° C. The value is extrapolated from the actual conductance at 10° C. Typical values are 23 watts/°K.±5. The formula used is:

$$K_{c0}=Kc\_10-(Sc*10° \text{ C.}) \quad (14)$$

Characters enclosed in { } indicate the variable names used in the source code.
Heater-Ping Test Pseudocode:

The heater ping test verifies that the heaters are properly wired for the current line voltage.

Get the sample block and coolant to a known and stable point.
Turn ON the ramp cooling valves
Wait for the block and coolant to go below 5° C.
Turn OFF ramp cooling valves
Measure the cooling effect of control cooling by measuring the block temperature drop over a 10 second time interval.
Wait 10 seconds for stabilization before taking any measurements.
Wait 10 seconds
temp1=block temperature
Wait 10 seconds
temp2 =block temperature
{tempa}=temp2−temp1
Examine the variable {linevolts} which contains the actual measured line voltage. Pulse the heater with 75 watts for a line voltage greater than or equal to 190 V or with 300 watts if it less than or equal to 140 V.

```
if ({linevolts} >= 190 Volts) then
    deliver 75 watts to heater
else if ({linevolts} <= 140 Volts) then
    deliver 300 watts to heater
else
    display an error message
```

Measure the temperature rise over a 10 second time period. The result is the average heat rate in 0.01°/second.
temp1=block temperature
Wait 10 seconds
temp2=block temperature
{tempb}=temp2−temp1
Subtract the average heat rate {tempb} from the control cooling effect to calculate true heating rate $$\text{heat\_rate}=\{tempb\}-\{tempa\} \quad (17)$$

Evaluate the heat_rate. For 220 V–230 V, the heat rate should be less than 0.30°/second. For 100 V–120 V the heat rate should be greater than 0.30°/second.

```
if (linevoltage = 220V and heat_rate > 0.30°/second)
then
        Error ———> Heaters wired for 120V
        Lock up keyboard
    if (linevoltage = 120V and heat_rate < 0.30°/second)
then
        Error ———> Heaters wired for 220V
        Lock up keyboard
```

KCC Test Pseudocode:

This test measures the control cooling conductance also known as $K_{cc}$.

$K_{cc}$ is measured at a block temperature of 60° C.

Drive block to 60° C.

Maintain block temperature at 60° C. for 300 seconds Integrate the power being applied to the sample block heaters over a 90 second time period. Measure and integrate the power required to maintain the block temperature with control cooling bias.

```
{dt_sum}        = 0 (delta temperature sum)
{main_pwr_sum}  = 0 (main heater power sim)
{aux_pwr_sum}   = 0 (auxiliary heater power sum)

for (count = 1 to 90)
    {
        {dt_sum} = {dt_sum} + (block temperature –
coolant temperature)
        wait 1 sec Accumulate the power applied to the main and
auxiliary heaters. The actual code resides in the
PID control task and is therefore summed every
200ms.

{main_pwr_sum} = {main_pwr_sum} + {actual_power}
        {aux_pwr_sum} = {aux_pwr_sum} + {aux1_actual} +
{aux2_actual}
    }
```

Compute the conductance by dividing the power sum by the temperature sum. Note that the units are 10 mW/°K.

$$K_{cc} = (\{main\_pwr\_sum\} + \{aux\_pwr\_sum\})/\{dt\_sum\} \quad (18)$$

BLOCK CP Test Pseudocode:

This test measures the sample block thermal capacity.

Drive the block to 35° C.

Control block temperature at 35° C. for 5 seconds and record initial temperature.

initial_temp=block temperature

Deliver maximum power to heaters for 20 seconds while summing the difference in block to coolant temperature as well as heater power.

```
Deliver 500 watts
{dt_sum} = 0
```

```
for count = 1 to 20 seconds)
    {
        {dt_sum} = {dt_sum} + (block temperature – coolant
temperature)
        wait 1 second
    }
```

(19) delta_temp = block temperature – intial_temp

Compute the joules in cooling power due to control cooling which occurs during ramp.

(20) cool_joule = Control cooling conductance ($K_{cc}$) * {dt_sum}

Compute the total joules applied to the block from the main heater and control cooling. Divide by temp change over the interval to compute thermal capacity.

$$\text{Block CP} = \text{ramptime} * (\text{heater power} - \text{cool\_joule})/\text{delta\_temp} \quad (21)$$

where:
    ramptime=20 seconds
    heater power=500 Watts

COOL_PWR_10:

This test measures the chiller power at 10° C.

Control the coolant temperature at 10° C. and stabilize for 120 secs.

```
count = 120
do while (count != 0)
    {
        if coolant temperature = 10 ± 0.5° C.) then
            count = count – 1
        else
            count = 120
        wait 1 second
    }
```

At this point, the coolant has been at 10° C. for 120 seconds and has stabilized. Integrate, over 32 seconds, the power being applied to maintain a coolant temperature of 10° C.

```
{cool_init}     = coolant temperature
{main_pwr_sum}  = 0
{aux_pwr_sum}   = 0
{delta_temp_sum} = 0 for (count = 1 to 32)
    {
Accumulate the power applied to the main and
auxiliary heaters. The actual code resides in the
control task.

{main_pwr_sum} = {main_pwr_sum} + actual_power
        {aux_pwr_sum} = {aux_pwr_sum} + aux1_actual +
                        aux2_actual delta_temp_sum = delta_temp_sum + (ambient temp –
                         coolant temp)
        wait 1 second
    }
```

Compute the number of joules of energy added to the coolant mass during the integration interval. "(coolant temp–cool_ init)" is the change in coolant temp during the integration interval. 550 is the Cp of the coolant in joules, thus the product is in joules. It represents the extra heat added to the coolant which made it drift from setpoint during the integration interval. This error is subtracted below from the total heat applied before calculating the cooling power.

$$\text{cool\_init} = (\text{coolant temp} - \text{cool\_init}) * 550J \quad (22)$$

Add the main power sum to the aux heater sum to get joules dissipated in 32 seconds. Divide by 32 to get the average joules/sec.

$$\{\text{main\_pwr\_sum}\} = (\{\text{main\_pwr\_sum}\} + \{\text{aux\_pwr\_sum}\} - \text{cool\_init})/32 \quad (23)$$

Compute the chiller power at 10° C. by summing all the chiller power components.

$$\text{Power}_{10°C} = \text{main\_power\_sum} + \text{PUMP PWR} + (K\_AMB * \text{delta\_temp\_sum}) \quad (24)$$

where:
{main_pwr_sum}=summation of heater power over interval
PUMP PWR=12 Watts, pump that circulates coolant
delta_temp_sum=summation of amb–coolant over interval
K_AMB=20 Watts/K, thermal conductance from cooling to ambient.

KC_10 Test Pseudocode:
This test measures the ramp cooling conductance at 10° C.
Control the coolant temperature at 10° C.±0.5 and allow it to stabilize for 10 seconds.
At this point, the coolant is at setpoint and is being controlled. Integrate, over a 90 second time interval, the power being applied to the heaters to maintain the coolant at 10° C. Sum the difference between the block and coolant temperatures.

```
{main_pwr_sum} = 0
{aux_pwr_sum}  = 0
{dt_sum}       = 0 for (count = 1 to 90)
{
Accumulate the power applied to the main and
auxiliary heaters. The actual code resides in the
PID control task.

{main_pwr_sum} = {main_pwr_sum} + actual_power
{aux_pwr_sum} = {aux_pwr_sum} + aux1_actual +
                aux2_actual {dt_sum} = {dt_sum} + (block temperature – coolant
temp)
wait 1 second
}
```

Compute the energy in joules delivered to the block over the summation period. Units are in 0.1 watts.

$$\{\text{main\_pwr\_sum}\} = \{\text{main\_pwr\_sum}\} + \{\text{aux\_pwr\_sum}\} \quad (25)$$

Divide the power sum by block–coolant temperature sum to get ramp cooling conductance in 100 mW/K.

$$Kc\_10 = \{\text{main\_pwr\_sum}\}/\{\text{dt\_sum}\} \quad (26)$$

COOL_PWR_18 Test Pseudocode:
This test measures the chiller power at 18° C.
Get the sample block and coolant to a known and stable point. Control the coolant temperature at 18° C. and stabilize for 120 secs.

```
count = 120
do while (count != 0)
{
   if (coolant temperature = 18° C. ± 0.5) then
      count = count – 1
   else
      count = 120
   wait 1 second
}
```

At this point the coolant has been at 18° C. for 120 seconds and has stabilized. Integrate, over 32 seconds, the power being applied to maintain a coolant temperature of 18° C.

```
{cool_init}      = coolant temperature
{main_pwr_sum}   = 0
{aux_pwr_sum}    = 0
{delta_temp_sum} = 0
for (count = 1 to 32)
{
Accumulate the power applied to the main and
auxiliary heaters. The actual code resides in the
control task.

{main_pwr_sum} = {main_pwr_sum} + actual_power
{aux_pwr_sum} = {aux_pwr_sum} + aux1_actual +
aux2_actual delta_temp_sum = delta_temp_sum + (ambient temp –
coolant temp)
wait 1 second
}
```

Compute the number of joules of energy added to the coolant mass during the integration interval. "(coolant temp–cool_ init)" is the change in coolant temp during the integration interval. 550 is the Cp of the coolant in joules, thus the product is in joules. It represents the extra heat added to the coolant which made it drift setpoint during the integration interval. This error is subtracted below from the total heat applied before calculating the cooling power.

$$\text{cool\_init} = (\text{coolant temp} - \text{cool\_init}) * 550J \quad (27)$$

Add main power sum to aux heater sum to get joules dissipated in 32 seconds. Divide by 32 to get the average joules/sec.

$$\{\text{main\_pwr\_sum}\} = (\{\text{main\_pwr\_sum}\} + \{\text{aux\_pwr\_sum}\} - \text{cool\_init})/32 \quad (28)$$

Compute the chiller power at 18° C. by summing all the chiller power components.

$$\text{Power}_{18°C} = \text{main\_power\_sum} + \text{PUMP PWR} + (K\_AMB * \text{delta\_temp\_sum}) \quad (29)$$

where:
{main_pwr_sum}=summation of heater power over interval
PUMP PWR=12 Watts, pump that circulates coolant
delta_temp_sum=summation of amb–coolant over interval
K_AMB=20 Watts/K, Thermal conductance from cooling to ambient.

KC_18 Test Pseudocode:
This test measures the ramp cooling conductance at 18° C.
Control the coolant temperature at 18° C.±0.5 and allow it to stabilize for 10 seconds.
At this point, the coolant is at setpoint and being controlled. Integrate, over a 90 second time interval, the power being applied to the heaters to maintain the coolant at 18° C. Sum the difference between the block and coolant temperature.

```
{main_pwr_sum}   = 0
{aux_pwr_sum}    = 0
{dt_sum}         = 0 for (count = 1 to 90)
{
Accumulate the power applied to the main and
auxiliary heaters. The actual code resides in the
control task.

{main_pwr_sum} = {main_pwr_sum} + actual_power
{aux_pwr_sum} = {aux_pwr_sum} + aux1_actual +
aux2_actual {dt_sum} = {dt_sum} + (block temperature − coolant
temp)
   wait 1 second
}
```

Compute the energy in joules delivered to the block over the summation period. Units are in 0.1 watts.

$$\{main\_pwr\_sum\} = \{main\_pwr\_sum\} + \{aux\_pwr\_sum\} \quad (30)$$

Divide power sum by block–coolant temperature sum to get ramp cooling conductance in 100 mW/K.

$$Kc\_18 = \{main\_pwr\_sum\}/\{dt\_sum\} \quad (31)$$

SENLAG Test Pseudocode:
This test measures the sample block sensor lag.
Drive the block to 35° C. Hold within ±0.2° C. for 20 seconds then record temperature of block.

{tempa}=block temperature

Deliver 500 watts of power to sample block.
Apply 500 watts of power for the next 2 seconds and count the amount of iterations through the loop for the block temperature to increase 1° C. Each loop iteration executes every 200 ms, therefore actual sensor lag is equal to count*200 ms.

```
secs  = 0
count = 0 do while (TRUE)
{
if (secs >= 2 seconds) then
   shut heaters off
if (block temperature - tempa > 1.0° C.) then
   exit while loop
count = count + 1
}
end do while sensor lag = count
```

REAL TIME OPERATING SYSTEM - CRETIN

CRETIN is a stand alone, multitasking kernel that provides system services to other software modules called tasks. Tasks are written in the "C" language with some time critical areas written in Intel 8085 assembler. Each task has a priority level and provides an independent function. CRETIN resides in low memory and runs after the startup diagnostics have successfully been executed.

CRETIN handles the task scheduling and allows only one task to run at a time. CRETIN receives all hardware interrupts thus enabling waiting tasks to run when the proper interrupt is received. CRETIN provides a real time clock to allow tasks to wait for timed events or pause for known intervals. CRETIN also provides intertask communication through a system of message nodes.

The firmware is composed of nine tasks which are briefly described in priority order below. Subsequent sections will describe each task in greater detail.

1. The control task (PID) is responsible for controlling the sample block temperature.
2. The keyboard task is responsible for processing keyboard input from the keypad.
3. The timer task waits for a half second hardware interrupt, then sends a wake up message to both the sequence and the display task.
4. The sequence task executes the user programs.
5. The pause task handles programmed and keypad pauses when a program is running.
6. The display task updates the display in real time.
7. The printer task handles the RS-232 port communication and printing.
8. The LED task is responsible for driving the heating LED. It is also used to control the coolant temperature while executing Install.
9. The link task starts files that are linked together in a method by simulating a keystroke.

Block Temperature Control Proqram (PID Task)

The Proportional Integral Differential (PID) task is responsible for controlling the absolute sample block temperature to 0.1° C., as well as controlling the sample block temperature non-uniformity (TNU, defined as the temperature of the hottest well minus the temperature of the coldest well) to less than ± 0.5° C. by applying more heating power to the perimeter of the block to compensate for losses through the guard band edges. The PID task is also responsible for controlling the temperature of the heated cover to a less accurate degree. This task runs 5 times per second and has the highest priority.

The amount of heating or cooling power delivered to the sample block is derived from the difference or "error" between the user specified sample temperature stored in memory, called the setpoint, and the current calculated sample temperature. This scheme follows the standard loop control practice. In addition to a power contribution to the film heaters directly proportional to the current error, i.e., the proportional component, (setpoint temperature minus sample block temperature), the calculated power also incorporates an integral term that serves to close out any static error (Setpoint temperature-Block temperature less than 0.5° C.). This component is called the integral component. To avoid integral term accumulation or "wind-up", contributions to the integral are restricted to a small band around the setpoint temperature. The proportional and integral component gains have been carefully selected and tested, as the time constants associated with the block sensor and sample tube severely restrict the system's phase margin, thus creating a potential for loop instabilities. The proportional term gain is P in Equation (46) below and the integral term gain is Ki in Equation (48) below.

The PID task uses a "controlled overshoot algorithm" where the block temperature often overshoots its final steady state value in order for the sample temperature to arrive at its desired temperature as rapidly as possible. The use of the overshoot algorithm causes the block temperature to overshoot in a controlled manner but does not cause the sample temperature to overshoot. This saves power and is believed to be new in PCR instrumentation. A controlled undershoot is also used. The block temperature is controlled such that it does not undershoot or overshoot by more than 0.5° C.

The total power delivered to all heater of the sample block to achieve a desired ramp rate is given by:

$$\text{Power} = (CP/\text{ramp\_rate}) + \text{bias} \quad (40)$$

where:
CP=Thermal mass of block
bias=bias or control cooling power
ramp_rate=$T_{final} - T_{initial}$/desired ramp rate This power is clamped to a maximum of 500 watts of heating power for safety.

With every iteration of the task (every 200 ms) the system applies heating or ramp cooling power (if necessary) based on the following algorithms.

The control system is driven by the calculated sample temperature. The sample temperature is defined as the average temperature of the liquid in a thin walled plastic sample tube placed in one of the wells of the sample block (hereafter the "block"). The time constant of the system (sample tube and its contents) is a function of the tube type and volume. At the start of a run, the user enters the tube type and the amount of reaction volume. The system computes a resultant time constant (τ or tau). For the MicroAmp™ tube and 100 microliters of reaction volume, tau is approximately 9 seconds.

$$T_{blk-new} = T_{blk} + \text{Power} * (200ms/CP) \quad (41)$$

$$T_{samp-new} = T_{samp} + (T_{blk-new} - T_{samp}) * 200\ ms/tau \quad (42)$$

where:
$T_{blk-new}$=Current block temperature
$T_{blk}$= Block temperature 200 ms ago
Power= Power applied to block
CP= Thermal mass of block
$T_{samp-new}$= Current sample temperature
$T_{samp}$= Sample temperature 200 ms ago
tau= Thermal Time Constant of sample tube, adjusted for sensor lag (approximately 1.5)

The error signal or temperature is simply:

$$\text{error} = \text{Setpoint} - T_{samp-new} \quad (43)$$

As in any closed loop system, a corrective action (heating or cooling power) is applied to close out part of the current error. In Equation (45) below, F is the fraction of the error signal to be closed out in one sample period (200 mS).

$$T_{samp-new} = T_{samp} + F * (SP - T_{samp}) \quad (44)$$

where SP= the user setpoint temperature

Due to the large lag in the system (long tube time constant), the fraction F is set low.

Combining formulas (42) and (44) yields:

$$T_{samp-new} = T_{samp} + (T_{blk-new} - T_{samp}) * .2/tau = T_{samp} + F * (SP - T_{samp}) \quad (45)$$

Combining formulas (41) and (45) and adding a term P (the proportional term gain) to limit block temperature oscillations and improve system stability yields:

$$Pwr = CP * P/T * ((SP - T_{samp}) * F * tau/T + T_{samp} - T_{blk}) \quad (46)$$

where
P= the proportional term gain and
T= the sample period of 0.2 seconds (200 msec). and
P/T=1 in the preferred embodiment Equation (46) is a theoretical equation which gives the power (Pwr) needed to move the block temperature to some desired value without accounting for losses to the ambient through the guardbands, etc.

Once the power needed to drive the block is determined via Equation (46), this power is divided up into the power to be delivered to each of the three heater zones by the areas of these zones. Then the losses to the manifolds are determined and a power term having a magnitude sufficient to compensate for these losses is added to the amount of power to be delivered to the manifold heater zone. Likewise, another power term sufficient to compensate for power lost to the block support pins, the block temperature sensor and the ambient is added to the power to be delivered to the edge heater zones. These additional terms and the division of power by the area of the zones convert Equation (46) to Equations (3), (4) and (5) given above.

Equation (46) is the formula used by the preferred embodiment of the control system to determine the required heating or cooling power to the sample block.

When the computed sample temperature is within the "integral band" i.e., ±0.5° C. around the target temperature (SP), the gain of the proportional term is too small to close out the remaining error. Therefore an integral term is added to the proportional term to close out small errors. The integral term is disabled outside the integral band to prevent a large error signal from accumulating. The algorithm inside the "integral band" is as follows:

$$Int\_sum\ (new) = Int\_sum\ (old) + (SP - T_{samp}) \quad (47)$$

$$pwr\_adj = ki * Int\_sum\ (new) \quad (48)$$

where,
Int_sum= the sum of the sample period of the difference between the SP and $T_{samp}$ temperature, and
Ki= the integral gain (512) in the preferred embodiment).

Once a heating power has been calculated, the control software distributes the power to the three film heater zones 254, 262 and 256 in FIG. 13 based on area in the preferred embodiment. The edge heaters receive additional power based upon the difference between the block temperature and ambient temperature. Similarly, the manifold heaters receive additional power based upon the difference between the block temperature and the coolant temperature.

Characters enclosed in { } in the pseudocode given below for the PID task correspond to the variable names used in the source code of Microfiche Appendix F.
PID Pseudocode
Upon System Power up or Reset
Initialize PID variables
Read the line frequency
Initialize PIT and system clock
Turn off ramp cooling
Turn off all heaters
Calculate heater resistances
Do Forever—executes every 200 ms
If (block temperature> 105) then
Turn off heaters
Turn on ramp valves Display error message
Read the line voltage {linevolts}
Read the coolant sensor and convert to temperature {h2otemp}
Check if sensor reading is within normal operating range
Display an error message if it is not.
Read the ambient sensor and convert to temperature {ambtemp}
Check if sensor reading is within normal operating range
Display an error message if it is not.
Read the heated cover sensor and convert to temperature {cvrtemp}
Check if sensor reading is within normal operating range
Display an error message if it is not.
Read the sample block sensor and convert to temperature {blktemp}
Check if sensor reading is within normal operating range
Display an error message if it is not.

This portion of the code also reads the temperature stable voltage reference and compares the voltage to a reference voltage that was determined during calibration of the instrument. If there is any discrepancy, the electronics have drifted and the voltage readings from the temperature sensors are adjusted accordingly to obtain accurate temperature readings.

Compute the sample temperature {tubetenths} or the temperature that gets displayed by using a low-pass digital filter.

$$tubetenths = TT_{n-1} + (TB_n - TT_{n-1}) * T/tau \qquad (49)$$

where $TT_{n-1}$ = last sample temp {tubetenths}

$TB_n$ = current block sensor temp {blktenths}

T = sample interval in seconds = 200 ms tau = tau tube {cf_tau} — tau sensor {cf_lag}

Equation (49) represents the first terms of a Taylor series expansion of the exponential that defines the calculated sample temperature given as Equation (6) above.

Compute the temperature of the foam backing underneath the sample block, {phantenths} known as the phantom mass. The temperature of the phantom mass is used to adjust the power delivered to the block to account for heat flow in and out of the phantom mass. The temperature is computed by using a low pass digital filter implemented in software.

$$phantenths = TT_{n-1} + (TB_n - TT_{n-1}) * T/tau \qquad (50)$$

where $TT_{n-1}$ = Last phantom mass temp {phantenths}

$TB_n$ = Current block sensor temp {blktenths}

T = Sample interval in seconds = 200 ms $tau_{foam}$ = Tau of foam block = 30 secs.

Compute the sample temperature error (the difference between the sample temperature and the setpoint temperature) {abs_tube_err}.

Determine ramp direction {fast_ramp} = UP_RAMP or DN_RAMP

If (sample temperature is within ERR of setpoint (SP)) then PID not in fast transition mode. {fast_ramp} = OFF where ERR = the temperature width of the "integral band", i.e., the error band surrounding the target or setpoint temperature.

Calculate current control cooling power {cool_ctrl} to determine how much heat is being lost to the bias cooling channels.

Calculate current ramp cooling power {cool_ramp}

Calculate {cool_brkpt}. {cool_brkpt} is a cooling power that is used to determine when to make a transition from ramp to control cooling on downward ramps. It is a function of block and coolant temperature.

The control cooling power {cool_ctrl} and the ramp cooling power {cool_ramp} are all factors which the CPU must know to control downward temperature ramps, i.e., to calculate how long to keep the ramp cooling solenoid operated valves open. The control cooling power is equal to a constant plus the temperature of the coolant times the thermal conductance from the block to the bias cooling channels. Likewise, the ramp cooling power is equal to the difference between the block temperature and the coolant temperature times the thermal conductance from the block to the ramp cooling channels. The cooling breakpoint is equal to a constant (given in Microfiche Appendix F) times the difference in temperature between the block and the coolant.

Calculate a heating or cooling power {int_pwr} needed to move the block temperature from its current temperature to the desired setpoint (SP) temperature.

$$\{int\_pwr\} = KP * CP * [(SP - T_{samp}) * \{cf\_kd\} + Ts - T_{BLK}] \qquad (51)$$

where:

KP = Proportional gain = P/T in Equation (46) = approximately one in the preferred embodiment CP = Thermal mass of block SP = Temperature setpoint $T_{SAMP}$ = Sample temperature $T_{BLK}$ = Block temperature cf_kd = Tau * $K_d$/ Delta_t where tau is the same tau as used in Equation (49) and $K_d$ is a constant given in Microfiche Appendix F and Delta_t is the 200 msec sample period.

If the flag {normal_power} is set to 0 when doing a down ramp, then use the following power equation:

$$CP * P/t_{interval} * ((SP - TB_{n-1}) * F * tau/t_{interval}) \qquad (51.1)$$

If (sample temperature is within {cf_iband} of setpoint) then integrate sample error {i_sum} else $$clear\ \{i\_sum = 0\}. \qquad (52)$$

Calculate the integral term power.

$$integral\ term = \{i\_sum\} * constant\ \{cf\_term\}. \qquad (53)$$

Add the integral term to the power.

$$\{int\_pwr\} = \{int\_pwr\} + integral\ term \qquad (54)$$

Adjust power to compensate for heating load due to the effects of the phantom mass (foam backing) by first finding the phantom mass power then adding it to power {int_pwr}.

Calculate phantom mass power {phant_pwr} by:

(55)   phant_pwr = C * (blktenths - phantenths) / 10 where:   C = thermal mass of foam backing (1.0 W/K)

Adjust heater power
{int_pwr} = {int_pwr} + {phant_pwr}

Compute power needed in manifold heaters {auxl_power} which will compensate for loss from the sample block into the manifold edges that have coolant flowing through it. Note that if the system is in a downward ramp, {aux1_power} = 0. The manifold zone power required is described below:

$$\{aux1\_power\}=K1*(T_{BLK}-T_{AMB})+K2*(T_{BLK}-T_{COOL})+K5*(dT/dt)$$

where:

K1=Coefficient {cf_1coeff}
K2=Coefficient {cf_2coeff}
K5=Coefficient {cf_5coeff}
dT/dt= Ramp rate
$T_{BLK}$=Block temperature
$T_{AMB}$=Ambient temperature
$T_{COOL}$= Coolant temperature Compute power needed in edge heaters {aux2_power} which will compensate for losses from the edges of the sample block to ambient. Note that if we are in a downward ramp {aux2_power}=0. The edge zone power required is described below:

$$\{aux2\_power\}=K3*(T_{BLK}-T_{AMB})+K4*(T_{BLK}-T_{COOL})+ K6*(dT/dt)$$

where:

K3=Coefficient {cf_3coeff}
K4=Coefficient {cf_4coeff}
K6= Coefficient {cf_6coeff} dT/dt= Ramp rate
$T_{BLK}$=Block temperature
$T_{AMP}$=Ambient temperature
$T_{COOL}$= Coolant temperature Delete contribution of manifold {aux1_power} and edge heater power {aux2_power} to obtain total power that must be supplied by main heaters and coolers.

$$\{int\_pwr\}=\{int\_pwr\}-\{aux1\_power\}- \{aux2\_power\} \quad (59)$$

[In an alternate version, the equation {int_pwr}={int_pwr} +{aux'_power}+{aux2_power} is used ]

Decide if the ramp cooling should be applied. Note that {cool_brkpt} is used as a breakpoint from ramp cooling to control cooling.

If (int_pwr <—cool_brkpt and performing downward ramp) to decide whether block temperature is so much higher than the setpoint temperature that ramp cooling is needed then Turn ON ramp valves else Turn OFF ramp valves and depend upon bias cooling If (ramping down)

Check if the gain needs to be adjusted

Check if the alternate power equation (51.1) should be used

At this point, {int_pwr} contains the total heater power and {aux1_power} and {aux2_power} contain the loss from the block out to the edges. The power supplied to the auxiliary heaters is composed of two components: aux_power and int_power. The power is distributed {int_pwr} to the main and auxiliary heaters based on area.

total_pwr=int_pwr
int_pwr=total_pwr * 66%
aux1_power= total_pwr * 20%+aux1_power
aux2_power=total_pwr * 14%+aux2_power If (ramping down)

Depending on the setpoint, the coolant temperature and the time constant of the tube, apply power to the heaters until the ramp cooling terminates.

Compute the number of half cycles for the triac to conduct for each end zone and each iteration of the control loop to send the appropriate amount of power to the heaters. This loop executes once every ⅕ second, therefore there are 120/5=24 half cycles at 60 Hz or 100/5=20 at 50 Hz. The number of half cycles is a function of requested power {int_pwr}, the current line voltage {linevolts} and the heater resistance. Since the exact power needed may not be delivered each loop, a remainder is calculated {delta_power} to keep track of what to include from the last loop.

$$int\_pwr=int\_pwr+delta\_power \quad (60)$$

Calculate the number of ½ cycles to keep the triac on. Index is equal to the number of cycles to keep the triac on.

(61) index=power * main heater ohms * [20 or 24] / linevolts squared where Equation (61) is performed once for each heater zone and where "power"=int_pwr for the main heater zone, aux1_pwr for the manifold heater zone and aux2_pwr for the edge heater zone. (61)

Calculate the amount of actual power delivered.

(62) actual_power=linevolts squared * index / main heater resistance

Calculate the remainder to be added next time.

delta_power=int_pwr—actual_power (63)

Calculate the number of ½ cycles for the edge and manifold heaters using the same technique described for the main heaters by substituting {aux1_pwr} and {aux2_pwr} into Equation (60).

Load the calculated counts into the counters that control the main, manifold and edge triacs.

Look at heated cover sensor. If heated cover is less than 105° C., then load heated cover counter to supply 50 watts of power.

Look at sample temperature. If it is greater than 50° C., turn on HOT LED to warn user not to touch block.

END OF FOREVER LOOP

Keyboard Task

The purpose of the keyboard task is to wait for the user to press a key on the keypad, compare the key to a list of valid keystrokes for the current state, execute the command function associated with the valid key and change to a new state. Invalid keystrokes are indicated with a beep and then ignored. This task is the heart of the state driven user interface. It is "state driven" because the action taken depends on the current state of the user interface.

Keyboard Task Pseudocode:

Initialize keyboard task variables.

Turn off the cursor.

Check if the instrument has been calibrated, installed and has the correct configuration plug installed If (the power failed while the user was running a program) then Compute and display the number of minutes the power was off for.

Write a power failure status record to the history file.

Send a message to the sequence task to start a 4° C. soak.

Give the user the option of reviewing the history file.

If (the user request to review the history file) then
    Go to the history file display.

Send a message to pid task to turn on the heated cover.

Display the top level screen.

Do Forever

Send a message to the system that this task is waiting for a hardware interrupt from the keypad.

Go to sleep until this interrupt is received.

When awakened, read and decode the key from the keypad.

Get a list of the valid keys for the current state.

Compare the key to the list of valid keys.

If (the key is valid for this state) then

Get the "action" and next state information for this key.

Execute the "action" (a command function) for this state.

Go to the next state.

Else

Beep the beeper for an invalid key.

End of Forever Loop

Timer Task Overview

The purpose of the timer task is to wake up the sequence and the real time display task every half a second. The timer task asks the system (CRETIN) to wake it up whenever the half second hardware interrupt that is generated by the clock/calendar device is received. The timer task then in turn sends a wake up message to the sequence task and the real time display task respectively. This intermediate task is necessary since CRETIN will only service one task per interrupt and thus only the higher priority task (the sequence task) would execute.

Timer Task Pseudocode:

Do Forever

Send a message to the system that this task is waiting for a hardware interrupt from the clock/calendar device.

Go to sleep until this interrupt is received.

When awakened, send a message to the sequence and to the real time display task.

End Forever Loop

Sequence Task Overview

The purpose of the sequence task is to execute the contents of a user defined program. It sequentially steps through each setpoint in a cycle, consisting of a ramp and a hold segment, and sends out setpoint temperature messages to the pid task which in turn controls the temperature of the sample block. At the end of each segment, it sends a message to the real time display task to switch the display and a message to the printer task to print the segment's runtime information. The user can pause a running program by pressing the PAUSE key on the keypad then resume the program by pressing the START key. The user can prematurely abort a program by pressing the STOP key. This task executes every half a second when it is awakened by the timer task.

Sequence Task Pseudocode

Do Forever

Initialize sequence task variables. Wait for a message from the keyboard task that the user has pressed the START key or selected START from the menu or a message from link task that the next program in a method is ready to run.

Go to sleep until this message is received.

When awaken, update the ADC calibration readings to account for any drift in the analog circuitry.

If (not starting the 4° C. power failure soak sequence) then

Send a message to the printer task to print the PE title line, system time and date, program configuration parameters, the program type and its number.

If (starting a HOLD program) then

Get the temperature to hold at {hold_tp}.

Get the number of seconds to hold for {hold_time}.

If (ramping down more than 3° C. and {hold_tp}>45° C.) then

Post an intermediate setpoint.

Else

Post the final setpoint {hold_tp}.

While (counting down the hold time {hold_time})

Wait for half second wake up message from timer task.

Check block sensor for open or short.

If (keyboard task detected a PAUSE key) then

Post a setpoint of current sample temp.

Send a message to wake up the pause task.

Go to sleep until awakened by the pause task.

Post pre-pause setpoint.

If (an intermediate setpoint was posted) then

Post the final setpoint.

If (the setpoint temp is below ambient temp and will be there for more than 4 min.) then Set a flag to tell pid task to turn off the heated cover.

Increment the half second hold time counter {store_time}.

Post the final setpoint again in case the hold time expired before the intermediate setpoint was reached—this insures the correct setpoint will be written the history file. Write a data record to the history file. Send a message to the printer task to print the HOLD info. End of HOLD program Else if (starting a CYCLE program) then Add up the total number of seconds in a cycle {secs_in_run}, taking into account the instrument ramp time and the user programmed ramp and hold times.

Get the total number of seconds in the program by multiplying the number of seconds in a cycle by the number of cycles in a program {num_cyc}.

Total {secs_in_run}={secs_in_run} per cycle * {num_cyc}. While (counting down the number of cycles {num_cyc})

While (counting down the number of setpoints {num_seg})

Get the ramp time {ramp_time}.

Get the final setpoint temp {t_final}.

Initialize the ramp variables.

Get the hold time {local_time}.

Send a message to the real time display task to display the ramp segment information.

Calculate the maximum amount of time it should take to ramp to the setpoint.

If (the user programmed a ramp time) then

Compute the error {ramp_err} between the programmed ramp time and the actual ramp time as follows. This equation is based on empirical data.

{ramp_err}= prog ramp_rate * 15+0.5 (up ramp)

{ramp_err}= prog ramp_rate * 6+1.0 (down ramp)

where:

prog ramp_rate=(abs($T_f-T_c$)−1) / {ramp_time}

$T_f$=setpoint temp {t_final}

$T_c$=current block temp {blktemp} abs= absolute value of the expression

Note: the '−1' is there because the clock starts within 1° C. of setpoint.

new ramp_time=old {ramp_time}−{ramp_err}

If (new ramp_time>old {ramp_time}) then new ramp_time=old {ramp_time}.
Else
  new ramp_time=0.
While (sample temp is not within a user configured temp {cf_clk_dev} of setpoint)
  Wait for half second wake up message from timer task.
  Post a new ramp setpoint every second.
Else if (ramping down more than 3° C. and {t_final}>45° C.) then
  Post an intermediate setpoint.
  While (sample temp is more than 1° C. of setpoint)
    Wait for half second wake up message from timer task.
    Increment the half second ramp time counter.
    Check if the maximum time to ramp to setpoint has expired.
    Display an error message if so.
    If ramping up and within some integral band of setpoint, change the gain.
    If (keyboard task detected a PAUSE key) then
      Post a setpoint of current sample temp.
      Send a message to wake up the pause task.
      Go to sleep until awakened by the pause task.
      Post pre-pause setpoint.
Post the final setpoint.
While (sample temp is not within a user configured temp {cf_clk_der} of setpoint)
  Wait for half second wake up message from timer task.
  Increment the half second ramp time counter.
  Check if the maximum time to ramp to setpoint has expired.
  Display an error message if so.
  Check if the gain needs to be changed.
  If (keyboard task detected a PAUSE key) then
    Post a setpoint of current sample temp.
    Send a message to wake up the pause task.
    Go to sleep until awakened by the pause task.
    Post pre-pause setpoint.
Send a message to the printer task to print the ramp information.
Beep beeper to signal end of ramp segment.
Send a message to the real time display task to display the hold segment information.
While (counting down the hold time)
  Wait for half second wake up message from timer task.
  Increment the half second hold time counter.
  If (ramping down and on the upramp part of the block temperature undershoot and both the block and sample temperature are within 0.2° C. of setpoint) then
    Set a flag so that the power equation in pid will revert back to normal (51)
  If (keyboard task detected a PAUSE key) then
    Post a setpoint of current sample temp.
    Send a message to wake up the pause task.
    Go to sleep until awakened by the pause task.
    Post pre-pause setpoint.
  Write a data record to the history file.
  Send a message to the printer task to print the hold information.
  If (the final setpoint temp has drifted more than the user configurable amount {cf_temp_dev}) then
    Write an error record to the history file.
Check for a programmed pause and execute if necessary.
Go to next segment.
Send a message to the printer task to print an end of cycle message.
Go to next cycle.
End of CYCLE program.
Else if (starting an AUTO-CYCLE program) then
Add up the total number of seconds in each program {secs_in_run} taking into account the instrument ramp time and the user programmed hold times and temperatures which can be automatically incremented or decremented by a programmed amount, either linearly or geometrically, each cycle.
While (counting down the number of cycles {num_cyc})
  While (counting down the number of setpoints {num_seg})
    Get the final setpoint temp {t_final}.
    Get the hold time {time_hold}.
    Send a message to real time display task to display the ramp segment information.
    Check if the user programmed an auto increment or decrement of the setpoint temp and/or the hold time and adjust them accordingly.
    If (the auto increment or decrement of the temp causes the setpoint to go below 0° C. or above 99.9° C.) then
      An error record is written to the history file.
      The setpoint is capped at either 0° C. or 99.9° C.
    If (the auto decrement of the hold time causes the hold time to go below 0 seconds) then
      An error record is written to the history file.
      The hold time is capped at 0° C.
    Initialize the ramp variable.
    If (ramping down more than 3° C. and {t_final}>45° C.) then
      Post an intermediate setpoint.
      While (sample temp is not within 1° C. of setpoint)
        Wait for half second wake up message from timer task.
        Increment the half second ramp time counter.
        If (keyboard task detected a PAUSE key) then
          Post a setpoint of current sample temp.
          Send a message to wake up the pause task.
          Go to sleep until awakened by the pause task.
          Post pre-pause setpoint.
      Check if the maximum amount of time to reach setpoint has expired and write an error message to the history file if it has.
      Check if the gain needs to be changed.
    Post the final setpoint.
    While (sample temp is not within a user configured temp {cf_clk_dev} of setpoint)
      Wait for half second wake up message from timer task.
      Increment the half second ramp time counter.
      Check block sensor for open or short.
      If (keyboard task detected a PAUSE key) then
        Post a setpoint of current sample temp.
        Send a message to wake up the pause task.
        Go to sleep until awakened by the pause task.
        Post pre-pause setpoint.
    Send a message to the printer task to print the ramp segment information.
    Beep beeper to signal end of ramp portion of segment.
    Send a message to the real time display task to display the hold segment information.
    While (counting down the hold time)

Wait for half second wake up message from timer task.
Increment the half second hold time counter.
If (keyboard task detected a PAUSE key) then
    Post a setpoint of current sample temp.
    Send a message to wake up the pause task.
    Go to sleep until awakened by the pause task.
    Post pre-pause setpoint.
If (ramping down and on the upramp part of the block temperature undershoot and both the block and sample temperature are within 0.2° C. of setpoint) then
    Set a flag so that the power equation in pid will revert back to normal (51).
Write a data record to the history file.
Send a message to the printer task to print the hold information.
If (the final setpoint temp has drifted more than the user configurable amount {cf_temp_dev}) then
    Write an error record to the history file.
Go to next segment.
Send a message to the printer task to print an end of cycle message.
Go to next cycle.
End of AUTO-CYCLE program.
Else if (starting a POWER FAILURE sequence) then
Post a setpoint of 4° C.
Set a flag {subamb_hold} so that the pid task will shut off the heated cover.
DO FOREVER
    Wait for a half second wake up message from the timer task.
    Increment the half second hold time counter.
END FOREVER LOOP
End of power failure sequence
Write a run end status record to the history file.
If (running a method)
Set a flag {weird_flag} so the link task will know to send a message to the sequence task to start the next program running.
Else
Return user interface to idle state display.
End of Forever Loop Pause Task Overview The purpose of the pause task is to handle either a pause that the user programs in a CYCLE or an AUTO-CYCLE program or a pause when the user presses the PAUSE key on the keypad.

When the sequence task encounters a programmed pause while executing a program, it goes to sleep and awakens the pause task. The pause task in turn sends a message to the real time display task to continually display and decrement the time the user asked to pause for. When the pause timer times out, the pause task sends a message to awaken the sequence task and then goes to sleep. The user can prematurely resume the program by pressing the START key on the keypad or can prematurely abort the program by pressing the STOP key.

When the keyboard task detects a PAUSE key while a program is running, it sets a flag {pause_flag} then waits for the sequence task to acknowledge it. When the sequence task sees this flag set, it sends an acknowledgment message back to the keyboard task then puts itself to sleep. When the keyboard task receives this message, it awakens the pause task. The pause task sends a message to the real time display task to continually display and increment the amount of time the program is paused for. The timer will time out when it reaches the pause time limit set by the user in the configuration section. The user can resume the program by pressing the START key on the keypad or abort the program by pressing the STOP key.

Pause Task Pseudocode:

Do Forever
Wait for a message from the keyboard task indicating a keypad pause, or a message form the sequence task indicating a user programmed pause.
Go to sleep until a message is received.
When awakened, check a flag for the type of pause initiated.
If (it is a programmed pause) then
Send a message to the real time display task to display the pause timer counting up.
Else
Send a message to the real time display task to display the pause timer counting down.
While (counting down the time out counter)
Send a message to the system to suspend this task for half a second.
Send a message to the printer task to print the pause information.
If (it is a programmed pause) then
Write a status record to the history file.
The pause has timed out so send a message to the wake up the sequence task.
Send a message to the real time display task to halt the pause display.
Send a message to the real time display task to resume the running program display.
Else (it is a keypad pause)
The pause has timed out and the program must be aborted so send a message to the system to halt the sequence task and send it back to the top of its FOREVER loop.
If (the program running was a HOLD program)
Send a message to the printer task to print the hold information.
Write a status record to the history file.
Set {normal_power} flag so PID will use the normal power equation.
Return the user interface to its idle state.
Display an abort message.
End of Forever Loop Display Task Overview The purpose of the real time display task is to display temperatures, timers, sensor readings, ADC channel readings, and other parameters that need to be continually updated every half second.

Display Task Pseudocode:
    Initialize display task variables.
    Do Forever
Wait for a message every half second from the timer task.
Go to sleep until the message is received.
When awakened, check if another task has sent a list of parameters to display or a flag to halt the current update.
Toggle the half second flag {half_sec}.
If (there's a list of parameters to display) then Set a semaphore so no one else will update the display.
Turn off the cursor.
While (stepping through the list of parameters)
  If (it is a time parameter) then
    Display the time.
    If (half second flag {half_sec} is set) then
      Increment or decrement the time variable.
  Else if (it is a decimal number) then
    Display a decimal number.
  Else if (it is an integer number) then
    Display the integer.
  Else if (it is an ADC channel readout) then
    Read the counts from the ADC channel.
    If (need it displayed as mV) then
      Convert counts to mV.
    Display the value.
  Else if (it is a power display) then
    Display the power in terms of watts.
  Else if (it is the hours left parameter) then
    Convert seconds to tenths of hours.
    Display the hours left in tenths of hours.
    If (half second flag {half$_{13}$ sec} is set) then
      Decrement the seconds variable.
  If (the cursor was on) then
    Turn it back on.
  Store the current system time in battery RAM.
  Clear the semaphore to release the display.
End of Forever Loop
Printer Task Overview The purpose of the printer task is to handle the runtime printing. It is a low priority task and should not interfere with other time critical tasks.
Printer Task Pseudocode:
  Do Forever
  Wait for a message from another task that wishes to print.
  Go to sleep until a message is received.
  When awaken, make local copies of the global variables to be printed.
  Post a printer acknowledgement message.
  If (need to print a status or error message) then
    Print the information contained in the current history record.
  Else if (need to print the page header) then
    Print the company name, instrument ID, firmware version number and the current system time and date.
  Else if (need to print the program header) then
    Print the type of program and its number.
  Else if (need to print the program configuration parameters) then
    Print the tube type, reaction volume and the sample temperature deviation from setpoint that starts the clock.
  Else if (need to print end of cycle information) then
    Print the ending time and temperature.
  Else if (need to print segment information) then
    Print either the ramp or hold segment information.
  Else if (need to print a pause status message) then
    Print the amount of time paused for and at what temp.
  End of Forever Loop
LED Task Overview The purpose of the LED task is to make the illumination of the "Heating" LED reflect the power applied to the main heater. This is a low priority task that runs once a second.
LED Task Pseudocode:
  Initialize LED task variables.
  Do Forever
    Send a message to the system to wake this task every second.
    Go to sleep.
    When awaken, load counter 2 of PIC timer A with a value that reflects the power applied to the main heater as follows:
      load counter with value={K_htled}* {ht_led}
    Where:
      {K_htled} holds a constant to compute the time to pulse the heating LED and is equal to 15200 / 500. 15200 is a little greater than the PIC's clock of 14.4KHz and this is the value loaded into the timer to keep the LED constantly on. 500 is the main heater power.
      {ht_led} will be a value between 0 and 500 and will be equal to the watts applied to the main heater.
  End of Forever Loop
Link Task Overview The purpose of the link task is to simulate the user pressing the START key on the keypad. This task is necessary so that programs can be executed one right after the other (as in a method) without user intervention. The link task wakes up the sequence task and it begins running the next program as if the START key were pressed.
Link Task Pseudocode:
  Initialize link task variables.
  Do Forever
    If (the flag {weird_flag} is set and it is not the first file in the method) then
      Send a message to the sequence task to wake up and run a program.
  End of Forever Loop Start Up Sequence

POWER-UP SEQUENCE

When the power to the instrument is turned on or the software does a RESET, the following sequence takes place. Note: the numbers below correspond to numbers on the flow chart in FIG. 55.

1. Transmit a Ctrl-G (decimal 7) character out the RS-232 printer port. Poll the RS-232 port for at least 1 second and if a Ctrl-G is received, it is assumed that an external computer is attached to the port and all communication during the power-up sequence will be redirected from the keypad to the RS-232 port. If no Ctrl-G is received, the power-up sequence continues as normal.

2. Check if the MORE key is depressed. If so, go straight to the service-only hardware diagnostics.

3. The next 3 tests are an audio/visual check and cannot report an error: 1) the beeper beeps 2) the hot, cooling, and heating LEDs on the keypad are flashed 3) each pixel of the display is highlighted. The copyright and instrument ID screens are displayed as the power-up diagnostics execute.

4. Should an error occur in one of the power-up diagnostics, the name of the component that failed is displayed and the keypad is locked to the customer. The code 'MORE 999' gains access to the service-only hardware diagnostics.

5. Check channel 0 of the PPI-B device to see if the automated test bit is pulled low. If it is, run the UART test. If the test passes, beep the beeper continuously.

6. Start the CRETIN operating system which in turn will start up each task by priority level.

7. Check a flag in battery RAM to see if the instrument has been calibrated. If not, display an error message and lock the keypad to the customer. The code 'MORE 999' gains access to the service-only calibration tests.

8. Run a test that measures the voltage and line frequency and see if both these values match the configuration plug selected while calibrating the instrument. If not, display an error message and lock the keypad to the customer. The code 'MORE 999' gains access to the service-only calibration tests.

9. Check a flag in battery RAM to see if the instrument has been installed. If not, display an error message and lock the keypad to the customer. The code 'MORE 999' gains access to the install routine.

10. Check a flag in battery RAM to see if there was a power failure while the instrument was running. If so, start a 4° C. soak and display the amount of time the power was off for. Ask the user if they wish to view the history file which will tell them exactly how far along they were in the run when the power went off. If they select yes, they go straight to the user diagnostics.

11. Beep the beeper.

12. Display the top level user interface screen.

There now follows information concerning two sets of user interface screens, the first of which is produced by Version 1 of the Electronics and Software and the second of which is produced by Version 2 of the Electronics and Software.

User Interface

The objective of the GeneAmp PCR System 9600 user interface is to provide a simple way to develop and run
5 programs that perform PCR.

There are 3 types of programs available. The HOLD program consists of a single setpoint held for a set amount of time or held for an infinite amount of time and terminated by the STOP key. The CYCLE program adds the features of timed
10 ramps and programmable pauses. This program allows up to 9 setpoints and up to 99 cycles. The AUTO program allows the user to increment or decrement the setpoint time and/or temperature a fixed amount every cycle. This program also allows up to 9 setpoints and up to 99 cycles. A METHOD
15 program provides a way to link up to 17 hold, cycle or auto programs together.

A total of 150 programs can be stored with numbers ranging from 1 to 150. Programs can be created, stored, protected, printed, or deleted. A directory of the stored programs can
20 be viewed or printed.

| | | |
|---|---|---|
| 25 | RUN | starts a program running from the program display or restarts a programmed or keypad pause. |
| | MORE | toggles the runtime displays and also accesses the service-only functions (if followed by the code 999). |
| 30 | BACK | moves to the previous field within the same screen. If currently positioned on the first field, it moves to the previous screen. |
| | STEP | moves down to the first field in the next screen. |
| | PAUSE | starts a paused time-out for manual interruptions. |
| 35 | OPTION | either moves the cursor left-to-right through the menu items (rolling over to the leftmost option) or toggles the YES/NO response. |
| | STOP | aborts a running program or moves the user up one level in the user interface. |
| 40 | CE | clears invalid numeric entries. |
| 45 | ENTER | accepts the current numeric entry, accepts a menu item, accepts a YES/NO response, or skips to the next field of a display. If the numeric entry is the last of a display, ENTER steps to the next display. |

COMMON SYSTEM 9600 DISPLAYS

PROGRAM display                                        Example:

| Prog ### Msg Temp | CYCL #17 Done 74.0C |
|---|---|
| Menu | RUN-STORE-PRINT-HOME |

Prog      is either HOLD, CYCL, AUTO or METH
is the program # (1-150) or ??? if it is not
          stored yet
Msg       is either Done, Error, Abort or blank
Temp      is the current sample temperature
Menu      are the available options RUNTIME display                                        Example:

| Action Temp | Ramp to 94.0C  29.6C |
|---|---|
| Timer Prog/Cyc | 10:00        Cycle 14 |

Action is either 'Hold at xx.xC' or 'Ramp to xx.xC'
Temp     is the current sample temperature
Timer    counts down the hold or ramp time or counts up a hold
         time of FOREVER
Prog/Cyc for a HOLD file is 'Prog xxx'
         for a CYCL or AUTO file is 'Cycle xx' - counts up MORE display                                           Example:

| Setpt Tot Cyc | Setpt #3 Tot Cyc 25 |
|---|---|
| Timer Prog | Hrs left 2.5 Prog 17 |

Setpt   is the current setpoint # (1-9) - counts up
Tot Cyc is the total # of cycles (1-99) in the current
        program
Timer   is the time left in the program in hrs - counts down
Prog    is the current program # (1-150)

KEYPAD PAUSE display                                   Example:

| Prog ### Temp | AUTO #18        55.0C |
|---|---|
| PAUSE Timer | PAUSE 9:45 |

Prog      is either HOLD, CYCL, AUTO or METH
is the program # (1-150) or ??? if it is not
          stored yet
Temp      is the current sample temperature Timer is the configurable pause time - counts down

TOP LEVEL USER INTERFACE

Select Option 9600
RUN-CREATE-EDIT-UTIL
TOP LEVEL display

Run
Enter program #xxx
RUN display

Create program
HOLD-CYCL-AUTO-METH
CREATE display

Edit
Enter program #xxx
EDIT display

Select function
DIR-CONFIG-DIAG-DEL
UTIL display

Programs are created by selecting a program type in the CREATE display. The user is brought directly to the first display of the program to be edited.

Stored programs are retrieved by entering a number 1 to 150 from the RUN, EDIT, or program displays. Entering a valid program number from the RUN display automatically begins the run. Entering a valid program number from the EDIT or program display brings the user to the first display of the program to be edited.

Programs are edited by pressing STEP (move down a screen), BACK (move to the previous field) or ENTER (move to the next field).

Programs are run by selecting RUN the RUN-STORE-PRINT-HOME menu or by pressing the RUN key on the keypad. The user must first enter 2 parameters required for each run.

Tube type: MICRO
React vol: 100uL

The OPTION key toggles the tube type from MICRO (MicroAmp tube) to THIN (thin-walled GeneAmp tube). If the user configured a special tube, then the option of OTHER is added. A different reaction volume may be entered. These parameters are stored with this program. ENTER accepts these values.

Select print mode
OFF-CYCLE-SETPOINT

If the user configured the runtime printer ON and he is running a cycle, auto or method program, then the following printer choices are offered. the program is started. CYCLE prints a message only upon completion of a cycle. SETPOINT prints runtime data for every setpoint (ramp/hold time and temps).

|  |  |
|---|---|
| Select print mode<br>OFF-ON | If the user configured the runtime printer ON and he is running a hold program, then the following printer choices are offered. |

|  |  |
|---|---|
| Cover temp is xx°C<br>Run starts at 100°C | If the heated cover is below 100°C, the following screen is displayed. If the user is on this display when the heated cover reaches 100°C, the run automatically begins. If the user hit STOP to return to the program display, then the run must be manually re-started. |

Accepting HOME at the RUN-STORE-PRINT-HOME menu without saving a program displays the screen:

|  |
|---|
| Prog fxxx not stored<br>Continue? YES |

HOLD PROGRAM

```
HOLD #xxx        xx.xC
RUN-STORE-PRINT-HOME
```
PROGRAM display

```
Hold at xx.xC
Hold FOREVER-xxx:xx
```
The user can choose between an infinite soak or a time limited hold.

5
```
Beep while Hold?   NO
```
The beeper will sound once a second.

HOLD PROGRAM - Runtime displays

```
Hold at xx.xC  xx.xC
xxx:xx       Prog xx
```
RUNTIME display

None

MORE display

```
HOLD #xx        xx.xC
PAUSE xx:xx
```
KEYPAD PAUSE display

None

PROGRAMMED PAUSE

HOLD PROGRAM - Runtime printout

PE Cetus   GeneAmp PCR System 9600   Ver xx.x   Nov 14, 1990
10 xx:xx am
Tube type:MICRO  Reaction vol:100uL  Start clock within x.xC of setpt HOLD program #xxx
   HOLD  Program: xx.xC  xxx:xx     Actual: xx.xC  xxx:xx
15    or
       HOLD  Program: xx.xC  FOREVER   Actual: xx.xC  xxx:xx
HOLD program #xxx - Run Complete Nov 14, 1990 xx:xx am

CYCLE PROGRAM

```
- CYCL #xxx      xx.xC
  RUN-STORE-PRINT-HOME
```
PROGRAM display

```
X Temperature PCR
```

The default is 3. This determines the number of setpoints in this program. 1 to 9 setpoints are allowed.

```
Setpt #1   Ramp xx:xx
xx.xC      Hold xx:xx
```

The number of setpoints entered above determines how many setpoint edit displays will be offered. The user can enter a ramp and hold time for each setpoint. The hold timer will start when the sample temp gets within a user configurable temp of setpoint.

```
Total cycles = xx
Pause during run? NO
```

If the user does NOT want to pause, then the next 3 displays are skipped. 1 to 99 cycles are allowed.

```
Pause after setpt #x
Beep while pause? YES
```

Entering a 0 for setpoint number also means the user does NOT want to pause therefore the next 2 displays are skipped.

```
1st pause at cycl xx
Pause every xx cycls
```

The cycle number is limited to the total number of cycles entered above.

```
Pause time xx:xx
```

The default pause time is set in the user configuration.

CYCLE PROGRAM - Runtime displays

```
Ramp to xx.xC   xx.xC
xxx:xx        Cycle xx
```
RUNTIME display (ramp)

```
Setpt #x   Tot Cyc xx
Hrs left X.X Progxxx
```
MORE display

```
Hold at xx.xC   xx.xC
xxx:xx        Cycle xx
```
RUNTIME display (hold)

```
CYCL #xxx        xx.xC
PAUSE xx:xx
```
KEYPAD PAUSE display

```
Setpt #x           xx.xC
PAUSE xx:xx Cycle xx
```
PROGRAMMED PAUSE

CYCLE PROGRAM - Runtime printout

```
   PE Cetus   GeneAmp PCR System 9600   Ver xx.x   Nov 14, 1990
   xx:xx am
 5 Tube type:MICRO  Reaction vol:100uL  Start clock within x.xC
   of setpt CYCL program #xxx
         Cycle #xx
         Setpt #x  RAMP Program: xx.xC  xx:xx   Actual: xx.xC
10 xx:xx
                   HOLD Program: xx.xC  xx:xx   Actual: xx.xC
   xx:xx
                   :
                   :   (up to 9 setpoints)
15               . .
                   :   (up to 99 cycles)
                   .
   CYCL program #xxx - Run Complete Nov 14, 1990 xx:xx am
   CYCL program #xxx - User Aborted Nov 14, 1990 xx:xx am (only
20 if aborted)
```

AUTO PROGRAM

```
AUTO #xxx        xx.xC
RUN-STORE-PRINT-HOME
PROGRAM display
```

```
X Temperature PCR
```

The default is 3. This determines the number of setpoints in this program. 1 to 9 setpoints are allowed.

```
Setpt #1 xx.xC
Hold for xx:xx
```

The number of setpoints entered above determines how many setpoint edit displays will be offered. No ramp time is offered thus the instrument ramps as fast as possible. The hold timer start when the sample temp gets within a user configurable temp of setpoint.

```
Setpt #1 xx.xC
Change time/temp?YES
```

If the user wants to increment or decrement the time and/or temperature every cycle, then the following display is offered.

```
xx.xC delta _ x.xC
       delta   xx:xx
```

The OPTION key toggles the arrow up (increment every cycle) or down (decrement every cycle). The max time allowed to decrement is limited to the setpoint hold time.

Up to 99 cycles are allowed.

```
Total cycles = xx
```

AUTO PROGRAM - Runtime displays

```
Hold at xx.xC  xx.xC
xxx:xx      Cycle xx
```
RUNTIME display

```
Setpt #x  Tot Cyc xx
Hrs left X.X Progxxx
```
MORE display

```
AUTO #xxx      xx.xC
PAUSE xx:xx
```
KEYPAD PAUSE display

```
None
```
PROGRAMMED PAUSE

AUTO PROGRAM - Runtime printout

```
  PE Cetus   GeneAmp PCR System 9600   Ver xx.x   Nov 14, 1990
  xx:xx am
5 Tube type:MICRO  Reaction vol:100uL  Start clock within x.xC
  of setpt AUTO program #xxx
       Cycle #xx
           Setpt #x  RAMP Program: xx.xC  xx:xx   Actual: xx.xC
10 xx:xx
                    HOLD Program: xx.xC  xx:xx   Actual: xx.xC
   xx:xx
              .
              .    (up to 9 setpoints)
15            .
          .  (up to 99 cycles)
          .
   AUTO program #xxx - Run Complete Nov 12, 1990 xx:xx am
   AUTO program #xxx - User Aborted Nov 12, 1990 xx:xx am (only
20 if aborted)
```

METHOD PROGRAM

```
METH #xxx        xx.xC
RUN-STORE-PRINT-HOME
```
PROGRAM display

Link progs:    -    -
     -    -    -    -    -

Up to 17 programs can be linked in a method. If the user tries to enter a non-existant program #, the message "Prog does not exist" is displayed. If the user tries to link another method, the message "Cannot link a method" is displayed.

-    -    -    -    -
   -    -    -    -

METHOD PROGRAM - Runtime displays

The RUNTIME, MORE and PAUSE displays will be those of the program currently running. Two additional MORE displays are offered when the program running is linked in a method.

```
METH #xxx    aaa-bbb-
ccc-ddd-eee-fff-ggg-
```
ADDITIONAL MORE display

The number of the program currently running will flash.

```
hhh-iii-jjj-kkk-lll-
mmm-nnn-ooo-ppp-qqq
```

METHOD PROGRAM - Runtime printout

PE Cetus   GeneAmp PCR System 9600   Ver xx.x   Nov 14, 1990
xx:xx am
Tube type:MICRO   Reaction vol:100uL   Start clock within x.xC
of setpt METHOD program #xxx                    - preceeds all linked
program data METHOD program #xxx - Meth Complete -  follows all linked
progra data

METHOD PROGRAM - Print

Select option
METHOD-PROGRAM DATA

METHOD      prints the header of each program linked in the method.
PROGRAM DATA    prints the header and contents of each program linked in the method.

STORING A PROGRAM

When STORE is selected from the RUN-STORE-PRINT-HOME menu, the routine for storing a program is the same for a file as well as a method. Protecting a program insures the user that the program will not be overwritten or deleted without knowledge of the user number. Other users will be able to view, edit, run, and link the protected file in their methods but will not be able to alter the stored version.

| Display | Description |
|---|---|
| Store<br>Enter program #xxx | xxx is the first available program number from 1 - 150. |
| Progxxx is protected<br>Enter user #xxxx | The user has entered the # of a protected program. The correct user # must be entered in order to overwrite this program. |
| Progxxx is protected<br>Wrong user number! | The wrong user # was entered. This display remains for 5 seconds before reverting to the previous one. The user is given 3 chances to enter the correct #. |
| Progxxx is linked in<br>Methxxx Continue?YES | If the user tries to overwrite a program that is linked in a method, the user is warned and given the option of continuing or not. |
| Can't overwrite prog<br>Linked in method xxx | If the user tries to overwrite a program that is linked in a method with another method, an error message is given. |
| Store<br>Protect program? NO | The user is given the chance to protect a program as well as unprotect a previously protected program. |
| Store<br>Enter user #xxxx | The user wants to protect the program and therefore must enter a user #. |

Ready to store the program in an available slot. The user # appears only if the program is protected.

```
┌─────────────────────┐
│  Prog #xxx User #xxxx │
│  OK to store? YES     │
└─────────────────────┘
```

```
┌─────────────────────┐
│  Prog #xxx User #xxxx   │
│  OK to overwrite? YES   │
└─────────────────────┘
```

Ready to overwrite an existing program. The user # appears only if the program is protected.

UTILITY FUNCTIONS

Select function
DIR-CONFIG-DIAG-DEL
UTIL display

DIR     allow the user to view or print a directory of the stored programs by either their program number, user number or program type.

5 CONFIG allows the user to tailor the use of the instrument to their specific needs.

DIAG    offers the user a means of diagnosing runtime problems and verifying the performance of the instrument.

10 DEL    allows the user to delete stored programs by program number, user number or program type.

UTIL - DIRECTORY

```
Directory
PROG-TYPE-USER-PRINT
```

Directory by PROGram number

```
Directory
Enter program #xxx
```

Programs will be listed in numerical order starting at the given number. The STEP and BACK keys move through the directory displays. The beeper sounds at the beginning or end of the program list.

```
HOLD #124
```

STOP returns the user to the above display.

Directory by program TYPE

```
Directory
HOLD-CYCL-AUTO-METH
```

The program numbers will be listed for the selected type of program.

```
CYCL #15
```

Directory by USER number

```
Directory
Enter user #xxxx
```

All programs stored under the given user number will be listed.

```
METH #150 User #1234
```

Directory PRINT

Directory Print
PROG-TYPE-USER

The user can get a hardcopy of the directory listing in the same manner the directory is viewed above.

UTIL - USER CONFIGURATION

| | |
|---|---|
| Configuration EDIT-PRINT | The configuration file can be edited by accepting EDIT from the menu or by pressing the STEP key. PRINT prints the contents of this file. |
| Time: xx:xx  Date: mm/dd/yy | The user can set the system time and date. |
| Runtime printer OFF  Runtime beeper ON | If the runtime printer is ON, the user will be prompted with printer option as the start of each run. If the runtime beeper is ON, then a beep will sound at the end of each segment (after a ramp or hold portion of a sequence) while running a program. |
| Pause time-out limit xx:xx | This time represents the maximum amount of time a program can pause for before it is aborted. This pertains only to the keypad pause. |
| Allowed setpt error x.x°C | This time represents the number of degrees the actual sample temp may vary from the setpoint before an error is flagged. |
| Idle state setpoint xx°C | This setpoint is useful for balancing the control cooling power which is always present. The sample temp will be maintained at the idle state setpoint whenever the instrument is idle. |
| Start clock within x.x°C of setpoint | The clock which times the hold segment of a running program can be configured to be triggered when it gets within this temperature of the sample temp. The nominal value is 1.0°C. |

If the user wishes to use a different type of tube other than the MicroAmp or Thin-walled GeneAmp tubes, they must set this option to YES and enter at least 3 pairs of Special tube?  NO reaction volume and tube time constant data. This curve will be used to extrapolate the correct Tau (tube time constant) for each run using this special tube depending on the reaction volume entered by the user at the start of a run.

– 231 w –

~~ 56 23 ~~

UTIL - USER CONFIGURATION (cont)

| Rxn vol=xxxuL T=xxxs  Rxn vol=xxxuL T=xxxs | 3 sets of this screen will be offered if the user sets "Special tube?" to YES. |

UTIL - DELETE

Delete
PROGRAM-USER-ALL

Delete by PROGRAM

Delete
Enter program #xxx

All programs (files and methods) can be deleted by number.

Can't delete progxxx
Linked in methodxxx!

A program cannot be deleted if it linked in a method.

Progxxx is protected
Enter user #xxxx

The user has entered the # of a protected program. The correct user # must be entered in order to delete this program.

Progxxx is protected
Wrong user number!

The wrong user # was entered. This display remains for 5 seconds before reverting to the previous one. The user is given 3 chances to enter the correct #.

Prog #xxx User #xxxx
Delete program? YES

Ready to delete the program. The user # appears only if the program was protected.

Delete by USER

Delete
Enter user #xxxx

Programs can be deleted under a given user number.

Delete
No progs with #xxxx

If no programs exist with the given user #, the following message is displayed.

**Progs linked in meth
STEP to list progs**

Programs cannot be deleted if they are linked in a method. The STEP key will cycle through the list of linked programs.

UTIL - DELETE (cont)

| | |
|---|---|
| Can't delete progxxx<br>Linked in methodxxx! | The list of the linked programs will show which method the program is linked to. |
| User #xxxx<br>Delete all progs?YES | This will delete all the programs under the given user # that are not linked. |

Delete ALL

| | |
|---|---|
| Delete every<br>unprotected prog?YES | This will delete every unprotected program that is not linked in a protected method. |

UTIL - USER DIAGNOSTICS

While running any diagnostic test, the STOP key always returns the user to the top level diagnostic screen and automatically increments the test number and name to the next test. This facilitates manually cycling through the available diagnostics.

```
Enter Diag Test #1
REVIEW HISTORY FILE
```

The user can enter the number of the diagnostic to run or can use the STEP or BACK keys to cycle through the available tests. Every time the STEP or BACK key is pressed, the test number is incremented or decremented and the associated test name is displayed. This feature eliminates the need for the user to memorize the number associated with each test.

REVIEW HISTORY FILE

```
Enter Diag Test #1
REVIEW HISTORY FILE
```

The history file is a circular buffer in battery RAM which can store up to 500 records of the latest run. When the buffer is full, the oldest entries will be overwritten. The buffer will automatically be cleared before a program is executed.

```
HISTORY      nnn recs
ALL-STAT-ERRORS-PRNT
```

The history file header displays the current number of records in the file ('nnn').
ALL views all the records
STAT views only the status records
ERRORS views only the records with error messages
PRNT prints all or part of the history file The two types of records are 1) status records which give information about the program and 2) data records which give information abount each hold and ramp segment in a program. A Hold program is treated as one hold segment and the data record will be stored when the file ends.

Since there could be hundreds of entries (50 cycles X 6 setpoints ~= 350 entries), fast, bi-directional movement through the file is required. Note that most PCR programs will be 3 or 6 setpoints and 40 cycles or less. The entries will normally be reviewed in reverse order, thus the first record seen will be the last record written.

If the user has chosen a type of record to view, STEP or BACK will move down or up the buffer by one entry of the chosen type. By preceding STEP or BACK with a number, the second line is replaced with "Skip #XXX entries". The user enters a number and presses ENTER to accept the value and that number of entries is skipped going forward (STEP) or backward (BACK).

By preceding STEP or BACK with the RUN key, the user can quickly move to the largest record # (the newest record) or record #1 (the oldest record) of the chosen type.

STOP terminates the review mode and displays the file header.

STATUS RECORD

| `ffff #xxx/mmm    nnn`<br>`message` | 'ffff' is either HOLD, CYCL or AUTO<br>'xxx' is the program number<br>'/mmm' is the method number for a linked program, else blank |

'nnn' is the record number

'message' is one of the following:

Status messages

| | |
|---|---|
| Tube Type: xxxxx | Type of sample tube used in the run |
| Reaction vol: xxxuL | Reaction volume used in the run |
| Clk starts w/in x.xC | The hold clock starts within this temp of setpoint |
| Start xx/xx/xx xx:xx | Time and date of the start of the run |
| End   xx/xx/xx xx:xx | Time and date of the end of the run |
| Meth Complete | All programs linked in the method are complete |
| Pause xx:xx at xx.xC | The program paused for this time at this temp |

Fatal status messages

| | |
|---|---|
| Sensor Error | A sensor had a bad reading 10 times in a row |
| Power fail xxx.x hrs | The power was off for this amount of time |
| User Abort | The user pressed the STOP key during the run |
| Pause Timeout xx:xx | The keypad pause has reached its configurable time limit. |
| Fatal Setpoint Error | Is the requirement to abort a program if the setpoint is not reached within a calculated amount of time. A 10 X 10 lookup table of starting ramp temperature (0°C - 100°C in 10°C increments) vs. ending ramp temperature (same axis labeling) will hold the average time the TC2 should take to ramp up or down any given amount of degrees. The file will be aborted if the setpoint is not reached in the amount of time calculated as follows: | programmed ramp time + (2 * lookup table value) + 10 minutes

DATA RECORD

'f' is either HOLD, CYCL or AUTO
'xxx' is the program number

-231 DD-
~~-56-30-~~

```
f#xxx/mmm ddd.dC nnn
Cycyy Setpt z mmm:ss
```

'/mmm' is the method number for a linked program else blank
'ddd.d' is the ending setpoint temp 'nnn' is the record number 'yy' is the cycle number
'z' is the setpoint number
'mmm:ss' is the setpoint time The cycle and setpoint number fields will be omitted for a Hold program.

―231 EE―
~~56;31~~

DATA ERROR RECORD

```
message    ddd.dC nnn
Cycyy Setpt z mmm:ss
```

'ddd.d' is the ending setpoint temp
'nnn' is the record number
'yy' is the cycle number
'z' is the setpoint number
'mmm:ss' is the setpoint time
'message' indicates a non-fatal error as follows:

Non-fatal Error messages

Setp Error  The setpoint was not reached in the calculated time:
            programmed ramp time + (2 * lookup table value).

Prog Error  An Auto program auto increment/decrement of the setpoint temp or time caused the hold time to go negative           or the temp to go out of the range 0.1°C to 100°C.

Temp Error  At the end of the segment, the setpoint temp has drifted +/- a user configurable amount.

For the Hold program, the cycle and setpoint fields will be omitted.

PRINTING THE HISTORY FILE

Access to the history file print routines is through the history file header menu. The OPTION key cycles the cursor through the options:

```
HISTORY      nnn recs
ALL-STAT-ERRORS-PRNT
```

5 Pressing the ENTER key when the cursor is positioned under PRNT displays the print screen:

```
Print History
ALL-STAT-ERRORS
```

ALL     prints all the records in the file
    STAT    prints only the status records
    ERRORS   prints only the records with error messages 10 When one of print options is selected, the following screen is displayed:

```
Print History
Print from prog #xx
```

The first (most recent) program number will be the default program. The user can change the program number from which to begin printing. While printing, the following screen is
15 displayed:

```
Print History
...printing
```

At the end of printing, the Print History menu is again displayed.

HEATER TEST

---
Enter Diag Test #2
HEATER TEST

---

The heater test calculates the heat rate of the sample block as its temperature rises from 35°C to 65°C. The following screen is displayed as it forces the block temperature to 35°C.

---
Heater Test Blk=XX.X
going to 35C...

---

When the temperature stabilizes, all heaters are turned on full power. The display now reads "going to 65C" and the block temperature is monitored for 20 seconds after it passes 50°C. After 20 seconds, a pass or fail message is displayed.

---
Heater Test PASSES

---

CHILLER TEST

---

Enter Diag Test #1
CHILLER TEST

---

The chiller test calculates the cool rate of the sample block as its temperature drops from 35°C to 15°C. The following screen is displayed as it forces the block temperature to 35°C.

---

Chillr Test Blk=XX.X
going to 35C...

---

When the temperature stabilizes, the chiller is on. The display now reads "going to 15C" and the block temperature is monitored for 20 seconds after it passes 25°C. After 20 seconds, a pass or fail message is displayed.

---

Chiller test PASSES

---

GENEAMP PCR SYSTEM 9600
USER INTERFACE SPECIFICATION

The objective of the GeneAmp PCR System 9600 user interface is to provide a simple way to develop and run programs that perform PCR.

There are 3 types of programs available. The HOLD program consists of a single setpoint held for a set amount of time or held for an infinite amount of time and terminated by the STOP key. The CYCLE program adds the features of timed ramps and programmable pauses. This program allows up to 9 setpoints and up to 99 cycles. The AUTO program allows the user to increment or decrement the setpoint time and/or temperature a fixed amount every cycle. This program also allows programmable pauses, up to 9 setpoints and up to 99 cycles. A METHOD program provides a way to link up to 17 hold, cycle or auto programs together.

A total of 150 programs can be stored with numbers ranging from 1 to 150. Programs can be created, stored, protected, printed, or deleted. A directory of the stored programs can be viewed or printed.

THE SYSTEM 9600 KEYPAD

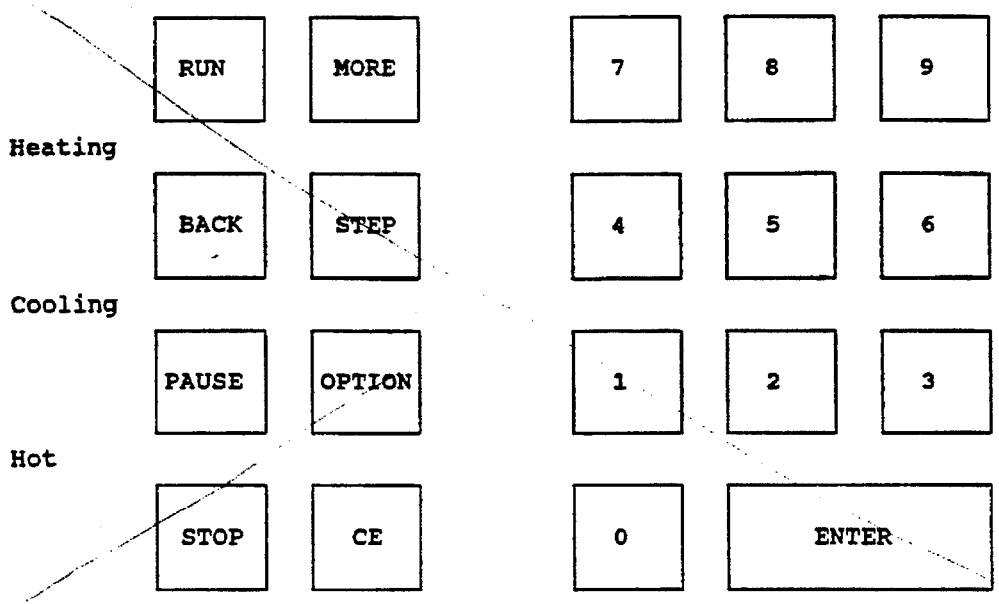

| | |
|---|---|
| RUN | starts a program running from the program display or restarts a programmed or keypad pause. |
| MORE | toggles the runtime displays and also accesses the service-only functions (if followed by the code 999). |
| BACK | moves to the previous field within the same screen. If currently positioned on the first field, it moves to the previous screen. |
| STEP | moves down to the first field in the next screen. |
| PAUSE | starts a paused time-out for manual interruptions. |
| OPTION | either moves the cursor left-to-right through the menu items (rolling over to the leftmost option) or toggles the YES/NO response. |
| STOP | aborts a running program or moves the user up one level in the user interface. |
| CE | clears invalid numeric entries. |
| ENTER | accepts the current numeric entry, accepts a menu item, accepts a YES/NO response, or skips to the next field of a display. If the numeric entry is the last of a display, ENTER steps to the next display. |

COMMON SYSTEM 9600 DISPLAYS

PROGRAM display

```
Prog ###   Msg    Temp
Menu
```

Example:
```
CYCL# 17 Done   74.0C
RUN-STORE-PRINT-HOME
```

```
Prog       is either HOLD, CYCL, AUTO or METH
is the program # (1-150) or ??? if it is not stored yet
Msg        is either Done, Error, Abort or blank
Temp       is the current sample temperature
Menu       are the available options
```

RUNTIME display

```
Action          Temp
Timer           Prog/Cyc
```

Example:
```
Ramp to 94.0C   29.6C
10:00           Cycle 14
```

```
Action     is either 'Hold at xx.xC' or 'Ramp to xx.xC'
Temp       is the current sample temperature
Timer      counts down the hold or ramp time or counts up a hold time of
           FOREVER
Prog/Cyc   for a HOLD file is 'Prog xxx'
           for a CYCL or AUTO file is 'Cycle xx' - counts up
```

MORE display

```
Setpt       Tot Cyc
Timer       Prog
```

Example:
```
Setpt #3  Tot Cyc 25
Hrs left 2.5 Prog 17
```

```
Setpt      is the current setpoint # (1-9) - counts up
Tot Cyc    is the total # of cycles (1-99) in the current program
Timer      is the time left in the program in hrs - counts down
Prog       is the current program # (1-150)
```

KEYPAD PAUSE display

```
Prog ###         Temp
PAUSE Timer
```

Example:
```
AUTO# 18          55.0C
PAUSE  9:45
```

```
Prog       is either HOLD, CYCL, AUTO or METH
is the program # (1-150) or ??? if it is not stored yet
Temp       is the current sample temperature
Timer      is the configurable pause time - counts down
```

TOP LEVEL USER INTERFACE

```
Select Option    9600
RUN-CREATE-EDIT-UTIL
```
TOP LEVEL display

```
Run
Enter program #xxx
```
RUN display

```
Create program
HOLD-CYCL-AUTO-METH
```
CREATE display

```
Edit
Enter program #xxx
```
EDIT display

```
Select function
DIR-CONFIG-DIAG-DEL
```
UTIL display

Programs are created by selecting a program type in the CREATE display. The user is brought directly to the first display of the program to be edited.

Stored programs are retrieved by entering a number 1 to 150 from the RUN, EDIT, or program displays. Entering a valid program number from the RUN display automatically begins the run. Entering a valid program number from the EDIT or program display brings the user to the first display of the program to be edited.

Programs are edited by pressing STEP (move down a screen), BACK (move to the previous field) or ENTER (move to the next field).

Programs are run by selecting RUN the RUN-STORE-PRINT-HOME menu or by pressing the RUN key on the keypad. The user must first enter 2 parameters required for each run.

```
Select tube    MICRO
Reaction vol? 100uL
```

The OPTION key toggles the tube type from MICRO (MicroAmp tube) to THIN (thin-walled GeneAmp tube). If the user configured a special tube, then the option of OTHER is added. A different reaction volume may be entered. These parameters are stored with this program. ENTER accepts these values.

```
Select print mode
OFF-CYCLE-SETPOINT
```

If the user configured the runtime printer ON and he is running a cycle, auto or method program, then the following printer choices are offered. the program is started. CYCLE prints a message only upon completion of a cycle. SETPOINT prints runtime data for every setpoint (ramp/hold time and temps).

```
Select print mode
OFF-ON
```

If the user configured the runtime printer ON and he is running a hold program, then the following printer choices are offered.

```
Cover temp is  xx°C
Run starts at 100°C
```

If the heated cover is below 100°C, the following screen is displayed. If the user is on this display when the heated cover reaches 100°C, the run automatically begins. If the user hit STOP to return to the program display, then the run must be manually re-started.

```
Prog #xxx not stored
Continue? YES
```

Accepting HOME at the RUN-STORE-PRINT-HOME menu without saving a program displays this screen.

```
CYCL#xxx        xx.xC
Abort program? YES
```

If the STOP key is pressed while a program is running, the user is given the chance of aborting the program or continuing.

HOLD PROGRAM

```
HOLD#xxx          xx.xC
RUN-STORE-PRINT-HOME
```
PROGRAM display

```
Hold at xx.xC
Hold FOREVER-xxx:xx
```

The user can choose between an infinite soak or a time limited hold.

```
Beep while Hold?  NO
```

The beeper will sound once a second.

HOLD PROGRAM - Runtime displays

```
Ramp to xx.xC   xx.xC
  0:00         Progxxx
```
RUNTIME display (ramp)

```
Hold at xx.xC   xx.xC
xxx:xx         Progxxx
```
RUNTIME display (hold)

```
HOLD#xxx         xx.xC
PAUSE xx:xx
```
KEYPAD PAUSE display

```
Hrs left x.x Progxxx
```
MORE display

```
None
```
PROGRAMMED PAUSE

HOLD PROGRAM - Runtime printout

```
PE Cetus   GeneAmp PCR System 9600   Ver 1.06   Mar 18, 1992 12:32 pm

Tube type MICRO   Reaction vol 100uL   Start clock within 1.0C of setpt

HOLD Program #xxx
              RAMP  Program: xx.xC  0:00      Actual: xx.xC  xx:xx
              HOLD  Program: xx.xC xxx:xx     Actual: xx.xC xxx:xx
HOLD Program #xxx  - Run Complete Mar 18, 1992 12:32 pm
                or
              HOLD  Program: xx.xC FOREVER    Actual: xx.xC xxx:xx
```

HOLD Program #xxx   - User Abort   Mar 18, 1992 12:32 pm

CYCLE PROGRAM

```
CYCL#xxx          xx.xC
RUN-STORE-PRINT-HOME
```
PROGRAM display

```
x Temperature PCR
```

The default is 3. This determines the number of setpoints in this program. 1 to 9 setpoints are allowed.

```
Setpt #1   Ramp xx:xx
xx.xC      Hold xx:xx
```

The number of setpoints entered above determines how many setpoint edit displays will be offered. The user can enter a ramp and hold time for each setpoint. The hold timer will start when the sample temp gets within a user configurable temp of setpoint.

```
Total cycles =xx
Pause during run? NO
```

If the user does NOT want to pause, then the next 3 displays are skipped. 1 to 99 cycles are allowed.

```
Pause after setpt #x
Beep while pause?YES
```

Entering a 0 for setpoint number also means the user does NOT want to pause therefore the next 2 displays are skipped.

```
1st pause at cyc xx
Pause every xx cyc's
```

The cycle number is limited to the total number of cycles entered above.

```
Pause time xx:xx
```

The default pause time is set in the user configuration.

CYCLE PROGRAM - Runtime displays

```
Ramp to xx.xC   xx.xC
xx:xx         Cycle xx
```
RUNTIME display (ramp)

```
Hold at xx.xC   xx.xC
xx:xx         Cycle xx
```
RUNTIME display (hold)

```
CYCL#xxx        xx.xC
PAUSE xx:xx
```
KEYPAD PAUSE display

```
Setpt #x   Tot Cyc xx
Hrs left X.X Progxxx
```
MORE display

```
Setpt #x        xx.xC
PAUSE xx:xx Cycle xx
```
PROGRAMMED PAUSE

CYCLE PROGRAM - Runtime printout

```
PE Cetus   GeneAmp PCR System 9600   Ver 1.06   Mar 18, 1992 12:32 pm

Tube type MICRO   Reaction vol 100uL   Start clock within 1.0C of setpt

CYCL Program #xxx
        Setpt #x   RAMP Program: xx.xC  xx:xx    Actual: xx.xC  xx:xx
                   HOLD Program: xx.xC  xx:xx    Actual: xx.xC  xx:xx
                       .
                       .   (up to 9 setpoints)
        Cycle #xx Complete
                   .
                   .   (up to 99 cycles)
                   .
CYCL Program #xxx   - Run Complete Mar 18, 1992 12:32 pm
CYCL Program #xxx   - User Abort   Mar 18, 1992 12:32 pm (only if aborted)
```

AUTO PROGRAM

```
AUTO#xxx          xx.xC
RUN-STORE-PRINT-HOME
```
PROGRAM display

```
x Temperature PCR
```
The default is 3. This determines the number of setpoints in this program. 1 to 9 setpoints are allowed.

```
Setpt #1 xx.xC
Hold for xx:xx
```
The number of setpoints entered above determines how many setpoint edit displays will be offered. No ramp time is offered thus the instrument ramps as fast as possible. The hold timer start when the sample temp gets within a user configurable temp of setpoint.

```
Setpt #1 xx.xC
Change time/temp?YES
```
If the user wants to increment or decrement the time and/or temperature every cycle, then the following display is offered.

```
xx.xC  delta _  x.xC
       delta   xx:xx
```
The OPTION key toggles the arrow up (increment every cycle) or down (decrement every cycle). The max time allowed to decrement is limited to the setpoint hold time.

```
Total cycles =xx
Pause during run? NO
```
If the user does NOT want to pause, then the next 3 displays are skipped. 1 to 99 cycles are allowed.

```
Pause after setpt #x
Beep while pause?YES
```
Entering a 0 for setpoint number also means the user does NOT want to pause therefore the next 2 displays are skipped.

```
1st pause at cyc xx
Pause every xx cyc's
```
The cycle number is limited to the total number of cycles entered above.

```
Pause time xx:xx
```
The default pause time is set in the user configuration.

AUTO PROGRAM - Runtime displays

```
Hold at xx.xC   xx.xC
xx:xx         Cycle xx
```
RUNTIME display

```
Setpt #x  Tot Cyc xx
Hrs left X.X Progxxx
```
MORE display

```
AUTO#xxx        xx.xC
PAUSE xx:xx
```
KEYPAD PAUSE display

```
Setpt #x        xx.xC
PAUSE xx:xx Cycle xx
```
PROGRAMMED PAUSE

AUTO PROGRAM - Runtime printout

```
PE Cetus   GeneAmp PCR System 9600   Ver xx.x   Mar 18, 1992 12:32 pm

Tube type MICRO   Reaction vol 100uL   Start clock within 1.0C of setpt

AUTO Program #xxx
        Setpt #x   RAMP  Program: xx.xC  xx:xx   Actual: xx.xC  xx:xx
                   HOLD  Program: xx.xC  xx:xx   Actual: xx.xC  xx:xx
                    .
                    .  (up to 9 setpoints)
                    .
        Cycle #xx Complete
                .
                .  (up to 99 cycles)
                .
AUTO Program #xxx   - Run Complete Mar 18, 1992 12:32 pm
AUTO Program #xxx   - User Aborted Mar 18, 1992 12:32 pm (only if aborted)
```

METHOD PROGRAM

```
METH#xxx         xx.xC
RUN-STORE-PRINT-HOME
```
PROGRAM display

```
Link progs:   -   -
   -   -   -   -   -
```

Up to 17 programs can be linked in a method. If the user tries to enter a non-existant program #, the message "Prog does not exist" is displayed. If the user tries to link another method, the message "Cannot link a method" is displayed.

```
   -   -   -   -   -
   -   -   -   -
```

METHOD PROGRAM - Runtime printout

PE Cetus   GeneAmp PCR System 9600   Ver 1.06   Mar 18, 1992 12:32 pm

Tube type MICRO   Reaction vol 100uL   Start clock within 1.0C of setpt

METHOD Program #xxx                    - preceeds all linked program data
METHOD Program #xxx - Method Complete -  follows all linked program data

METHOD PROGRAM - Print

```
Select option
METHOD-PROGRAM DATA
```

Method          prints the number and type of each program linked in the method.
Program Data    prints the number, type and contents of each program linked in the method.

STORING A PROGRAM

When STORE is selected from the RUN-STORE-PRINT-HOME menu, the routine for storing a program is the same for a file as well as a method. Protecting a program insures the user that the program will not be overwritten or deleted without knowledge of the user number. Other users will be able to view, edit, run, and link the protected file in their methods but will not be able to alter the stored version.

```
Store
Enter program #xxx
```
xxx is the first available program number from 1 - 150.

```
Progxxx is protected
Enter user #xxxx
```
The user has entered the # of a protected program. The correct user # must be entered in order to overwrite this program.

```
Progxxx is protected
Wrong user number!
```
The wrong user # was entered. This display remains for 5 seconds before reverting to the previous one. The user is given 3 chances to enter the correct #.

```
Progxxx is linked in
Methxxx Continue?YES
```
If the user tries to overwrite a program that is linked in a method, the user is warned and given the option of continuing or not.

```
Can't overwrite prog
Linked in method xxx
```
If the user tries to overwrite a program that is linked in a method with another method, an error message is given.

```
Store
Protect program?  NO
```
The user is given the chance to protect a program as well as unprotect a previously protected program.

```
Store
Enter user #xxxx
```
The user wants to protect the program and therefore must enter a user #.

```
Prog#xxx    User#xxxx
OK to store? YES
```
Ready to store the program in an available slot. The user # appears only if the program is protected.

```
Prog#xxx    User#xxxx
OK to overwrite? YES
```
Ready to overwrite an existing program. The user # appears only if the program is protected.

– 231 vv –

UTILITY FUNCTIONS

```
Select function
DIR-CONFIG-DIAG-DEL
```
UTIL display

Dir     allow the user to view or print a directory of the stored programs by either their program number, user number or program type.

Config     allows the user to tailor the use of the instrument to their specific needs.

Diag     offers the user a means of diagnosing runtime problems and verifying the performance of the instrument.

Del     allows the user to delete stored programs by program number, user number or program type.

UTIL - DIRECTORY

```
Directory
PROG-TYPE-USER-PRINT
```

The key sequence 'MORE 1 2 3' from this display will reveal all the stored programs and their user numbers (if they have one). This will allow someone to erase programs that no one knows the user number of.

Directory by PROGram number

```
Directory -
Enter program #xxx
```

Programs will be listed in numerical order starting at the given number. The STEP and BACK keys move through the directory displays. The beeper sounds at the beginning or end of the program list.

```
HOLD#124
```

STOP returns the user to the above display.

Directory by program TYPE

```
Directory
HOLD-CYCL-AUTO-METH
```

The program numbers will be listed for the selected type of program.

```
CYCL# 15
```

Directory by USER number

```
Directory
Enter user #xxxx
```

All programs stored under the given user number will be listed.

```
METH#150    User#1234
```

Directory PRINT

```
Directory Print
PROG-TYPE-USER
```

The user can get a hardcopy of the directory listing in the same manner the directory is viewed above.

UTIL - USER CONFIGURATION

```
Configuration
EDIT-PRINT
```

The configuration file can be edited by accepting EDIT from the menu or by pressing the STEP key. PRINT prints the contents of this file. Pressing MORE from this screen will give a hidden serial port baud rate choice of 9600 or 2400 baud.

The user can set the system time and date.

```
Time: hh:mm.
Date: mm/dd/yy
```

```
Runtime printer OFF
Runtime beeper   ON
```

If the runtime printer is ON, the user will be prompted with printer option as the start of each run. If the runtime beeper is ON, then a beep will sound at the end of each segment (after a ramp or hold portion of a sequence) while running a program.

```
Pause time-out limit
xx:xx
```

This time represents the maximum amount of time a program can pause for before it is aborted. This pertains only to a keypad pause (via the PAUSE or STOP key).

```
Allowed setpt error
x.x°C
```

This temperature represents the number of degrees the actual sample temperature may vary from the setpoint, at the end of a hold segment, before an error is flagged.

```
Idle state setpoint
xx°C
```

This setpoint is the temperature the 9600 goes to during any idle state.

```
Start clock within
x.x°C of setpoint
```

The clock which times the hold segment of a running program can be configured to be triggered when the sample temp gets within this temperature of setpoint. The nominal value is 1.0°C.

```
Special tube?   NO
```

If the user wishes to use a different type of tube other than the MicroAmp or Thin-walled GeneAmp tubes, they must set this option to YES and enter the tube time constant for a reaction volume of 100uL, 50uL and 20uL. This curve will be used to extrapolate the correct Tau (tube time constant) for each run using this special tube depending on the reaction volume entered by the user at the start of a run.

UTIL - USER CONFIGURATION (cont)

```
Rxn vol=100uL T= 9.5
Rxn vol= 50uL T= 7.0
```

The following 2 screens will be offered only if the user toggles the response to "Special tube?" to YES.

```
Rxn vol= 20uL T= 5.0
```

```
Set MICRO tube time
constants?          NO
```

If the time constants for the MicroAmp tubes should change, the user must be able to enter the new time constants so the software can adjust itself accordingly. The OPTION key toggles the response from NO (no modification required) to DEFAULTS (put the time constants back to their default values) to MODIFY (enter new time constants). The ENTER key accepts the selected response.

```
Rxn vol=100uL T= 9.5
Rxn vol= 50uL T= 7.0
```

The following 2 screens will be offered only if the user toggles the response to "Set MICRO tube time constants?" to MODIFY.

```
Rxn vol= 20uL T= 5.0
```

```
Set THIN tube time
constants?          NO
```

The following 3 displays are needed only if the time constants for the Thin-walled GeneAmp tubes should change. They funtion exactly like the the displays for the MicroAmp tubes above.

```
Rxn vol=100uL T=12.0
Rxn vol= 50uL T=12.0
```

```
Rxn vol= 20uL T=12.0
```

UTIL - DELETE

```
Delete
PROGRAM-USER-ALL
```

Delete by PROGRAM

```
Delete
Enter program #xxx
```
All programs (files and methods) can be deleted by number.

```
Can't delete progxxx
Linked in methodxxx!
```
A program cannot be deleted if it linked in a method.

```
Progxxx is protected
Enter user #xxxx
```
The user has entered the # of a protected program. The correct user # must be entered in order to delete this program.

```
Progxxx is protected
Wrong user number!
```
The wrong user # was entered. This display remains for 5 seconds before reverting to the previous one. The user is given 3 chances to enter the correct #.

```
Prog#xxx   User#xxxx
Delete program? YES
```
Ready to delete the program. The user # appears only if the program was protected.

Delete by USER

```
Delete
Enter user #xxxx
```
Programs can be deleted under a given user number.

```
Delete
No programs found!
```
If no programs exist with the given user #, the following message is displayed.

```
Progs linked in meth
STEP to list progs
```
Programs cannot be deleted if they are linked in a method. The STEP key will cycle through the list of linked programs.

UTIL - DELETE (cont)

```
Can't delete progxxx
Linked in methodxxx!
```
The list of the linked programs will show which method the program is linked to.

```
User #xxxx
Delete all progs?YES
```
This will delete all the programs under the given user # that are not linked.

Delete ALL

```
Delete every
unprotected prog?YES
```
This will delete every unprotected program that is not linked in a protected method.

UTIL - USER DIAGNOSTICS

While running any diagnostic test, the STOP key always returns the user to the top level diagnostic screen and automatically increments the test number and name to the next test. This facilitates manually cycling through the available diagnostics.

```
Enter Diag Test #1
REVIEW HISTORY FILE
```

The user can enter the number of the diagnostic to run or can use the STEP or BACK keys to cycle through the available tests. Every time the STEP or BACK key is pressed, the test number is incremented or decremented and the associated test name is displayed. This feature eliminates the need for the user to memorize the number associated with each test.

REVIEW HISTORY FILE

```
Enter Diag Test #1
REVIEW HISTORY FILE
```

The history file is a circular buffer in battery RAM which can store up to 500 records of the latest run. When the buffer is full, the oldest entries will be overwritten. The buffer will automatically be cleared before a program is executed.

```
HISTORY     nnn recs
ALL-STAT-ERROR-PRINT
```

The history file header displays the current number of records in the file ('nnn').

All    views all the records
Stat    views only the status records
Error    views only the records with error messages
Print    prints all or part of the history file The two types of records are 1) status records which give information about the program and 2) data records which give information abount each hold and ramp segment in a program.

The entries will be viewed in reverse order, thus the first record seen will be the last record written.

After the user has chosen a type of record to view, STEP or BACK will move down or up the buffer by one record of the chosen type. By preceding STEP or BACK with a number, the second line is replaced with "Skip #XXX records". The user enters a number and presses ENTER to accept the value and that number of records is skipped going forward (STEP) or backward (BACK).

By preceding STEP or BACK with the RUN key, the user can quickly move to the largest record # (the newest record) or record #1 (the oldest record) of the chosen type.

STOP terminates viewing the history records.

STATUS RECORD

```
ffff #xxx/mmm    nnn
message
```

'ffff' is either HOLD, CYCL or AUTO
'xxx' is the program number
'/mmm' is the method number for a linked program, else blank
'nnn' is the record number
'message' is one of the following:

Status messages

| | |
|---|---|
| Tube Type: xxxxx | Type of sample tube used in the run |
| Reaction vol: xxxuL | Reaction volume used in the run |
| Clk starts w/in x.xC | The hold clock starts within this temp of setpoint |
| Start xx/xx/xx xx:xx | Time and date of the start of the run |
| End   xx/xx/xx xx:xx | Time and date of the end of the run |
| Meth Complete | All programs linked in the method are complete |
| Pause xx:xx at xx.xC | The program paused for this time at this temp |

Fatal status messages

| | |
|---|---|
| Sensor Error | A sensor had a bad reading 10 times in a row |
| Power fail xxx.x hrs | The power was off for this amount of time |
| User Abort | The user pressed the STOP key during the run |
| Pause Timeout xx:xx | The keypad pause has reached its configurable time limit. |
| Fatal Setpoint Error | Is the requirement to abort a program if the setpoint is not reached within a calculated amount of time. A 10 X 10 lookup table of starting ramp temperature (0°C – 100°C in 10°C increments) vs. ending ramp temperature (same axis labeling) will hold the average time the TC2 should take to ramp up or down any given amount of degrees. The file will be aborted if the setpoint is not reached in the amount of time calculated as follows: | programmed ramp time + (2 * lookup table value) + 10 minutes

DATA RECORD

```
f#xxx/mmm ddd.dC nnn
Cycyy Setpt z mmm:ss
```

'f' is either HOLD, CYCL or AUTO
'xxx' is the program number
'/mmm' is the method number for a linked program else blank
'ddd.d' is the ending setpoint temp
'nnn' is the record number
'yy' is the cycle number
'z' is the setpoint number
'mmm:ss' is total setpoint time (ramp + hold time)

The cycle and setpoint number fields will be omitted for a Hold program.

DATA ERROR RECORD

```
message    ddd.dC nnn
Cycyy Setpt z mmm:ss
```

'ddd.d' is the ending setpoint temp
'nnn' is the record number
'yy' is the cycle number
'z' is the setpoint number
'mmm:ss' is the total setpoint time
'message' indicates a non-fatal error
as follows:

Non-fatal Error messages

Setp Error    The setpoint was not reached in the calculated time:
              programmed ramp time + (2 * lookup table value).
Prog Error    An Auto program auto increment/decrement of the setpoint
              temp or time caused the hold time to go negative
                 or the temp to go out of the range 0.1°C to 100°C.
Temp Error    At the end of the segment, the setpoint temp has drifted
              +/- a user configurable amount.

For the Hold program, the cycle and setpoint fields will be omitted.

PRINTING THE HISTORY FILE

```
HISTORY      nnn recs
ALL-STAT-ERROR-PRINT
```

Access to the history file print routines is through the history file header menu. The OPTION key cycles the cursor through the options.

```
History Print
ALL-STAT-ERRORS
```

Pressing the ENTER key when the cursor is positioned under PRINT displays the print screen.

All     prints all the records in the file
Stat    prints only the status records
Errors  prints only the records with error messages

```
History Print
printing...
```

While printing, the following screen is displayed.

At the end of printing, the History menu is again displayed.

HEATER TEST

```
Enter Diag Test #2
HEATER TEST
```

The heater test calculates the heat rate of the sample block by driving the block to 35°C then ramping upwards as fast as possible and monitoring the rise in block temperature after the block crosses the 50°C mark.

```
Heater Test  Blk=xxC
going to 35C...
```

The block is forced to 35°C.

```
Heater Test  Blk=35C
wait 30 sec...  0:00
```

When the block reaches 35°C, it stabilizes for 30 seconds. A count up timer counts out the 30 seconds.

```
Heater Test  Blk=xxC
ramping...
```

After 30 seconds, all heaters are turned on full power as the block ramps upwards as fast as possible.

```
Heater Test  Blk=xxC
timing...       0:00
```

When the block crosses 50°C, the heat rate is monitored for the next 20 seconds. A count up timer counts out the 20 seconds.

```
Heater Test Passed
Rate = x.xx°/sec
```

A pass or fail message is displayed at the end of the test. If the display test info flag is on, the rate is diplayed also.

CHILLER TEST

```
Enter Diag Test #3
CHILLER TEST
```

The chiller test calculates the cool rate of the sample block by driving the block to 50°C then ramping downwards as fast as possible and monitoring the drop in block temperature after the block crosses the 25°C mark.

```
Chiller Test Blk=xxC
waiting...   H2O=xxC
```

The coolant temperature must be below 15°C before the test will start.

```
Chiller Failure
 CALL SERVICE!
```

If the chiller cannot cool the coolant to 15°C within 12 minutes, there is a problem with the chiller and this message is displayed.

```
Chiller Test Blk=xxC
going to 50C...
```

The following screen is displayed as it forces the block temperature to 50°C.

```
Chiller Test Blk=50C
wait 30 sec...  0:00
```

When the block reaches 50°C, it stabilizes for 30 seconds. A count up timer counts out the 30 seconds.

```
Chiller Test Blk=xxC
ramping...
```

After 30 seconds, all heaters are turned off as the block ramps downwards as fast as possible.

```
Chiller Test Blk=xxC
timing...       0:00
```

When the block crosses 25°C, the cool rate is monitored for the next 20 seconds. A count up timer counts out the 20 seconds.

```
Chiller Test Passed
Rate = x.xx°/sec
```

A pass or fail message is displayed at the end of the test. If the display test info flag is turned on, the rate is displayed also.

– 231 III –

SYSTEM PERFORMANCE TEST

> Enter Diag Test #4
> SYSTEM PERFORMANCE

The system performance diagnostic performs an extensive test of the heating and cooling systems. It measures or calculates control cooling conductance, ramp cooling conductance at 10°C and 18°C, cooling power at 10°C and 18°C, sample block thermal and coolant capacity and sample block sensor lag. The user would normally not run this test unless he suspected a problem with the instrument. If the tests detect a problem, the user will be able to call a Service person and report the result of the failing test. The tests takes approximately 30 minutes to run. The user sees only a subset of the tests listed above.

> System Performance
> VIEW-RUN-PRINT

The user is given the option of viewing the results of the latest test, running the test or printing the results.

RUNning the test

> Running System
> Performance Diag

This message is displayed while the test is running.

> Test Passed
> STEP to view results

At the end of the test, a message tells the user if the all tests have "Passed", if the test detected "Warnings" which means that some of the measurements are marginal, or if any test has "Failed". The STEP key allows the user to view the results.

> Print report? YES

At the end of viewing the results, the user is given the option of printing the results.

VIEWing the test results

The user is not expected to interpret the results of these tests. If a test has produced a warning or failure, a "W" or "F" will appear next to the test name. The parameter on the left is the value stored when the instrument was originally installed. The parameter on the right is the latest test result.

Control cooling conductance

FIG. 231JJJ

```
Ctrl Cooling Cond
Kcc=x.xx    New=x.xx
```

```
Sensor delay
Lag=xx      New=xx
```
Sample block sensor lag

```
Flow Test
Flow=xx.x   New=xx.x
```
Flow test - ramp cooling conductance at 10°C

```
Kc at 18°C
Kc18=xx.x   New=xx.x
```
Ramp cooling conductance at 18°C

```
Chill Pwr at 18°C
P_18=xxx    New=xxx
```
Cooling power at 18°C

PRINTing the test results

The user will receive a print of the test results in the form of the screens above. The instrument serial number is printed on the report.

VERIFY CALIBRATION

```
Enter Diag Test #5
VERIFY CALIBRATION
```

This test provides the user with a convenient way of verifying calibration at 40°C and 95°C and temperature non-uniformity at 40°C. Before the user runs this test, he places a temperature probe attached to a hand-held meter in a cell of the sample block.

```
Going to 40°C...
Cvr=xxxC    Blk=xx.xC
```
The test waits until the heated cover is at 40°C ± 10°C before starting.

```
Wait 3 minutes...
Time=mm:ss Blk=xx.xC
```
The block stabilizes at 40°C for 3 minutes. A count up timer counts out the 3 minutes.

```
Record Temperature
Time=mm:ss Blk=xx.xC
```
After 3 minutes, the user compares the block temperature to the hand-held meter display.

When the ENTER key is pressed, the test is repeated at a temperature of 95°C.

```
Going to 95°C...
Cvr=xxxC    Blk=xx.xC
```
The test waits until the heated cover is at 95°C ± 10°C before starting.

```
Wait 3 minutes...
Time=mm:ss Blk=xx.xC
```
The block stabilizes at 95°C for 3 minutes. A count up timer counts out the 3 minutes.

```
Record Temperature
Time=mm:ss Blk=xx.xC
```
After 3 minutes, the user compares the block temperature to the hand-held meter display.

What we claim is:

1. An apparatus for controlled automated performance of polymerase chain reactions in at least one sample tube containing a known volume of a liquid sample mixture, which apparatus comprises:
   a. A sample block having at least one well for said at least one sample tube,
   b. a computing apparatus,
   c. heating and cooling means controlled by said computing apparatus for changing the temperature of said sample block, and
   d. means for determining the temperature of said block in a first sample interval, wherein said first sample interval is an interval of time designated as time n;
   wherein said computing apparatus includes means for determining the temperature of said liquid sample mixture as a function of the temperature of said sample block over time by utilizing the relationship:

$$\text{Tsamp}_n = \text{Tsamp}_{n-1} + \text{TB}_n - \text{Tsamp}_{n-1}) * \text{tinterval}/\text{tau}$$

where $\text{Tsamp}_n$ is equal to the sample temperature in said first sample interval, $\text{Tsamp}_{n-1}$ is a sample temperature in a second sample interval immediately preceding the first sample interval, said second sample interval designated as time n−1, $\text{TB}_n$ is equal to the block termperature in said first sample interval, tinterval is a time in seconds between consecutive sample intervals, and tau is a function of thermal characteristics of said apparatus.

2. The apparatus of claim 1, wherein said thermal characteristics comprise a first thermal time constant corresponding to said at least one sample tube and said volume of said sample mixture, and a second thermal time constant corresponding to a block temperature sensor thermally coupled to said block.

3. The apparatus of claim 2, wherein tau equals approximately said first thermal time constant minus said second thermal time constant.

4. The apparatus of claim 3, wherein said first thermal time constant is between approximately 5 seconds and 14 seconds and said second thermal time constant equals approximately 1.5 seconds.

5. The apparatus of claim 1 further comprising an input device for receiving one or more user defined setpoints, each said setpoint defining a hold time / first temperature pair; and wherein said computing apparatus includes means for controlling said heating and cooling means as a function of said user defined setpoints and said sample temperature; and wherein said computing apparatus further comprises means to combine one or more setpoints in a user defined order to form a profile wherein the controlling of said heating and cooling means as a function of the setpoints in a said profile defines a profile run.

6. The apparatus of claim 7, wherein said first temperature defines a target sample temperature after ramping said sample temperature at a preselected ramp rate, and said hold time defines a length of time to maintain said sample at said first temperature after ramping.

7. The apparatus of claim 1 further including an input device for receiving user defined setpoints defining a hold time/temperature profile, wherein said computing apparatus includes means for controlling said heating and cooling means as a function of said user defined setpoints and said sample temperature.

8. The apparatus of claim 6, wherein said apparatus for controlled automated performance of polymerase chain reactions includes an enclosure for said sample block defining an enclosed ambient atmosphere, and wherein said sample block is comprised of a central region containing in an upper surface an array of sample wells for holding said at least one sample tube, an end edge region comprising two end edges at opposite ends of said block which are in thermal contact with said enclosed ambient atmosphere, and a manifold region comprising two manifold edges at opposite sides of said block, wherein each said manifold edge is thermally coupled to a manifold.

9. The apparatus of claim 8 wherein said heating means is a heater having a central heating zone thermally coupled to said central region, an end edge heating zone thermally coupled to said edge region, and a manifold heating zone thermally coupled to said manifold region.

10. The apparatus of claim 8 wherein said computing apparatus comprises means for determining an actual heating power to be applied to each said heating zone in said first sample interval, including:
    a. means for determining a theoretical second power representing the total power to apply to said block in said sample interval without accounting for power losses,
    b. means for determining theoretical third powers to be applied to each said zone in said first sample interval as a function of said theoretical second power,
    c. means for determining power losses by said regions in said first sample interval, and
    d. means for determining the actual heating power to be applied to each said heating zone as a function of said theoretical third powers and said power losses by said regions.

11. The apparatus of claim 10 wherein said means for determining said theoretical second power includes:
    a. means for determining a first fraction of the difference between the target sample temperature after ramping and the sample temperature in said second sample interval to be made up in said first sample interval, and
    b. means for determining said theoretical second power as a function of said first fraction, said sample temperature in said second sample interval and said block temperature in said second sample interval.

12. The apparatus of claim 11 wherein said means for determining said theoretical second power includes means for determining said theoretical second power as a function of:

$$CP * P/t_{interval} * ((SP - T_{samp_{n-1}}) * F * tau/t_{interval} + T_{samp_{n-1}} - T_{B_{n-1}})$$

where CP is equala to a thermal mass of said block P is a proportional term gain, SP is said target sample temperature after ramping, F is said first fraction and $T_{B_{n-1}}$ is equal to the temperature of the block in said second sample interval.

13. The apparatus of claim 10 wherein said computing apparatus comprises means for adjusting said theoretical second power when said sample temperature in said second sample interval is within an integral band of said target sample temperature after ramping, in order to close out remaining error.

14. The apparatus of claim 13, wherein said integral band is approximately $+/- 0.5°$ C.

15. The apparatus of claim 13 wherein said means for adjusting said theoretical second power comprises means for adjusting said theoretical second power as a function of a power adjustment term given approximately by:

$$\text{int\_sum}_n = \text{int\_sum}_{1-1} + (SP - T_{samp_{n-1}})$$

$$\text{pwr\_adj} = ki * \text{int\_sum}_n$$

where pwr_adj equals said power adjustment term, int_sum$_n$ is a value of an accumulating integral term in said first sample interval, int_sum$_{n-1}$ is a value of said accumulating integral term in said second sample interval, SP is said target sample temperature after ramping, and ki equals an integral gain.

16. The apparatus of claim 15, wherein said integral gain is approximately 512.

17. The apparatus of claim 10, wherein said means for determining power losses by said regions in said first sample interval comprises:

a. means for determining power lost to a foam backing on said sample block in said first sample interval, b. means for determining power lost to said manifolds in said first sample interval, and c. means for determining power lost to said enclosed ambient atmosphere in said first sample interval.

18. The apparatus of claim 17, wherein said means for determining power lost to said foam backing on said sample block in said first sample interval comprises:

a. means for determining the temperature of said foam backing in said first sample interval, b. means for determining said power lost to said foam backing as a function of said temperature of said foam backing in said first sample interval, said temperature of said block in said first sample interval, and a thermal mass of said foam backing.

19. The apparatus of claim 18, wherein said means for determining the temperature of the foam backing in said first sample interval comprises means for determining the temperature of the foam backing in said first sample interval according approximately to:

$$T_{foam_n} = T_{foam_{n-1}} + (T_{B_n} - T_{foam_{n-1}}) * t_{interval} / \text{tau2}$$

where $T_{foam_n}$ is equal to the temperature of the foam backing in said first sample interval, $T_{foam_{n-1}}$ is equal to the foam backing temperature in said second sample interval, and tau2 is a function of said thermal mass of said foam backing.

20. The apparatus of claim 19, wherein tau2 is approximately 30.

21. The apparatus of claim 18 wherein said means for determining the power lost to said foam backing comprises means for determining the power lost to said foam backing according approximately to:

$$\text{foam-pwr} = C * (T_{B_n} - T_{foam_n})$$

where foam-pwr is said power lost to said foam backing in said first sample interval, $T_{foam_n}$ is equal to the temperature of the foam in said first sample interval and C is equal to the thermal mass of the foam backing.

22. The apparatus of claim 17 additionally comprising means for delivering a bias coolant constantly applied to said sample block, and wherein said means for determining the power lost to said manifolds in said first sample interval comprises means for determining the power lost to said manifolds in said first sample interval according approximately to:

$$\text{manifold\_loss} = KA(T_{B_n} - T_{A_n}) + KD(T_{B_n} - T_{C_n}) + TM(dT/dt)$$

where manifold_loss equals said power lost to said manifolds in said first sample interval, KA equals an end edge region-to-enclosed ambient atmosphere conductance constant, $T_{A_n}$ equals the enclosed ambient atmosphere temperature in said first sample interval, $T_{C_n}$ equals the temperature of said bias coolant in said first sample interval, KC equals a sample block-to-coolant conductance constant, TM equals a thermal mass of said manifolds and dT/dt equals said preselected ramp rate.

23. The apparatus of claim 17 additionally comprising means for delivering a bias coolant constantly applied to said sample block, and wherein said means for determining the power lost to said enclosed ambient atmosphere in said first sample interval comprises means for determining the power lost to said enclosed ambient atmosphere in said first sample interval according approximately to:

$$\text{ambient\_loss} = K2A(T_{B_n} - T_{A_n}) + K2C(T_{B_n} - T_{C_n}) + TM2(dT/dt)$$

where ambient$_{13}$ loss is said power lost to said enclosed ambient atmosphere in said first sample interval, K2A equals an end edge region-to-enclosed ambient atmosphere conductance constant, $T_{A_n}$ equals the enclosed ambient atmosphere temperature in said first sample interval, K2C equals an end edge region-to-coolant conductance constant, $T_{C_n}$ equals the temperature of the bias coolant in said first sample interval, TM2 equals a thermal mass of said enclosed ambient atmosphere, and dT/dt equals said preselected ramp rate.

24. The apparatus of claim 10, wherein said means for determining the actual heating power to be applied to each said heating zone as a function of said theoretical third powers and said power losses by said regions comprises means for determining the actual heating power to be applied to each said heating zone as a function of said theoretical third powers and said power losses by said regions according approximately to:

$$\text{central\_pwr} = \text{pwr} * \text{cper}$$

ti manifold_pwr=pwr * mper+ manifold_loss $$\text{edge\_pwr} = \text{pwr} * \text{eper} + \text{ambient\_loss}$$

where pwr is a function of said theoretical second power plus power lost to a foam backing on said block in said first sample interval, manifold_loss equals a power lost to said manifolds in said first sample interval, ambient_loss equals a power lost in said edge region to said enclosed ambient atmosphere in said first sample interval, central_pwr equals a power to be applied to said central heating zone in said first sample interval, manifold_pwr equals a power to be applied to said manifold heating zone in said first sample interval, edge_pwr equals a power to be applied to said end edge heating zone in said first sample interval, cper equals a percentage of heater area in said central heating zone, mper equals a percentage of heater area in said manifold heating zone, and eper equals a percentage of heater area in said edge heating zone.

25. The apparatus of claim 24, wherein cper equals approximately 0.66, mper equals approximately 0.20 and eper equals approximately 0.14.

26. The apparatus of claim 8, wherein said sample block contains multiple transverse bias cooling channels alternating with multiple transverse ramp cooling channels, said bias and ramp cooling channels being parallel to said upper surface, said apparatus further comprising means for constantly pumping chilled coolant through said bias cooling channels and means for selectively pumping chilled coolant through said ramp cooling channels comprising valve means controlled by said computing apparatus.

27. The apparatus of claim 26 wherein said computing apparatus comprises means for determining a total cooling power to be applied to said block in said first sample interval including:

a. means for determining a theoretical cooling power representing the total power to apply to said block in said first sample interval without accounting for power losses, b. means for determining power losses in said block regions in said first sample interval, and c. means for determining said total cooling power as a function of said theoretical cooling power and said power losses.

28. The apparatus of claim 27 wherein said means for selectively pumping chilled coolant through said ramp cooling including further comprises:

a. means for determining that ramp direction is downward, b. means for determining a cooling breakpoint as a function of said block temperature and a temperature of said coolant, and c. means for determining if coolant will be pumped through said ramp cooling channels as a function of said total cooling power and said cooling breakpoint, wherein the determination made by said means for determining if coolant will be pumped through said ramp cooling channels constitutes a ramp cooling decision.

29. The apparatus of claim 27 wherein said means for determining said theoretical cooling power includes:

a. means for determining a second fraction of the difference between the target sample temperature after ramping and the sample temperature in said second sample interval to be made up in said first sample interval, and b. means for determining said theoretical cooling power as a function of said second fraction, said sample temperature in said second sample interval and said block temperature in said second sample interval.

30. The apparatus of claim 29, wherein said means for determining said theoretical cooling power comprises means for determining said theoretical cooling power as a function of:

$$CP * P/t_{interval} * ((SP-T_{samp_{n-}}) * F * tau/t_{interval} + T_{samp_{n-1}} - T_{B_{n-1}})$$

where CP is equal to a thermal mass of said block, P is a proportional term gain, SP equals said target sample temperature after ramping, $T_{B_{n-1}}$ is equal to the temperature of the block in said second sample interval, F is said second fraction and $T_{B_{n-1}}$ is equal to the temperature of the block in said second sample interval.

31. The apparatus of claim 27 wherein said computing apparatus comprises means for adjusting said theoretical cooling power when said sample temperature in said second sample interval is within an integral band of said target sample temperature after ramping, in order to close out remaining error.

32. The apparatus of claim 31, wherein said integral band is approximately $+/_{31}$ 0.5° C.

33. The apparatus of claim 31, wherein said means for adjusting said theoretical cooling power comprises means for adjusting said theoretical cooling power as a function of a power adjustment term given approximately by:
int_sum$_n$=int_sum$_{n-1}$ +(SP−T$_{sampn-1}$)

pwr_adj=ki * int_sum$_n$ where pwr_adj equals said power adjustment term, int_sum$_n$ is a value of an accumulating integral term in said first sample interval, int_sum$_{n-1}$ is a value of said accumulating integral term in said second sample interval, SP equals said target sample temperature after ramping, and ki equals an integral gain.

34. The apparatus of claim 33, wherein said integral gain is approximately 512.

35. The apparatus of claim 27, wherein said means for determining power losses in said block regions in said first sample interval comprises:

a. means for determining power lost to a foam backing on said sample block in said first sample interval b. means for determining power lost to said manifolds in said first sample interval, and c. means for determining power lost to said enclosed ambient atmosphere in said first sample interval.

36. The apparatus of claim 35, wherein said means for determining power lost to said foam backing on said sample block in said first sample interval comprises:

a. means for determining the temperature of said foam backing in said first sample interval, b. means for determining said power lost to said foam backing as a function of said temperature of said foam backing in said sample interval, said temperature of said block in said first sample interval, and a thermal mass of said foam backing.

37. The apparatus of claim 36, wherein said means for determining the temperature of the foam backing in said first sample interval comprises means for determining the temperature of the foam backing in said first sample interval according approximately to:

$$T_{foam_n} = T_{foam_{n-1}} 30 \ (T_{B_n} - T_{foam_{n-1}}) * t_{interval} / tau2$$

where $T_{foam_n}$ is equal to the temperature of the foam backing in said first sample interval, $T_{foam_{n-1}}$ is equal to the foam backing temperature in said second sample interval, and tau2 is a function of said thermal mass of said foam backing.

38. The apparatus of claim 37, wherein tau2 is approximately 30.

39. The apparatus of claim 37, wherein said means for determining the power lost to said foam backing comprises means for determining the power lost to said foam backing according approximately to:
foam-pwr=C * $(T_{B_n} - T_{foam_n})$
where foam-pwr is said power lost to said foam backing in said first sample interval, $T_{foam_n}$ is equal to the temperature of the foam in said first sample interval and C is equal to the thermal mass of the foam backing.

40. The apparatus of claim 35, wherein said means for determining the power lost to said manifolds in said first sample interval comprises means for determining the power lost to said manifolds in said first sample interval according approximately to:

$$manifold\_loss = KA \ (T_{B_n} - T_{A_n}) + KC \ (T_{B_n} - T_{C_n}) + TM \ (dT/dt)$$

where manifold_loss equals said power lost to said manifolds in said first sample interval, KA equals an end edge region-to-enclosed ambient atmosphere conductance constant, $T_{A_n}$ equals the enclosed ambient atmosphere temperature in said first sample interval, $T_{C_n}$ equals a temperature of said bias coolant in said first sample interval, KC equals a sample block-to-coolant conductance constant, TM equals a thermal mass of said manifolds and dT/dt equals said preselected ramp rate.

41. The apparatus of claim 35, wherein said means for determining the power lost to said enclosed ambient atmosphere in said first sample interval comprises means for determining the power lost to said enclosed ambient atmosphere in said first sample interval according approximately to:

$$\text{ambient\_loss} = K2A\ (T_{B_n} - T_{A_n}) + K2C\ (T_{B_n} - T_{C_n}) + TM2(dT/dt)$$

where ambient_loss is said power lost to said enclosed ambient atmosphere in said first sample interval, K2A equals an end edge region-to-enclosed ambient atmosphere conductance constant, $T_{A_n}$ equals the enclosed ambient atmosphere temperature in said first sample interval, K2C equals an end edge region-to-coolant constant, $T_{C_n}$ equals the coolant temperature in said first sample interval, TM2 equals a thermal mass of said enclosed ambient atmosphere, and dT/dt equals said preselected ramp rate.

42. The apparatus of claim 28, wherein said cooling breakpoint is a function of the difference between said block temperature in said first sample interval and said temperature of said coolant fluid in said first sample interval.

43. The apparatus of claim 28, wherein said means for determining if said ramp cooling channels will be open further comprises means for determining if said ramp cooling channels will be open as a function of the difference between said total cooling power and said cooling breakpoint.

44. The apparatus of claim 1, further comprising means for overshooting the temperature of said sample block above a desired sample temperature, thereby decreasing an upramp time required for said liquid sample mixture to achieve said desired sample temperature.

45. The apparatus of claim 44 further comprising means for controlling the overshoot such that it is equal to or less than approximately 0.5° C.

46. The apparatus of claim 15 additionally comprising means for delivering a bias coolant constantly applied to said sample block, and wherein said means for adjusting said theoretical second power comprises means for dynamically modifying said integral gain when said sample temperature is within said integral band of said target sample temperature, and said apparatus is performing an upramp, according approximately to:

$$\text{Gain}_n = C1*(SP - TC_n) + C2$$

Where $\text{Gain}_n$ is said integral gain in said first sample interval, C1 is a first gain constant, SP is said target sample temperature after ramping, $TC_n$ is the temperature of said coolant in said first sample interval and C2 is a second gain constant.

47. The apparatus of claim 46, wherein said C1 equals approximately 0.65.

48. The apparatus of claim 46, wherein said C2 equals approximately 109.

49. The apparatus of claim 46, wherein said C2 equals approximately 105.

50. The apparatus of claim 46 wherein a gain constant is used for said integral gain when said sample temperature is within a second integral band of said target sample temperature, said second integral band being smaller than said integral band.

51. The apparatus of claim 50, wherein said integral band is approximately ±11° C. and said second integral band is approximately ±0.5° C.

52. The apparatus of claim 50, wherein said gain constant is approximately 512.

53. The apparatus of claim 1, further comprising means for undershooting the temperature of said sample block below a desired sample temperature, thereby decreasing a downramp time required for said liquid sample mixture to achieve said desired sample temperature.

54. The apparatus of claim 53 further comprising means for controlling the undershoot such that it is equal to or less than approximately 0.5° C.

55. The apparatus of claim 28 further comprising means for dynamically changing said means for determining said theoretical cooling power such that the temperature of the block will undershoot said target sample temperature after ramping in a controlled fashion.

56. The apparatus of claim 55 further comprising means for activating, as a function of said target sample temperature after ramping, ramp direction, and said ramp cooling decision, said means for dynamically changing said means for determining said theoretical cooling power.

57. The apparatus of claim 54, wherein said means for activating said means for dynamically changing said means for determining said theoretical cooling power comprises means for activating said means for dynamically changing said means for determining said theoretical cooling power if said target sample temperature after ramping is greater than approximately 45° C., ramp direction is downward and said ramp cooling decision is not to ramp.

58. The apparatus of claim 55, wherein said means for dynamically changing said means for determining said theoretical cooling power further comprises means for determining said theoretical cooling power as a function of:

$$CP\ P/t_{interval}*((SP - T_{B_{n-1}})*F*\text{tau}/t_{interval})$$

59. The apparatus of claim 1, wherein said means for determining the temperature of said block in said first sample interval comprises means for determining the temperature of said block in said first sample interval as a function of at least one temperature of said block in a previous sample interval.

60. The apparatus of claim 1, wherein said means for determining the temperature of said block in said first sample interval comprises means for reading the temperature of said block from a block temperature sensor thermally coupled to said block.

61. The apparatus of claim 1, wherein $t_{interval}$ equals approximately 0.2 seconds.

62. The apparatus of claim 1, wherein said known volume of liquid sample mixture is in the range of approximately 20–100 microliters.

63. The apparatus of claim 5, wherein said computing apparatus comprises means for receiving user issued commands to invoke said profile runs, wherein said invoking causes said profiles to be run at least once.

64. The apparatus of claim 63, wherein said input device further comprises means for receiving a user defined cycle count number for a plurality of said profiles, and wherein said computing means comprises means for running said profiles said cycle count number of times automatically when said profiles are invoked.

65. The apparatus of claim 64, wherein said computing apparatus further comprises means for linking multiple profiles in any order to form a protocol, said protocol defining a sequence of said profiles to be invoked automatically upon said command from the user, wherein invoking said sequence of profiles automatically defines a protocol run.

66. The apparatus of claim 65, wherein said computing apparatus further comprises means for linking a single profile a plurality of times in a single protocol.

67. The apparatus of claim 65, wherein said computing apparatus further comprises means for storing a plurality of protocols.

68. The apparatus of claim 67, wherein said computing apparatus comprises means for including any said profile in a plurality of said protocols.

69. The apparatus of claim 65, wherein said computing apparatus comprises means for protecting a profile included in any said protocol from being deleted or overwritten.

70. The apparatus of claim 5, further comprising means for determining that an electrical power to operate said apparatus went off during a said profile run.

71. The apparatus of claim 70 further comprising means for reporting the length of said electrical power outage when said electrical power is restored.

72. The apparatus of claim 70, further comprising means for automatically starting a soak of said liquid sample mixture upon restoration of said electrical power.

73. The apparatus of claim 72, wherein said soak occurs at approximately 4° C.

74. The apparatus of claim 64, further comprising means for automatically increasing the hold time of any or all said setpoints from cycle to cycle in said cycle count.

75. The apparatus of claim 74, wherein activation of said means for automatically increasing the hold time of any or all setpoints from cycle to cycle is selectable as a user level option.

76. The apparatus of claim 74, wherein said computing apparatus comprises means for receiving first user defined values defining an increment in hold time from cycle to cycle, and wherein said means for automatically increasing the hold time comprises means for automatically increasing the hold time of any or all said setpoints from cycle to cycle as a first function of said first user defined values.

77. The apparatus of claim 76, wherein said first function is a linear function.

78. The apparatus of claim 76, wherein said first function is a geometric function.

79. The apparatus of claim 64 further comprising means for automatically decreasing the hold time of any or all setpoints from cycle to cycle in said cycle count.

80. The apparatus of claim 79, wherein activation of said means for automatically decreasing the hold time of any or all setpoints from cycle to cycle is selectable as a user level option via said input device.

81. The apparatus of claim 79, wherein said computing apparatus comprises means for receiving second user defined values defining a decrement in hold time from cycle to cycle, and wherein said means for automatically decreasing the hold time comprises means for automatically decreasing the hold time of any or all said setpoints from cycle to cycle as a second function of said second user defined values.

82. The apparatus of claim 81, wherein said second function is a linear function.

83. The apparatus of claim 81, wherein said second function is a geometric function.

84. The apparatus of claim 64 further comprising means for automatically increasing the first temperature of any or all said setpoints from cycle to cycle in said cycle count.

85. The apparatus of claim 84, wherein activation of said means for automatically increasing the first temperature of any or all setpoints from cycle to cycle is selectable as a user level option.

86. The apparatus of claim 84, wherein said computing apparatus comprises means for receiving third user defined values defining an increment in the first temperature from cycle to cycle, and wherein said means for automatically increasing the first temperature comprises means for automatically increasing the first temperature of any or all setpoints from cycle to cycle as a third function of said third user defined values.

87. The apparatus of claim 86, wherein said third function is a linear function.

88. The apparatus of claim 86, wherein said third function is a geometric function.

89. The apparatus of claim 64 further comprising means for automatically decreasing the first temperature of any or all said setpoints from cycle to cycle in said cycle count.

90. The apparatus of claim 89, wherein activation of said means for automatically decreasing the first temperature of any or all setpoints from cycle to cycle is selectable as a user level option.

91. The apparatus of claim 89, wherein said computing apparatus comprises means for receiving fourth user defined values defining a decrement in first temperature from cycle to cycle, and wherein said means for automatically decreasing the first temperature comprises means for automatically decreasing the first temperature of any or all setpoints from cycle to cycle as a fourth function of said fourth user defined values.

92. The apparatus of claim 91, wherein said fourth function is a linear function.

93. The apparatus of claim 91, wherein said fourth function is a geometric function.

94. The apparatus of claim 65, further comprising a programmed pause option means to automatically suspend a said profile run for a user defined period of time.

95. The apparatus of claim 94, further comprising a programmed pause option means to automatically suspend a said protocol run for a user defined period of time.

96. The apparatus of claim 95, wherein said pause option means comprises means to suspend a said profile run at any point in a said profile run or during any or all cycles of a said profile invocation, and further comprising means for suspending a said protocol run after any or all said profile runs in a said protocol run.

97. The apparatus of claim 6 further comprising user-controllable means for defining a temperature range such that said computing apparatus will commence timing said hold time when said sample temperature is within said temperature range of said target sample temperature.

98. The apparatus of claim 2, further comprising an input device for receiving a tube type and a reaction volume, and wherein said computing apparatus comprises means for determining said thermal time constant for said sample tube as a function of said tube type and said sample volume.

99. The apparatus of claim 9, further comprising means for performing diagnostic checks of said heating means.

100. The apparatus of claim 99, wherein said diagnostic checks of said heating means comprises one or more heater ping tests, block thermal capacity tests, ramp cooling conductance tests, sensor lag tests.

101. The apparatus of claim 99, further comprising means for performing diagnostic checks of a cooling capacity of said apparatus.

102. The apparatus of claim 101, wherein said diagnostic checks comprise one or more control cooling conductance tests, block thermal capacity tests, chiller tests, ramp cooling conductance tests, sensor lag tests, coolant capacity tests.

103. The apparatus of claim 1, further comprising means for performing hardware diagnostics on user demand and/or automatically upon system start-up.

104. The apparatus of claim 103, wherein said hardware diagnostics include tests of one or more of a Programmable Peripheral Interface device, Battery RAM device, Battery RAM checksum, EPROM devices, Programmable Interface Timer devices, Clock/Calendar device, Programmable Interrupt Controller device, Analog to Digital Section, RS-232 Section, Display Section, Keyboard, Beeper, Ramp Cooling Values, EPROM mismatch, Firmware version level, Battery RAM Checksum and Initialization, Autostart Program Flag, Clear Calibration Flag, Heated Cover heater and control circuitry, Edge heater and control circuitry, Manifold heater and control circuitry, Central heater and control circuitry, Sample block thermal cutoff, Heated cover thermal cutoff.

105. The apparatus of claim 60 further comprising means for adjusting temperature sensor readings from said block temperature sensor to account for drift in analog circuitry.

106. The apparatus of claim 105 wherein said means for adjusting temperature sensor readings from said block temperature sensor to account for drift in the analog circuitry further comprises means for determining said drift, wherein said means for determining are capable of:

a) Measuring one or more test voltages under controlled conditions, b) Reading said voltages at the start of each run, and c) Measuring said drift as a function of said test voltages under controlled conditions and said voltages at the start of each run.

107. The apparatus of claim 65, wherein said computing apparatus comprises a means to display the approximate amount of time left in a said profile run or in a said protocol run.

108. The apparatus of claim 65, wherein said computing apparatus comprises means for displaying, during a said profile or protocol run, the sample temperature at any given time in said profile or protocol run.

109. The apparatus of claim 6, further comprising means for determining, for one or more setpoints, a first difference between said sample temperature after said hold time has expired and said target sample temperature of said setpoint.

110. The apparatus of claim 109, further comprising means for receiving and storing a user defined temperature differential.

111. The apparatus of claim 110, wherein said computing apparatus comprises means to report an error if said user defined temperature differential is greater than said first difference.

112. The apparatus of claim 6, further comprising means for configuring a second temperature, and further comprising means for causing said heating and cooling means to maintain said sample at said second temperature during any idle state.

113. The apparatus of claim 6, further comprising means for determining that, for one or more setpoints, said first temperature is reached within a user definable amount of time.

114. The apparatus of claim 89, further comprising means for determining whether said automatically decreased first temperature remains within a defined range.

115. The apparatus of claim 84, further comprising means for determining whether said automatically increased first temperature remains within a defined range.

116. The apparatus of claim 79, further comprising a means to determine whether said automatically decreased hold time is negative.

117. The apparatus of claim 60 further comprising means to continually monitor said block sensor and to invoke an abort procedure if block sensor readings are above a maximum desireable temperature for said block by a predetermined number of degrees for a predetermined number of times.

118. The apparatus of claim 117, wherein said abort procedure comprises means for one or more of aborting the profile or protocol run, flagging an error in a history file, displaying message alerts to a user, disabling said heating means.

119. The apparatus of claim 65, further comprising means for printing information stored in said system.

120. The apparatus of claim 119, wherein said information comprises one or more of: contents of a profile, contents of a protocol, listing of created profiles, listing of created protocols, configuration parameters, system calibration parameters.

121. The apparatus of claim 1, further comprising means for controlling all user controllable functions remotely.

122. The apparatus of claim 1 wherein said computing apparatus comprises means to display a menu driven user interface.

123. The apparatus of claim 65 wherein said computing apparatus maintains a history file of an immediately previous run containing details of said previous run suitable for integrity checks and error analysis.

124. Thermocycler apparatus for automated performance of a polymerase chain reaction comprising a. a metal sample block having a major top surface and a major bottom surface, b. an array of spaced-apart sample wells formed in said major top surface, c. bias cooling constantly applied to said sample block at a rate sufficient to cause said block, if at a temperature within the range of 35°–100° C., to cool uniformly at a rate of at least about 0.1° C./sec unless external heat is supplied, and d. computer-controllable heating means for uniformly raising the temperature of said block at a rate greater than the bias cooling rate, said thermocycler apparatus comprising means for maintaining the array of sample wells at a constant in the range of 35°–100° C. within a tolerance band of plus or minus about 0.5° C.

125. Thermocycler apparatus according to claim 124 wherein said array comprises a rectangular array having rows of spaced-apart sample wells.

126. Thermocycler apparatus according to claim 125 wherein said array comprises an 8-by-12 rectangular array having center-to-center sample well spacing compatible with industry standard microliter plate format.

127. Thermocycler apparatus according to claim 126 wherein said sample block has a block thermal capacity of about 500–600 watt-seconds per °C.

128. Thermocycler apparatus according to claim 125 wherein said sample block contains multiple transverse bias cooling channels through said block parallel to said top surface and parallel to and spaced from the rows of wells, and wherein said bias cooling is applied by pumping cooling liquid through said bias cooling channels.

129. Thermocycler apparatus according to claim 128 wherein said bias cooling channels are insulated.

130. Thermocycler apparatus according to claim 124 wherein said computer-controllable heating means comprises multiple, separately controllable heating zones for said block, at least one first zone for the portion of the block containing the array of sample wells and at least one second zone for the peripheral portion of the block outside the array.

131. Thermocycler apparatus according to claim 130 wherein said computer-controllable heating means comprises a multizone film heater in thermal contact with said major bottom surface.

132. Thermocycler apparatus according to claim 124 wherein said sample block includes around its periphery a guard band having thermal characteristics similar to the block portion containing the array and wherein said guard band is bias cooled and controllably heated.

133. Thermocycler apparatus according to claim 132 wherein said guard band includes a groove formed in said top surface extending substantially around said array, decreasing the thermal conductivity between the block portion containing the array and the guard band.

134. Thermocycler apparatus according to claim 132 wherein said computer-controllable heating means comprises multiple, separately controllable heating zones for said block, at least one first zone for the portion of the block containing the array of sample wells and at least one second zone for the guard band.

135. Thermocycler apparatus according to claim 134 wherein said computer-controllable heating means comprises a multizone film heater in thermal contact with said major bottom surface.

136. Thermocycler apparatus according to claim 124 further comprising computer-controllable ramp cooling means capable of lowering the temperature of said block at a rate of at least about 4° C. per second from 100° C. and at least about 2° C. per second from 40° C.

137. Thermocycler apparatus according to claim 136 wherein said array comprises a rectangular array comprising rows of spaced-apart sample wells, wherein said sample block contains multiple transverse bias cooling channels alternating with multiple transverse ramp cooling channels, and wherein said bias cooling and said ramp cooling are applied by pumping cooling liquid through said ramp cooling channels and said bias cooling channels.

138. Thermocycler apparatus according to claim 137 further comprising means to deliver cooling liquid to opposite ends of successive ramp cooling channels.

139. Thermocycler apparatus according to claim 136 wherein said computer-controllable heating means is capable of ramp heating.

140. Thermocycler apparatus according to claim 139 wherein said controllable heating comprises multiple, separately controllable heating zones for said block, at least one first zone for the portion of the block containing the array of sample wells and at least one second zone for the portion of the block outside the array.

141. Thermocycler apparatus according to claim 140 wherein said computer-controllable heating means comprises a multizone film heater in thermal contact with said major bottom surface.

142. Thermocycler apparatus according to claim 124 further comprising means for seating into the wells in said array sample tubes of nonidentical height with a seating force on each sample tube sufficient to cause a snug, flush fit between the surface of the tube and the surface of the well.

143. Thermocycler apparatus according to claim 142 wherein said means for seating comprises deformable, compliant, gas-tight caps for said sample tubes, a vertically displaceable platen, and controllable means for forcibly lowering said platen to maintain said seating force on the cap for each tube.

144. Thermocycler apparatus-according to claim 143 wherein said platen is maintained at a heated temperature in the range of 94°–110° C.

145. Thermocycler apparatus according to claim 144 wherein said platen is maintained at a temperature in the range of 100°– 110° C.

146. Thermocycler apparatus according to claim 124 further comprising a computer system for controlling said heating means.

147. Thermocycler apparatus according to claim 136, wherein said computer system controls said ramp cooling means.

148. Thermocycler apparatus for automated, rapid performance of a polymerase chain reaction comprising a. a thermally homogeneous metal sample block of low thermal mass having a major top surface and a major bottom surface, said block containing in a central region of its upper surface an 8-by-12 rectangular array of sample wells having center-to-center spacing compatible with industry standard microtiter plate format, said block also containing a peripheral region surrounding said array, said peripheral region comprising a guard band having thermal characteristics similar to the thermal characteristics of the central region, b. a bias cooling system for constantly cooling said sample block at a bias cooling rate sufficient to cause said block, if at a temperature within the range of 35°–100° C., to cool uniformly at a rate of at least about 0.1° C./sec unless external heat is supplied, c. a computer system for receiving and storing user data regarding times and temperatures defining a plurality of reaction cycles, d. a ramp cooling system controlled by said computer system for selectively cooling said sample block at a ramp cooling rate of at least about 4° C./sec from 100° C. and at least about 2° C./sec from 40° C., e. a multizone heating system controlled by said computer system having a heating zone for the central region of the block and a heating zone for the guard band, said heating system comprising means for providing heat necessary to maintain the sample block at a constant temperature in the range of 35°–100° C. and also capable of providing ramp heating to the block, f. a pressing cover vertically displaceable above said sample block, and g. cover displacing means for raising said cover and for lowering said cover and maintaining its vertical position against a resisting force of at least about 3000 grams, said thermocycler apparatus comprising means for maintaining the array of sample wells at a constant temperature in the range of 35°–100° C. within a tolerance band of plus or minus 0.5° C.

149. Thermocycler apparatus according to claim 148 wherein said pressing cover comprises a heated platen maintainable at a temperature in the range of 94°–110° C.

150. Thermocycler apparatus according to claim 148 wherein said multizone heating system comprises a film heater in thermal contact with the bottom surface of the sample block.

151. Thermocycler apparatus according to claim 150 wherein said bias cooling system comprises a series of bias cooling channels through said block parallel to said top surface and parallel to and spaced from the rows of wells, and pump means for pumping cooling liquid through said bias cooling channels.

152. Thermocycler apparatus according to claim 151 wherein said ramp cooling system comprises a series of ramp cooling channels through said block parallel to the bias cooling channels and spaced apart therefrom and from the rows of wells, and pump means for pumping cooling liquid through said ramp cooling channels, entering at opposite ends of successive ramp cooling channels.

153. Thermocycler apparatus according to claim 152 wherein there is one bias cooling channel and one ramp cooling channel proximate each row of sample wells.

154. Thermocycler apparatus according to claim 148 further comprising h. a two-piece plastic holder for loosely holding up to 96 microtiter sample tubes of a preselected design, each having a cylindrically shaped upper section open at its top end and a closed, tapered lower section extending downwardly therefrom, each tube being of circular cross section and having a circumferential shoulder extending outwardly from said upper section at a position on said upper section spaced from the open end thereof, comprising aa. a one-piece tray member comprising
  i. a flat, horizontal plate section containing 96 holes in an 8-by-12 rectangular array compatible with industry standard microtiter plate format, said holes being slightly larger than the outside diameter of the upper sections of said tubes but smaller than the outside diameter of said shoulder,
  ii. a first vertical tray sidewall section completely around said plate extending upwardly to a height greater than the height of a tube resting in one of said holes,
  iii. a second vertical tray sidewall section around said plate extending downwardly approximately to the bottom of the upper section of a tube resting in one of said holes,
bb. a one-piece retainer releasably engageable inside said tray over any sample tubes resting in said tray comprising
  i. a flat, horizontal plate section containing 96 holes in an 8-by-12 rectangular array compatible with industry standard microtiter plate format, said holes being slightly larger than the outside diameter of the upper sections of said tubes but smaller than the outside diameter of said shoulder,
  ii. a vertical retainer sidewall section around said retainer plate section extending upwardly from said plate, wherein when said retainer is engaged inside said tray, the retainer plate section lies slightly above the shoulder of a tube resting in said tray and the first tray sidewall section is about as high as said retainer sidewall section, whereby tubes resting in said tray are retained loosely both vertically and laterally and extend downwardly into said sample wells,
  i. up to 96 microtiter sample tubes in said holder, each of which engages a deformable cap for forming a gas-tight seal thereon, and each of which said caps protrudes slightly above an uppermost edge of said two-piece plastic holder when said sample tubes are seated in said holder and in said sample wells.

155. Thermocycler apparatus according to claim 154 wherein the downward displacement of said cover deforms the tops of said caps downwardly until the displacement is stopped by said uppermost edge of said two-piece plastic holder.

156. Thermocycler apparatus according to claim 155 wherein said uppermost edge of said two-piece plastic holder contacts the underside of said cover around the entire periphery of said edge, thus forming a gas-tight seal.

157. Thermocycler apparatus according to claim 148 comprising at least two heating zones for the guard band.

158. The apparatus of either of claims 1 or 150, further comprising said tube wherein said tube comprises a PCR reaction-compatible one-piece plastic microcentrifuge-type tube comprising a first substantially cylindrically shaped upper wall section and a second substantially conically shaped lower wall section characterized by said second wall section being substantially reduced in thickness relative to said first wall section to a thickness of no more than approximately 0.012 inches, wherein substantially entirely said second wall section contacts the wall of said well.

159. The apparatus of either of claims 1 or 142, further comprising said tube wherein said tube comprises a PCR reaction-compatible one-piece plastic microcentrifuge-type tube comprising a first substantially cylindrically shaped upper wall section and a second substantially conically shaped lower wall section characterized by said second wall section being substantially reduced in thickness relative to said first wall section to a thickness of no more than approximately 0.012 inches, wherein substantially entirely said second wall section contacts the wall of said well and further comprising a cap wherein said cap is of one piece and is pivotally attached to said tube and removably insertable into said tube to hermetically seal it, said cap comprising a substantially cylindrically shaped third lower section, a resiliently deformable closed fourth top section and a circumferential shoulder, extending radially outwardly, attached to said third section.

160. In a combination of a thermal cycler for performing a polymerase chain reaction comprising a temperature-controlled metal block having an array of tapered wells in its top surface, and a plurality of individual reaction tubes having similarly tapered lower sections and upper sections which project above the top surface of the block when the tubes are placed in said wells, the improvement comprising means for seating said tubes in said wells, said seating means comprising:

a) resiliently deformable sealing caps removably attached to said tubes, b) a platen, c) support means for supporting the platen above the block, and d) displacement means associated with the support means for raising the platen above said caps and for lowering it so as to apply a force of at least 30 grams to each cap.

161. The apparatus according to claim 160 further comprising controllable heating means to maintain said platen at a preselected temperature in the range of 94°–100° C.

162. The apparatus according to claim 161 further comprising skirt means attached to said support means for isolating said block and said tubes.

163. The apparatus according to claim 161, wherein said displacement means comprises screw means.

164. The apparatus according to claim 161 further comprising a two-piece plastic holder for loosely holding up to 96 of said tubes, each tube having a cylindrically shaped upper section open at its top end and a closed, tapered lower section extending downwardly therefrom, each tube also being of circular cross section and having a circumferential shoulder extending outwardly from said upper section at a position on said upper section spaced from the open end thereof, comprising a one-piece tray member comprising
  i. a flat, horizontal plate section containing 96 holes in an 8-by-12 rectangular array compatible with industry standard microtiter plate format, said holes being. Slightly larger than the outside diameter of the upper sections of said tubes but smaller than the outside diameter of said shoulder.
  ii. a first vertical tray sideway section completely around said plate extending upwardly to a height greater than the height of a tube resting in one of said holes, and
  iii. a second vertical tray sidewall section around said plate extending downwardly approximately to the bottom of the upper section of a tube resting in one of said holes, and b. a one-piece retainer releasably engageable inside said tray over any sample tubes resting in said tray comprising
i. a flat, horizontal plate section containing 96 holes in an 8-by-12 rectangular array compatible with industry standard microtiter plate format, said holes being slightly larger than the outside diameter of the upper sections of said tubes but smaller than the outside diameter of said shoulder, and
ii. a vertical retainer sidewall section around said retainer plate section extending upwardly from said plate, wherein when said retainer is engaged inside said tray, the retainer plate section lies slightly above the shoulder of a tube resting in said tray and the first tray sidewall section is about as high as said retainer sidewall section, whereby tubes resting in said tray are retained loosely both vertically and laterally and wherein said holes in said two-piece plastic holder generally align with said wells in said metal block when said two-piece plastic holder is in place on said metal block.

165. The apparatus according to claim 164, wherein said displacement means includes means for lowering said platen so as to apply a force of 50–100 grams to each cap.

166. The apparatus of claim 164, wherein said displacement means further comprises means for seating said platen on said uppermost edge of said holder such that said tubes are substantially enclosed by the block, the uppermost edge of said holder and the platen.

167. The apparatus of claim 160, wherein said plurality of reaction tubes are loosely held in an array.

* * * * *

UNITED STATES PATENT AND TRADEMARK OFFICE
CERTIFICATE OF CORRECTION

PATENT NO. : 5,475,610
DATED : DECEMBER 12, 1995
INVENTOR(S) : ATWOOD ET AL.

It is certified that error appears in the above-identified patent and that said Letters Patent is hereby corrected as shown below:

In claim 1, Column 243, line 20, before "TBn" insert - - ( - - .

In claim 161, Column 258, line 35, change "100°C" to - - 110°C - - .

Signed and Sealed this

Twenty-sixth Day of September, 2000

Attest:

Q. TODD DICKINSON

*Attesting Officer*   *Director of Patents and Trademarks*